United States Patent
Rogers et al.

(10) Patent No.: US 12,427,556 B2
(45) Date of Patent: Sep. 30, 2025

(54) USER-REMOVABLE, ELECTRICALLY HEATED, AND MECHANICALLY ACTUATED BUCKET UNIT FOR ORGANIC MATTER PROCESSING APPARATUS

(71) Applicant: Chewie Labs LLC, San Bruno, CA (US)

(72) Inventors: Matthew Lee Rogers, San Francisco, CA (US); Harry E. Tannenbaum, San Francisco, CA (US); Adam Mittleman, Redwood City, CA (US); Jaideep Singh Chavan, Mountain View, CA (US); Pinida Jan Moolsintong, San Francisco, CA (US)

(73) Assignee: Chewie Labs LLC, San Bruno, CA (US)

( * ) Notice: Subject to any disclaimer, the term of this patent is extended or adjusted under 35 U.S.C. 154(b) by 615 days.

(21) Appl. No.: 17/897,507

(22) Filed: Aug. 29, 2022

(65) Prior Publication Data
US 2023/0081670 A1    Mar. 16, 2023

Related U.S. Application Data

(60) Provisional application No. 63/313,946, filed on Feb. 25, 2022, provisional application No. 63/239,852, filed on Sep. 1, 2021.

(51) Int. Cl.
*B09B 3/35*    (2022.01)
*B02C 18/00*    (2006.01)
(Continued)

(52) U.S. Cl.
CPC ............ *B09B 3/35* (2022.01); *B02C 18/0092* (2013.01); *B02C 18/067* (2013.01); *B02C 18/24* (2013.01);
(Continued)

(58) Field of Classification Search
CPC ..... B02C 18/16; B02C 18/18; B02C 18/0092; B02C 18/067; B02C 18/24;
(Continued)

(56) References Cited

U.S. PATENT DOCUMENTS 5,340,536 A    8/1994 Datar et al.
5,634,600 A    6/1997 Kubota et al.
(Continued)

FOREIGN PATENT DOCUMENTS

EP    0791568    8/1997
JP    2002-001262    1/2002
(Continued)

OTHER PUBLICATIONS

Jayalakshmi et al., "Waste to Wealth—A Novel Approach for Food Waste Management"; published in: 2017 IEEE International Conference on Electrical, Instrumentation and Communication Engineering (ICEICE); Date of Conference: Apr. 27-28, 2017.
(Continued)

*Primary Examiner* — Michael L Hobbs
(74) *Attorney, Agent, or Firm* — Van Court & Aldridge LLP

(57) ABSTRACT

Embodiments disclosed herein provide a bucket assembly and method of use thereof. The bucket assembly is a relatively lightweight and removable apparatus that can fracture cut, paddle, and heat contents contained therein. The bucket assembly can include a housing that has a curved metal plate and blade array attached thereto. A cut and paddle assembly can rotate within the housing and interface with the blade array to fracture cut contents contained therein. The cut and paddle assembly is also operative to mix the contents to ensure full dispersal within the housing. A flexible heater array is attached to and operative to heat the curved metal plate. The combination of the fracture cutting,
(Continued)

paddling, and heating can convert organic matter to a ground and selectively desiccated product.

21 Claims, 88 Drawing Sheets

(51) Int. Cl.
| | | |
|---|---|---|
| *B02C 18/06* | (2006.01) | |
| *B02C 18/24* | (2006.01) | |
| *B09B 3/40* | (2022.01) | |
| *F26B 3/20* | (2006.01) | |
| *B02C 18/16* | (2006.01) | |
| *B09B 101/70* | (2022.01) | |

(52) U.S. Cl.
CPC .............. *B09B 3/40* (2022.01); *F26B 3/20* (2013.01); *B02C 2018/162* (2013.01); *B09B 2101/70* (2022.01)

(58) Field of Classification Search
CPC ....... B02C 2018/162; B09B 3/35; B09B 3/40; B09B 2101/70; F26B 3/20; F26B 3/06; F26B 3/22; F26B 9/082; F26B 11/16; F26B 23/04; F26B 25/006; F26B 25/005; F26B 25/22; F26B 2200/04; F26B 2200/02; F26B 1/005
See application file for complete search history.

(56) References Cited

U.S. PATENT DOCUMENTS

| | | | |
|---|---|---|---|
| 6,150,939 | A | 11/2000 | Lin |
| 7,240,865 | B2 | 7/2007 | Choi |
| 9,308,535 | B2 | 4/2016 | Delgado et al. |
| 9,597,620 | B2 | 3/2017 | Verdegan et al. |
| 9,895,726 | B1 | 2/2018 | Atkinson et al. |
| 10,065,196 | B1 | 9/2018 | Tran et al. |
| 10,906,046 | B2 | 2/2021 | Crepeau et al. |
| 11,241,694 | B2 | 2/2022 | Crepeau et al. |
| 11,278,908 | B2 | 3/2022 | Crepeau et al. |
| 11,389,804 | B2 | 7/2022 | Hayman et al. |
| 11,541,397 | B2 | 1/2023 | Crepeau et al. |
| 2003/0155228 | A1 | 8/2003 | Mills |
| 2004/0175303 | A1 | 9/2004 | Lin |
| 2004/0251339 | A1 | 12/2004 | Strutz |
| 2004/0265197 | A1 | 12/2004 | Lin |
| 2007/0190212 | A1 | 8/2007 | Lee |
| 2008/0067270 | A1 | 3/2008 | Strutz |
| 2009/0113791 | A1 | 5/2009 | Bertin et al. |
| 2009/0200180 | A1 | 8/2009 | Capote |
| 2010/0140248 | A1 | 6/2010 | Yi et al. |
| 2011/0020184 | A1 | 1/2011 | Sun |
| 2011/0062259 | A1 | 3/2011 | Gregoire |
| 2011/0151553 | A1 | 6/2011 | Cruson et al. |
| 2012/0021504 | A1 | 1/2012 | Bradlee |
| 2012/0034350 | A1 | 2/2012 | Gard et al. |
| 2012/0298658 | A1 | 11/2012 | Bosetti et al. |
| 2013/0217111 | A1 | 8/2013 | Chang |
| 2013/0263786 | A1 | 10/2013 | Meisel, III et al. |
| 2014/0117126 | A1 | 5/2014 | Ceru et al. |
| 2015/0196920 | A1 | 7/2015 | Celli et al. |
| 2015/0376882 | A1 | 12/2015 | Park |
| 2016/0022112 | A1 | 1/2016 | Davenport |
| 2016/0207845 | A1 | 7/2016 | Delgado et al. |
| 2016/0295906 | A1 | 10/2016 | Jacobsen et al. |
| 2017/0197857 | A1 | 7/2017 | Whitener et al. |
| 2017/0226466 | A1 | 8/2017 | Grillo et al. |
| 2017/0260111 | A1 | 9/2017 | Maghas et al. |
| 2017/0349501 | A1 | 12/2017 | Buzruk |
| 2018/0093814 | A1 | 4/2018 | Espinosa |
| 2018/0148391 | A1 | 5/2018 | Ashbee et al. |
| 2019/0030544 | A1 | 1/2019 | Kratzer, III et al. |
| 2019/0083989 | A1 | 3/2019 | Tran et al. |
| 2019/0152698 | A1 | 5/2019 | Zhao |
| 2020/0001389 | A1 | 1/2020 | Ryan et al. |
| 2020/0147617 | A1 | 5/2020 | Atkinson et al. |
| 2020/0148604 | A1 | 5/2020 | Atkinson et al. |
| 2020/0353473 | A1 | 11/2020 | Hayman et al. |
| 2020/0353474 | A1 | 11/2020 | Crepeau et al. |
| 2021/0154676 | A1* | 5/2021 | Crepeau ............ B02C 23/18 |
| 2022/0242799 | A1 | 8/2022 | Ying et al. |
| 2022/0347693 | A1 | 11/2022 | Hayman et al. |
| 2023/0142555 | A1 | 5/2023 | Hotte et al. |
| 2023/0149939 | A1 | 5/2023 | Crepeau et al. |

FOREIGN PATENT DOCUMENTS

| | | |
|---|---|---|
| JP | 2004-216253 | 12/2004 |
| JP | 2006255592 | 9/2006 |
| KR | 19980047631 | 9/1998 |
| KR | 100692243 | 3/2007 |
| KR | 100694645 B1 | 3/2007 |
| KR | 100694646 B1 | 3/2007 |
| KR | 20090123375 | 12/2009 |
| KR | 101017615 B1 | 2/2011 |
| KR | 101017616 B1 | 2/2011 |
| KR | 101053035 B1 | 8/2011 |
| KR | 101187381 | 10/2012 |
| KR | 101332453 | 11/2013 |
| KR | 101461608 | 12/2014 |
| KR | 20150112689 | 10/2015 |
| KR | 102474495 B1 | 4/2016 |
| KR | 20160044110 | 4/2016 |
| KR | 101866863 | 6/2018 |
| KR | 300966490 S | 7/2018 |
| KR | 101882829 B1 | 8/2018 |
| KR | 101884662 B1 | 8/2018 |
| KR | 101921624 B1 | 11/2018 |
| KR | 101941620 | 1/2019 |
| KR | 301095230 S | 2/2021 |
| KR | 301109396 S | 5/2021 |
| KR | 301109397 S | 5/2021 |
| KR | 301109403 S | 5/2021 |
| KR | 301109404 S | 5/2021 |
| KR | 301154947 S | 3/2022 |
| KR | 301140601 S | 12/2022 |
| KR | 301202238 S | 2/2023 |
| KR | 1020230060939 A | 5/2023 |
| KR | 301223966 S | 11/2023 |
| WO | WO2008030997 | 3/2008 |
| WO | WO2009157744 | 12/2009 |
| WO | WO2015182929 | 3/2015 |
| WO | WO2016060290 | 4/2016 |
| WO | WO2016102947 | 6/2016 |
| WO | WO2017083944 | 5/2017 |
| WO | WO2022055212 A1 | 3/2022 |

OTHER PUBLICATIONS

Zhu, "Food Waste Drum Sieve Design"; Mar. 26, 2015; Technology, Communication and Transport; Sovonia University of Applied Sciences.

* cited by examiner

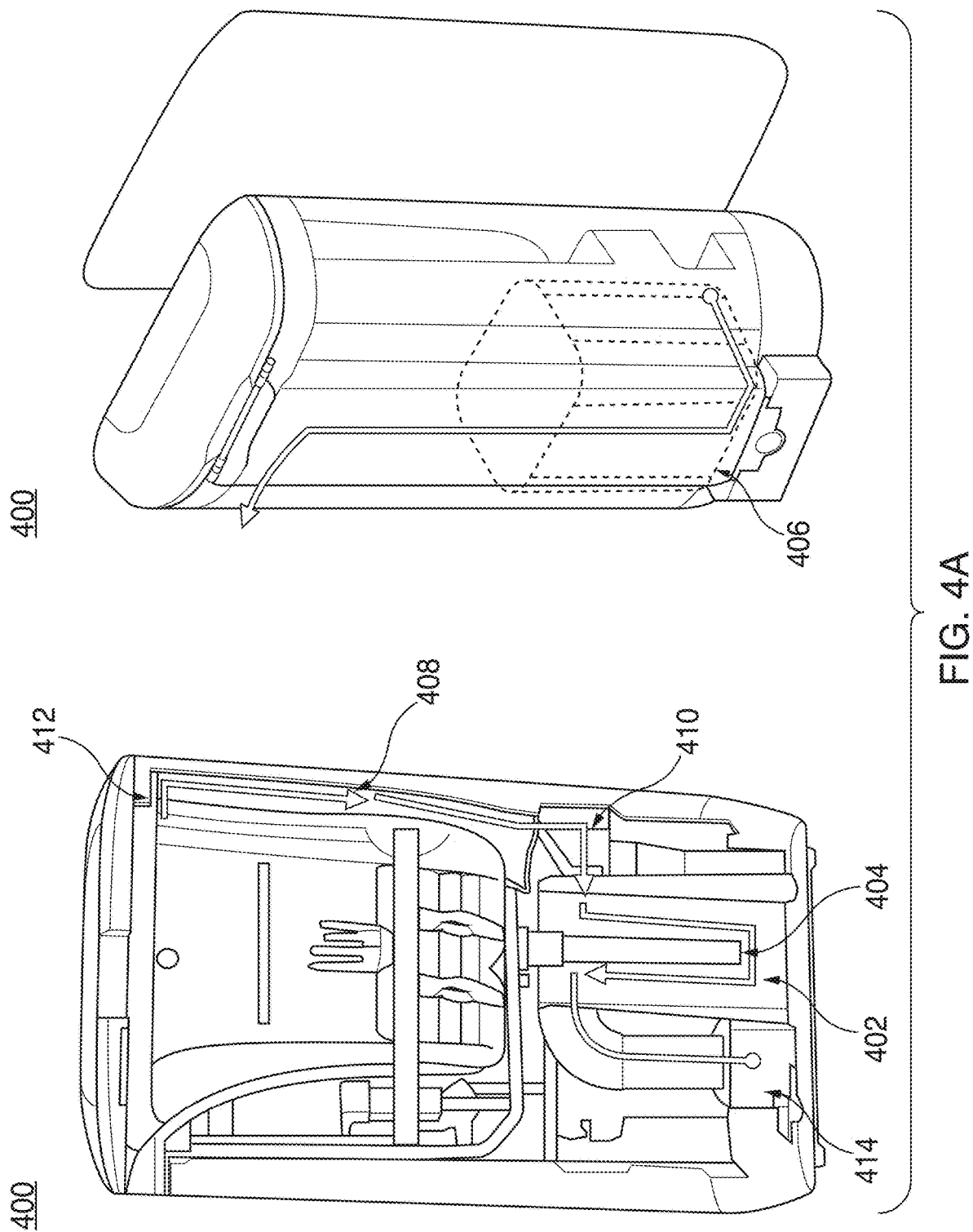

1200

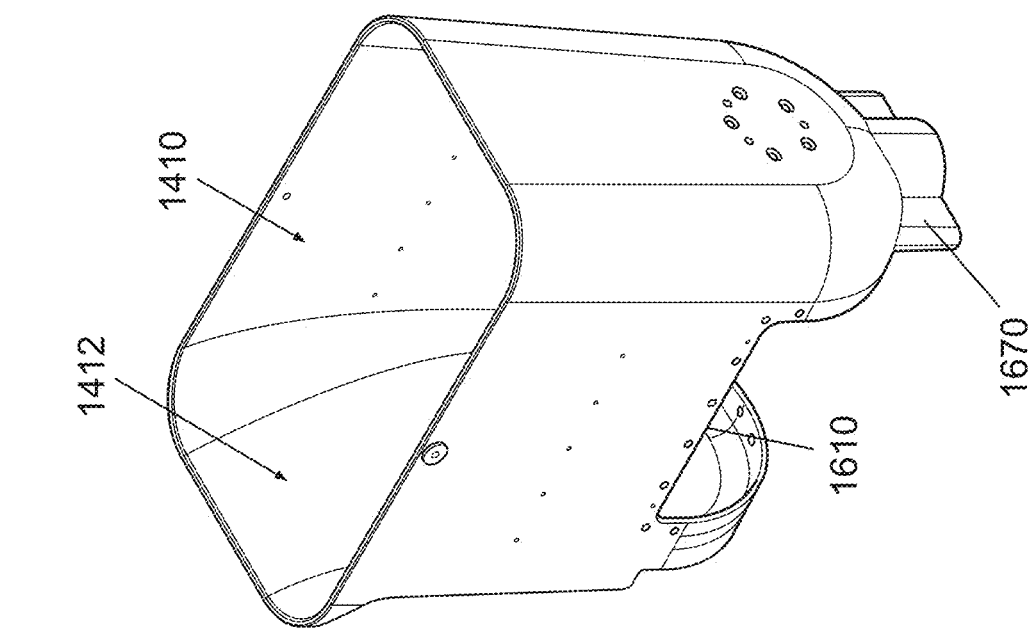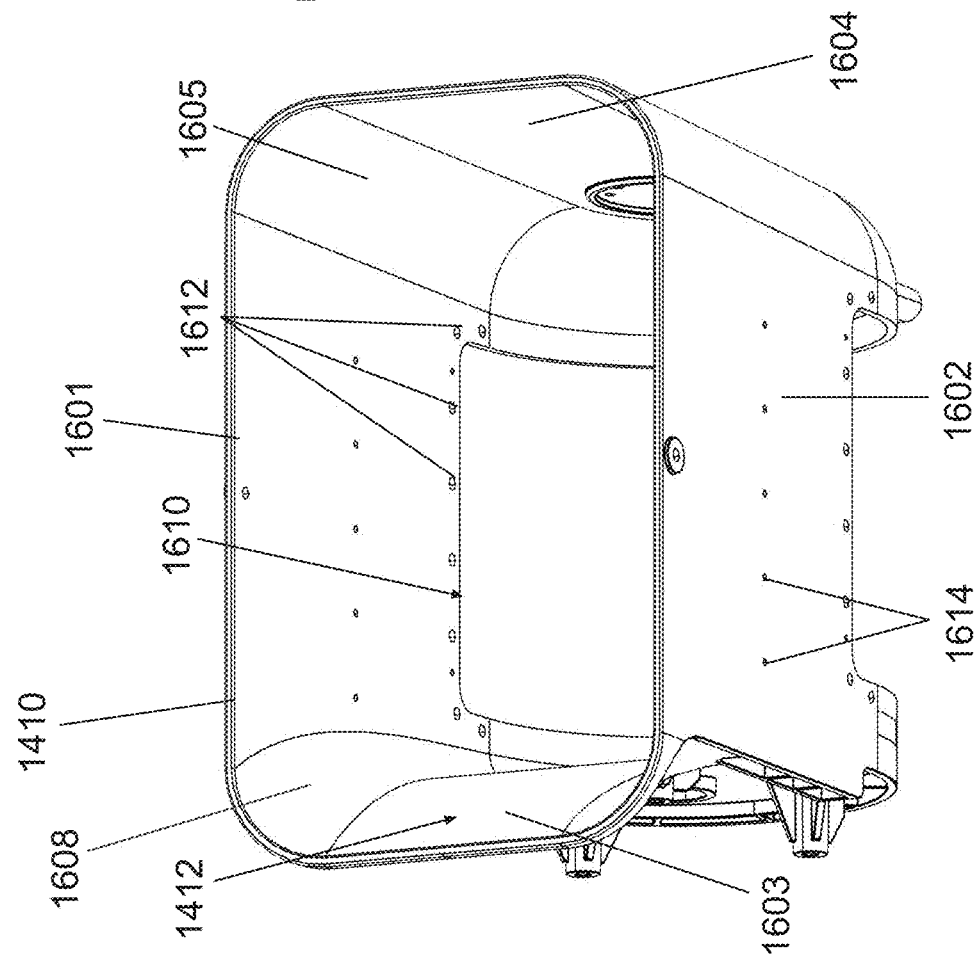
FIG. 16B
FIG. 16A

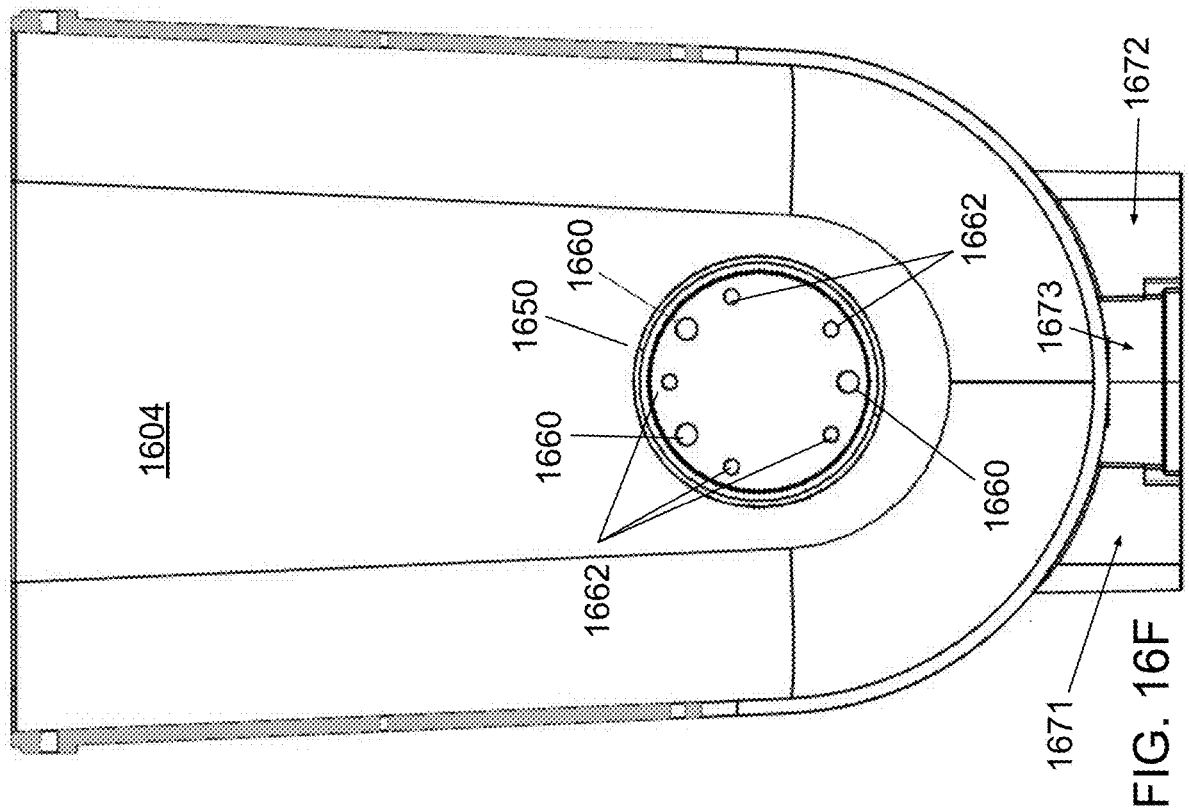
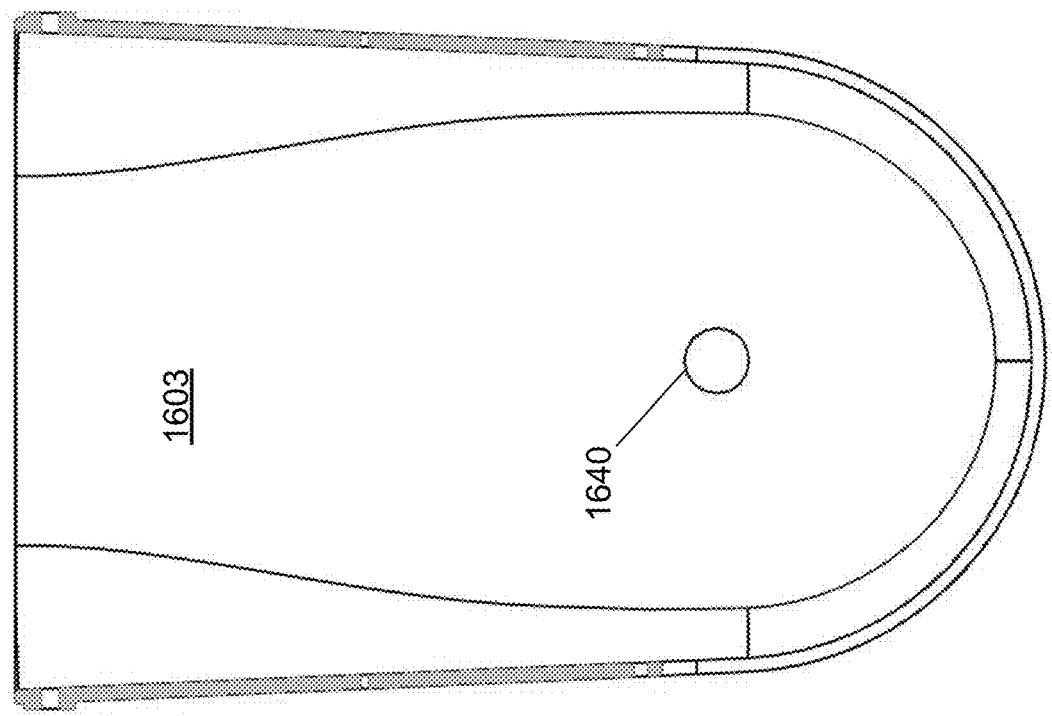

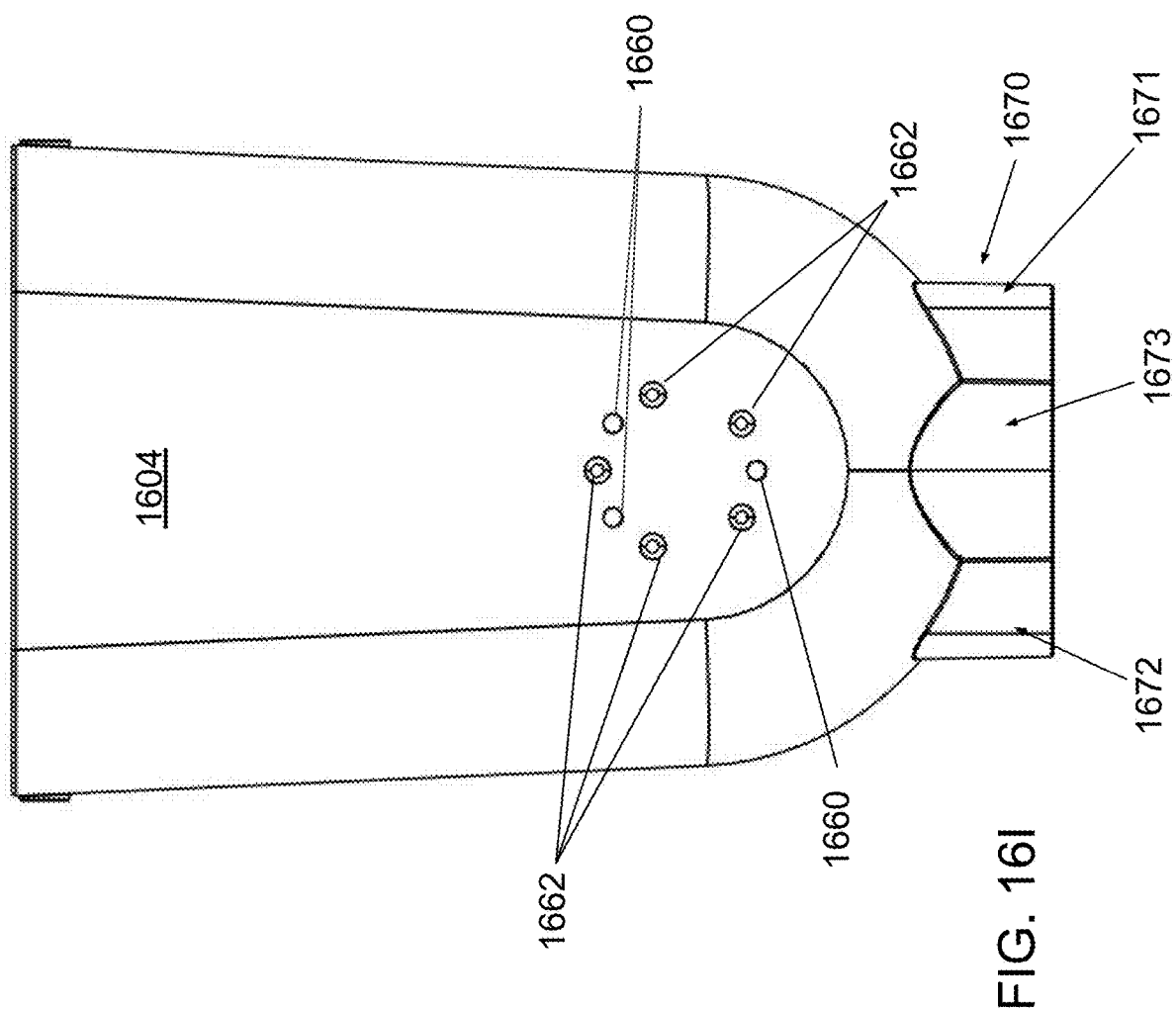

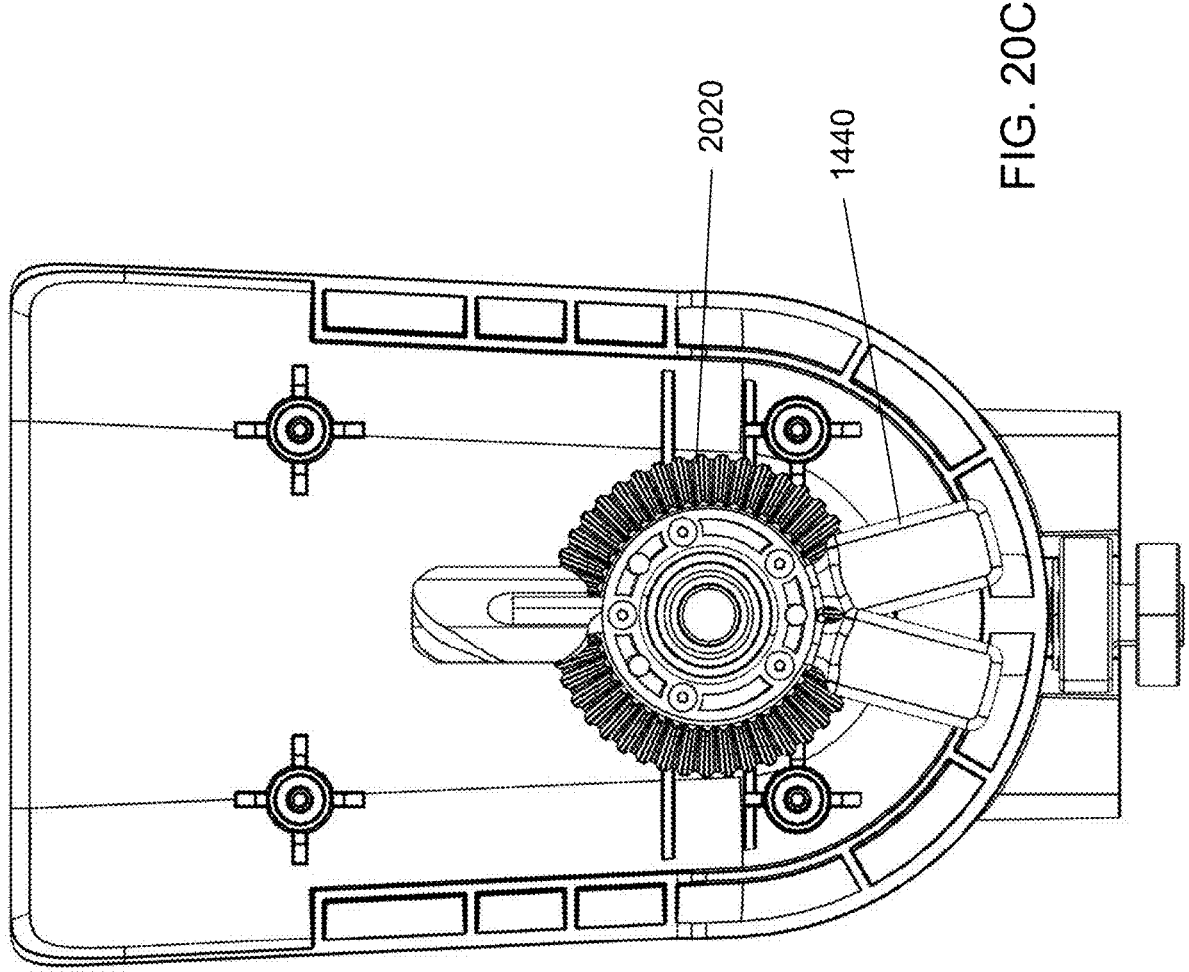

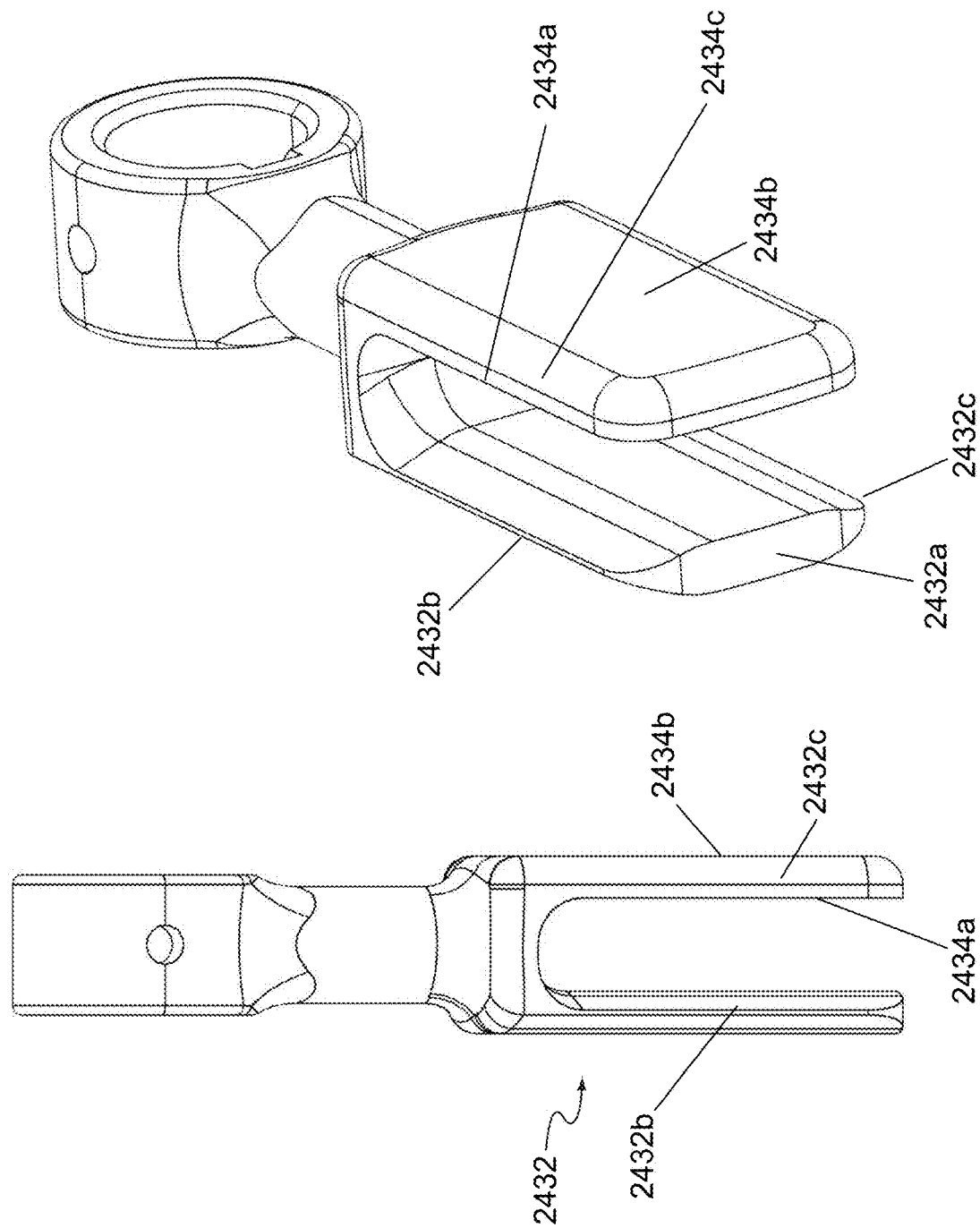

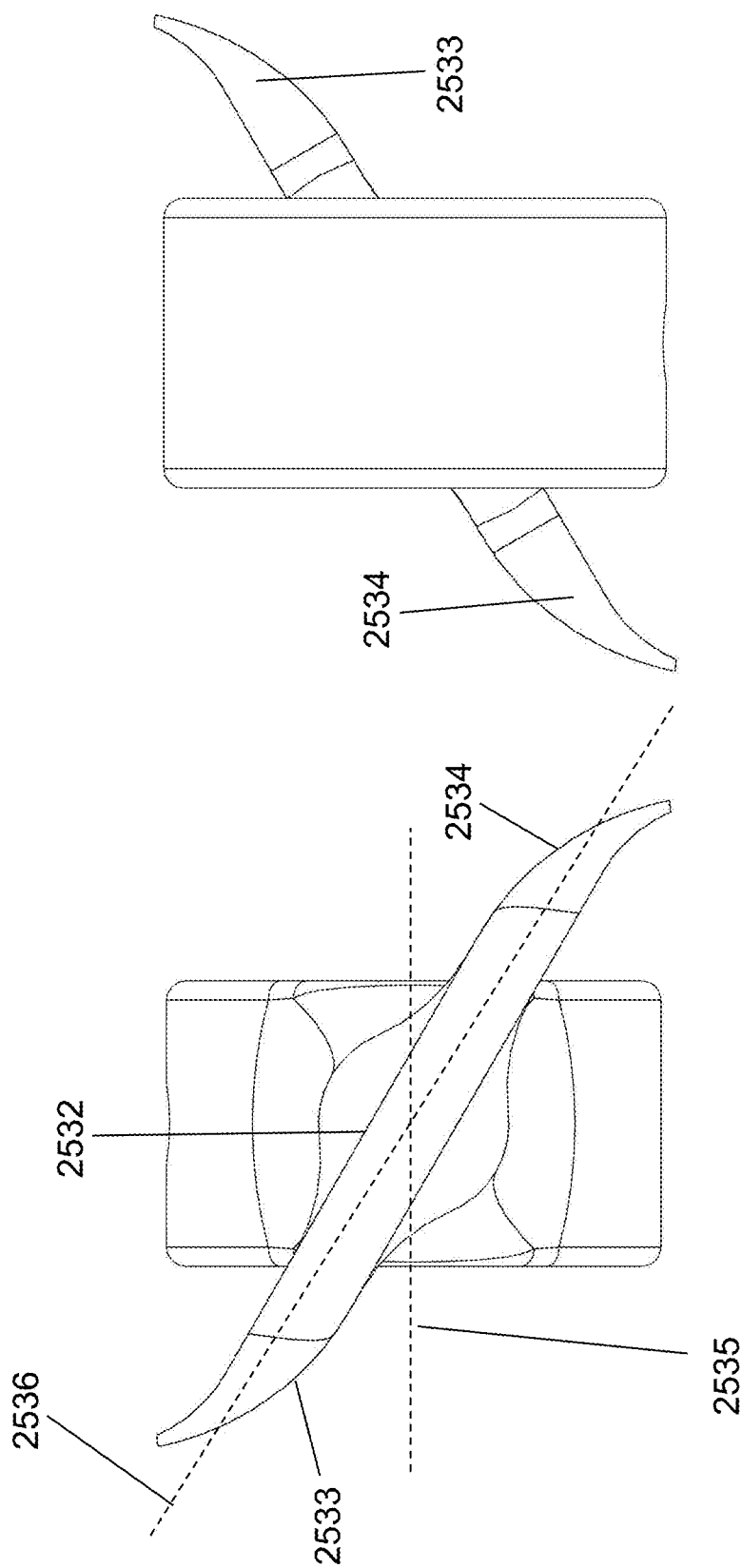

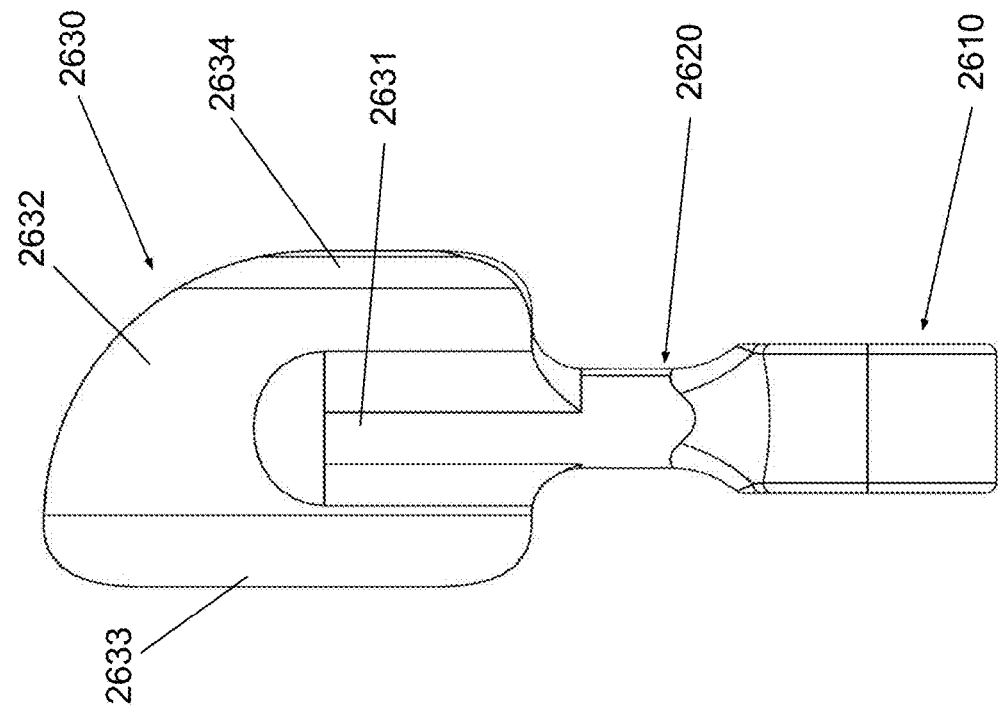
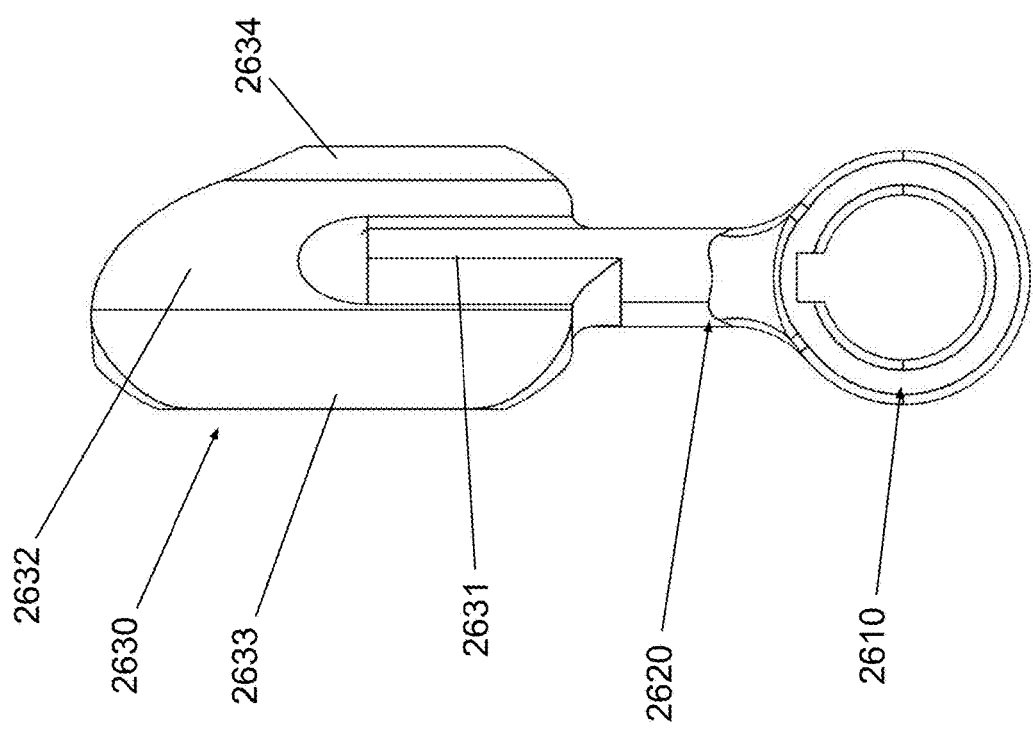
FIG. 26B
FIG. 26A

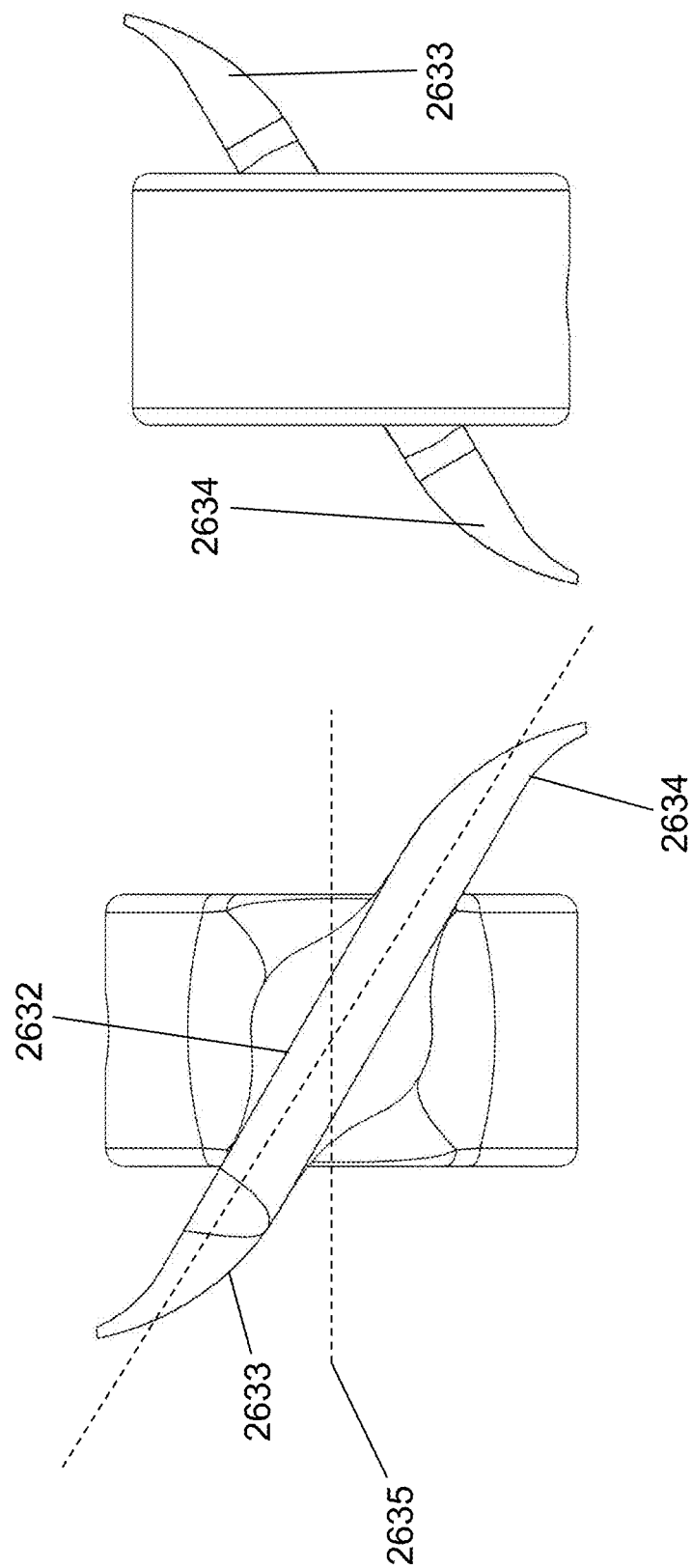

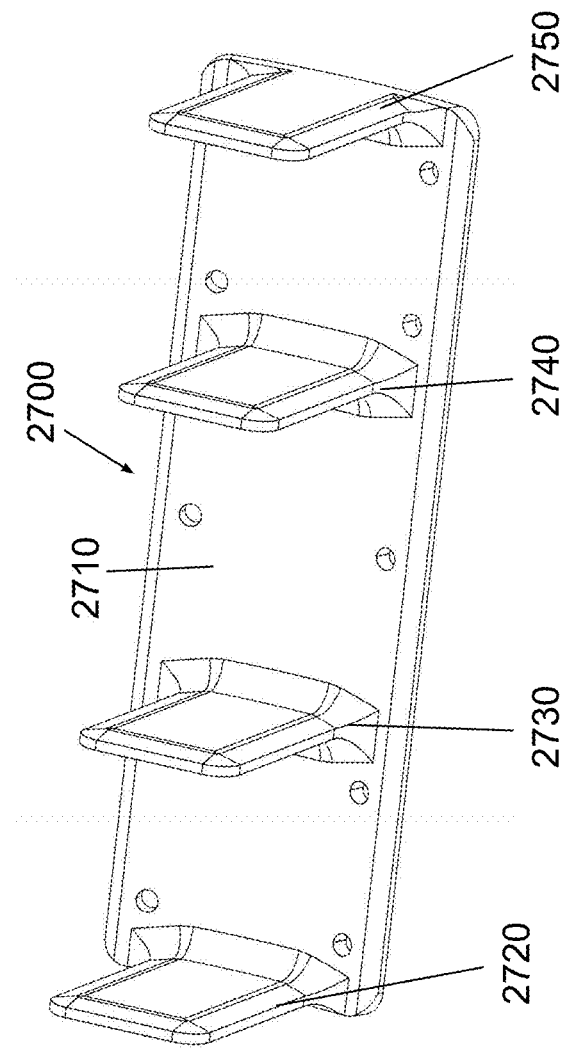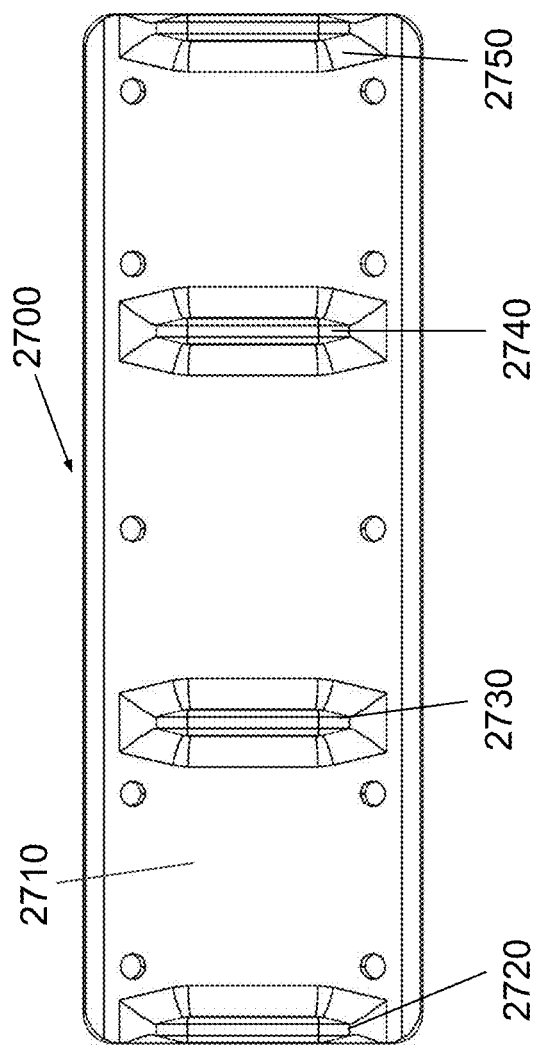
FIG. 27A
FIG. 27B

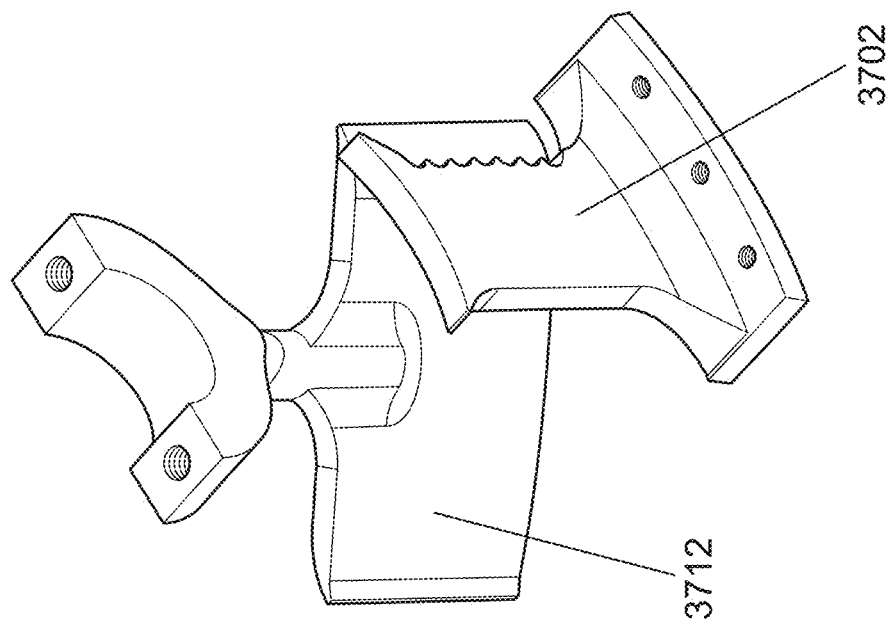
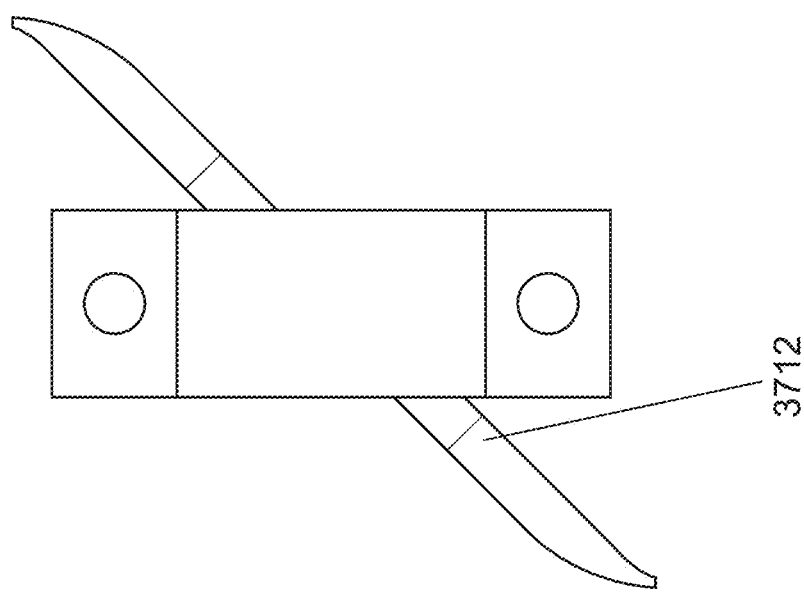
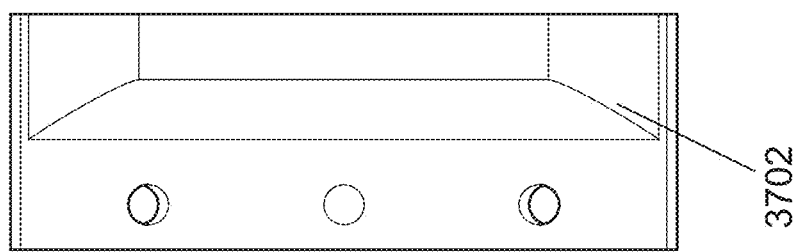
FIG. 37B
FIG. 37A

USER-REMOVABLE, ELECTRICALLY HEATED, AND MECHANICALLY ACTUATED BUCKET UNIT FOR ORGANIC MATTER PROCESSING APPARATUS

CROSS-REFERENCE TO A RELATED APPLICATION

This patent application claims the benefit of U.S. Provisional Application No. 63/239,852, filed Sep. 1, 2021, and U.S. Provisional Application No. 63/313,946, filed Feb. 25, 2022, the disclosures of which are incorporated herein in their entireties.

TECHNICAL FIELD

This patent specification relates to bucket assemblies and methods for processing organic matter with the bucket assembly, and more particularly to processing organic matter with an electrically heated and mechanically actuated bucket assembly.

BACKGROUND

The terms "waste management" and "waste disposal" may be used to refer to the activities required to manage waste from its inception to its disposal. These activities generally include the collection, transport, treatment, and disposal of waste, together with monitoring the process to ensure compliance with related ordinances, rules, and laws. Landfills represent the oldest form of waste management.

A common form of waste in landfills is food and other organic matter. This is a significant problem since food and other organic matter degrades into methane—a powerful greenhouse gas—without oxygen. These harmful emissions can be avoided by diverting food and other organic matter from landfills. One way to divert food and other organic matter from landfills is to process the food and other organic matter into a partially desicatted product using a conventional food recycler or food grinder. These conventional food recylers and food grinders, however, are not efficient in processing food and other organic matter.

BRIEF SUMMARY

Embodiments disclosed herein provide an organic matter processing apparatus and method for the use thereof to convert organic matter into a ground and desiccated product. This can be accomplished using a bucket assembly that can grind, paddle, and heat organic matter contained therein. The bucket assembly can include a housing that has a curved metal plate and blade array attached thereto. A cut and paddle assembly can rotate within the housing and interface with the blade array to fracture cut and grind contents contained therein. The cut and paddle assembly can also mix the contents to ensure full dispersal within the housing. A flexible heater array is attached and operative to heat the curved metal plate.

A further understanding of the nature and advantages of the embodiments discussed herein may be realized by reference to the remaining portions of the specification and the drawings.

BRIEF DESCRIPTION OF THE DRAWINGS

FIG. 4A includes isometric front and rear perspective views of an organic matter processing apparatus where the durable housing is transparent to show additional details according to embodiment.

FIGS. 16A-16K show different views of a housing of the bucket assembly according to embodiment.

FIGS. 20A, 20B, and 20C show illustrative top, perspective, and side views, respectively, of a transmission housing with transmission gears according to embodiment.

FIGS. 24A-24E show different views of a cutter fork according to embodiment.

FIGS. 25A-25E show different views of a paddle according to an embodiment.

FIGS. 26A-26E show different views of another type of paddle according to an embodiment.

FIGS. 27A-27C show different views of a blade array according to an embodiment.

FIGS. 33A-38B show different grinding mechanisms according to various embodiments.

Figure 1:
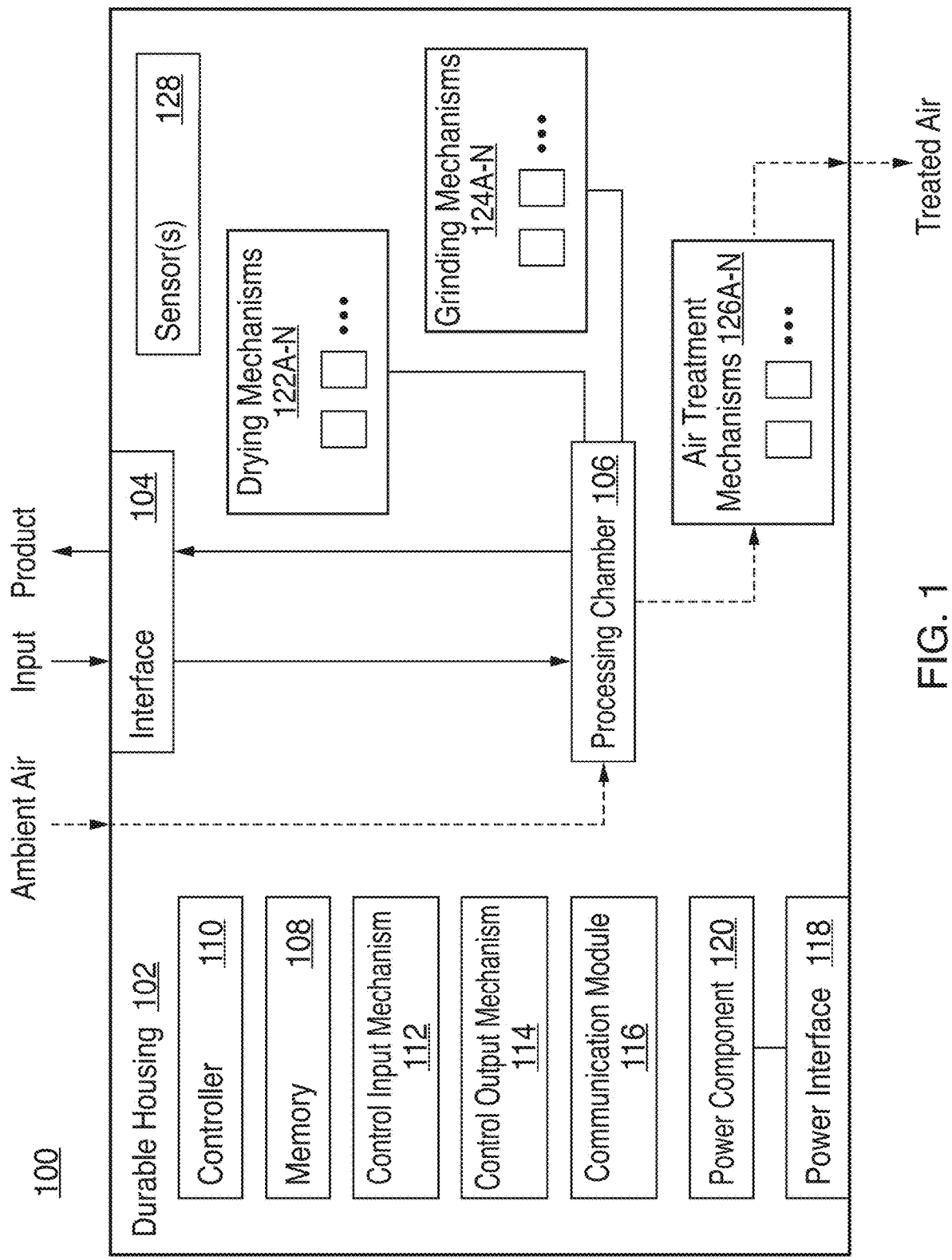
FIG. 1 includes a high-level illustration of an organic matter processing apparatus in accordance with various embodiments according to embodiment.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

As defined herein, an organic matter processing apparatus (OMPA) is an aero-mechanical device operative to convert OMPA input into an OMPA output using judicious combinations of physical, aero, and thermal processes including grinding, paddling, electric heating, and airflow.

OMPA input is defined herein as predominantly organic matter that is intended for processing by the OMPA. OMPA input can include food matter and/or mixed organic matter. Food matter can include consumable food items such as fats, oils, sweets such as sugars and chocolates, dairy products such as milk, yogurt, cheese, proteins such as meat (and bones thereof), poultry (and bones thereof), fish (and bones thereof), beans, eggs, and nuts, vegetables, fruits, and starches such as bread, cereal, pasta, and rice. Food matter is sometimes referred to as foodstuffs. Mixed organic matter can include paper or other fiber materials (e.g., soiled napkins or paper towels), compostable resins, compostable plastics, cellulosic materials (e.g., compostable silverware), and other non-food organic materials. OMPA input can also include other types of biodegradable matter (e.g., compostable diapers).

For many implementations, OMPA input may include food matter and/or mixed organic matter that is post-consumer, post-commercial, or post-industrial in nature, matter that if not processed according to the present teachings could be considered as waste, garbage, refuse, leavings, remains, or scraps. By way of example, food that is leftover on a child's dinner plate, and not in suitable condition or quantity to be stored and served later as leftovers, can represent one example of OMPA input. As another example, items such as potato peels, apple cores, cantaloupe rinds, broccoli stumps, and so forth, and similar organic materials that are spun off from the food preparation process, can represent other examples of OMPA input.

OMPA output is defined herein as processed organics derived from transformation of organic matter processed by the OMPA to yield a ground and selectively desiccated product. The processed organics can be a substantially desiccated product having water content ranging between 0.1 and 30 percent of total weight, between 5 and 25 percent of total weight, between 5 and 20 percent of total weight, between 1 and 15 percent of total weight, between 5 and 15 percent of total weight, between 10 and 15 percent of total weight, between 10 and 20 percent of total weight, between 15-20 percent of total weight, or between 10 and 25 percent of total weight. Alternatively, the processed organics can be a substantially desiccated product having water content of less than 15 percent of total weight, less than 10 percent of total weight, or less than 5 percent of total weight. The processed organics can exist as granulated or ground media. One type of processed organics can be FOOD GROUNDS™.

As defined herein FOOD GROUNDS™ refers to an OMPA output characterized as having a minimum nutritional value. FOOD GROUNDS™ can be derived from OMPA input comprised of a minimum percentage of food matter such that the FOOD GROUNDS™ OMPA output has the minimum nutritional value. The minimum percentage of food matter can ensure that the FOOD GROUNDS™ OMPA output attains at least the minimum nutritional value. For example, a higher nutrient value OMPA output can be more readily obtained from food matter than from mixed organics such as fiber materials and cellulosic materials.

As defined herein, an OMPA output processor repurposes the OMPA output for a commercial purpose. For example, the OMPA output can be used as feed or feedstock for feed for animals or fish. In some embodiments, an OMPA output processor that receives FOOD GROUNDS™ may produce a derivative product having a higher intrinsic value (e.g., nutritional, monetary, or both nutritional and monetary) than a derivative product produced primarily from mixed organics.

As defined herein, non-processed matter refers to matter that is not intended for processing by an OMPA or an OMPA output processor. Non-processed matter is not an OMPA input or an OMPA output. An example of non-processed matter can include inorganic matter such as, for example, metals, plastics, glass, ceramics, rocks, minerals, or any other substance that is not linked to the chemistry of life. Another example of non-processed matter can be yard waste such as grass clippings, leaves, flowers, branches, or the like. In very general terms, non-processed matter can refer to the garbage or waste that a resident or business disposes in a conventional trash bin for transport to a landfill processor, a recycle bin for transport to recyclables processor, or a yard waste bin for transport to a yard waste processor.

In one embodiment, the OMPA is designed to be used primarily in a residential context (e.g., in single family homes, townhouses, condos, apartment buildings, etc.) to convert residential based OMPA input into residential sourced OMPA output. Converting residential generated OMPA input to OMPA output can have a net positive effect in the reduction of methane and space occupied by landfills or compost centers by redirecting the OMPA input and the OMPA output thereof away from traditional reception centers of such material. Moreover, because the OMPA is user friendly, aesthetically pleasing, energy efficient, clean, and substantially odor free, the OMPA provides an easy to use platform for the residential sector to handle OMPA input (e.g., food scraps, etc.), thereby making the decision on what to do with residential based OMPA input an easier one to handle. The OMPA can convert OMPA input into FOOD GROUNDS overnight, where the FOOD GROUNDS are substantially odorless, easily transportable, and shelf-stable. The FOOD GROUNDS can remain in the OMPA until it is full, at which point the FOOD GROUNDS are removed and transported to an OMPA processing facility, which may convert the FOOD GROUNDS into a higher value food product (e.g., animal feed). It should be understood that OMPAs can be used to serve entire communities, cities, and industries. Use of OMPAs in these other sectors, as well as the residential sector, can result in diversion from landfills and further serve a goal of preventing OMPA input from becoming waste in the first place by converting it into usable products that can be used to enable more resilient, sustainable food systems.

Overview of Organic Matter Processing Apparatus

Figure 2B:
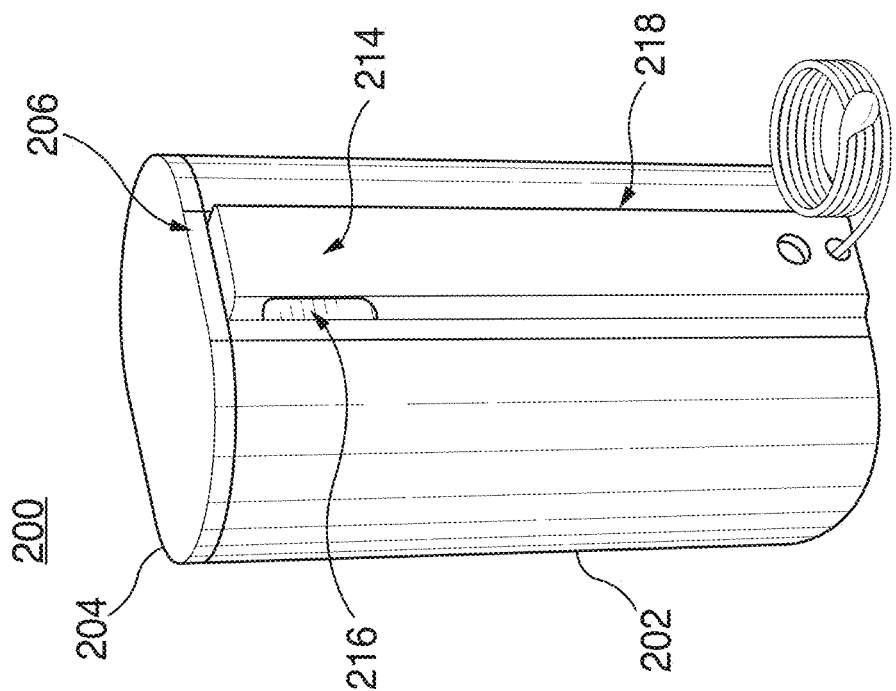
FIG. 2B includes another perspective view of the organic matter processing apparatus with the lid in an open position according to embodiment.
Figure 2A:
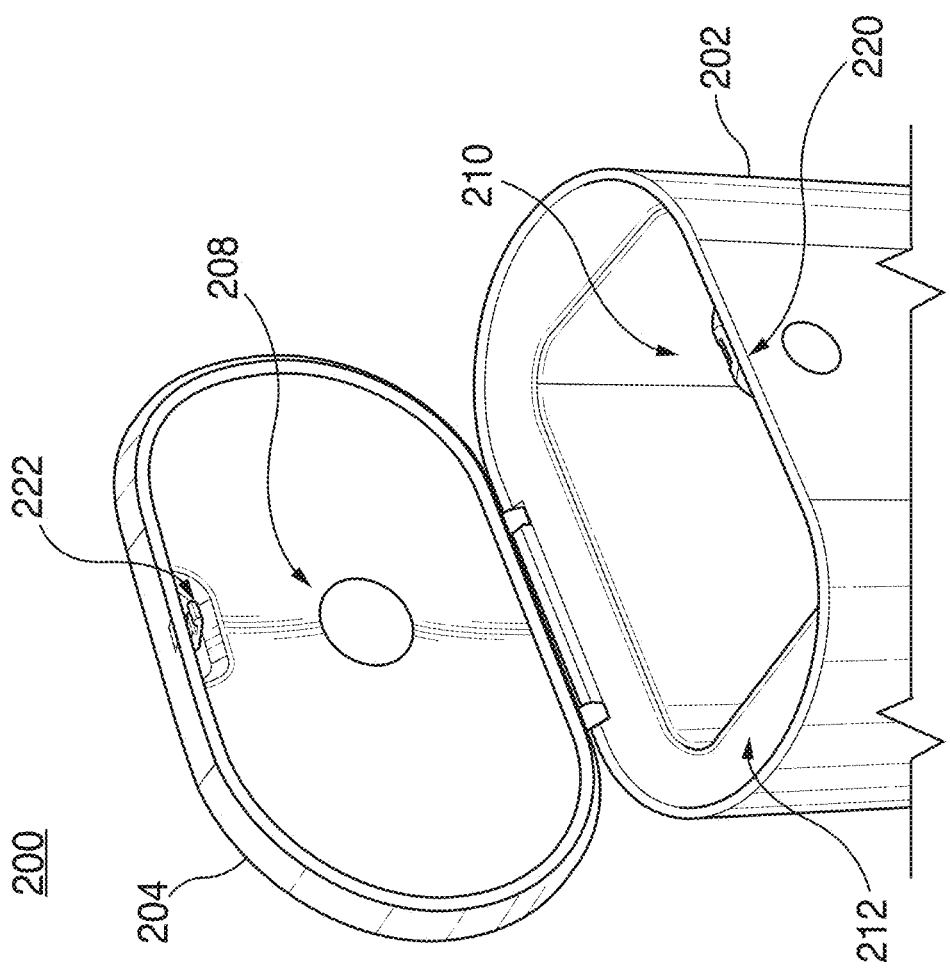
FIG. 2A includes a perspective view of an organic matter processing apparatus that includes a lid in a closed position according to embodiment.

FIG. 1 includes a high-level illustration of a OMPA 100 in accordance with various embodiments. As further discussed below, OMPA 100 may have a durable housing 102 with an interface 104 through which a processing chamber 106 can be accessed. The interface 104 may serve as the ingress interface through which OMPA input can be deposited into the processing chamber 106 and the egress interface through which the product can be retrieved from the processing chamber 106. As shown in FIGS. 2A-B, the durable housing 102 may take the form of a roughly cylindrical container that has an aperture along its top end.

Instructions for operating OMPA 100 may be stored in a memory 108. The memory 108 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the controller 110, the memory 108 can also store data that is generated by OMPA 100. For example, values generated by one or more sensors 128 included in OMPA 100 may be stored in the memory 108 in preparation for further analysis, as further discussed below. As further discussed below, these values may relate to characteristics (e.g., humidity or temperature) of the air traveling through OMPA 100, and insights into the OMPA input contained in the processing chamber 106 can be gained through analysis of these values. Note that the memory 108 is merely an abstract representation of a storage environment. The memory 108 could be comprised of actual integrated circuits (also referred to as "chips"). When executed by a controller 110, the instructions may specify how to control the other components of OMPA 100 to produce OMPA output from OMPA input in the processing chamber 106. The controller 110 may include a general purpose processor or a customized chip (referred to as an "application-specific integrated circuit" or "ASIC") that is designed specifically for OMPA 100.

Generally, OMPA 100 is able to operate on its own. Assume, for example, that OMPA 100 determines that OMPA input has been deposited into the processing chamber 106 based on measurements output by a weight sensor (also referred to as a "mass sensor"), as further discussed below. In response to such a determination, OMPA 100 may initiate processing of the OMPA input. Note, however, that the OMPA input need not necessarily be processed immediately. For example, OMPA 100 may not dry and then grind the OMPA input until a given criterion (e.g., time of day, weight of OMPA input, etc.) or combination(s) of various criteria is/are satisfied.

While OMPA 100 may be able to operate largely, if not entirely, on its own, there may be some situations where input from a user will be helpful or necessary. For example, the user may want to indicate when processing should be temporarily halted so that additional OMPA input can be added to the processing chamber 106. As another example, the user may to request that an operation be initiated or halted. For instance, the user could opt to initiate a "drying cycle" if the ambient environment is expected to be vacant, or the user could opt to halt a "grinding cycle" if the ambient environment is expected to be occupied. The various cycles of OMPA 100 are discussed in greater detail below.

As shown in FIG. 1, OMPA 100 may include a control input mechanism 112 (also referred to as a "data input mechanism" or simply "input mechanism") with which the user can interact to provide input. Examples of input mechanisms include mechanical buttons and keypads for tactile input, microphones for audible input, scanners for visual input (e.g., of machine-readable codes, such as barcodes or Quick Response codes), and the like. OMPA 100 may also include a control output mechanism 114 (also referred to as a "data output mechanism" or simply "output mechanism") for presenting information to inform the user of its status. For example, the control output mechanism 114 may indicate the current cycle (e.g., whether OMPA input is being processed, or whether product is ready for retrieval), connectivity status (e.g., whether OMPA 100 is presently connected to another electronic device via a wireless communication channel), and the like. One example of an output mechanism is a display panel comprised of light-emitting diodes (LEDs), organic LEDs, liquid crystal elements, or electrophoretic elements. In embodiments where the display panel is touch sensitive, the display panel may serve as the control input mechanism 112 and control output mechanism 114. Another example of an output mechanism is a speaker that is operable to output audible notifications (e.g., in response to a determination that the product is ready for retrieval).

Some embodiments of OMPA 100 are able to communicate with other electronic devices via wireless communication channels. For example, a user may be able to interact with OMPA 100 through a control platform (not shown) that is embodied as a computer program executing on an electronic device. The control platform is discussed in greater detail below with reference to FIG. 11. In such embodiments, OMPA 100 may include a communication module 116 that is responsible for receiving data from, or transmitting data to, the electronic device on which the control platform resides. The communication module 116 may be wireless communication circuitry that is designed to establish wireless communication channels with other electronic devices. Examples of wireless communication circuitry include chips configured for Bluetooth®, Wi-Fi®, ZigBee®, LoRa®, Thread, Near Field Communication (NFC), and the like.

OMPA 100 may include a power interface 118 (also referred to as a "power port" or "power jack") that is able to provide main power for the drying and grinding functionality, as well as power for the other components of OMPA 100, as necessary. The power interface 118 may allow OMPA 100 to be physically connected to a power source (e.g., an electrical outlet) from which power can be obtained without limitation. Alternatively, the power interface 118 may be representative of a chip that is able to wirelessly receive power from the power source. The chip may be able to receive power transmitted in accordance with the Qi standard developed by the Wireless Power Consortium or some other wireless power standard. Regardless of its form, the power interface 118 may allow power to be received from a source external to the durable housing 102. In addition to the power interface 118, OMPA 100 may include a power component 120 that can store power received at the power interface 118. The power component 118 could advantageously be useful to maintain some or all operations (e.g., the state of communications and functionality of electronic components) in the event of a power outage. Examples of power components include rechargeable lithium-ion (Li-Ion) batteries, rechargeable nickel-metal hydride (NiMH) batteries, rechargeable nickel-cadmium (NiCad) batteries, and the like.

In order to produce an OMPA output from OMPA input, OMPA 100 (and, more specifically, its controller 110) may control one or more drying mechanisms 122A-N and one or more grinding mechanisms 124A-N. The drying mechanisms 122A-N are discussed in greater detail below with reference to FIGS. 2A-4, while the grinding mechanisms 124A-N are discussed in greater detail below with reference to FIG. 6. The drying mechanisms 122A-N are responsible for desiccating the OMPA input. Desiccation may not only allow the OMPA input easier to process (e.g., grind), but also may prevent the formation of mold that thrives in humid conditions. Examples of drying mechanisms include heating elements that reduce moisture by introducing heat and fans that reduce moisture by introducing an airflow. Meanwhile, the grinding mechanisms are responsible for cutting, crushing, or otherwise separating the OMPA input into fragments. Examples of grinding mechanisms include paddles, mixers, impellers, and rotating blades (e.g., with two, three, or four prongs). Grinding mechanisms are normally comprised of a durable material, such as die cast aluminum, stainless steel, or another material that offers comparable strength and rigidity. By working in concert, the drying and grinding mechanisms 122A-N, 124A-N can convert OMPA input into a more stable product as further discussed below.

Moreover, air may be drawn from the ambient environment into the durable housing 102 and then expelled into the processing chamber 106 so as to help desiccate the OMPA input contained therein, as further discussed below with reference to FIGS. 2A-4. As shown in FIG. 1, air that is drawn from the processing chamber may be treated using one or more air treatment mechanisms 126A-N (also referred to as "air management mechanisms" or "air discharge mechanisms") before being released back into the ambient environment.

Other components may also be included in OMPA 100. For example, sensor(s) 128 may be arranged in various locations throughout OMPA 100 (e.g., along the path that the air travels through OMPA 100). The sensor(s) 128 may include a proximity sensor that is able to detect the presence of nearby individuals without any physical contact. The proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. Alternatively, the presence of an individual may be inferred based (i) whether sounds indicative of the user are detectable (e.g., by a passive microphone or an active sonar system) or (ii) whether an electronic device associated with the user is detectable (e.g., by the communication module 116).

OMPA 100 may adjust its behavior based on whether any individuals are nearby. For instance, OMPA 100 may change its operating state (or simply "state") responsive to a determination that an individual is nearby. As an example, OMPA 100 may stop driving the grinding mechanisms upon determining that someone is located nearby. Thus, OMPA 100 could intelligently react to changes in the ambient environment. Over time, outputs produced by the proximity sensor (plus other components of OMPA 100) could be used to better understand the normal schedule of individuals who frequent the physical space in which OMPA is situated.

In some embodiments, OMPA 100 includes an ambient light sensor whose output can be used to control different components. The ambient light sensor may be representative of a photodetector that is able to sense the amount of ambient light and generate, as output, values that are indicative of the sensed amount of ambient light. In embodiments where the control output mechanism 114 is a display panel, the values output by the ambient light sensor may be used by the controller 110 to adjust the brightness of the display panel.

Desiccating OMPA Input Through Airflow Generation

One core aspect of OMPA is its ability to desiccate OMPA input that is deposited into the processing chamber. By removing moisture from the OMPA input through a judicious application of heating, grinding, mixing, and airflow according to the teachings herein, the OMPA can substantially halt decomposition of the OMPA input and produce a stable mass of dried-and-grinded OMPA input (hereinafter "OMPA output" or "end product" or simply "product"). This can be accomplished by directing an airflow through the processing chamber that causes the OMPA input to become increasingly dry in a predictable manner.

FIG. 2A includes a front-side perspective view of OMPA 200 that includes a lid 204 in a closed position. FIG. 2B, meanwhile, includes a rear-side perspective view of OMPA 200 with the lid 204 in an open position. As further discussed below, the lid 204 may be pivotably connected to a durable housing 202, so as to allow a user to easily expose and then cover a processing chamber 210 located inside the durable housing 202. As described further herein, OMPA 200 can be advantageously designed and configured such that it can be placed flush up against a wall or other barrier in a space-saving manner, in that it does not require gapped separation from the wall, while at the same time maintaining the ability for good airflow in and out of OMPA 200.

As shown in FIG. 2A, the lid 204 may have one or more air ingress openings 206 (or simply "openings") through which air can be drawn from the ambient environment by a first fan (also referred to as a "turbulent fan") installed therein. Here, for example, a single opening 206 is located along a periphery of the lid 204 near a rear side of the OMPA 200. Generally, the opening(s) 206 are located near where the lid 204 is pivotably connected to the durable housing 202. Advantageously, there may be a built-in offset between a plane of the opening 206 and a backmost plane of the overall durable housing 202, whereby airflow into OMPA 200 will not be impeded even while the backmost plane is flush against a wall. However, the opening(s) 206 could be located, additionally or alternatively, elsewhere along the exterior surface of the lid 204. For example, multiple openings may be spaced along a periphery of the lid 204 to further ensure that sufficient air can be drawn into the lid 204 by the first fan even if OMPA 200 is positioned proximate to an obstacle (e.g., a wall).

As shown in FIG. 2B, this air can then be expelled toward the OMPA input through one or more openings 208 along the interior surface of the lid 204. This will create a downward airflow that causes turbulence inside the processing chamber 210, thereby increasing the rate at which the OMPA input is dried. The speed of the first fan may be roughly proportional to the speed of the downward airflow (and thus, the amount of turbulence). OMPA 200 may increase the speed of the first fan if quicker drying is desired.

Accordingly, the first fan may draw air through the opening(s) 206 in the exterior surface of the lid 204 and then blow the air downward toward the OMPA input to create a turbulent airflow (also referred to as a "turbulent airstream"). This turbulent airflow may create small vortices inside the processing chamber 210 that ensure the air continues to move across the surface of the OMPA input.

In the embodiment shown in FIG. 2B, the opening(s) 208 are centrally located along the interior surface of the lid 204. However, the opening(s) 208 could be located elsewhere along the interior surface of the lid 204. For example, the opening(s) 208 may be located along one edge of the lid 204 if the intake vent through which air is removed from the processing chamber 210 is located near an opposing edge of the lid 204.

When in operation, air can be removed from the processing chamber 210 through a used-air intake vent (not shown) in an exhaust hood that is located beneath a bezel 212. The intake vent is further discussed below with reference to FIGS. 3A-B. The bezel 212 may extend around a periphery of the durable housing 202 to "frame" the aperture through which OMPA input can be deposited in the processing chamber 210. The exhaust hood may be partially or fully obstructed when the bezel 212 is installed within the durable housing 202. Here, for example, the exhaust hood is fully obstructed by the bezel 212, and therefore cannot be easily viewed while the bezel 212 is installed within the durable housing 202.

As further discussed below, a user may need to remove the bezel 212 in order to remove the processing chamber 210 from the durable housing 202. To remove the bezel 212, the user may grasp a structural feature 220 (referred to as a "lip") that allows the bezel 212 to be readily removed by hand. The structural feature 220 may also serve other purposes. For example, the structural feature 220 may accommodate a locking mechanism 222 that extends downward from the lid 204 into the durable housing 202. After the locking mechanism 222 extends into the durable housing 202, a latch (e.g., driven by a solenoid) may secure the locking mechanism 222 in place. This may be helpful to restrict access when, for example, the OMPA 200 is operating at high intensity and contents of the processing chamber 210 are hot.

Removal of the bezel 212 may expose the exhaust hood as mentioned above. FIG. 3A includes a perspective view of OMPA 300 without its bezel to illustrate one possible location for the exhaust hood 302 that extends over a used-air intake vent. As further discussed below, the processing chamber 306 of OMPA 300 may be representative of a receptacle that can be removably installed within a cavity that is defined by an interior surface of the durable housing 308. Normally, the exhaust hood 302 is located along the interior surface such that, when the receptable is installed within the cavity, the used-air intake vent is positioned proximate to an upper end of the receptacle. Said another way, the exhaust hood 302 may be positioned so that the used-air intake vent is not obstructed when the receptacle is installed within the cavity in the durable housing 308.

At a high level, the exhaust hood 302 may be designed to guide or direct air from the processing chamber 306 through the used-air intake vent for treatment and then release into the ambient environment. A filter 304 may be installed in the used-air intake vent to prevent large fragments of OMPA input or product from entering the odor treatment system. This filter 304 may be removable. Accordingly, a user may be able to remove the filter 304 (e.g., for cleaning purposes), or the user may be able to replace the filter 304.

Figure 3A:
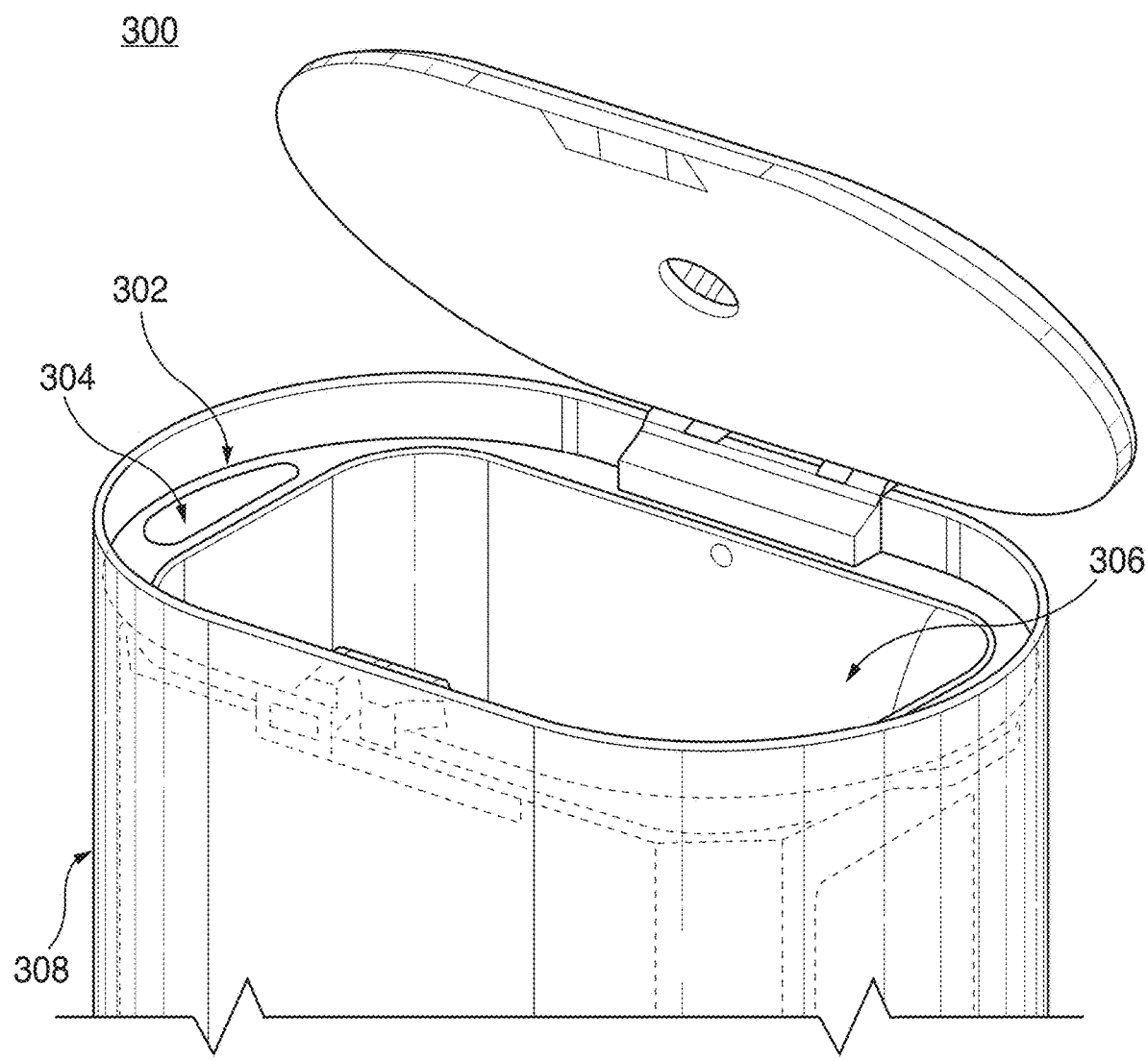
FIG. 3A includes a perspective view of an organic matter processing apparatus without its bezel to illustrate one possible location for the exhaust hood that extends over an intake vent according to embodiment.
Figure 3B:
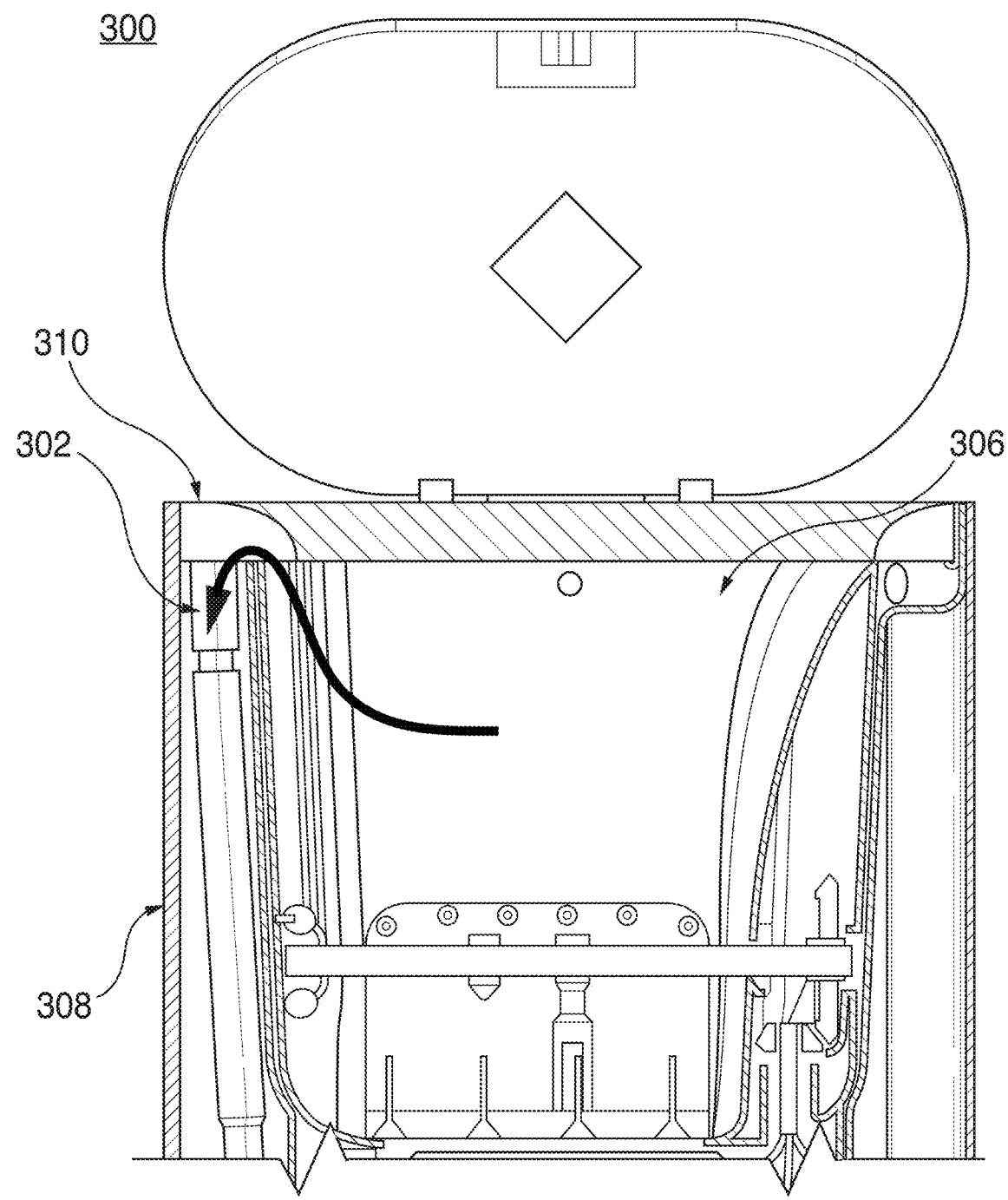
FIG. 3B illustrates how, when the bezel is installed in the organic matter processing apparatus, air in the processing chamber can flow underneath the bezel into a space above the edge of the receptacle and then downward through the used-air intake vent according to embodiment.

FIG. 3B illustrates how, when the bezel 310 is installed in OMPA 300, air in the processing chamber 306 can flow underneath the bezel 310 into a space above the edge of the receptacle and then downward through the used-air intake vent. Air that is removed from the processing chamber 306 through the used-air intake vent can be routed through an odor treatment system (not shown) of OMPA 300 for treatment, as further discussed below with reference to FIG. 4A. Then, the treated air can be expelled from OMPA 300 into the ambient environment. Referring again to FIG. 2, the treated air may be expelled through one or more air egress openings (or simply "openings") located along an interior surface of a mechanical feature 214. The interior surface of the mechanical feature 214 may define a space 216 into which treated air can be expelled. As shown in FIG. 2B, the space may not be fully enclosed. Here, for example, the mechanical feature 214 is roughly in the form of an open cylinder, and thus may also serve as a handle along the exterior surface of the durable housing 202. Additionally or alternatively, opening(s) may be located along the rear surface of the durable housing 202 but oriented such that the treated air is expelled outward at an angle. For example, opening(s) may be located along one or both sides of a vertical pillar 218 (also referred to as a "spine") that runs along the rear side of OMPA 200, so that the treated air is expelled toward the sides of OMPA 200. These designs allow treated air—which may be moister than ambient air—to exit OMPA 200 without being expelled directly onto a nearby obstacle (e.g., a wall). Another benefit of these designs is that "recycling" of air is minimized by ensuring that the treated air is not expelled toward the opening 206 in the lid 204 through which air is drawn into OMPA 200. Advantageously, the vertical pillar 218 can serve multiple functions. The vertical pillar 218 may not only serve as a mechanical offset that allows OMPA 200 to be placed adjacent to obstacles without obstructing incoming and outgoing airflow, but may also function as a plenum by providing a pathway along which air can travel while inside the durable housing 202. Moreover, the vertical pillar can act as an anti-tipping mechanism by providing stability.

FIG. 4A includes isometric front and rear perspective views of OMPA 400 where the durable housing is transparent to show additional details. In FIG. 4A, a trace is shown to indicate the route that air drawn from the processing chamber (e.g., through the exhaust hood 302 of FIG. 3) traverses before exiting OMPA 400. There are two main chambers through which the air guided as it traverses the route.

First, the air is guided through a photolysis chamber 402. In the photolysis chamber 402, the air is exposed to light emitted by a light source 404 that is meant to cause the decomposition or separation of odor-causing molecules. The light source 404 may be, for example, an ultraviolet (UV) bulb or UV light-emitting diode (LED).

Second, the air is guided through a dry media chamber 406. In the dry media chamber 406, the air is exposed to dry media that is meant to trap odor-causing molecules through a process referred to as adsorption. Examples of dry media include charcoal, coconut shell carbon, and manganese dioxide. In addition to acting as an odor destructor, the dry media may also act as an ozone destructor. Ozone may be generated by the light source 404 in the photolysis chamber 402, and the dry media may help to destroy that ozone.

In some embodiments, the durable housing includes a pivotable door that permits access to the dry media chamber 406. By opening the pivotable door, a user may be able to easily replace the dry media in the dry media chamber 406. For example, the user may remove existing canisters and then reinstall new canisters that have loose granules, disks, or other particulates of the dry media stored therein. Such a design allows the dry media to be replaced whenever necessary.

Following treatment in the dry media chamber 406, the air may rise upward through the vertical pillar along the rear side of the OMPA 400 that acts as a plenum. Then, the air can be expelled into the ambient environment through opening(s) located near the upper end of the vertical pillar as discussed above with reference to FIG. 2B.

Accordingly, air may initially be drawn through a used-air intake vent 412 into a channel 408 by a second fan 410 (also referred to as a "blower fan") that is located in or near the channel 408. The used-air intake vent 412 is the same used-air intake vent as mentioned above with reference to FIGS. 2-3. The air can then be directed into the photolysis chamber 402. Air leaving the photolysis chamber 402 can be directed into the dry media chamber 406. In some embodiments, the air is heated by a heater 414 before it enters the dry media chamber 406 in order to decrease moisture. This may help lengthen the lifespan of the dry media in the dry media chamber 406. After the air has been treated in the photolysis and dry media chambers 402, 406—which collectively represent the odor treatment system—the air can be guided upward through the vertical pillar that acts as a plenum, and then the air can be expelled into the ambient environment. As mentioned above, the air could be expelled through opening(s) along the rear surface of the durable housing.

The first fan included in the lid of OMPA 400 and the second fan 410 situated in the odor treatment system of the OMPA 400 may have variable speeds. Accordingly, a controller (e.g., controller 110 of FIG. 1) may be able to easily change the speed of the first and second fans. However, to ensure that air is drawn through the used-air intake vent 412, the second fan 410 may be driven at a higher speed than the first fan. Driving the second fan 410 at a higher speed than the first fan will result in a pressure differential that causes air to be advantageously drawn through the used-air intake vent 412.

Figure 4B:
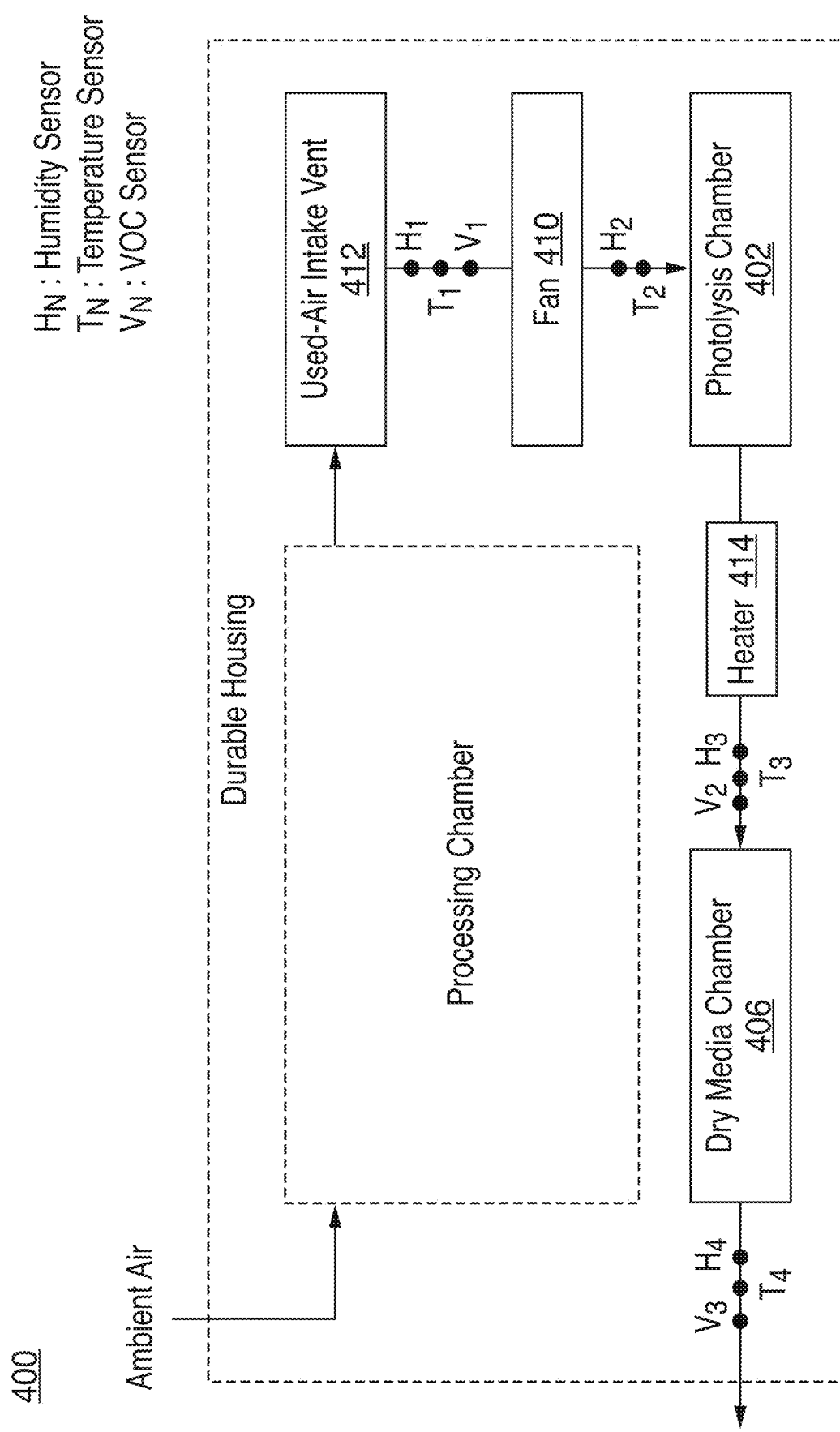
FIG. 4B includes a conceptual diagram that identifies possible locations for different types of sensors according to embodiment.

In order to gain insights in the nature of the air as it travels through OMPA 400, one or more sensors may be located along the route indicated by the trace. FIG. 4B includes a conceptual diagram that identifies possible locations for different types of sensors. Note that the selection and placement of sensors in FIG. 4B is provided for the purpose of illustration, and some or all of these sensors could be included in OMPA 400. For example, sensors able to measure temperature and humidity may be located proximate to the intake vent 412, the entry of the photolysis chamber 402, the channel interconnected between the photolysis and dry media chambers 402, 406, the exit of the dry media chamber 406, or any combination thereof. As another example, a sensor able to measure ozone may be located in the channel 408 leading to the photolysis chamber 402 and/or the channel interconnected between the photolysis and dry media chambers 402, 406. As another example, a sensor able to measure volatile organic compounds (VOCs) may be located along the route. If the VOC sensor is located before the photolysis chamber 402, its measurements may be used to monitor variations in odor across the lifetime of the OMPA 400. Meanwhile, if the VOC sensor is located after the photolysis chamber 402, its measurements may be used to determine the degree to which the dry media chamber 406 is responsible for destroying odor. Said another way, measurements produced by a VOC sensor located after the photolysis chamber 402 could be a useful indicator of the expected lifetime of the dry media in the dry media chamber 406. Other measurement dimensions that may be monitored by sensor(s) include carbon dioxide ($CO_2$), carbon monoxide (CO), dioxygen ($O_2$), hydrogen sulfide ($H_2S$), nitrogen dioxide ($NO_2$), potential of hydrogen (pH), and salinity.

Because the sensors are located along the route indicated by the trace, the odor treatment system may be able to operate as a closed loop system. The term "closed loop system," as used herein, is meant to describe a system that is able to dynamically adjust its activities based on feedback to achieve a desired goal. For instance, measurements generated by VOC sensors located along the route indicated by the trace may influence how a controller (e.g., the controller 110 of FIG. 1) controls different components of the OMPA 400. As an example, if measurements generated by a VOC sensor (e.g., V2 or V3 in FIG. 4B) located after the photolysis chamber 402 indicate that the air still has a relatively high concentration of an undesired gas, then the controller may adjust the speed of the second fan 410 so as to change the amount of time that the air remains in the photolysis and dry media chambers 402, 406. The measurements generated by VOC sensors could also be used to infer the condition of the photolysis and dry media chambers 402, 406. Assume, for example, that a VOC sensor is located between the photolysis chamber 402 and dry media chamber 406 as shown in FIG. 4B. In such a scenario, measurements generated by the VOC sensor may be used to predict the state of the dry media included in the dry media chamber 406. Said another way, measurements generated by the VOC sensor may be used to infer the amount of undesired gasses to which the dry media contained in the dry media chamber 406 has been exposed. Rather than simply instruct a user to replace the dry media on a periodic basis (e.g., every month, two months, or three months), an OMPA could instead intelligently indicate when replacement is necessary based on an analysis of measurements generated by the VOC sensor.

While sensors could be located at various positions along the route, sensors generally should not be installed in the photolysis chamber 402. As mentioned above, the light source 402 located in the photolysis chamber 402 may generate ozone as it emits light. This ozone can have a significant oxidative effect on various sensors. As such, sensors are generally not installed in the photolysis chamber 402.

One or more sensors could also be installed inside the processing chamber, for example, to measure characteristics of the air above the OMPA input (i.e., air in the "headspace" of the processing chamber). For example, sensors could be located along the interior surface of the lid, or sensors could be located along the interior surface of the processing chamber.

Additional sensors could also be located along the route indicated by the trace shown in FIG. 4A. For example, OMPA 400 may include a tachometer that measures the rotation speed of the shift of the second fan 410. Values output by the tachometer may be used (e.g., by the controller 110 of FIG. 1) to predict the speed at which the airflow is traveling through the OMPA 400, and therefore how to control other components (e.g., the drying and grinding mechanisms 122A-N, 124A-N of FIG. 1) of OMPA 400. Additionally or alternatively, OMPA 400 may include a dedicated sensor that is responsible for measuring the speed of the airflow, either directly or indirectly. For example, a hot wire anemometer may be situated along the route within the airflow. The hot wire anemometer may be electrically heated to some temperature above the ambient temperature. The airflow will cool the wire, and the speed of the airflow can be inferred based on the decrease in temperature. As another example, a pressure sensor may be situated along the route within the airflow. As the airflow contacts the pressure sensor, values indicative of the total force may be produced. The speed of the airflow can be inferred based on these values.

Practical Processing Chamber

Figure 5:
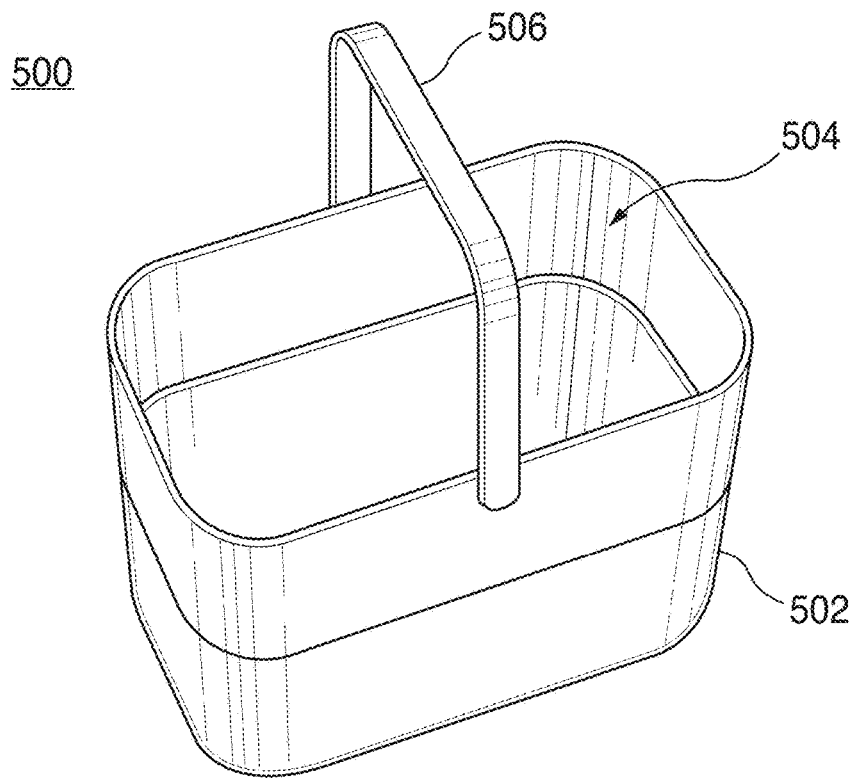
FIG. 5 includes a perspective view of a processing chamber that comprises a receptacle (also referred to as a "bucket") designed to fit securely within the durable housing of an organic matter processing apparatus according to embodiment.

Another core aspect of the OMPA is providing a processing chamber that not only allows OMPA input to be processed in a consistent, predictable manner, but is also easy to use by various individuals. FIG. 5 includes a perspective view of a processing chamber 500 that comprises a receptacle 502 (also referred to as a "bucket") designed to fit securely within the durable housing of an OMPA. The bucket 502 is preferably user-removable from the durable housing, so as to allow for easier integration into existing workflows. For example, the bucket 502 may be placed on the counter during food preparation and then reinstalled in the durable housing afterwards. As another example, the bucket 502 may be removed from the durable housing after production of the product is complete to allow for easier handling (e.g., disposal, storage, or use) of the product.

Generally, the bucket 502 is designed so that, when installed in the durable housing, OMPA input can be easily deposited by simply opening the lid of the OMPA. Normally, the bucket 502 includes an aperture 504 along its top end that is sized to allow for various forms of OMPA input. In some embodiments, the aperture 504 has a rectangular form that is 200-500 millimeters (mm) (7.87-19.68 inches) in length and 150-300 mm (5.90-11.81) in width. For example, the aperture 504 may have a length of roughly 350 mm (13.78 inches) and a width of roughly 200 mm (7.87 inches). Meanwhile, the bucket 502 may have a roughly prismatic form with a length of 250-500 mm (9.84-19.68 inches), a width of 100-300 mm (3.94-11.81 inches), and a height of 150-350 mm (5.90-13.78 inches). For example, the bucket 502 may have a length of roughly 320 mm (12.60 inches), a width of roughly 195 mm (7.68 inches), and a height of roughly 250 mm (9.84 inches).

Moreover, the bucket 502 may be designed to be easily washable (e.g., in a dishwasher). Thus, the bucket 502 may be comprised of one or more durable materials that can withstand prolonged exposure to OMPA input in various states (e.g., moist and dry), as well as repeated washings. Examples of durable materials include plastics, ceramics, metals, and biocomposites. The term "biocomposite," as used herein, may refer to a composite material formed by a matrix (e.g., of resin) and a reinforcement of natural fibers. Biocomposites may be well suited because the matrix can be formed with polymers derived from renewable resources. For example, fibers may be derived from crops (e.g., cotton, flax, or hemp), wood, paper, and the like. This makes biocomposites an attractive option since the benefits (e.g., a focus on renewability and recyclability) align with those offered by the OMPA.

As shown in FIG. 5, a handle 506 may be pivotably connected to opposing sides of the bucket 502. Such a design allows the handle 506 to be pivoted downward when the bucket 502 is installed in the structural body of the OMPA. This can be seen in FIG. 2A, where the handle is folded downward to accommodate a bezel. Thus, the handle 506 may be designed so as to not impede the deposition of OMPA input into the bucket 502. The handle 506 may be designed to allow a user to easily carry the entire processing chamber 500, with either one or two hands. To ensure that the processing chamber 500 can be transported without issue, the bucket 502 may be designed so that, when loaded with product, the weight does not exceed a threshold. The threshold may depend on the size of the bucket 502 and/or the material(s) from which the bucket 502 is made, though it may be desirable to limit the weight to no more than 10-25 pounds (and preferably 15-20 pounds).

Figure 6:
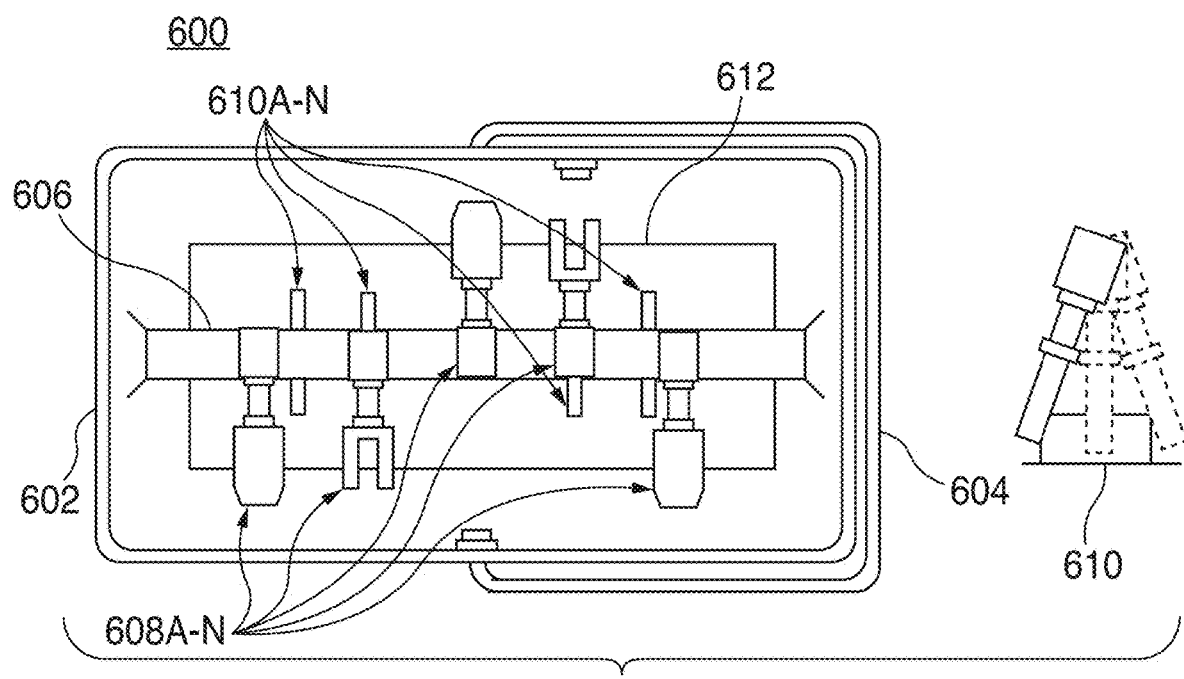
FIG. 6 includes a top view of a processing chamber that includes a bucket with a handle pivotably connected thereto according to embodiment.

FIG. 6 includes a top view of a processing chamber 600 that includes a bucket 602 with a handle 604 pivotably connected thereto. As mentioned above, a OMPA may include one or more grinding mechanisms 608A-N that are responsible for cutting, crushing, or otherwise separating OMPA input deposited into the bucket 602 into fragments. The grinding mechanisms 608A-N may be part of the processing chamber 600 as shown in FIG. 6. Here, for example, five grinding mechanisms are fixedly attached to a central rod 606 that arranged horizontally across the width of the bucket 602 and is driven by gears (not shown), which are in turn driven by a motor (not shown). The motor may be located in the durable housing, while the gears may be located in the bucket 602 as further discussed with reference to FIG. 7.

The grinding mechanisms 608A-N can be driven in such a manner that an appropriate amount of grinding occurs. In some embodiments, the appropriate amount of grinding is predetermined (e.g., programmed in memory of the OMPA). In other embodiments, the appropriate amount of grinding is determined dynamically based on a characteristic of OMPA input in the bucket 602. For example, the appropriate amount of grinding may be based on the amount of OMPA input (e.g., as determined based on measurements output by a mass sensor) contained in the bucket 602. As another example, the appropriate amount of grinding may be based on the amount of resistance that is experienced by the grinding mechanisms 608A-N. Generally, dried OMPA input that has been at least partially ground will offer less resistance than wet OMPA input or dried OMPA input that has not been ground.

As the central rod 606 rotates, the grinding mechanisms 608A-N may also rotate. Generally, the grinding mechanisms rotate at a rate of 1-10 rotations per minute (RPM), at a rate of 1-2 RPMs, or 1.6 RPMS. This rotating action may cause OMPA input located near the bottom of the bucket 602 to be brought toward the top of the bucket 602, such that all OMPA input contained in the bucket 602 is occasionally exposed to the downward airflow emitted from the lid.

The grinding mechanisms 608A-N may not provide sufficient shear on their own to break apart more solid OMPA input. Examples of solid OMPA input include bones, raw produce, and the like. To address this issue, the bucket 602 may include one or more stationary blades 610A-N that can work in concert with some or all of the grinding mechanisms 608A-N. Assume, for example, that the processing chamber 600 includes at least one paddle and at least one two-prong rotating blade. In FIG. 6, the processing chamber 600 includes three paddles and two two-prong rotating blades that are alternately arranged along the length of the central rod 606. In such an embodiment, the stationary blades 610A-N may be positioned so that as each two-prong rotating blade rotates, a corresponding stationary blade will pass through its two prongs to create cutting action. A side view of this scenario is shown in FIG. 6. Paddles may also create some cutting action. However, paddles may create less cutting action than the two-prong rotating blades since (i) the paddles are generally oriented at an angle to promote upward and sideward movement of OMPA input and (ii) the paddles generally pass alongside the stationary blades 610, thereby providing less shear.

Generally, more than one type of grinding mechanism is included in the processing chamber 600. For example, paddles and rotating blades could be arranged in an alternating pattern across the width of the bucket 602 so provide different functionalities. While the paddles may have limited usefulness in terms of grinding OMPA input, the paddles may be useful in churning OMPA input so that wetter material rises toward the top of the bucket 602. Accordingly, some "grinding mechanisms" may be primarily responsible for cutting OMPA input into smaller fragments while other "grinding mechanisms" may be primarily responsible for mixing the OMPA input to promote desiccation.

In FIG. 6, the paddles and rotating blades are shown to be coplanar—though extending from opposing sides of the central rod 606—for the purpose of illustration. The grinding mechanisms 608A-N could be radially arranged about the periphery of the central rod 606 in different ways. For example, the three paddles shown in FIG. 6 could be equally spaced about the circumference of the central rod 606 to ensure that OMPA input contained in the bucket 602 is constantly, or nearly constantly, jostled. Generally, the two-prong rotating blades are offset to minimize the torque that is needed to cut through OMPA input at any given point in time. Said another way, the two-prong rotating blades may be offset so that only one is actively cutting OMPA input in conjunction with its corresponding stationary blade 610 at a time. Here, for example, the two two-prong rotating blades are offset by 180 degrees, though the blades could be offset by more or less than 180 degrees.

Grinding mechanisms (and the power available to those grinding mechanisms) may govern the types of OMPA input that can be handled by a given OMPA. Generally, stronger grinding mechanisms in combination with more power will allow heavier duty OMPA input (e.g., bones) to be handled without issue. Accordingly, different embodiments of OMPA could be designed for residential environments (e.g., with less power and weaker grinding mechanisms) and commercial environments (e.g., with more power and stronger grinding mechanisms).

In some embodiments, the bucket 602 includes a thermally conductive base portion 612 that is responsible for conveying heat to the OMPA input. Normally, the thermally conductive base portion 612 may extend up the longitudinal sidewalls of the bucket 602 that are parallel to the central rod 606. In embodiments where the thermally conductive base portion 612 is responsible for heating the OMPA input, the thermally conductive base portion 612 may extend up the longitudinal sidewalls roughly 40-70 percent of their height. In embodiments where the thermally conductive base portion 612 is responsible for heating the OMPA input and air in the "headspace" of the processing chamber 600, the thermally conductive base portion 612 may extend up the longitudinal sidewalls roughly 70-90 percent of their height.

Figure 7:
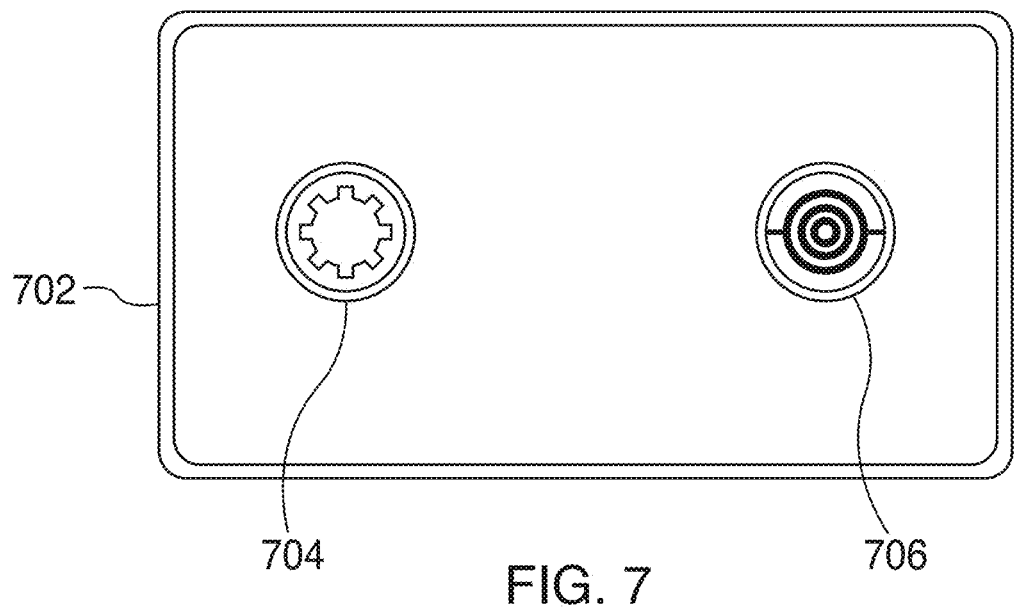
FIG. 7 includes a top view of a cavity in a durable housing that includes a mechanical coupling and an electrical coupling according to embodiment.

When the bucket 602 is installed within the durable housing, the thermally conductive base portion 612 may be electrically connected to a heating element (e.g., a resistive heating element in the form of a coil) that is located in the durable housing. FIG. 7 includes a top view of a cavity in a durable housing 702 that includes a mechanical coupling 704 and an electrical coupling 706. When installed within the cavity in the durable housing 702, the processing chamber 600 may be connected to the mechanical and electrical couplings 704, 706. Thus, the mechanical and electrical couplings 704 may be detachably connectable to respective interconnects on the processing chamber 600. The mechanical coupling 704 may be responsible for driving gears that are located in the bucket 602, while the electrical coupling 706 may be responsible for providing electricity to a heating element (not shown) that heats the thermally conductive base portion 612. The heating element may be part of the bucket 602. In some embodiments, the heating element is included in the cavity of the durable housing 702. In such embodiments, the thermally conductive base portion 612 of the bucket 602 may be heated through contact with the heating element. Accordingly, the thermally conductive base portion 612 may be heated through thermo-mechanical conductive heating or on-bucket electrical heating instead of convective heating.

A mass sensing system may be incorporated into the OMPA so that mass measurements can be made throughout an organic matter processing cycle or anytime the bucket is present within the OMPA. The mass sensing system may include one or more mass sensors such as, for example, piezoelectric mass sensors. Alternatively, the mass sensing system may include a strain gauge mass sensor.

One or more mass sensors are normally located along the bottom of the OMPA (e.g., on each "foot" where the OMPA terminates along a substantially planar level). These mass sensor(s) can be used to measure the weight of the OMPA (and thus, the weight of contents of the processing chamber). However, because the bucket 602 can be removable installed within the durable housing, mass sensors could additionally or alternatively be located along the bottom of the bucket 602. As an example, a mass sensor may be located on each "foot" of the bucket 602. Regardless of location, the mass sensor(s) included in the OMPA may continually or periodically output measurements that can be used to calculate, infer, or otherwise establish the total weight of the bucket 602 (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play an important role in ensuring that the OMPA can dynamically react to changes in the state of the OMPA input.

Figure 8:
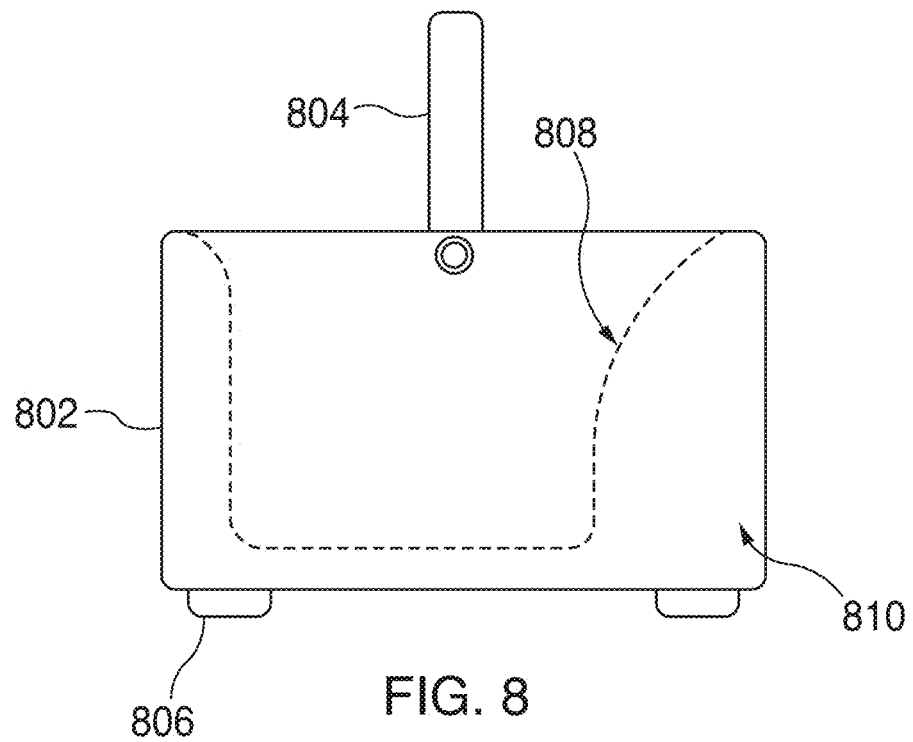
FIG. 8 includes a side profile view of a bucket in which organic matter can be deposited according to embodiment.

FIG. 8 includes a side profile view of a bucket 802 in which OMPA input can be deposited. A handle 804 may be pivotably connected to opposing sides of the bucket 802. The handle 804 may allow the bucket 802 to be easily removed from the OMPA as discussed above, as well as easily conveyed to another location. The bucket 802 may also have structural features 806 that terminate along a substantially planar level. These structural features 806 (also referred to as "feet") may help stabilize the bucket 802. Moreover, these structural features 806 may include the corresponding interconnects for the mechanical and electrical couplings 704, 706 discussed above with reference to FIG. 7. Such a design not only allows the corresponding interconnects to be readily aligned with those couplings, but also ensures that the structural features 806 can protect the corresponding interconnects when the bucket 802 is removed from the OMPA. As mentioned above, while mass sensor(s) are normally installed along the bottom of the OMPA in which the bucket 802 is to be installed, mass sensor(s) could additionally or alternatively be installed within some or all of these structural features 806 to measure the weight of the bucket 802 and its contents.

As shown in FIG. 8, the cavity defined by the interior surface of the bucket 802 may not necessarily by symmetrical across the longitudinal and latitudinal planes defined therethrough. For reference, the term "latitudinal plane" may be used to refer to the plane that is substantially parallel to the handle 804 while extended upward as shown. Meanwhile, the term "longitudinal plane" may be used to refer to the plane that is substantially orthogonal to the latitudinal plane. For example, the cavity may be more gradually tapered along one end to form a lip 808 (also referred to as a "spout"). The spout may allow a user to empty contents from the bucket 802 by simply tipping it along one end.

This gradual tapering along one end may also create a space 810 along one end of the bucket 802 in which components can be installed. For example, the gears that are responsible for driving the central rod that extends through the cavity may be located in this space 810. In addition to conserving valuable space within the bucket 802 (and OMPA as a whole), locating the gears in the space 810 will also add weight to one end of the bucket 802. This added weight may make it easier for the user to rotate the bucket 802 along that end to empty contents via the lip 808.

Practical Lid

An important aspect of increasing adoption is that the OMPA should be easily deployable and operable. The component with which many users will interact most frequently is the lid (e.g., lid 204 of FIG. 2). Accordingly, it is important that the lid be easy to use but also offer some functionality.

Figure 9:
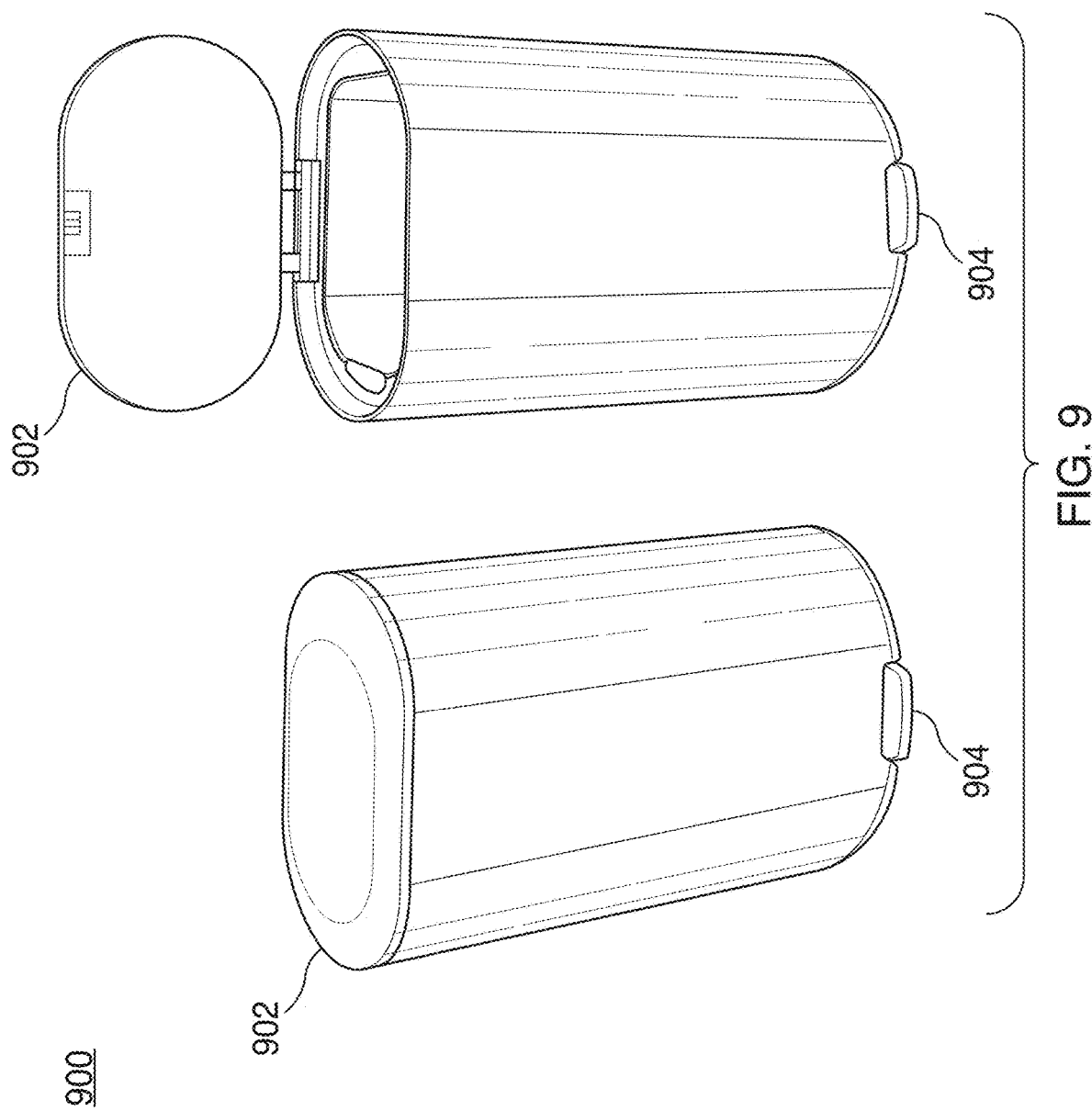
FIG. 9 includes front perspective views of an organic matter processing apparatus with the lid in a closed position and an open position according to embodiment.

As an example, a user may not only be able to open the lid with her hands, but also by interacting with an electromechanical pedal switch that is accessible along the front side of the OMPA. FIG. 9 includes front perspective views of OMPA 900 with the lid 902 in a closed position and an open position. As shown in FIG. 9, an electro-mechanical pedal switch 904 (or simply "pedal switch") may be located along the front side of OMPA 900. When a user applies pressure to the pedal switch 904 (e.g., with her foot), the lid 902 may be electro-mechanically actuated to the open position. As further discussed below, the open position may be one of multiple open positions to which the lid 902 can be actuated. When the user stops applying pressure to the pedal switch 904, the lid 902 may automatically close. The lid 902 may not close immediately, however. Instead, the lid 902 may be electro-mechanically actuated to the closed position a short interval of time (e.g., several seconds). Thus, the pedal switch 904 may allow the lid 902 of the OMPA 900 to be partially, if not entirely, operated in a hands-free manner.

As another example, the lid may be controllably lockable, for example, via a damped mechanism with a smooth spring-loaded retraction. Assume, for example, that the OMPA is performing high intensity processing where the processing chamber is heated. In such a situation, the lid may remain locked so long as the temperature of the processing chamber (or its contents) remains above a threshold (e.g., programmed in memory). This locking action may serve as a safety mechanism by ensuring that a user cannot easily access the interior of the OMPA under unsafe conditions. Note, however, that the user may still be able to override this locking action (e.g., by interacting with an input mechanism accessible along the exterior of the OMPA).

As another example, air may be "sucked" downward whenever the lid is opened, thereby preventing odors from escaping into the ambient environment. This action may be particularly helpful in preventing odors from escaping the OMPA when the lid is opened mid-cycle (i.e., while the OMPA input is being dried or ground). This action can be initiated by a controller based on one or more outputs produced by a sensor that is located proximate to where the lid contacts the durable housing when in the closed position. For example, a sensor could be located along the periphery of the lid, and its output may be indicative of whether the lid is adjacent to the durable housing (i.e., in the closed position). As another example, a sensor could be located along the periphery of the durable housing, and its output may be indicative of whether the lid is adjacent to the durable housing (i.e., in the closed position).

As another example, the lid may be intelligently controlled based on the intent of a user as inferred by the OMPA. Assume, for example, that the user either partially opens the lid by pivoting the lid roughly 30-75 degrees with respect to its original location or softly presses on a pedal switch (e.g., pedal switch 904 of FIG. 9). In such a situation, the OMPA may infer that the user is interested in performing a short-duration activity and then actuate the lid to a first angle (e.g., 60 degrees or 75 degrees). Examples of short-duration activities include depositing more OMPA input in the processing chamber or observing the OMPA input in the processing chamber. Now, assume that the user either fully opens the lid by pivoting the lid roughly 90 degrees with respect to its original location or firmly presses on the pedal switch. In such a situation, the OMPA may infer that the user is interested in performing a long-duration activity and then actuate the lid to a second angle (e.g., 90 degrees). Examples of long-duration activities include removing the processing chamber and cleaning the interior of the OMPA. Similarly, if the lid is actuated to the first angle and the OMPA then infers that the user is likely interested in performing a long-duration activity (e.g., based on removal of the bezel), then the lid may be actuated to the second angle. Accordingly, the OMPA may automatically further open the lid responsive to a determination that the user intends to access the interior for a longer period of time.

Similarly, the OMPA may control how quickly the lid closes based on the intent of the user. If the OMPA infers that the user is interested in performing a short-duration activity, the OMPA may maintain the lid in a given position (e.g., at the first angle) for a first amount of time. If the OMPA infers that the user is interested in performing a long-duration activity, the OMPA may maintain the lid in another given position (e.g., at the second angle) for a second amount of time. The first amount of time may be 2-10 seconds, while the second amount of time may be 10-60 seconds.

Overview of Operating States

Figure 10:
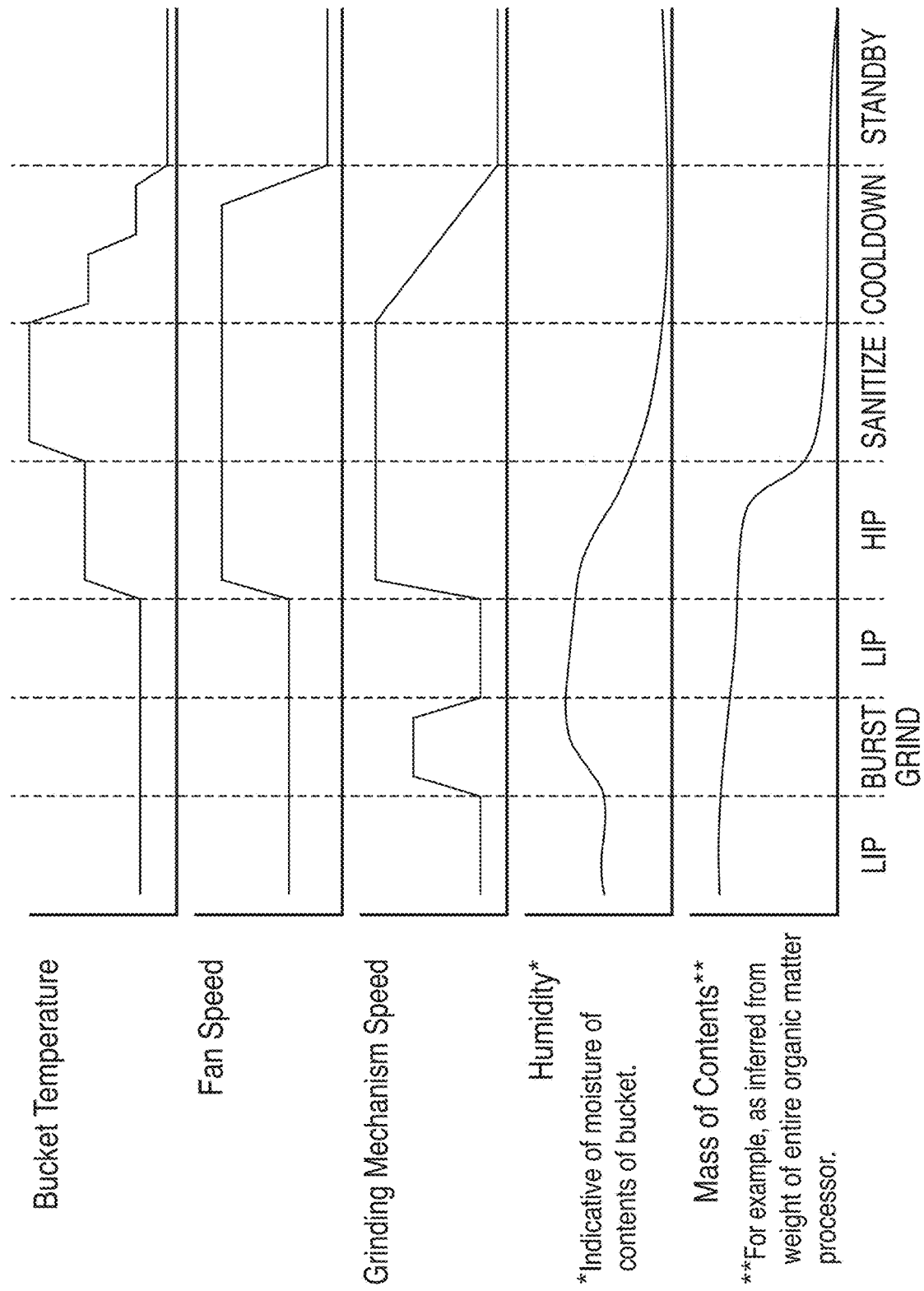
FIG. 10 includes an example of an operating diagram that illustrates how control parameters can be dynamically computed in accordance with an intelligent time recipe in order to process the contents of an organic matter processing apparatus according to embodiment.

Over time, the OMPA may cycle between various states to process OMPA input. As mentioned above, the OMPA may be able to convert OMPA input into a relatively stable product (e.g., food grounds) by drying and grinding the OMPA input. The control parameters for drying or grinding the OMPA input may be dynamically computed (e.g., by the controller 110 of FIG. 1) as a function of the outputs produced by sensors tasked with monitoring characteristics of the air traveling through the OMPA, as well as the mass or weight of the OMPA input in the processing chamber. For example, the control parameters could be dynamically computed as a function of (i) humidity of the air traveling through the OMPA, (ii) temperature of the air traveling through the OMPA, and (iii) weight of OMPA input contained in the OMPA. FIG. 10 includes an example of an operating diagram that illustrates how control parameters can be dynamically computed in accordance with an intelligent time recipe in order to process the contents of an OMPA.

As mentioned above, the OMPA may be able to intelligently cycle between different states to process OMPA input. Six different states are described in Table I. Those skilled in the art will recognize, however, that embodiments of the OMPA may be able to cycle between any number of these states. For example, some OMPAs may only be able to cycle between two, three, or four of these states, while other OMPAs may be able to cycle between all six states.

The OMPA may rely on a single target criterion or multiple target criteria to determine when to cycle between these states. The target criteria could be programmed into the memory of the OMPA, or the target criteria could be specified by a user (e.g., through an interface generated by a control platform). Examples of target criteria include moisture level, temperature, and weight. Using moisture level as an example, there may be multiple preset moisture levels (e.g., 10, 20, 30, and 40 percent) from which the target criterion could be selected (e.g., based on the nature of the OMPA input). The OMPA may not measure moisture of the OMPA input, but can instead predict or infer the moisture based on, for example, the humidity of air traveling through the OMPA and the weight of OMPA input. The OMPA could also rely on the average times for completion of these states. Assume, for example, that the OMPA receives input indicative of a request to process OMPA input deposited into the processing chamber. In such a situation, the OMPA may determine when to schedule the various states based on (i) how long those states have historically taken to complete and (ii) the weight of the OMPA input, among other factors. For example, the OMPA may attempt to schedule high intensity processing to be completed overnight as the grinding mechanisms may operate at a noise that might disturb nearby individuals.

TABLE I

Descriptions of states for processing OMPA input.

| State Identifier (ID) | State Description |
|---|---|
| High Intensity Processing (HIP) | Goal: Achieve the target moisture level at a given temperature.<br>Details: Temperature, airflow, and/or grinding mechanisms can be set to high settings. HIP normally takes at least several hours to complete, so the OMPA may attempt to schedule overnight. HIP may be triggered manually (e.g., via an interaction with an input mechanism, or via an instruction provided through the control platform) or automatically (e.g., based on a determination that the weight of the OMPA input exceeds a threshold). |

TABLE I-continued

Descriptions of states for processing OMPA input.

| State Identifier (ID) | State Description |
|---|---|
| Sanitize | Goal: Kill at least a predetermined number (e.g., greater than 99 percent) of pathogens.<br>Details: Settings are similar to HIP, though the temperature is higher. By default, sanitization may be performed before, during, or after HIP. Thus, sanitization may be considered part of HIP in some instances. |
| Low Intensity Processing (LIP) | Goal: Advance drying in a non-intrusive manner while individuals are more likely to be nearby (e.g., during daylight hours).<br>Details: Temperature, airflow, and/or grinding mechanisms can be set to low settings. While LIP may be similar to HIP in operation, LIP may be more suitable if individuals may be nearby. For example, the noise generated by the grinding mechanisms will typically be more tolerable at low settings than at high settings. |
| Burst Grind | Goal: Incorporate wet (e.g., unprocessed) OMPA input into dry (e.g., processed or semi-processed) OMPA input to make drying easier.<br>Details: Temperature and airflow may be maintained at the same settings as the prior state (e.g., HIP or LIP), but the grinding mechanisms can be set to a higher state to grind the wet OMPA input that has been newly added. Burst grind may be performed when new OMPA input is added to the processing chamber while HIP or LIP is being performed. |
| Standby | Goal: Conserve power once the target criteria have been reached.<br>Details: Temperatures, airflow, and/or grinding mechanisms can be off, unless necessary to meet some other criterion. For example, airflow and/or grinding mechanisms may be occasionally triggered to maintain an odor criterion. |
| Cooldown | Goal: Allow the user to handle the processing chamber.<br>Details: Settings are similar to standby, though airflow may be higher if necessary to cool the processing chamber or the product stored therein. |

As mentioned above, the durations of these states can be dynamically determined based on, for example, analysis of outputs generated by sensors housed in the OMPA. However, the durations of these states are predefined—at least initially—in some embodiments. For example, high intensity processing may be programmed to occur for a certain amount of time (e.g., 4, 6, or 8 hours), and burst grind may be programmed to occur for a certain amount of time (e.g., 30 seconds, 5 minutes, 30 minutes) whenever new OMPA input is added. Those skilled in the art will also recognize that the duration of some states could be dynamically determined, while the duration of other states could be predefined. As an example, the OMPA may continue performing high intensity processing until the target criteria are achieved. However, whenever new OMPA input is added, the OMPA may cycle to burst grind for a certain amount of time (e.g., 30 seconds, 5 minutes, 30 minutes) before reverting back to its previous state.

Overview of Control Platform

In some situations, it may be desirable to remotely interface with a OMPA. For example, a user may want to initiate high intensity processing if she is not at home and does not expect to return home for an extended duration (e.g., several hours). This could be done through a control platform that is communicatively connected to the OMPA. Thus, the user may be able to interact with the OMPA through the control platform. Through the control platform, the user may also be able to view information regarding the OMPA (e.g., its current state, average duration of each state, how much OMPA input has been processed over a given interval of time, current weight of the bucket and its contents) through interfaces that are generated by the control platform.

Figure 11:
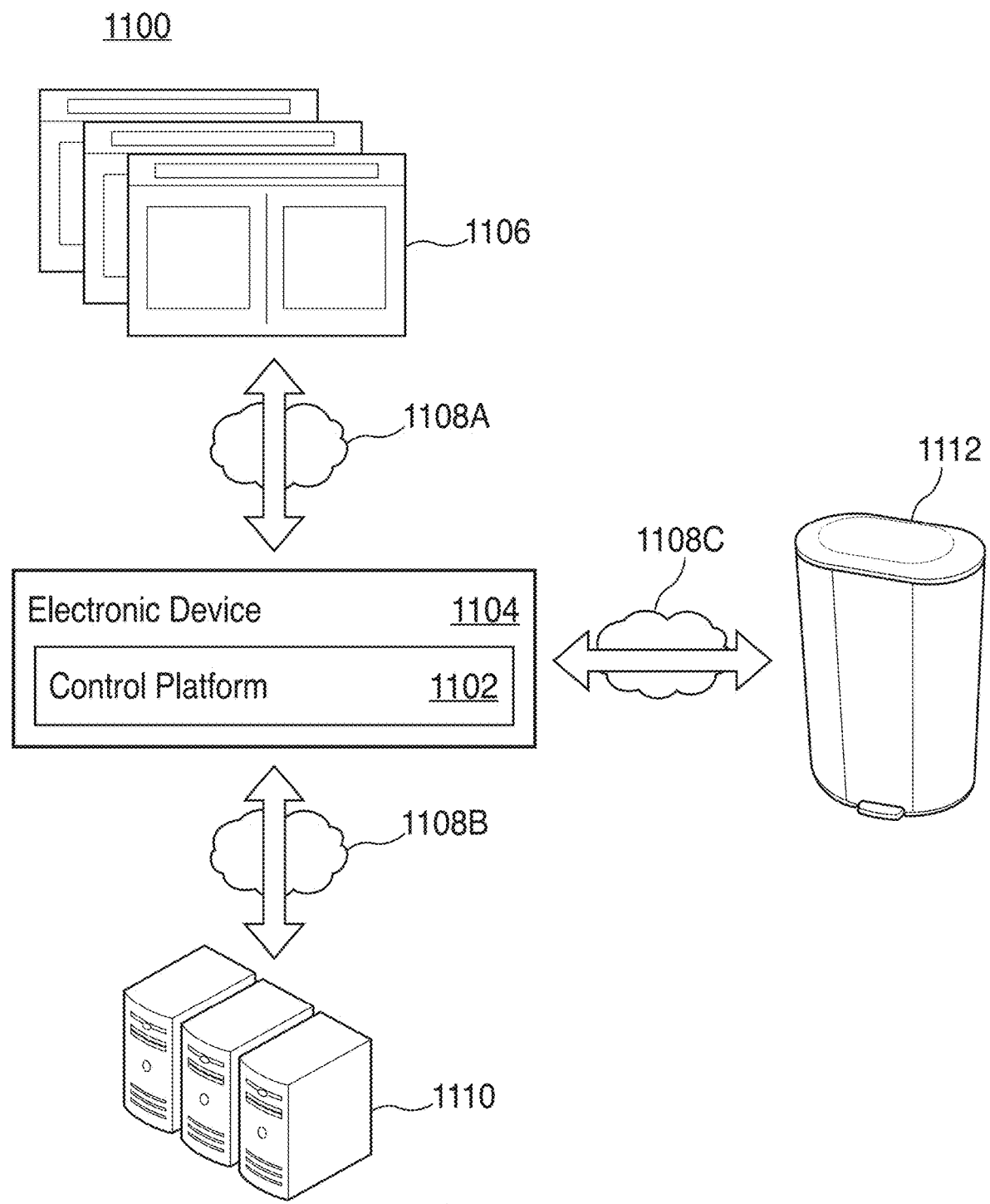
FIG. 11 illustrates a network environment that includes a control platform according to embodiment.

FIG. 11 illustrates a network environment 1100 that includes a control platform 1102. For the purpose of illustration, the control platform 1102 may be described as a computer program that is executing on an electronic device 1104 accessible to a user of OMPA 1112. As discussed above with reference to FIG. 1, OMPA 1112 may include a communication module that is responsible for receiving data from, or transmitting data to, the electronic device 1104 on which the control platform 1102 resides.

Users may be able to interface with the control platform 1102 via interfaces 1106. For example, a user may be able to access an interface through which information regarding OMPA 1112 can be viewed. This information may include historical information related to past performance (e.g., total pounds of OMPA input that has been processed), or this information may include state information related to current activity (e.g., the current state of OMPA 1112, an indication of whether OMPA 1112 is presently connected to the electronic device 1104, an indication of whether OMPA 1112 is presently locked). Thus, a user may be able to educate herself on the OMPA and its contents by reviewing content posted to interfaces generated by the control platform 1102.

Moreover, a user may be able to access an interface through which instructions can be provided to OMPA 1112. Said another way, the user may be able to specify, through the control platform 1102, when or how OMPA 1112 should process OMPA input stored therein. As an example, the OMPA 1112 may initially be configured to perform high intensity processing between 10 PM and 8 AM under the assumption that its ambient environment will generally be devoid of individuals during that timeframe. However, the user may be able to adjust aspects of setup or operation of OMPA 1112 through the control platform 1102. For instance, the user could specify that high intensity processing should not begin until 2 AM, or the user could specify that high intensity processing should not end after 6 AM.

A user could also program, through the control platform 1102, a preference regarding the weight at which to empty the processing chamber of OMPA 1112. On its own, the processing chamber may weigh 8-10 pounds. The total weight of the processing chamber (including its contents) can quickly become unwieldy for some users, such as elderly individuals and juvenile individuals. Accordingly, the control platform 1102 may permit users to define a weight at which to generate notifications (also referred to as "alarms"). Assume, for example, that a user indicates that the total weight of the processing chamber (including its contents) should not exceed 15 pounds through an interface generated by the control platform 1102. In such a scenario, the control platform 1102 may monitor mass measurements received from OMPA 1112 and then generate a notification in response to determining that the total weight of the processing chamber (including its contents) is within a certain amount of 15 pounds. The certain amount may be a fixed value (e.g., 1 pound or 2 pounds), or the certain amount may be a dynamically determined value (e.g., 5 percent or 10 percent of the weight specified by the user).

The notification could be presented in various ways. In embodiments where the control platform 1102 is implemented as a computer program executing on an electronic device 1104 as shown in FIG. 11, the notification may be generated by the computer program (e.g., in the form of a push notification). Additionally or alternatively, the control platform 1102 may transmit an instruction to OMPA 1112 to generate the notification. Accordingly, the notification could be a visual, audible, or tactile notification that is generated by the electronic device 1104 or OMPA 1112.

As shown in FIG. 11, the control platform 1102 may reside in a network environment 1100. Thus, the electronic device 1104 on which the control platform 1102 is implemented may be connected to one or more networks 1108A-C. These networks 1108A-C may be personal area networks (PANs), local area networks (LANs), wide area networks (WANs), metropolitan area networks (MANs), cellular networks, or the Internet. Additionally or alternatively, the electronic device 1104 could be communicatively connected to other electronic devices—including OMPA 1112—over a short-range wireless connectivity technology, such as Bluetooth, NFC, Wi-Fi Direct (also referred to as "Wi-Fi P2P"), and the like.

In some embodiments, at least some components of the control platform 1102 are hosted locally. That is, part of the control platform 1102 may reside on the electronic device 1104 that is used to access the interfaces 1106 as shown in FIG. 11. For example, the control platform 1102 may be embodied as a mobile application that is executable by a mobile phone. Note, however, that the mobile application may be communicatively connected to (i) OMPA 1112 and/or (ii) a server system 1110 on which other components of the control platform 1102 are hosted.

In other embodiments, the control platform 1102 is executed entirely by a cloud computing service operated by, for example, Amazon Web Services®, Google Cloud Platform™, or Microsoft Azure®. In such embodiments, the control platform 1102 may reside on a server system 1110 that is comprised of one or more computer servers. These computer servers can include different types of data (e.g., regarding batches of product that have been produced by OMPAs associated with different users), algorithms for implementing the routine described above (e.g., based on knowledge regarding ambient temperatures, humidity, etc.), algorithms for tailoring or training the routine described above (e.g., based on knowledge gained from nearby OMPAs or comparable OMPAs), and other assets (e.g., user credentials). Those skilled in the art will recognize that this information could also be distributed amongst the server system 1110 and one or more other electronic devices. For example, some data that is generated by a given OMPA may be stored on, and processed by, that OMPA or an electronic device that is "paired" with that OMPA. Thus, not all data generated by OMPAs—or even the control platform—may be transmitted to the server system 1110 for security or privacy purposes.

One benefit of having a network-connected OMPA is that it enables connectivity with other electronic devices, and thus integration into related systems.

Assume, for example, that a user purchases and then deploys a OMPA in a home. This OMPA may include a set of instructions (also referred to as the "intelligent time recipe") that, when executed, indicate how its components are to be controlled. These instructions may involve the execution of heuristics, algorithms, or computer-implemented models. Rather than learn best practices "from scratch," the OMPA (or a control platform to which it is communicatively connected) may be able to learn from the experiences of other OMPAs. These OMPAs may be located nearby, and therefore may experience comparable ambient conditions such as humidity, temperature, and the like. Alternatively, these OMPAs may be comparable, for example, in terms of amount of actual or expected OMPA input, type of actual or expected OMPA input, number of users (e.g., a single individual versus a family of four individuals), etc. Thus, knowledge may be shared among OMPAs as part of a networked machine learning scheme. Referring again to the above-mentioned example, the OMPA may initiate a connection with a control platform after being deployed in the home. In such a scenario, the control platform may provide another set of instructions that is learned based on knowledge gained by the control platform from analysis of the activities of other OMPAs. Accordingly, the control platform may further develop instruction sets based on machine learning. Learning may be performed continually (e.g., as OMPAs perform activities and generate data), and insights gained through learning may be provided continually or periodically. For instance, the control platform may communicate instructions to a OMPA whenever a new set is available, or the control platform may communicate a new set of instructions to an OMPA only upon receiving input (e.g., from the corresponding user) indicating that the OMPA is not operating as expected.

As another example, assume that a municipality is interested in collecting the products produced by various OMPAs for further processing (e.g., composting). In such a scenario, the municipality may be interested in information such as the weight and water content of product that is available for collection. Each OMPA may not only have the sensors needed to measure these characteristics as discussed above but may also have a communication module that is able to transmit measurements elsewhere. In some embodiments, these OMPA directly transmit the measurements to the municipality (e.g., by uploading to a network-accessible data interface, such as an application programming interface). In other embodiments, these OMPAs indirectly transmit the measurements to the municipality (e.g., by forwarding to respective control platforms, which then transmit the measurements—or analyses of the measurements—onward to the municipality). With these measurements, the municipality may be able to retrieve, transport, and handle the products produced by these OMPAs in a more intelligent manner. For example, the municipality may have a better understanding of when retrieval needs to occur, and how much storage space is needed for the products, if the weight is shared.

Users may also be able to communicate with one another, directly or indirectly, through OMPA. Assume, for example, that a first OMPA has finished processing its OMPA input into a product. Although processing is complete, a corresponding first user may not be ready to offload the product. In such a situation, a second user who is located nearby (e.g., as determined based on information generated by the respective OMPA, information input by the respective users, etc.) may offer to handle the product. For instance, the second user may retrieve the product from the first user and then handle it, add it to her own product, etc. Users may be able to communicate through the interfaces 1106 generated by the control platform 1102, or users may be able to communicate directly through their respective OMPAs.

Computing System

Figure 12:
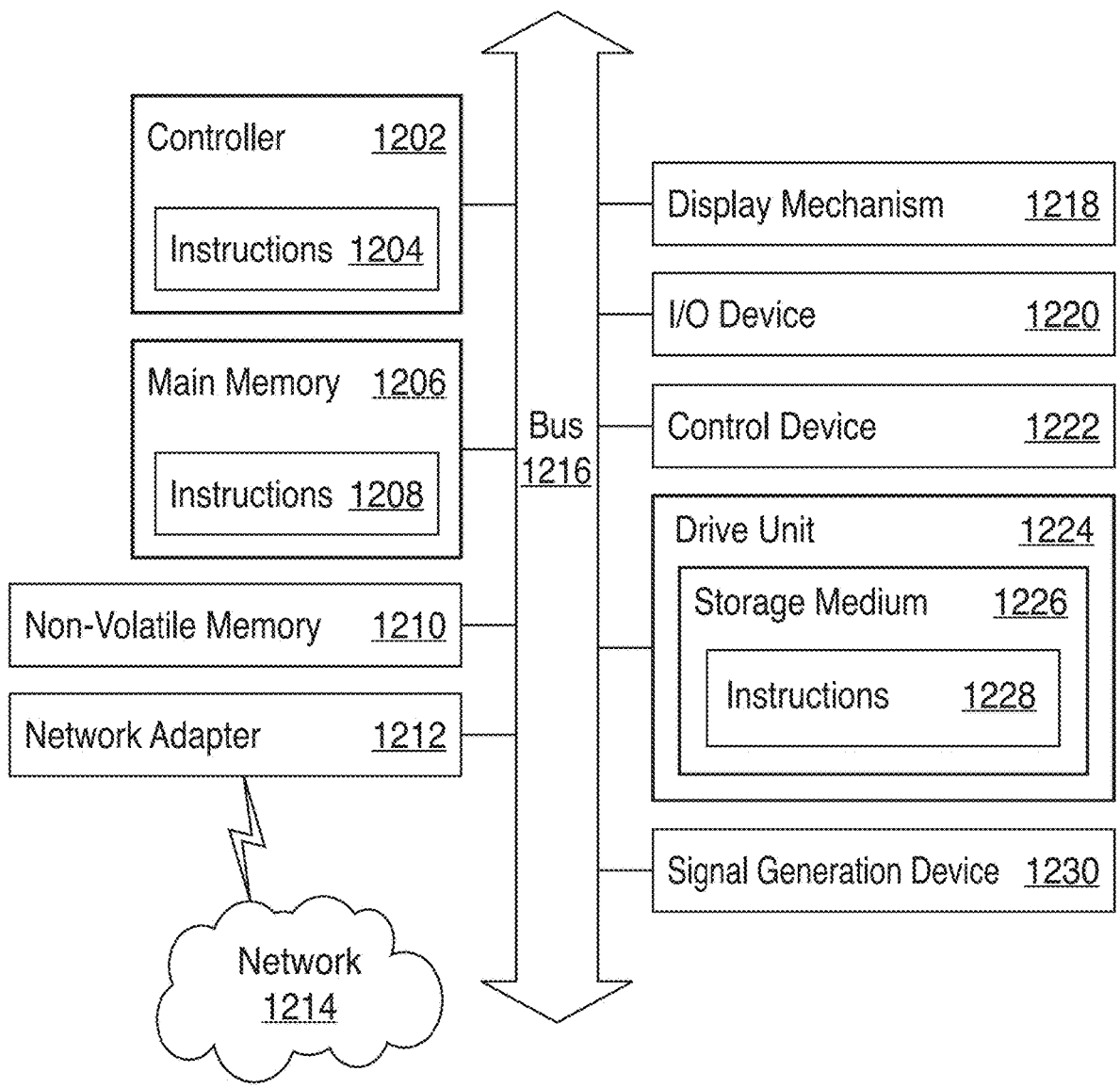
FIG. 12 is a block diagram illustrating an example of a computing system in which at least some operations described herein can be implemented according to embodiment.

FIG. 12 is a block diagram illustrating an example of a computing system 1200 in which at least some operations described herein can be implemented. For example, components of the computing system 1200 may be hosted on an OMPA that is tasked with converting OMPA input into a more stable product. As another example, components of the computing system 1200 may be hosted on an electronic device that is communicatively connected to an OMPA.

The computing system 1200 may include a controller 1202, main memory 1206, non-volatile memory 111210, network adapter 1212, display mechanism 1218, input/output (I/O) device 1220, control device 1222, drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While the main memory 1206, non-volatile memory 111210, and storage medium 1226 are shown to be a single medium, the terms "machine-readable medium" and "storage medium" should be taken to include a single medium or multiple media (e.g., a database distributed across more than one computer server) that store instructions 1228. The terms "machine-readable medium" and "storage medium" shall also be taken to include any medium that is capable of storing, encoding, or carrying instructions for execution by the computing system 1200.

In general, the routines executed to implement the embodiments of the present disclosure may be implemented as part of an operating system or a specific computer program. Computer programs typically comprise instructions (e.g., instructions 1204, 1208, 1228) that are set at various times in various memory and storage devices in an electronic device. When read and executed by the controller 1202, the instructions cause the computing system 1200 to perform operations to execute various aspects of the present disclosure.

The network adapter 1212 enables the computing system 1200 to mediate data in a network 1214 with an entity that is external to the computing system 1200 through any communication protocol that is supported by the computing system 1200 and the external entity. The network adapter 1212 can include a network adaptor card, wireless network interface card, router, access point, wireless router, switch, protocol converter, gateway, bridge, hub, digital media receiver, repeater, or any combination thereof.

Figure 13A:
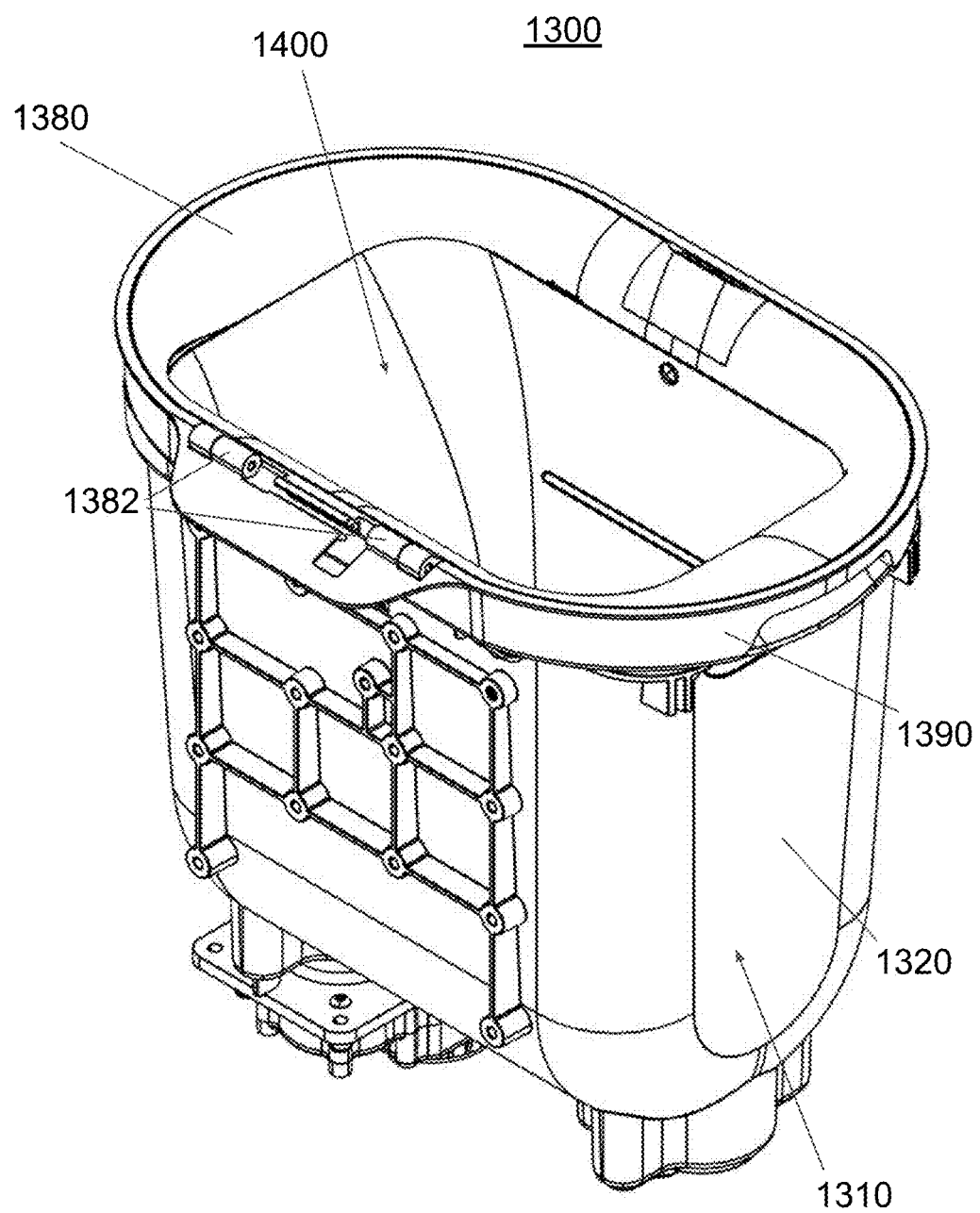
FIGS. 13A-13J illustrate different views of an OMPA subassembly according to embodiment.
Figure 13B:
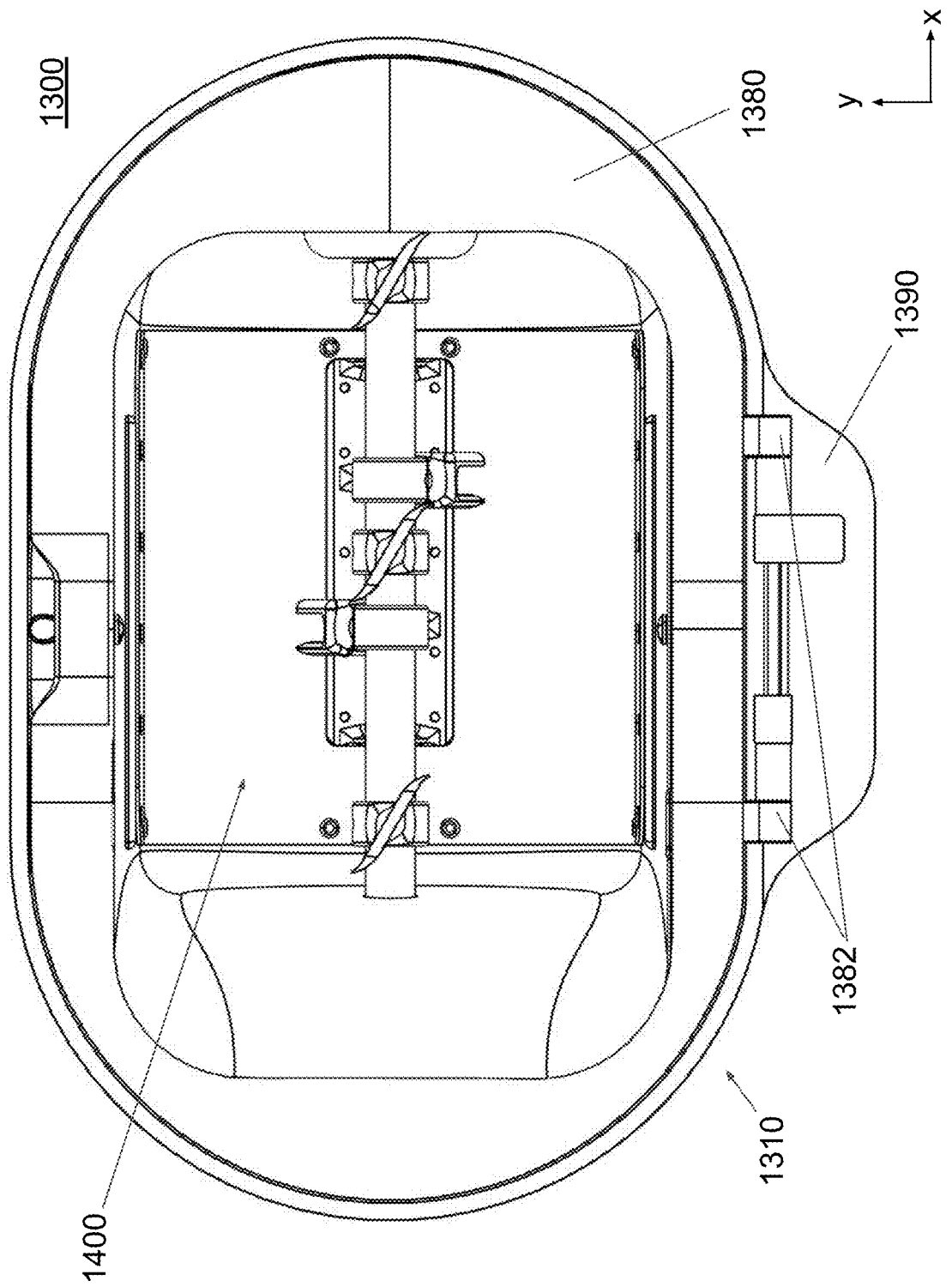
Figure 13C:
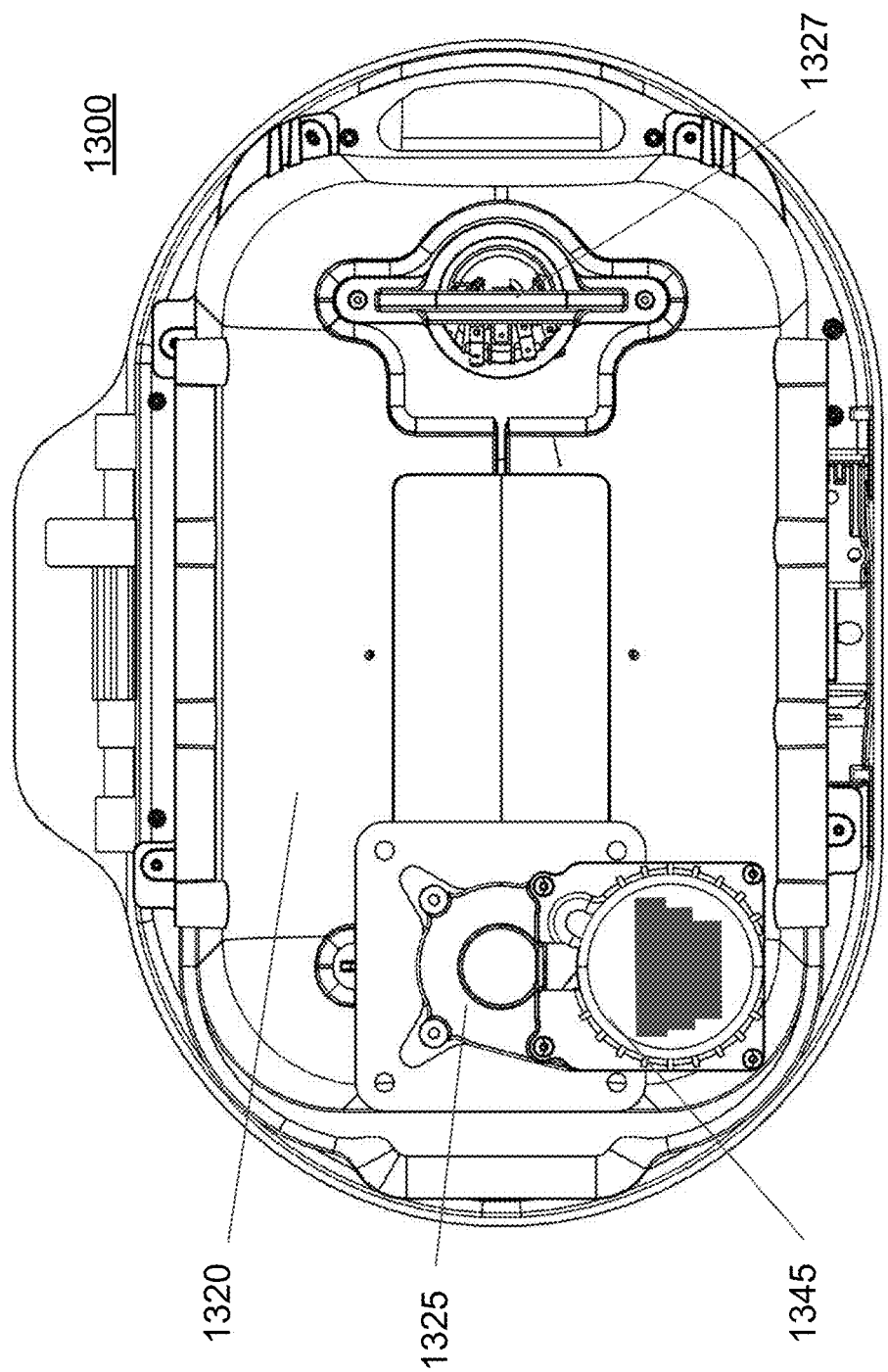
Figure 13D:
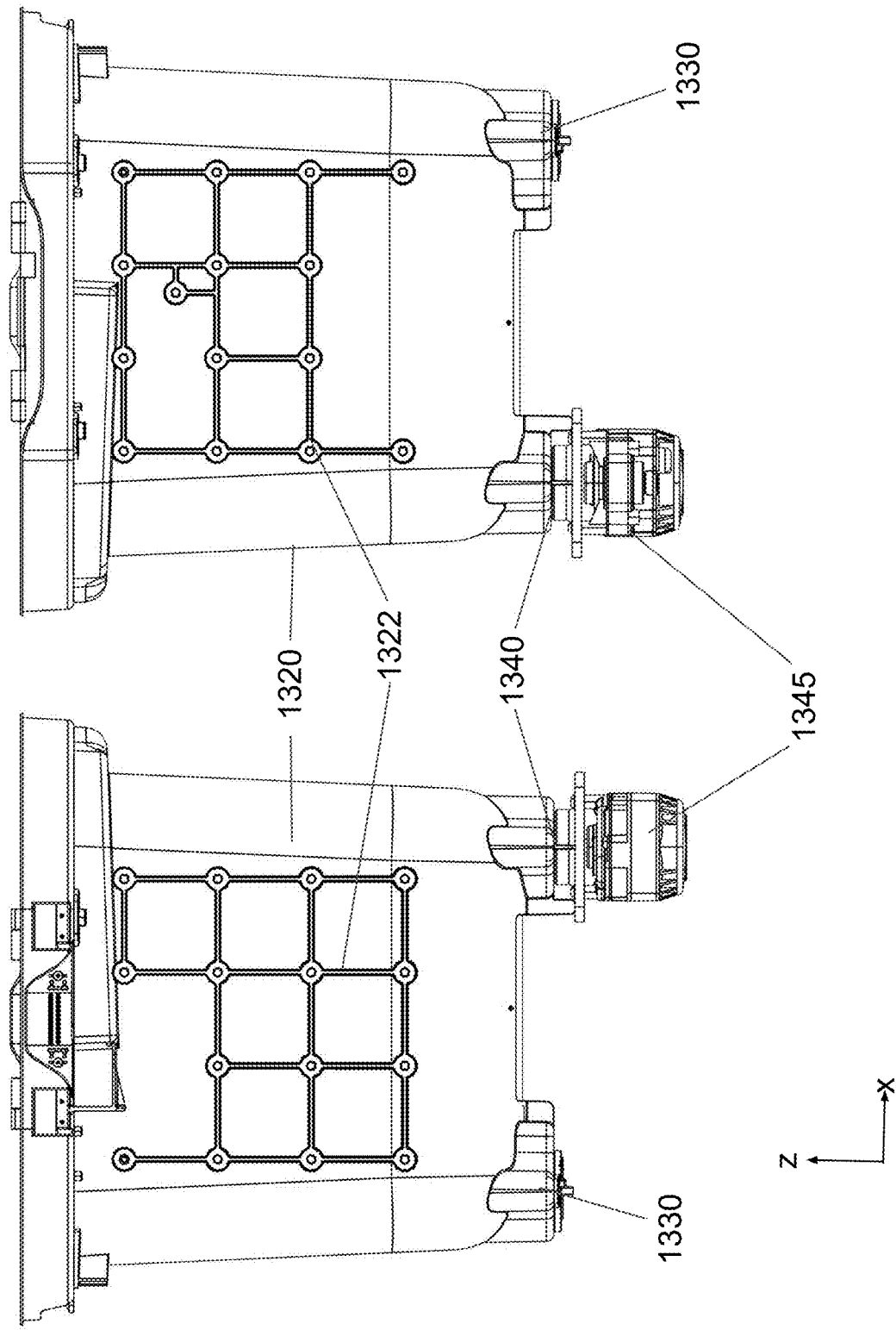
Figure 13E:
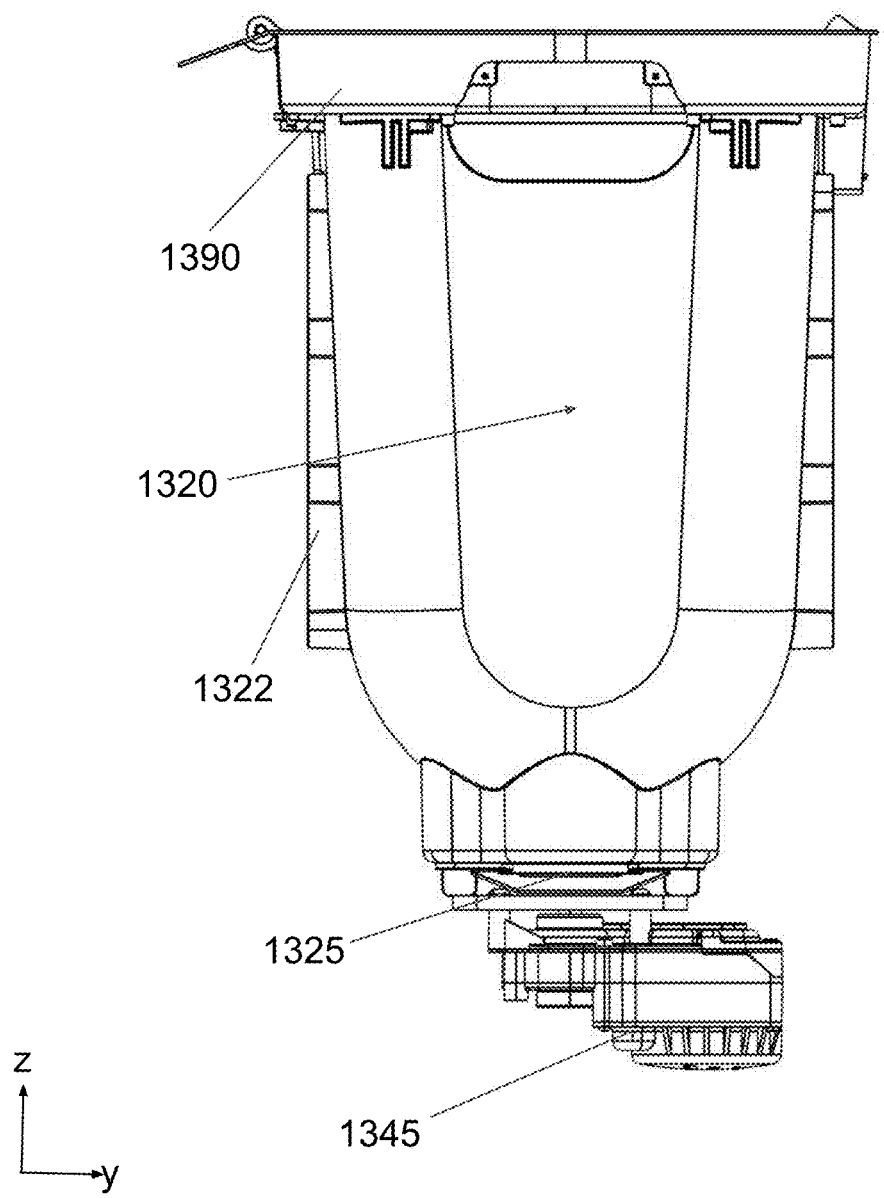

FIGS. 13A-13J illustrate different views of OMPA subassembly 1300 according to an embodiment. FIG. 13A shows an isometric view of OMPA subassembly 1300, FIG. 13B shows a top view of OMPA subassembly, FIG. 13C shows a bottom view of subassembly 1300, FIG. 13D shows a side front view of subassembly 1300, and FIG. 13E shows a side view of subassembly 1300. OMPA subassembly 1300 includes bucket interface assembly 1310, bezel 1380, lid support member 1390, and bucket assembly 1400. OMPA subassembly 1300 is one of many subassemblies that comprise an OMPA according to the embodiments discussed herein. Subassembly 1300 may fit within a durable housing (not shown) of the OMPA. The primary functions of subassembly 1300 can include cutting, fracturing, grinding, paddling, and any other physical manipulation of organic matter contained within bucket assembly 1400 and heating of organic matter contained within bucket assembly 1400. Subassembly 1300 may operate in concert with other subassemblies of the OMPA such as, for example, an airflow subassembly designed to supply forced airflow through the OMPA, including bucket assembly 1400, to dry the organic material. In addition, this airflow, coupled with the heating provided by subassembly 1300, aids in the drying organic material through convection heating.

OMPA subassembly 1300 has a length corresponding to an X axis, a width corresponding to a Y axis, and a height corresponding to a Z axis.

Figure 13F:
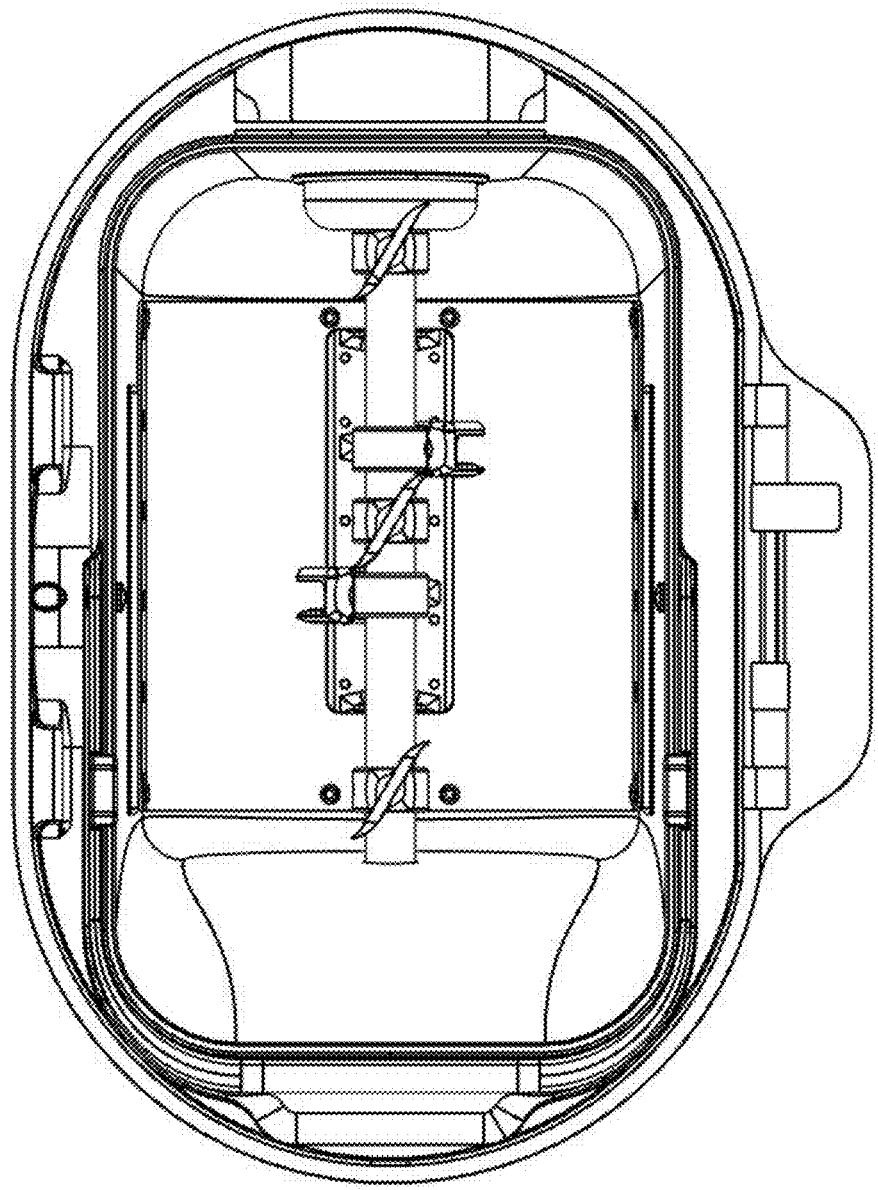

Bucket assembly 1400 is designed to be removed from and inserted into bucket interface assembly 1310 along the Z axis. Bucket interface assembly 1310 can serve as a receptacle for bucket assembly 1400 and can also provide a platform onto which lid support member 1390 can be mounted and secured thereto. In addition, assembly 1310 may be coupled to various structural members (not shown) and other components (not shown) that are included with an OMPA. Bezel 1380 can be secured to lid support member 1390 and is designed to fit within an inner dimension of lid support member when in a closed or in installed position (which position is shown in FIGS. 13A, 13B, 13D and 13E). Bezel 1380 may be connected to lid support member 1390 via hinge members 1382 and can pivot up to an open position and pivot down to a closed position. When bezel 1380 is in an open position, a user can remove or insert bucket assembly 1400. In other embodiments, bezel 1380 may be a component that the user removes from subassembly 1300 when the user desires to remove or insert bucket assembly 1400. FIG. 13F shows an illustrative top view of subassembly 1300 with bezel 1380 in an open position or removed altogether from subassembly 1300.

Figure 13G:
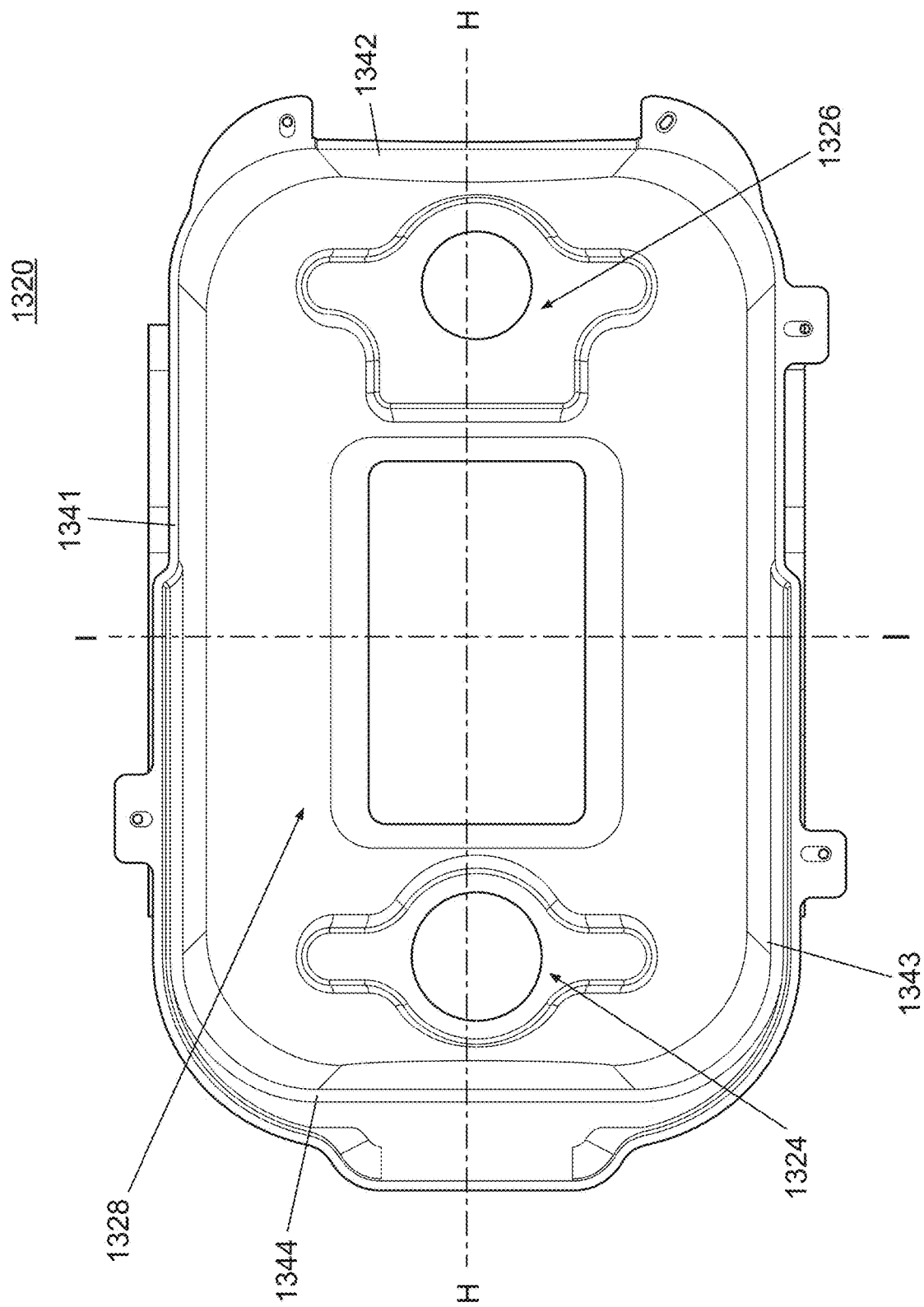
Figure 13H:
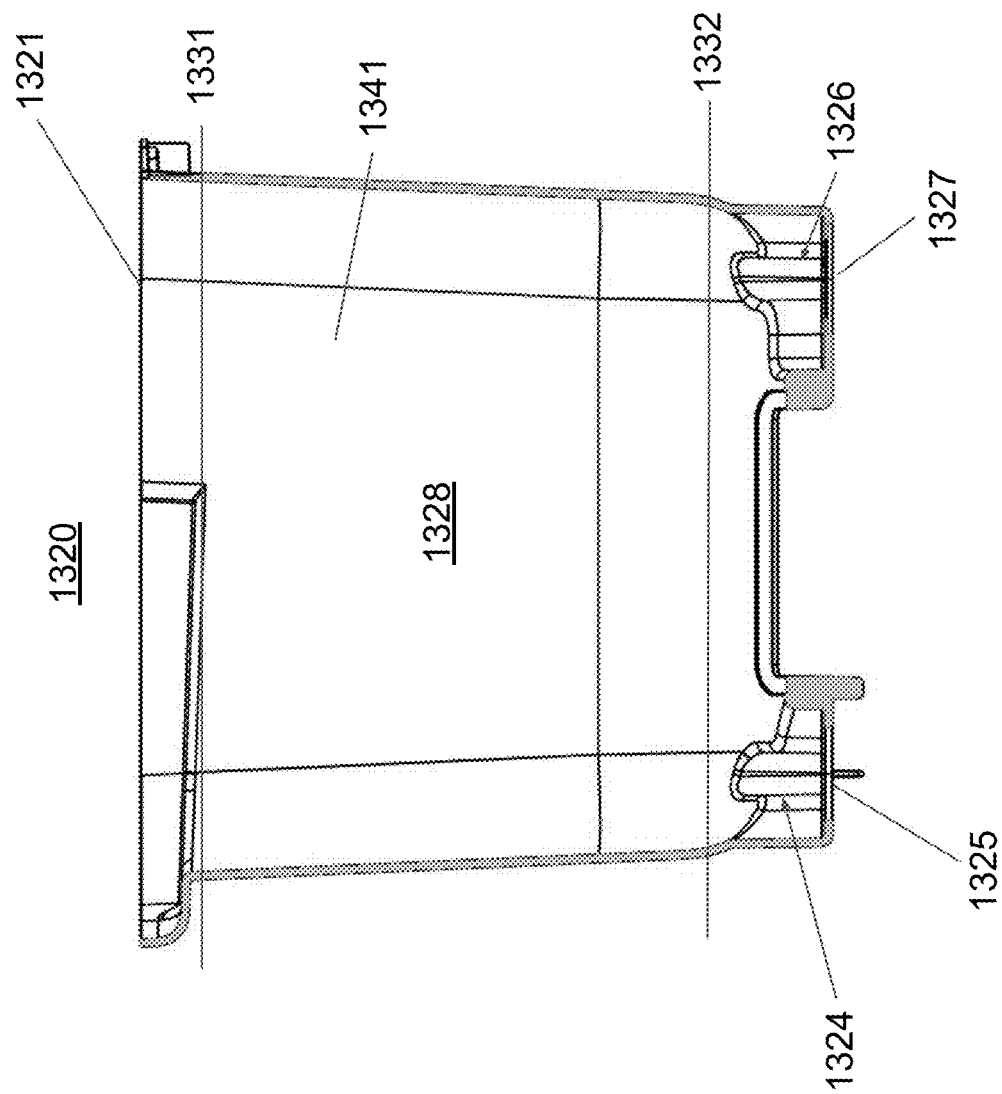
Figure 13I:
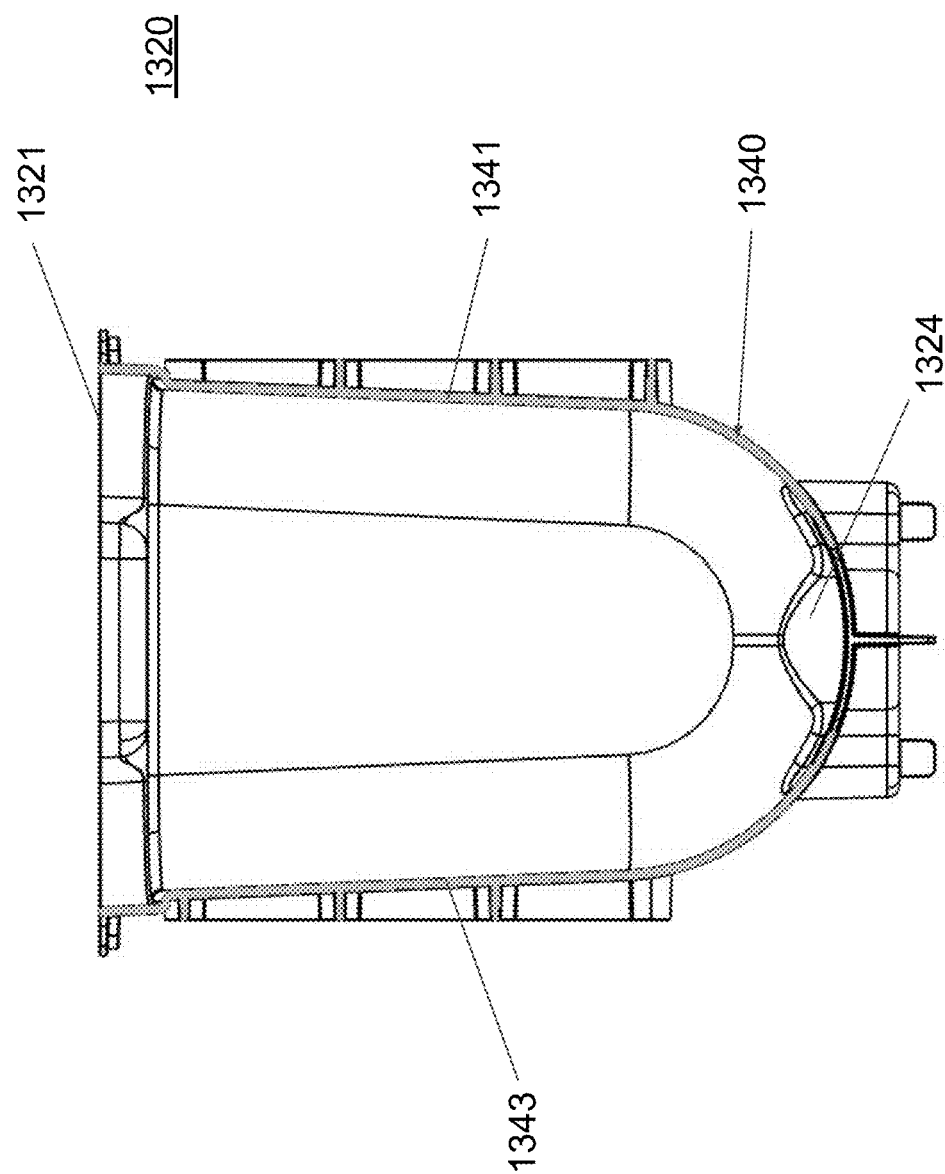

Bucket interface assembly 1310 can include housing 1320, electrical interface 1327, mechanical interface 1325, and motor 1345. Housing 1320 may be constructed from an injection molded plastic material having strategically placed structural reinforcement members such as rib support members 1322 placed on the front and back sides of housing 1320. Referring now to FIGS. 13G, 13H, and 13I which show illustrative top and cross-sectional views of housing 1320. The cross-sectional view of FIG. 13H is taken along line H-H in FIG. 13G. The cross-sectional view of FIG. 13I is taken along line I-I in FIG. 13G. Housing 1320 can include first registration footprint 1324 and second registration footprint 1326 each of which can be designed to be female in construction to receive reciprocal male registration footprints of bucket assembly 1400. Registration footprints 1324 and 1326 are designed so that bucket assembly 1400 can be inserted in only one orientation. As shown, registration footprint 1324 and registration footprint 1326 have different shapes and dimensions. Registration footprint 1324 is associated with mechanical interface 1325 and registration footprint 1326 is associated with electrical interface 1327. The one-way only orientation can ensure that the heavier mechanical portion of bucket assembly 1400 cannot touch or otherwise damage any electronics or electrical interface components retained in registration footprint 1326.

In FIG. 13H, note that the inner dimensions of cavity 1328 defining portions of the interior surface of housing 1320 may be symmetrical across the longitudinal and latitudinal planes defined therethrough. For reference, the latitudinal plane may refer to a plane that is be parallel to top surface 1321. Note, however, that the cross-sectional area of cavity 1330 may gradually decrease from latitudinal plane 1331 to latitudinal plane 1332. Further note that cavity 1328 has a semi-circular bottom portion 1340 with side walls 1341-

1344 that extend upwards from the bottom portion 1340 an angle that is not perpendicular to top surface 1321. In addition, the interfaces between all adjacent side walls 1341-1344 are curved as clearly illustrated in FIG. 13G. The shape and dimensions of cavity 1328 and registration footprints 1324 and 1326 are designed to accommodate bucket assembly 1400.

Figure 13J:
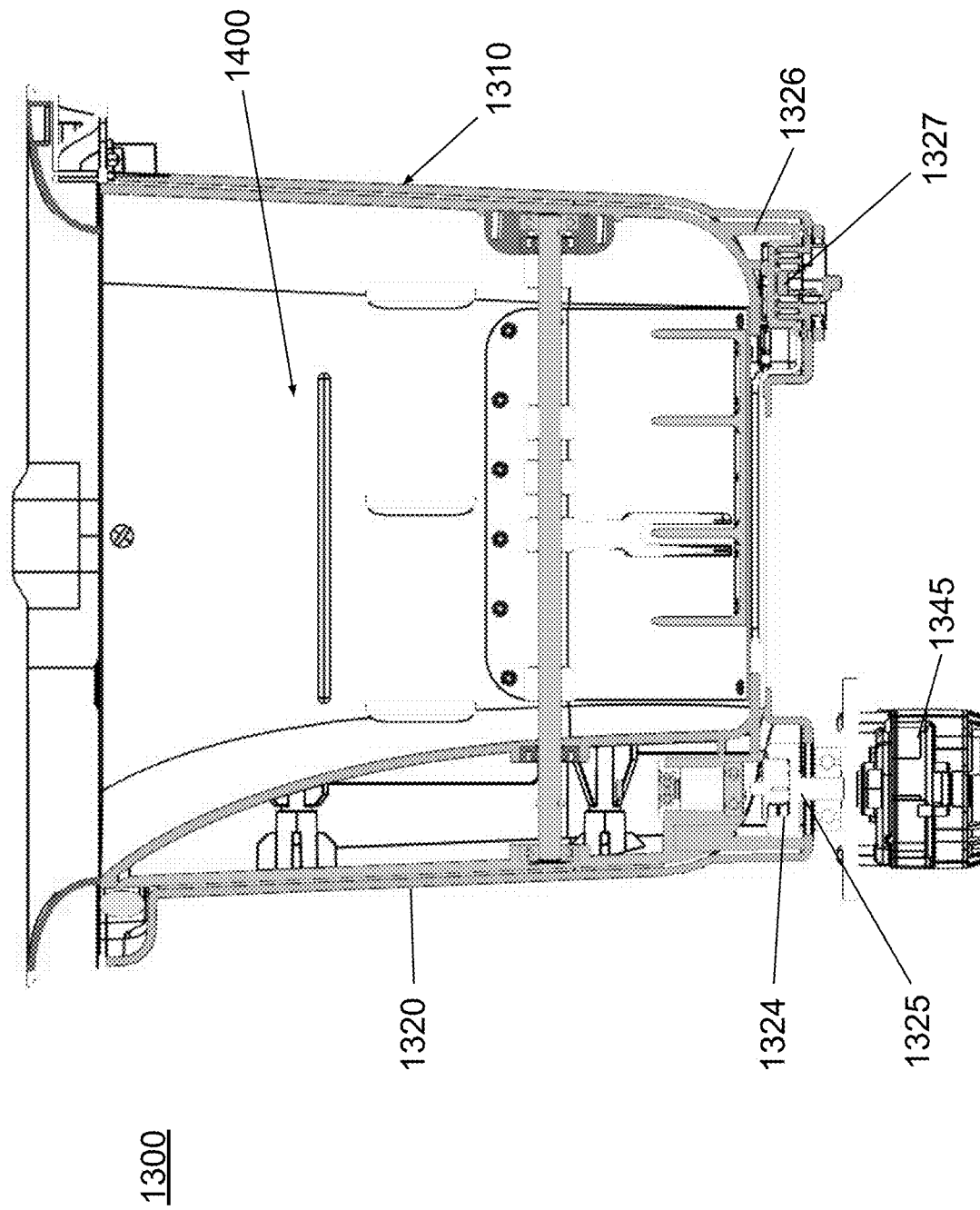

FIG. 13J shows an illustrative cross-sectional view subassembly 1300 showing electrical interface 1327 positioned in registration footprint 1326. In some embodiments, female electrical interface 1327 may exhibit a little movement play to better connect with its male electrical interface of bucket assembly 1400 when bucket assembly 1400 is inserted into bucket interface assembly 1310. For example, electrical interface 1327 may be able move in the x-y plane or x-y-z plane assuming bucket assembly 1400 is inserted along the z axis. FIG. 13J also shows mechanical interface 1325 positioned in registration footprint 1324. Female mechanical interface 1325 may be secured within footprint 1324 such that no movement play is permitted. Female mechanical interface can be connected to motor 1345 via a connecting rod or other coupling device. Secure mounting of female mechanical interface 1325 may be desired because no slop tolerance can exist between the male mechanical connector of bucket housing 1400 and female mechanical interface 1325. Motor 1345 may spin female mechanical connector at a relatively moderate speed (e.g., 1300 rpms), which causes the male mechanical connector to also spin at the same speed. Thus, registration between the female and male mechanical connectors is important.

Figure 14A:
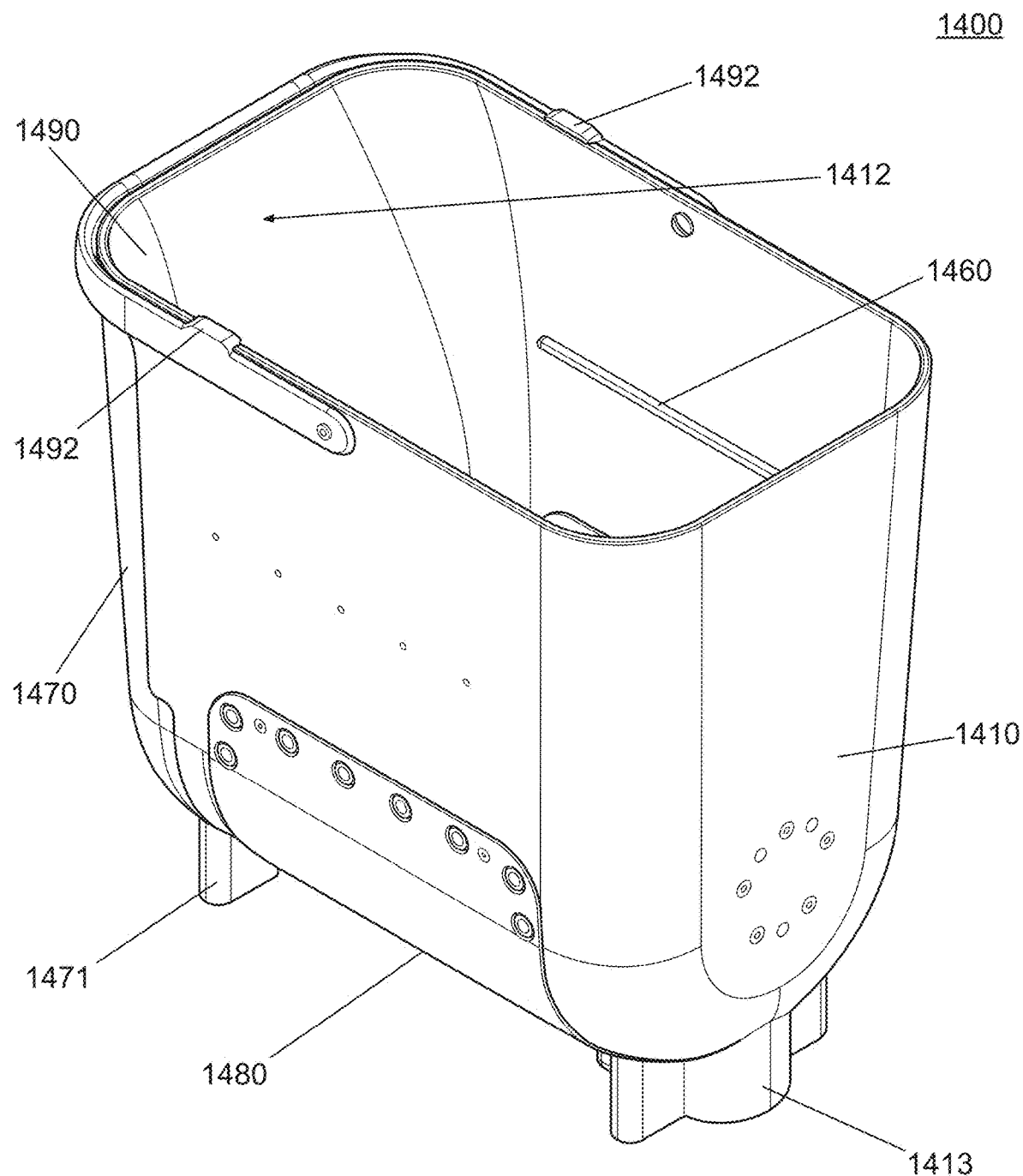
FIGS. 14A-14H show different views of a bucket assembly according to embodiment.
Figure 14B:
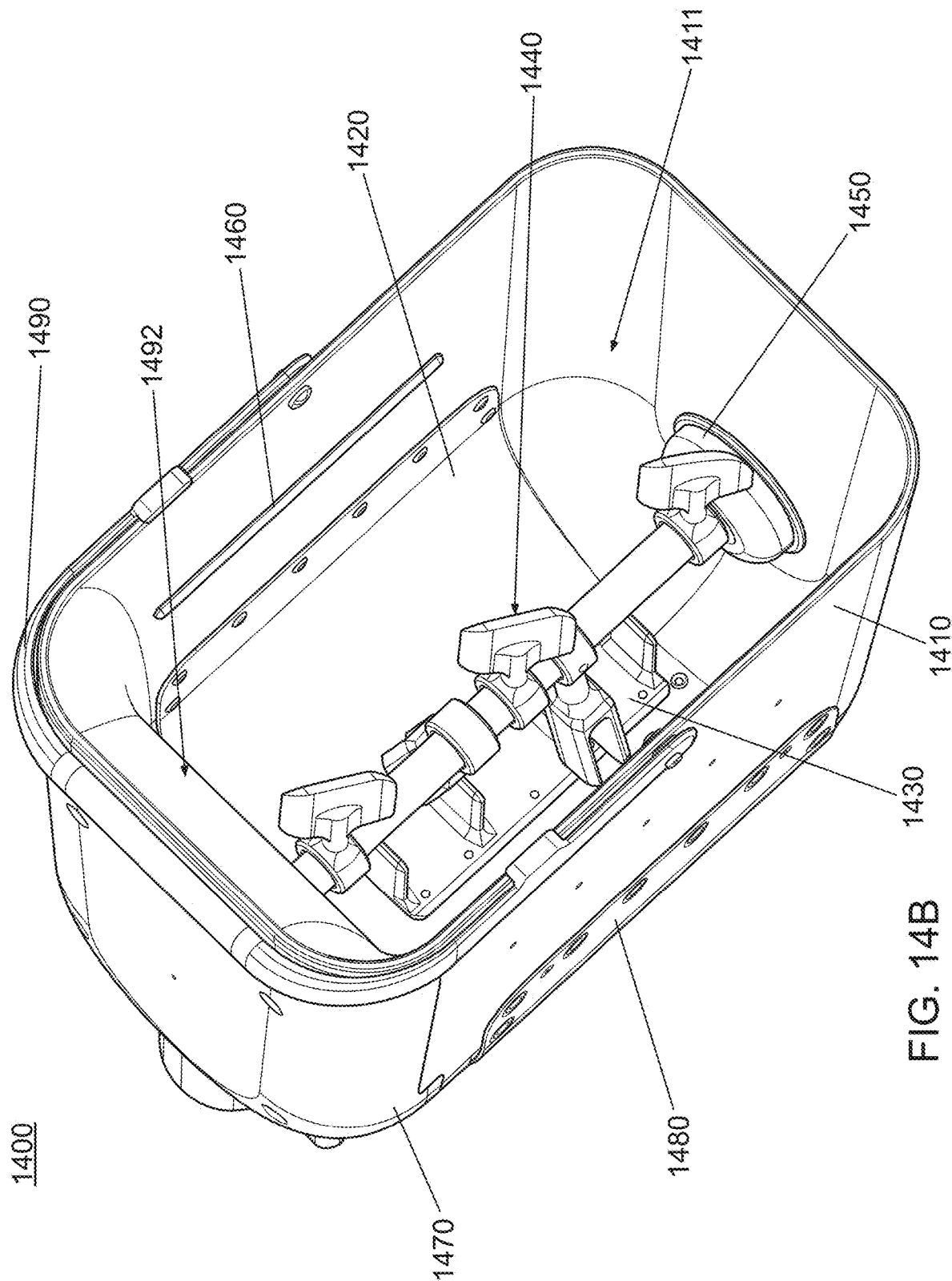
Figure 14C:
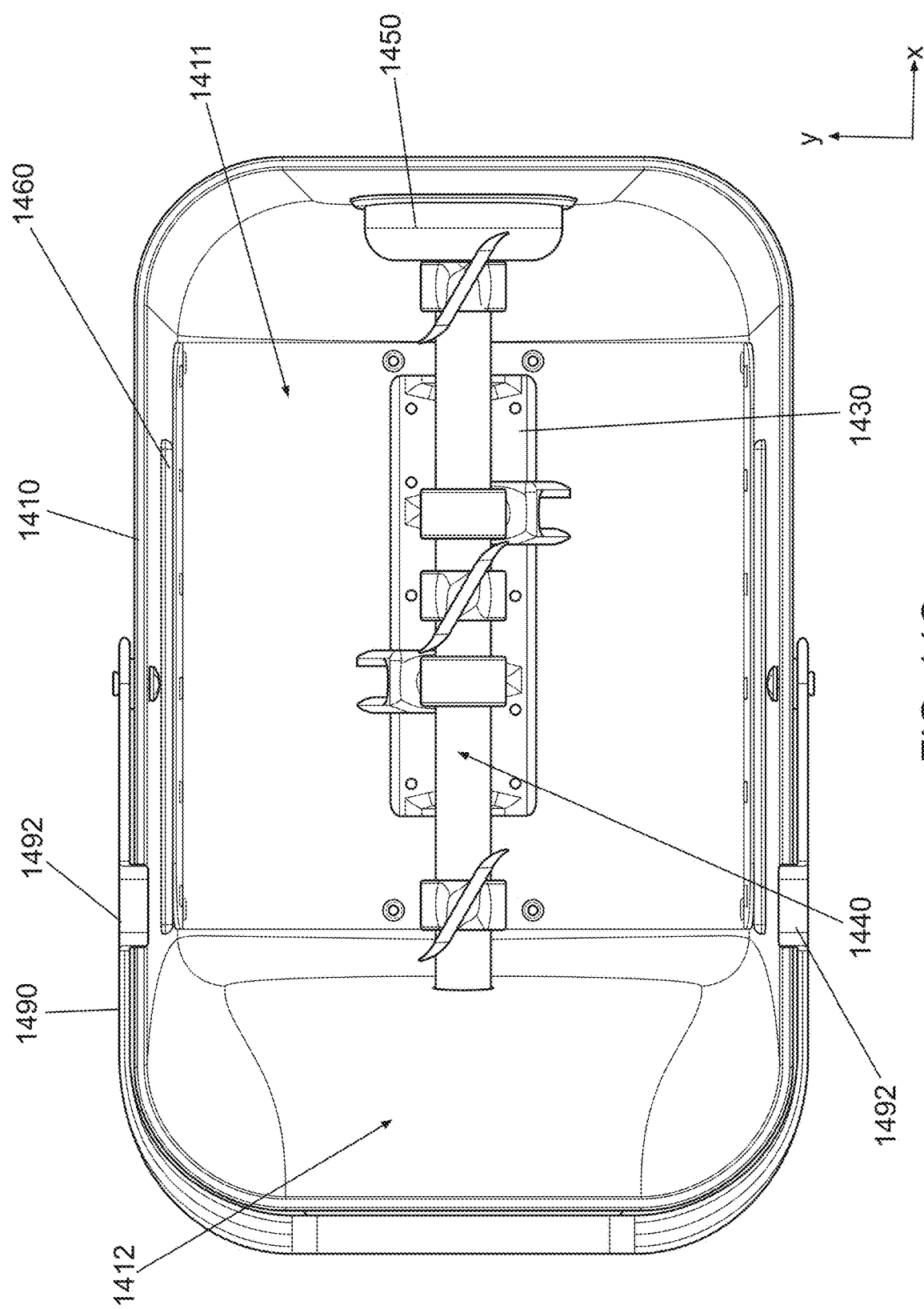
Figure 14D:
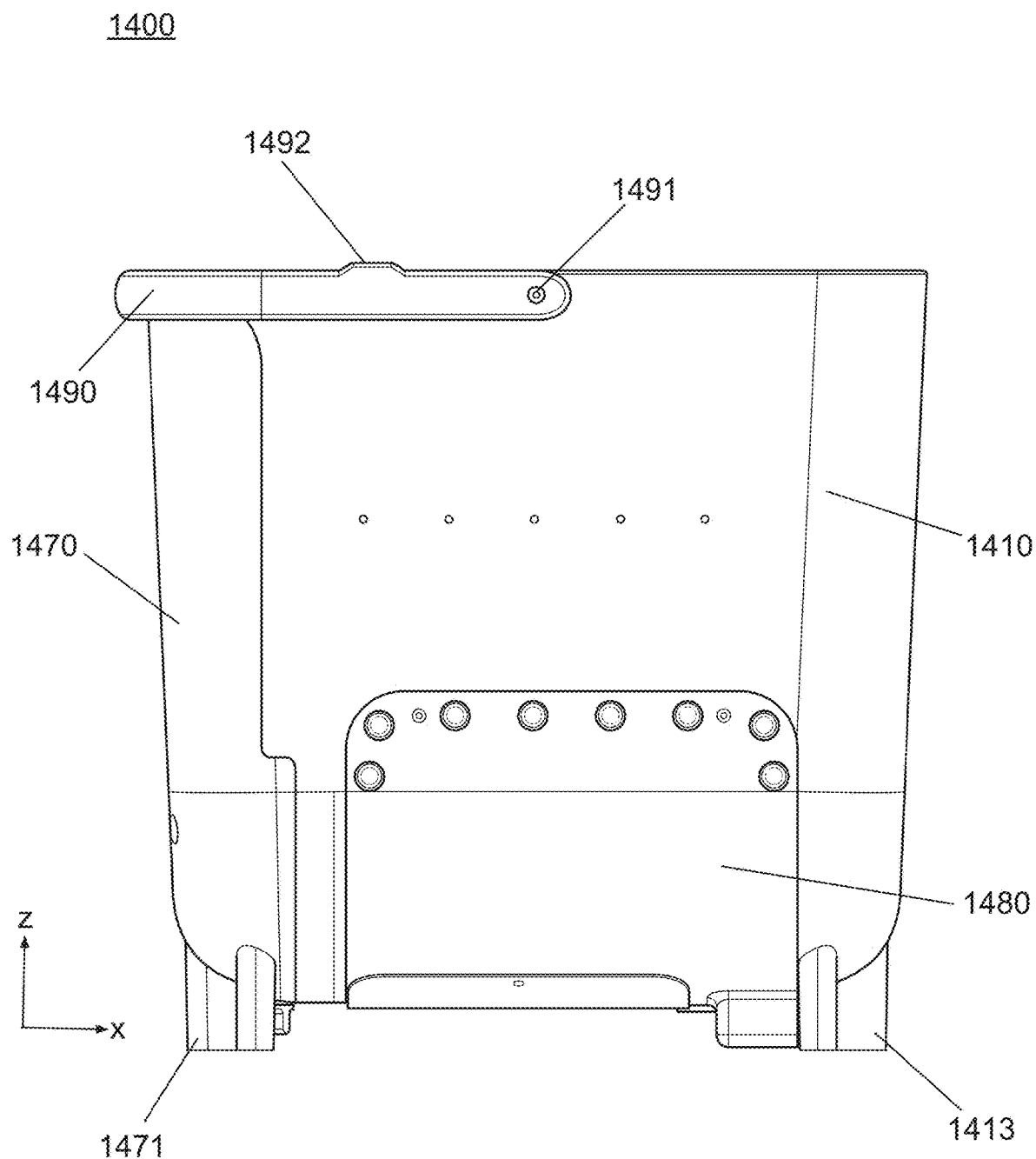
Figure 14E:
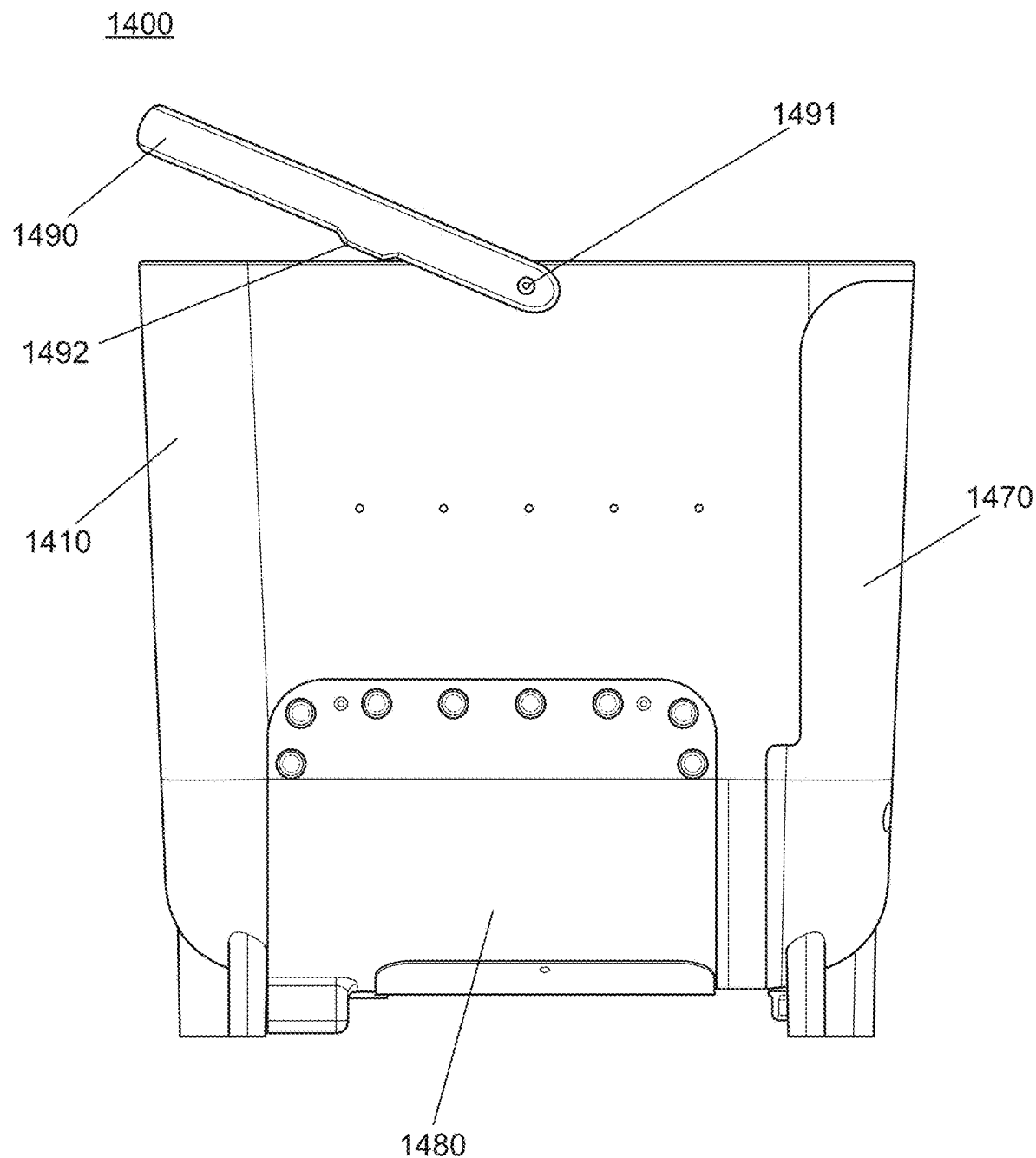
Figure 14G:
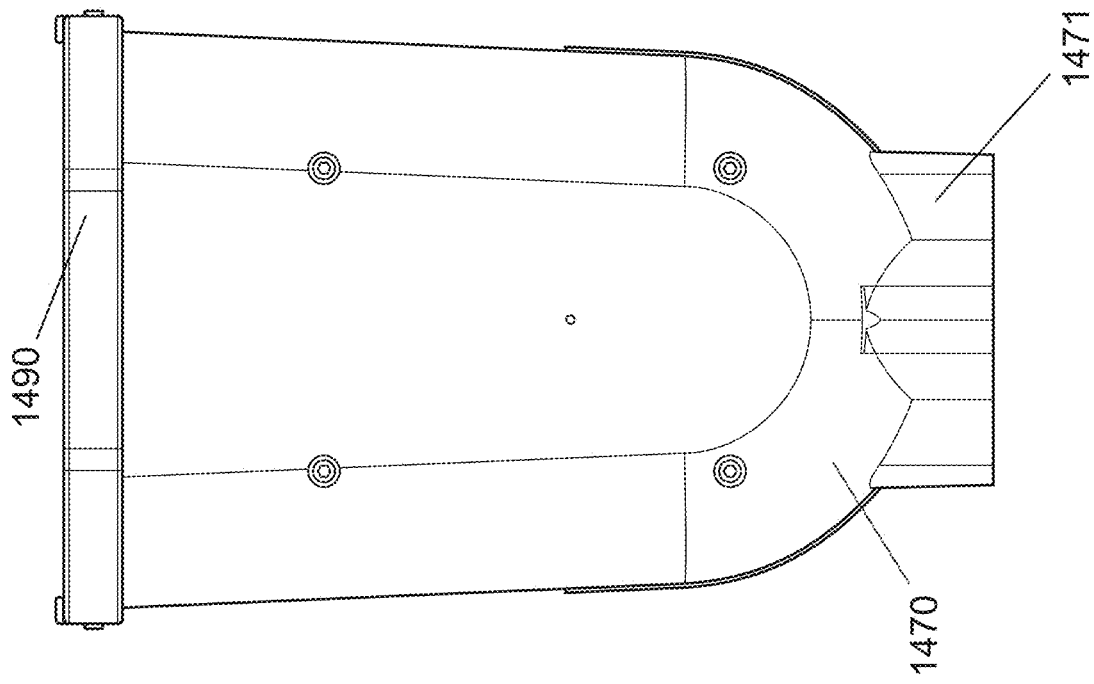
Figure 14F:
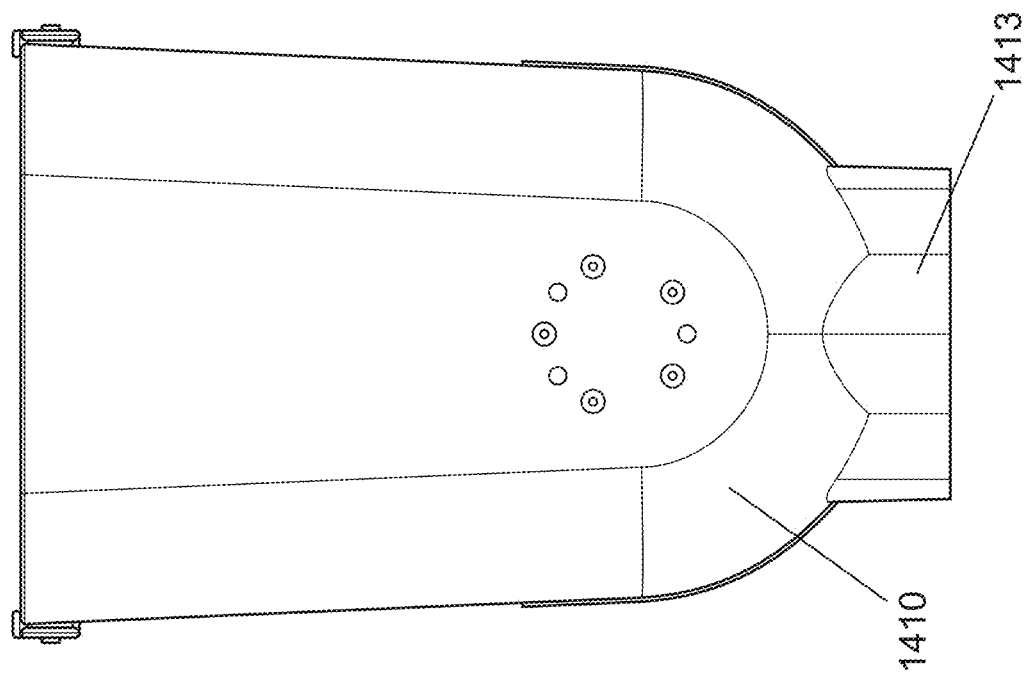
Figure 14H:
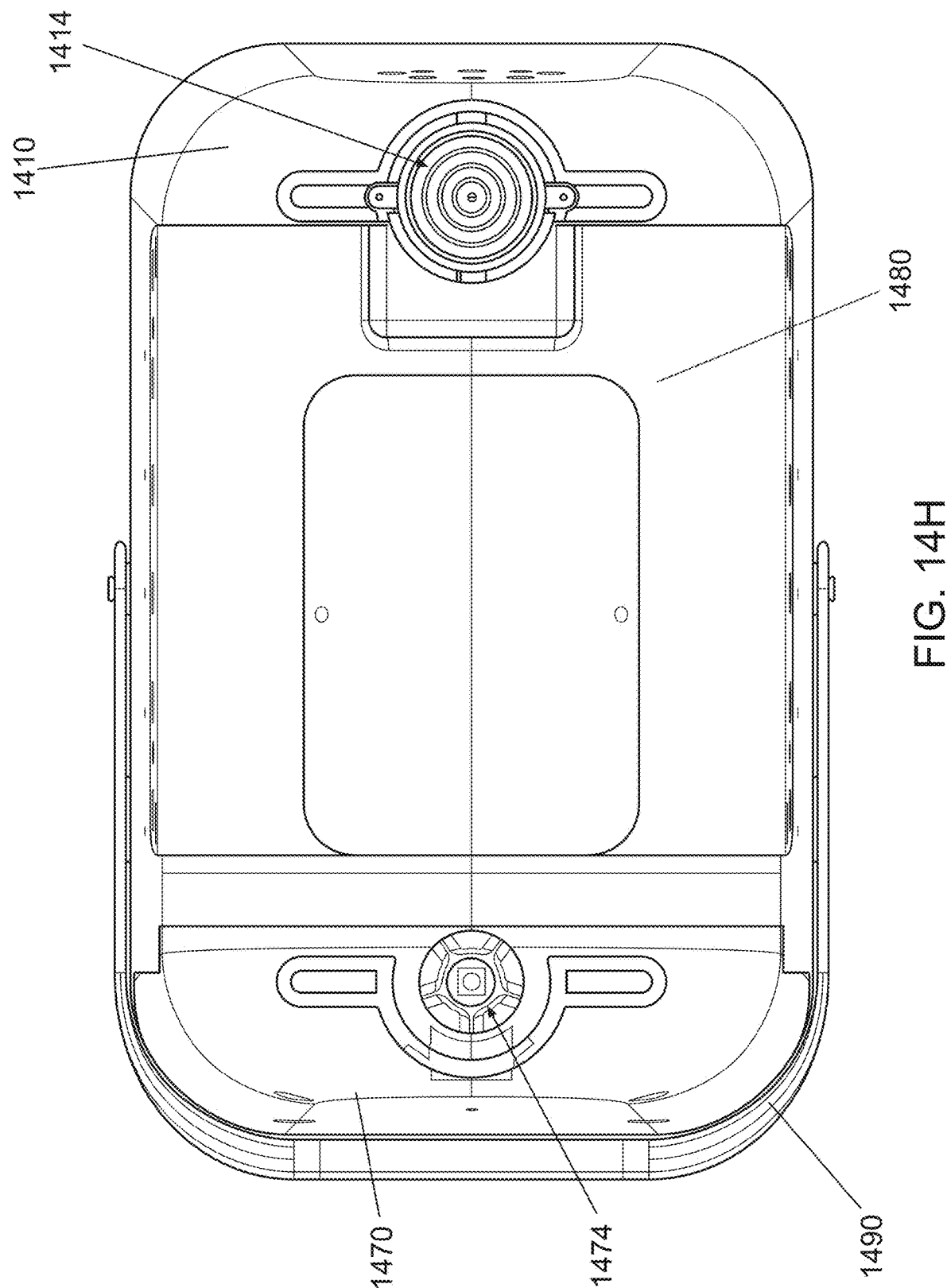

Bucket assembly 1400 and its components are now discussed in more detail with reference to FIGS. 14A-14I. Bucket assembly 1400 has a length corresponding to an X axis, a width corresponding to a Y axis, and a height corresponding to a Z axis. FIG. 14A shows an illustrative isometric view, FIG. 14B shows another isometric view, FIG. 14C shows a top view, FIG. 14D shows an illustrative front view with a handle in down position, FIG. 14E shows an illustrative back view with the handle in an open position, FIG. 14F shows a first side view, FIG. 14G shows a second side view, and FIG. 14H shows a bottom view of bucket assembly 1400. Bucket assembly 1400 can include bucket housing 1410, metal plate 1420, blade array 1430, cut and paddle assembly 1440, bearing housing 1450, fill line indicators 1460, transmission housing 1470, cover 1480, and handle 1490. Notable components not shown in FIGS. 14A-14I include a heating system, a gear reduction transmission, optional gasket, electronics, bearings or bushings, and various fasteners. Bucket assembly 1400 is designed to be inserted into and removed from subassembly 1300. In an effort to minimize the weight of bucket assembly 1400, many components may be constructed from plastic material such as housing 1410, transmission housing 1470, cover 1480, and handle 1490. Other components such as those that conduct heat (e.g., metal plate 1420) and engage in a cutting and paddling (e.g., cut and paddle assembly 1440) of any organic matter contained in bucket assembly 1400 may be constructed from metal, metal alloys, or a combination of different metals or alloys thereof. In other embodiments, various components within bucket assembly 1400 can be constructed entirely from metal. For example, housing 1410, transmission housing 1470, and cover 1480 can be constructed from metal. In yet another embodiment, various components within bucket assembly 1400 can be constructed from a hybrid of metal and plastic materials. For example, housing 1410 may be constructed from a combination of plastic and metal, where metal may be used in select locations to provide additional structural rigidity.

Bucket assembly 1400 is designed and operative to process organic matter in an efficient manner not contemplated by conventional food recyclers. Efficient processing is achieved through operation of cut and paddle assembly 1440 as it rotates within bucket housing 1410. Cut and paddle assembly 1440 may be secured between internal components (not shown) within transmission housing 1470 and bearing housing 1450, which is mounted to an inner wall of housing 1410. A motor (not shown) drives a transmission (not show) contained within transmission housing 1470, which transmission causes cut and paddle assembly 1440 rotate. Cut and paddle assembly 1440, in combination with blade array 1430, cuts and chops organic matter as cutter forks 1442 and 1443 and paddles 1444-1446 rotate around. Cut and paddle assembly 1440 can rotate in a clockwise direction or in a counter-clockwise direction. In some embodiments, assembly 1440 may rotate in the clockwise direction for a first period of time and then rotate in the counter-clockwise direction for a second period of time. Additional control features may be implemented to account for various conditions that may exist (e.g., stop rotating assembly 1440 when an uncuttable object is detected). In addition to cutting and chopping, cut and paddle assembly 1440 can stir organic matter contained in bucket housing 1410 by lifting organic matter upwards towards opening 1411 and pushing the organic matter away from blade array 1430. The lifting and pushing actions ensure that a turbulent flow of organic matter—down to up, up to down, and side to side—is achieved. That is, matter located on the bottom of housing 1410 can be pushed up and away from the bottom and matter is located higher up in bucket 1410 is pushed down towards blade array 1430. In addition, the orientation of paddles 1444-1446 can be arranged to move matter from left-to-right when assembly 1440 is rotating in a first direction (e.g., clockwise) and can move matter from right-to-left when assembly 1440 is rotating in a second direction (e.g., counter-clockwise). This turbulent flow can ensure that all organic matter contained in bucket housing 1410 is being subjected to cutting and grinding. This results in a consistent and uniform finished product (e.g., OMPA output or food grounds) (especially when coupled with heat and forced airflow).

In addition, this turbulent flow is something that cannot be achieved by conventional food recyclers that use a rotating paddle to sweep food stuffs located on the bottom of a circular container into a cutter. This conventional sweep and cut technique typically cannot cut any matter that rests on top of the matter that has been cut by the cutter because that matter remains stuck on the bottom of the circular container. That is, there is no top to down or down to up mixture of matter. As a result, this conventional food recycler is unable to effectively process quantities of foodstuffs that rest above the cutter. As such, the user of these conventional food recyclers may be required to constantly remove the contents of the circular bucket after a relatively small quantity of foodstuffs have been processed or the user will have to manually stir the foodstuffs to impart the turbidity needed to fully process all the food matter.

Bucket assembly 1400 has a heating system (not shown) that is attached to a first side of metal plate 1420 (i.e., opposite of the side of metal plate 1420 that forms part of the interior cavity of bucket housing 1410). The heating system is designed primarily to impart heat directly to metal plate 1420 so that heat can be transferred to blade array 1430, assembly 1440, the interior of housing 1410, and any organic matter contained inside housing 1410. The heating system can intelligently heat one or more portions of metal plate 1420 depending on various conditions (e.g., measured mass of organic matter contained in assembly 1400, monitor humidity within the OMPA, monitored temperature, etc.). The heating system is integrated within bucket assembly 1400—a component that can be removed from and inserted into the OMPA—and that the actual heating element(s) responsible for producing heat are not located externally to bucket assembly 1400. This is an advantage not contemplated by conventional food recyclers that typically use hot plates located under their respective mixing containers.

Handle 1490 may pivot around pivot axis 1491 to closed position (such as that shown in FIG. 14D), an open position (such as that shown in FIG. 14E), and location between the closed and open positions. Handle 1490 may be in the closed position when assembly 1400 is inserted within the OMPA and ready to resume processing organic matter. When a user is ready to remove bucket assembly 1400 form the OMPA, he or she may lift handle 1490 to extract bucket assembly 1400. If the user desires to empty the food grounds from bucket assembly 1400, he or she may tilt bucket assembly 1400 such that the integrated spout 1412 is pointed towards a bag, box, or other designated container intended to be the recipient of the food grounds. The user may hold both handle 1490 and a bottom portion of housing 1410 to dump out the food grounds. Stop tabs 1492 may prevent handle 1490 from pinching the user's fingers when he or she is dumping the OPMA output out of bucket assembly 1400. In the embodiment shown in FIGS. 14A-14E, stop tabs 1492 are shown to be integrated into handle 1490 and controls the position of handle 1490 in the closed position and controls the position of handle 1490 in the open position. In another embodiment, stop tabs may be integrated into housing 1410.

Bucket assembly 1400 may be able to stand alone on foot members 1471 and 1413. Foot members 1413 may be part of housing 1410 and foot member 1471 may be part of transmission housing 1470. Foot members 1471 and 1413 may be reciprocal male counterparts of registration footprints 1324 and 1326, respectively. Electrical interface 1414 may be integrated within foot member 1413. More particularly, electrical interface 1414 may be inset within foot member 1413 such that in the event a user drops bucket assembly 1400, foot member 1413 will take the brunt of the impact and protect electrical interface 1414. Electrical interface 1414 may be a male connector constructed to interface with electrical interface 1327. Mechanical interface 1474 may be a male connector integrated within foot member 1471. More particularly, mechanical interface 1474 may be inset within foot member 1471 such that in the event bucket assembly 1400 is dropped, foot member 1471 will take the brunt of the impact and protect mechanical interface 1474. Mechanical interface 1474 may be constructed to engage with female mechanical interface 1325.

Figure 15:
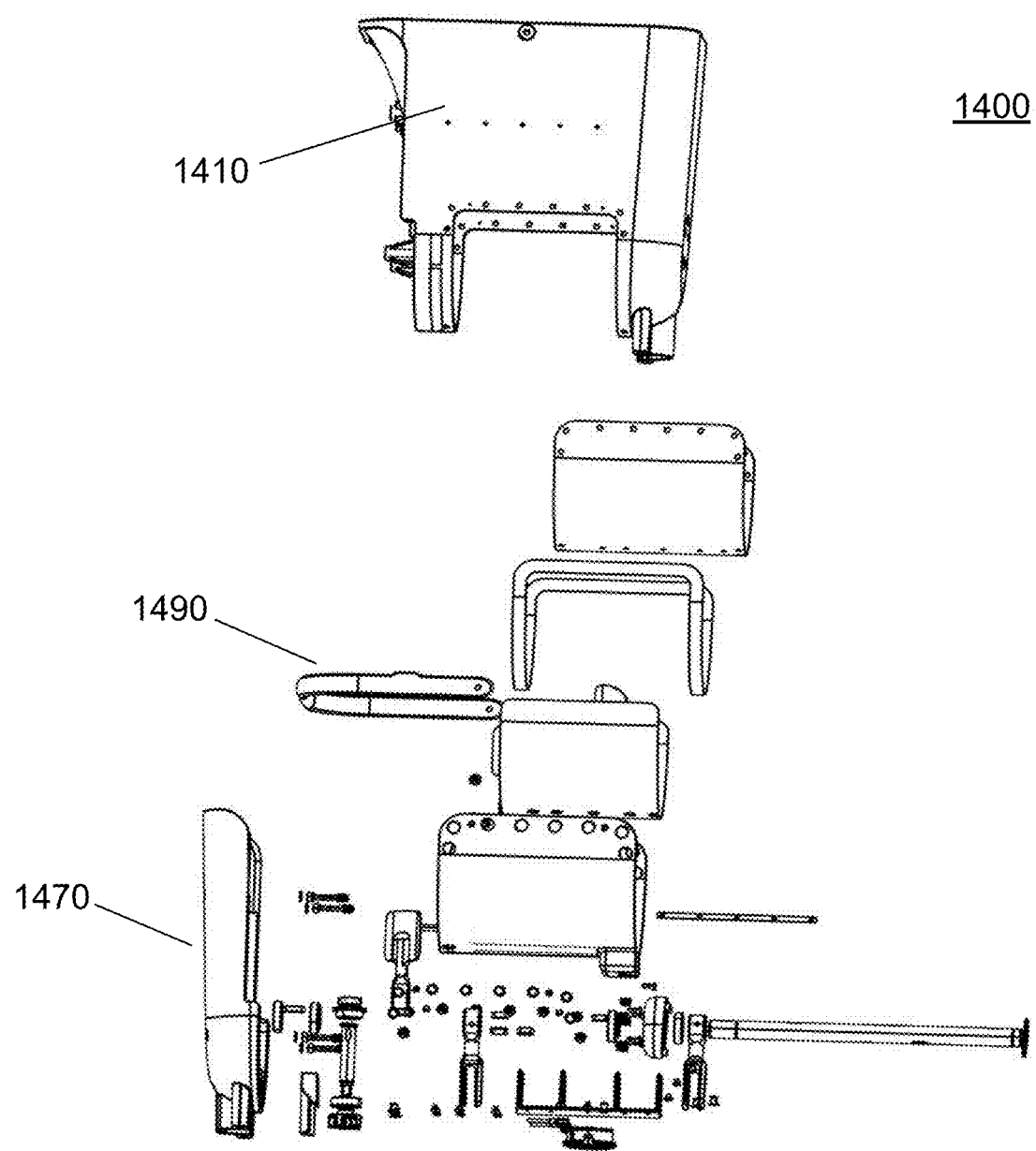
FIG. 15 shows a comprehensive exploded view of a bucket assembly according to embodiment.

FIG. 15 shows a comprehensive exploded view of bucket assembly 1400 according to an embodiment. Not all elements are labeled to avoid overcrowding the drawing.

Figure 16C:
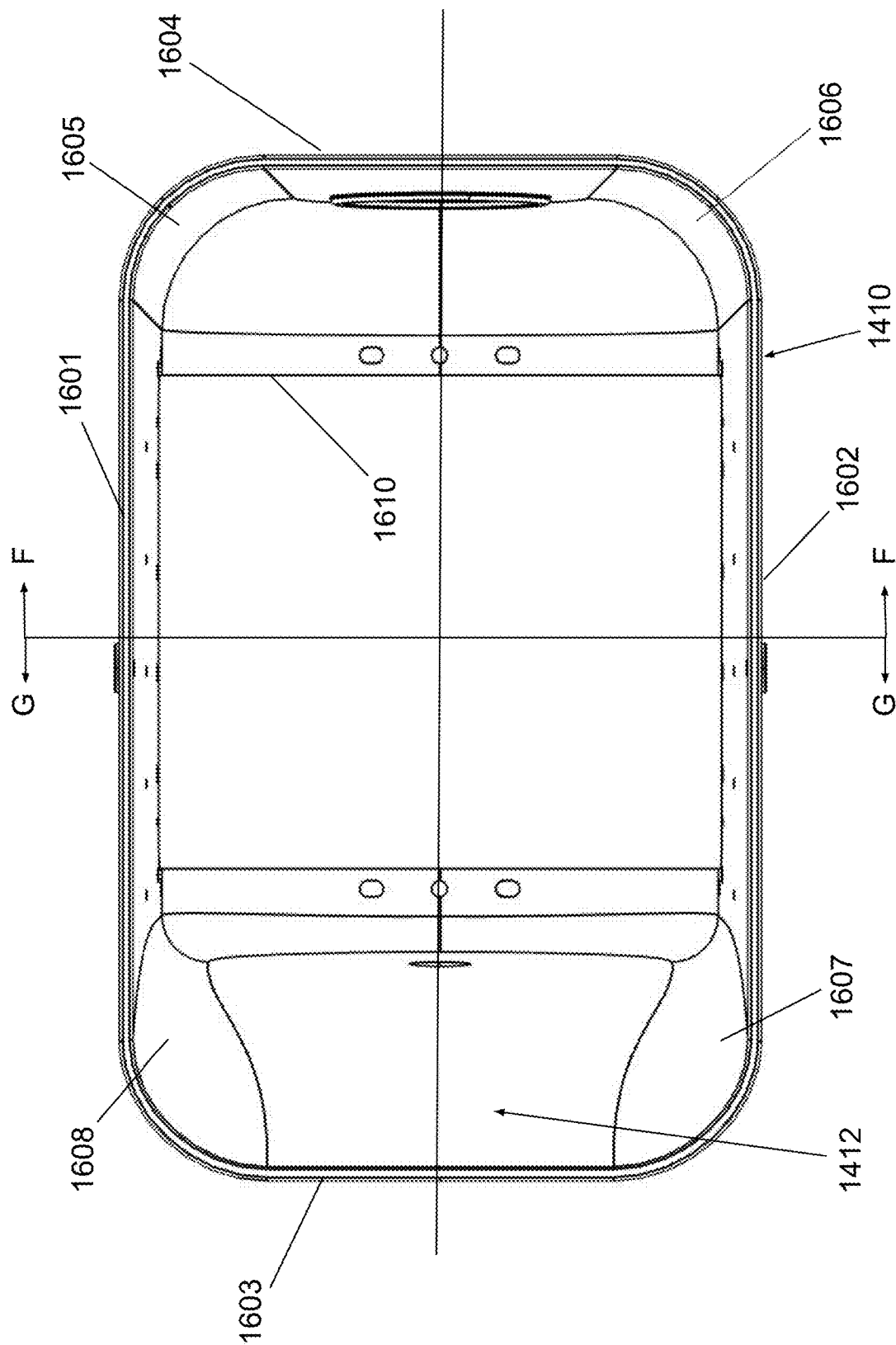
Figure 16D:
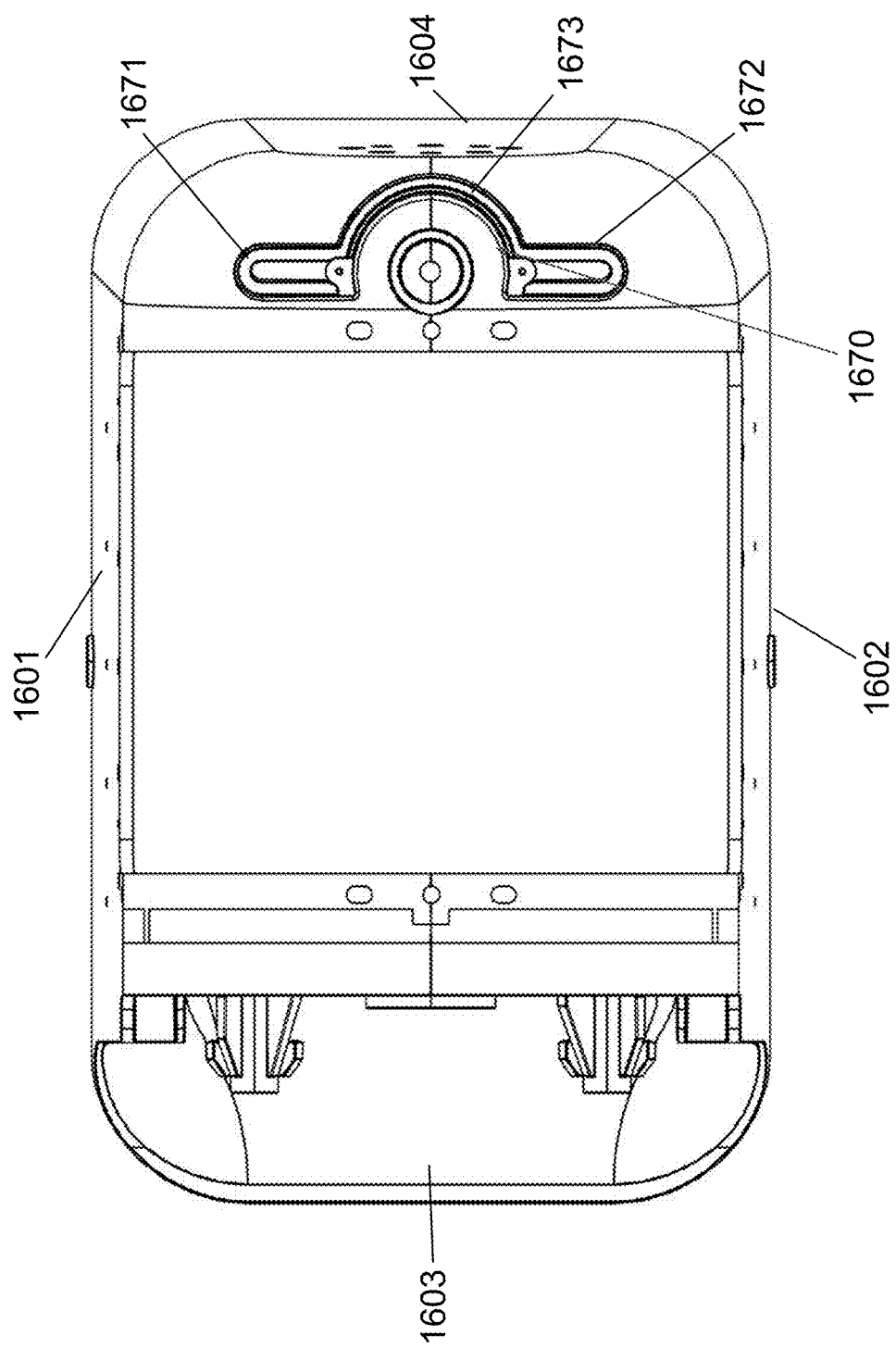
Figure 16E:
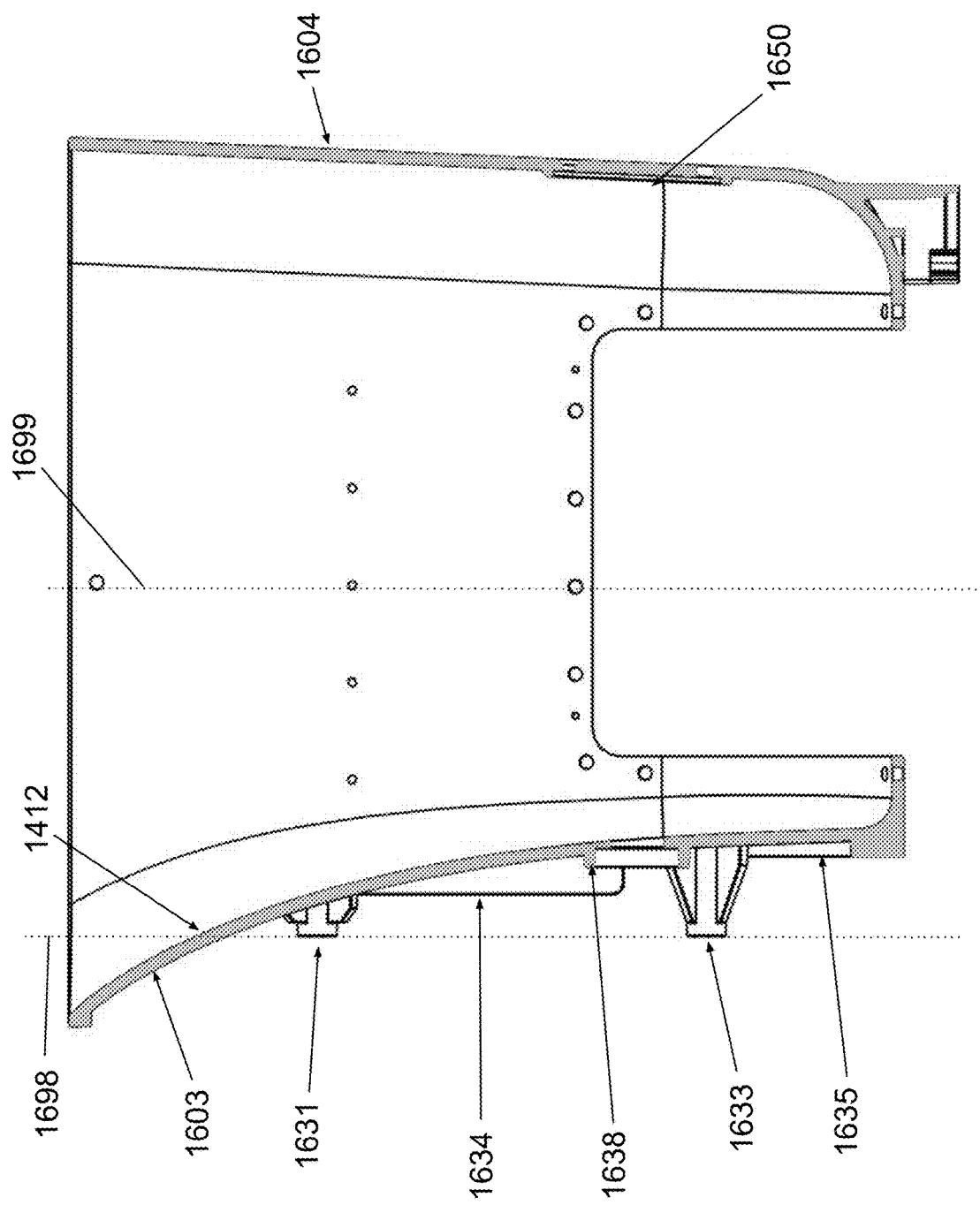
Figure 16H:
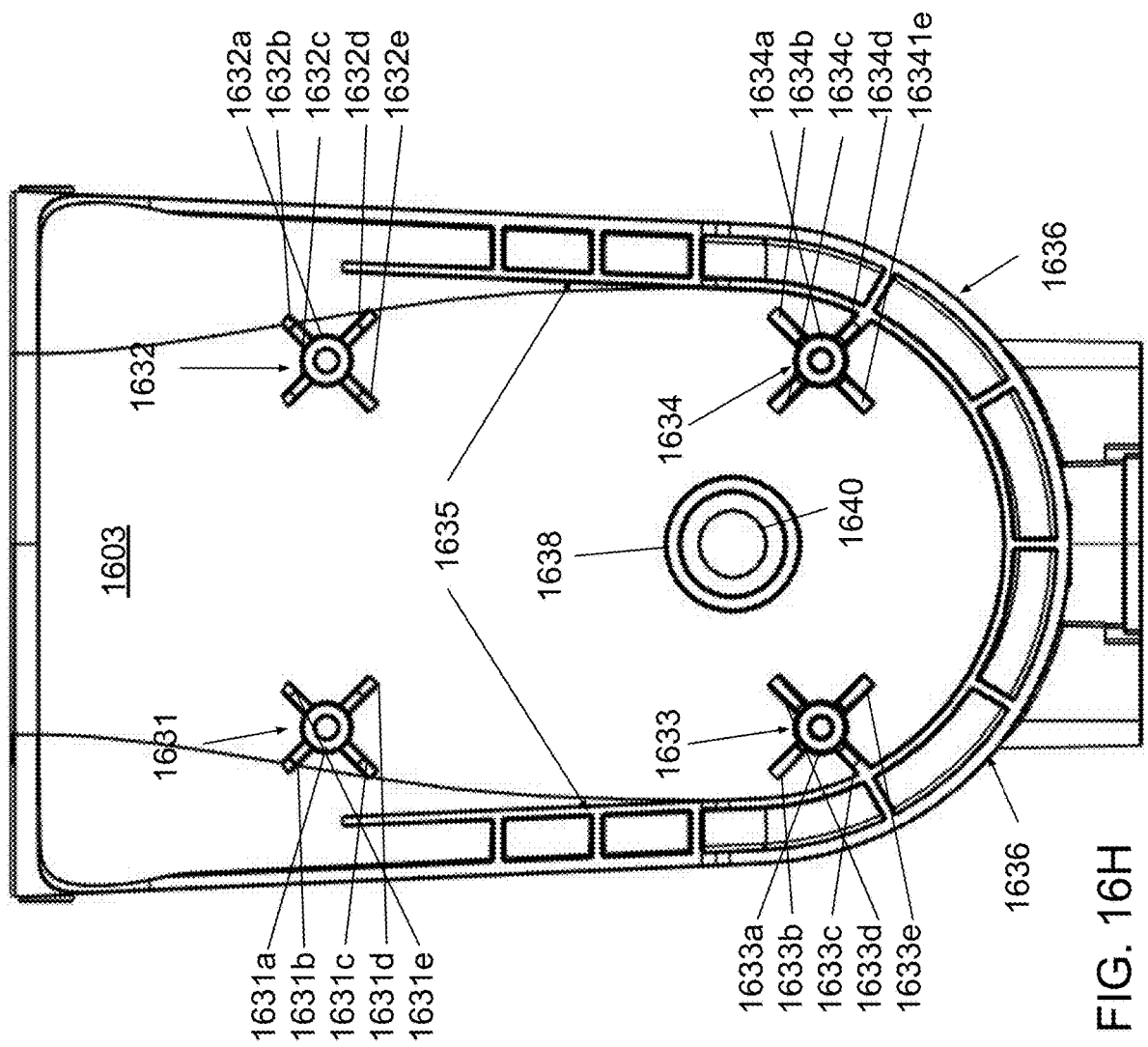
Figure 16J:
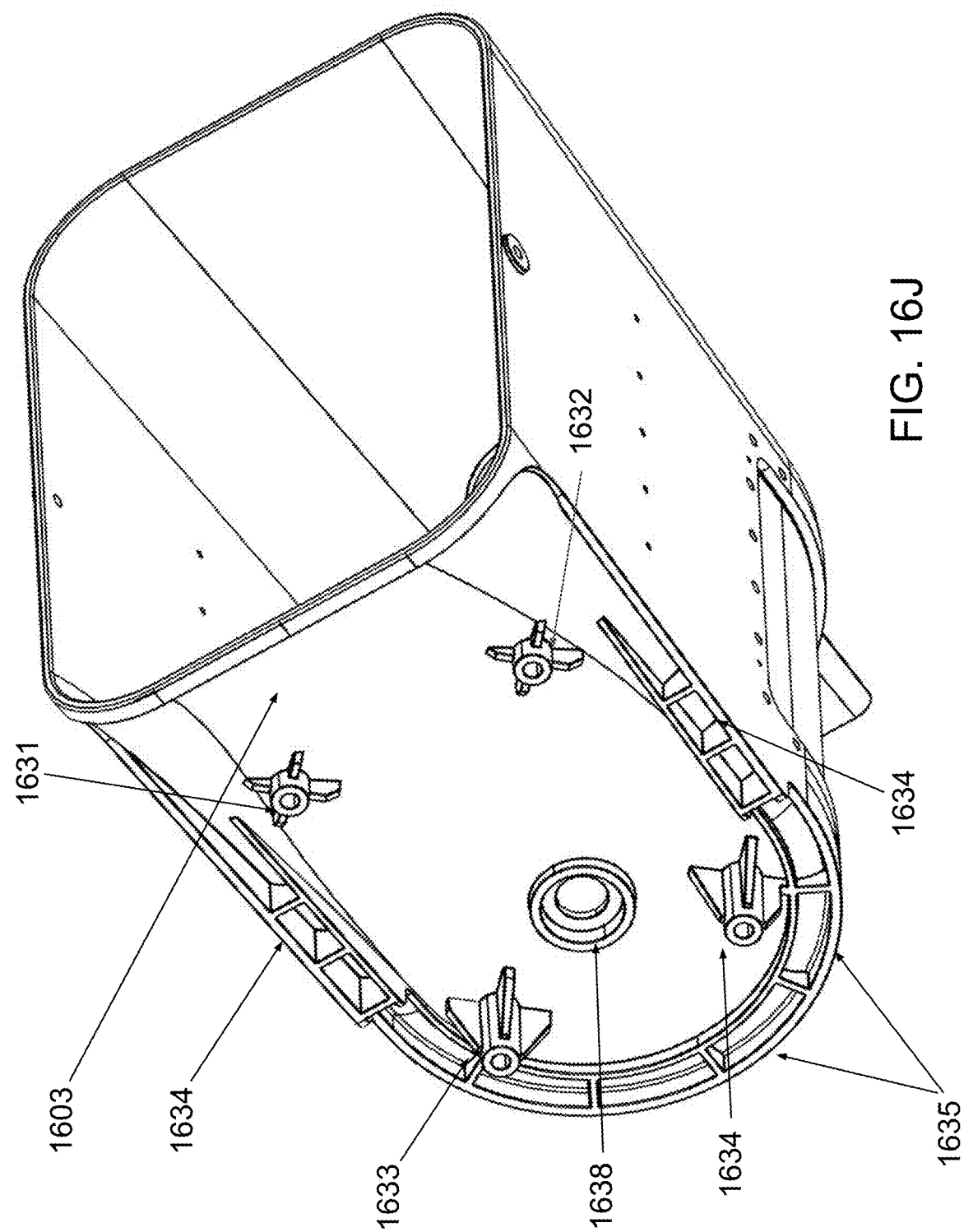
Figure 16K:
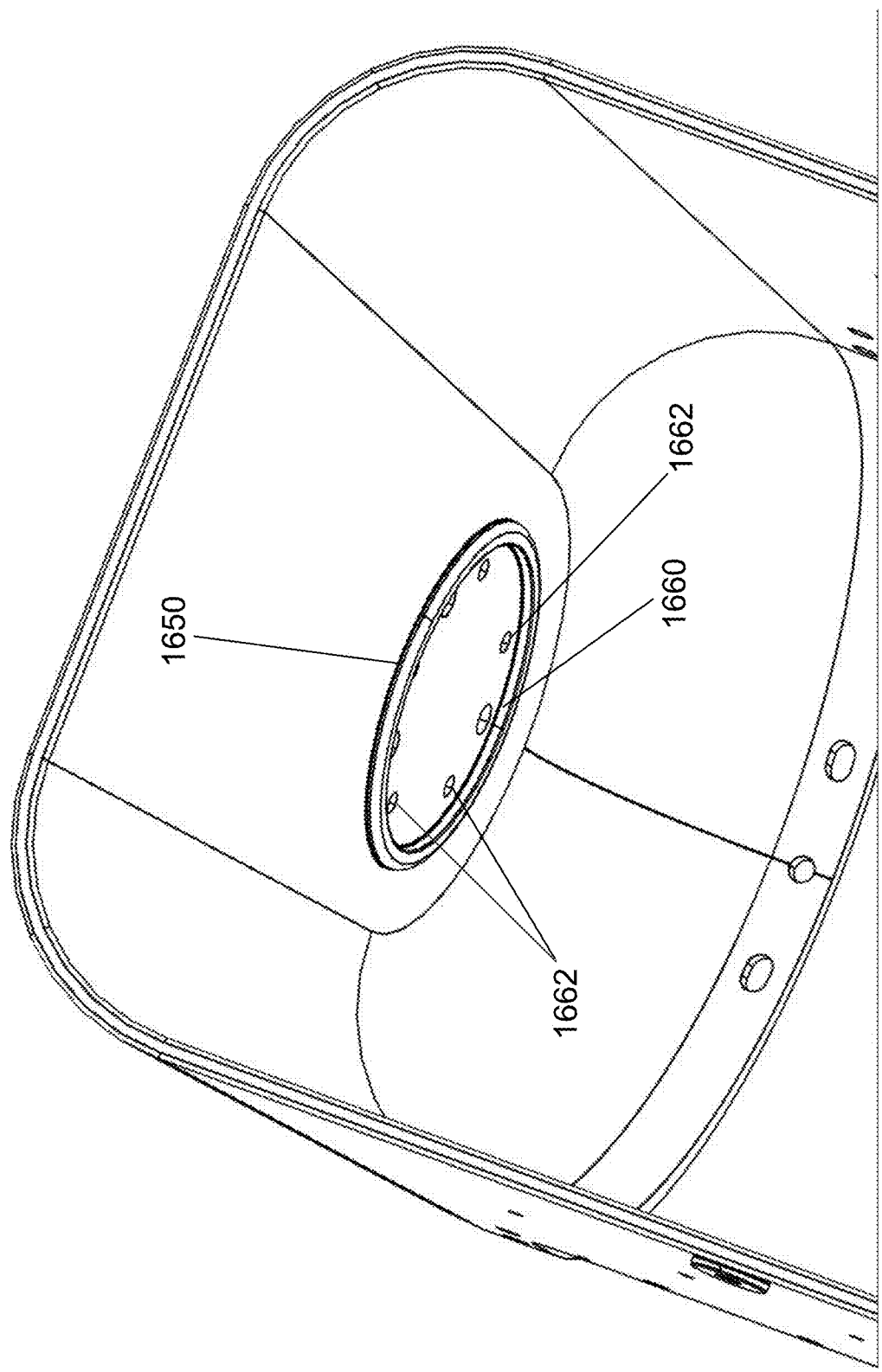

FIGS. 16A-16K show different views of housing 1410 according to various embodiments. FIG. 16A shows a perspective view of housing 1410. FIG. 16B shows an isometric view of housing 1410. FIG. 16C shows a top view of housing 1410 and FIG. 16D shows a bottom view of housing 1410. FIG. 16E shows a cross-sectional view taken along line E-E of FIG. 16C. FIG. 16F shows a cross-sectional view taken along line F-F of FIG. 16C and FIG. 16G shows a cross-sectional view taken along line G-G of FIG. 16C. FIGS. 16H and 16I show respective side views of housing 1410. FIG. 16J shows another perspective view of housing 1410, with emphasis showing FIG. 16H in at another angle. FIG. 16K shows an illustrative enlarge perspective view of a bearing support structure. Reference is now made collectively to FIGS. 16A-16K.

As shown, housing 1410 has a rectangular-shaped opening 1411 with curved transition regions 1605-1608 existing between the inside portions of side walls 1601-1604. The length of opening 1411 along its X-axis is longer than the width along its Y-axis. Housing 1410 has a fixed height along its Z-axis. Side walls 1601 and 1602 may correspond to the length direction of housing 1410 and side walls 1603 and 1604 may correspond to the width direction of housing 1410. Side walls 1601-1604 extend down from opening 1411 to the bottom cavity portion of housing 1410. Cutout 1610 may exist in the bottom cavity portion and portions of side walls 1601 and 1602. Several holes 1612 may exist around the perimeter of cutout 1610. Holes 1612 may be used to accept rivets to attach a metal plate (not shown) to housing 1410. Additional holes 1614 may exist within side walls 1601 and 1602 to accept fasteners (e.g., rivets) to attach fill line indicators (not shown) to the inside surface of side walls 1601 and 1602. Handle support hole 1616 may exist on side 1601 and handle support hold 1617 may exist on side 1602. Handle support holes 1616 and 1617 may retain a pin or fastener that couples handle 1490 (not shown) to housing 1410.

Side wall 1603 may include integrated spout 1412 and through-hole 1640. FIG. 16E shows with more particularity the curved surface of integrated spout 1412. As shown, the curvature of integrated spout becomes increasingly pronounced the closer it is to the plane defining opening 1411. The external portion of side wall 1603 may include several features designed to interface with transmission housing 1470 (not shown) and parts of cut and paddle assembly 1440 (also not shown). For example, fastening support members 1631-1634 can extend outwardly away from side wall 1603 and member 1631-1634 may each be configured to retain a screw or other fastening member used to secure transmission housing 1470 to housing 1410 (as shown in FIG. 14D). Note that because of the curve of integrated spout 1412, the sizing of fastening support members 1631-1634 may be different. For example, members 1631 and 1632, which exist near the upper portion housing 1410 where the curve is more pronounced, may extend a first distance (relative to side wall 1603) to a fixed distance relative to center line 1699 of housing 1410. The fixed distance away from center line 1699 is shown as dotted line 1698. Members 1633 and 1634, which exist near the lower portion of house 1410 where the curve is less pronounced, may extend a second distance (relative to side wall 1603) to the fixed distance relative to centerline 1699. The first distance is less than the second distance. Members 1631-1634 can include respective tubular members 1631a-1634a each having a planer surface that is coplanar to dotted line 1698. Members 1631-1634 can also each include respective rib members 1631(b-e)-1634(b-e) to provide added structure support to respective tubular members 1631a-1634a.

Side wall 1603 can also have integrated rib support members 1635 and 1636 that provide additional structural integrity to housing 1410. Such additional structural integrity may be needed to handle the torque generated by the motor (not shown) and transmission system (not shown) being used to rotate cut and paddle assembly 1440 (not shown). Support members 1635 exist in an upper portion of housing 1410 and arranged in a relatively straight configuration. Support members 1636 may exist in a lower portion of housing 1410 and arranged in a semi-circular configuration. In addition, an outward facing planar surface of support members 1635 may be recessed in the direction of centerline 1699 relative to an outward facing planar surface of support members 1634.

Side wall 1603 can include bearing support structure 1638 concentrically aligned with through-hole 1640 and located on the outward facing side of housing 1410. A bearing or bushing (not shown) may be retained by bearing support structure 1638 to provide support for a rod member of cut and paddle assembly 1440 (not shown).

Side wall 1604 may include bearing support structure 1650, registration holes 1660, and fastener holes 1662. Bearing support structure 1650 is a circular shaped member that protrudes from the inner surface of side wall 1604. Bearing support structure 1650 can provide structural support for a bearing housing that sits within the circular shaped member. That bearing housing may include registration members that interface with respective registration holes 1660 to align the bearing housing with respect to housing 1410. Fastener holes 1662 align with respective fastener inserts within the bearing housing. For example, during installation, screws can be inserted into fastener holes 1662 and the fastener inserts of the bearing housing to couple the bearing housing to housing 1410.

Housing 1410 includes electrical registration footprint 1670 that is configured to fit into registration footprint 1326 of bucket interface assembly 1310. Electrical registration footprint 1670 may have wing portions 1671 and 1672 and semi-circular portion 1673 that extend away from the bottom portion of housing 1410. Semi-circular portion 1673 may provide a protective shroud for a connector interface and any wires, connectors, or flex circuits that stem from the connector interface.

Figure 17A:
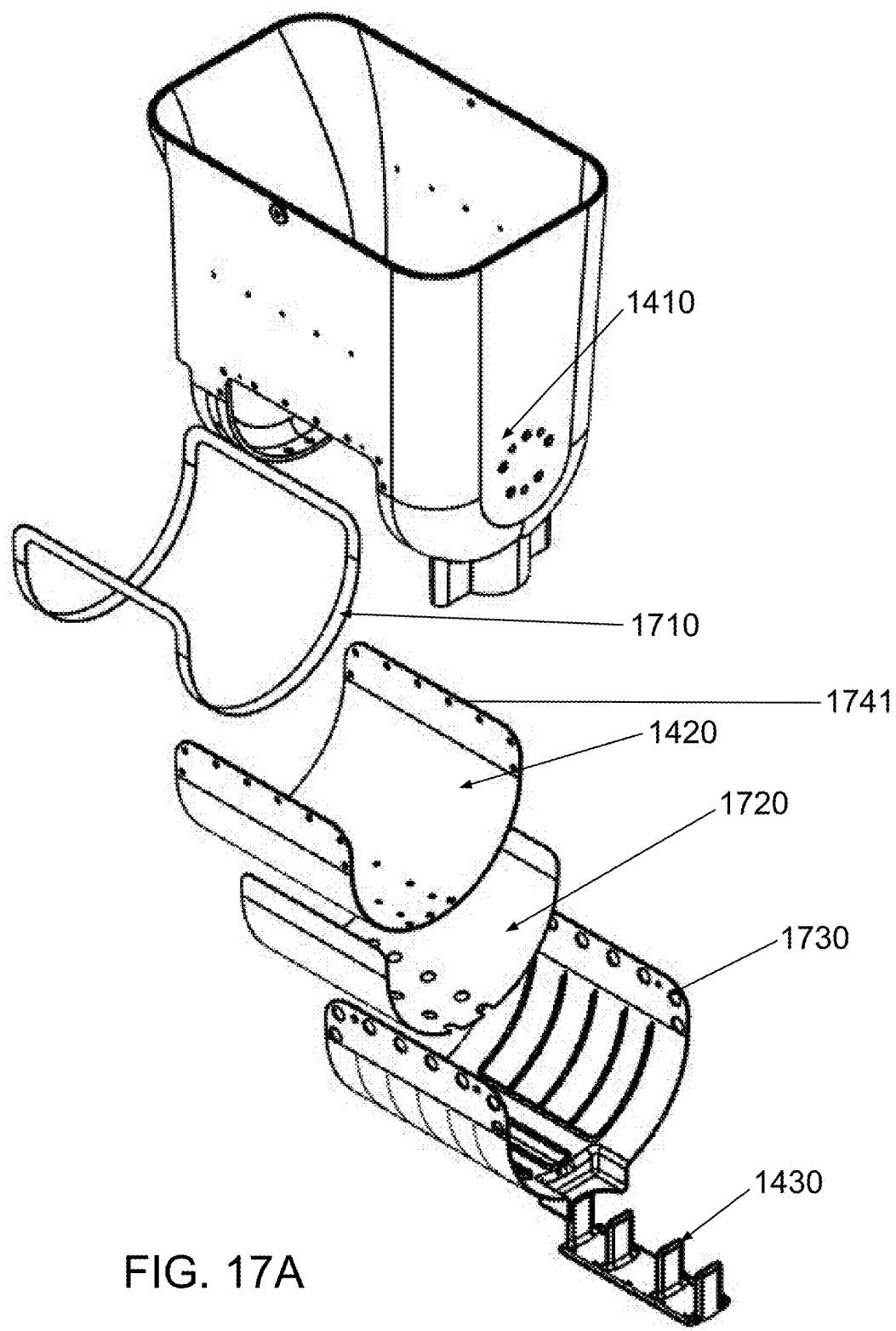
FIGS. 17A-17C show different views of a limited number of components of the bucket assembly according to embodiment.
Figure 17B:
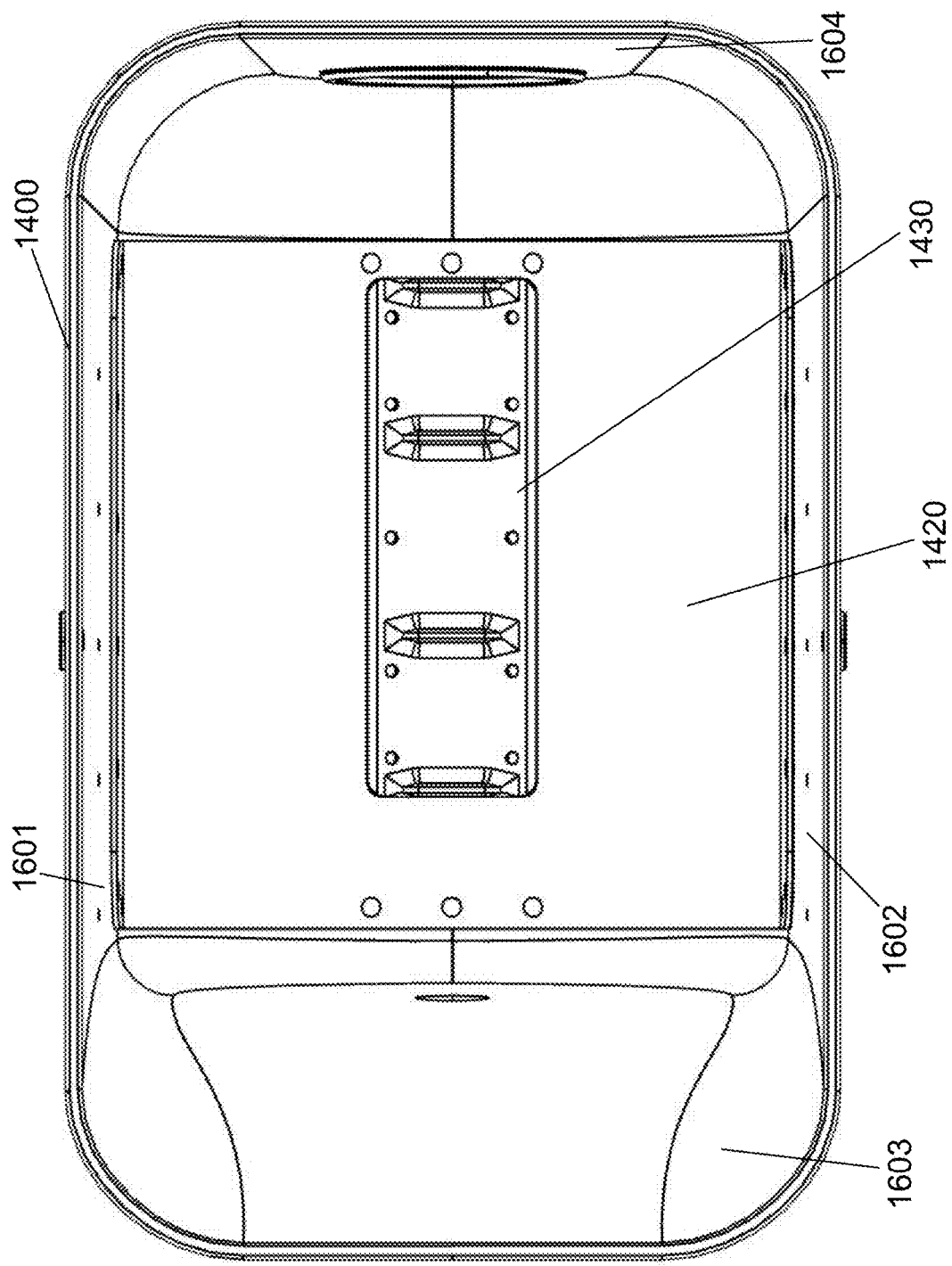
Figure 17C:
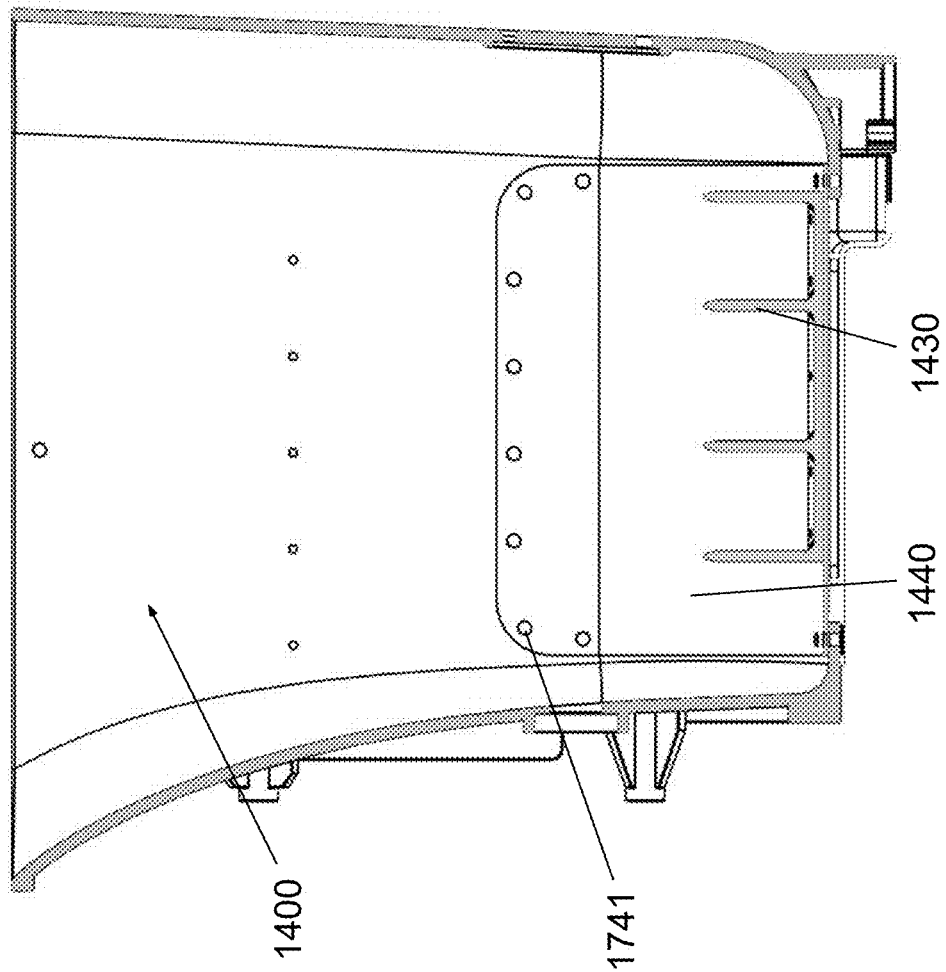

FIG. 17A shows an illustrative exploded view of housing 1410, metal plate 1420, blade array 1430, gasket 1710, flexible heating array 1720, and cover 1730. When assembled, metal plate 1420 is secured to housing 1410 via rivets (not shown). FIG. 17B shows an illustrative top view of housing 1410, metal plate 1420, and blade array 1430. FIG. 17C shows an illustrative cross-sectional view of housing 1410, metal plate 1420, and blade array 1430. Gasket 1710 is sandwiched between metal plate 1420 and housing 1410 to prevent any matter from leaking out of the bucket assembly. In particular, gasket 1470 is positioned on a bottom side of metal plate 1420 (i.e., the side opposite of the side forming the cavity within the bucket assembly) and is positioned around the perimeter of cutout 1610 (shown in FIGS. 16B and 16C). In some embodiments, gasket 1710 may overlay holes 1612 (shown in FIG. 16A). This way, when the rivets are installed, they penetrate gasket 1710 (through holes that are not shown) and through holes 1741 of metal plate 1420. Blade array 1430 is secured to the inner surface of metal plate 1420 as shown in FIG. 17B and FIG. 17C. The gross dimensions of the internal cavity of bucket assembly can be defined by the inner surfaces of side walls 1601-1604, the inner surface of metal plate 1420, and blade array 1430.

Metal plate 1420 may be constructed from a metal or alloy or a combination of metals and alloys. For example, in one embodiment, metal plate 1420 may be constructed from stainless steel. As another example, metal plate 1420 may be constructed from aluminum. In yet another embodiment, metal plate 1420 may have a multilayer construction. For example, one layer may include stainless steel (configured to face the internal cavity of the bucket assembly) and another layer may include aluminum (configured to face flexible heating element 1720). Metal plate 1420 may be constructed from different claddings (e.g., 3-PLY clad or 5-PLY clad). For example, a single aluminum layer may be sandwiched between two stainless steel layers. As another example, two layers of aluminum are sandwiched between three layers of stainless steel. As yet another example, one central copper layer is sandwiched between two layers of aluminum which are themselves sandwiched between two layers of stainless steel.

Figure 17D:
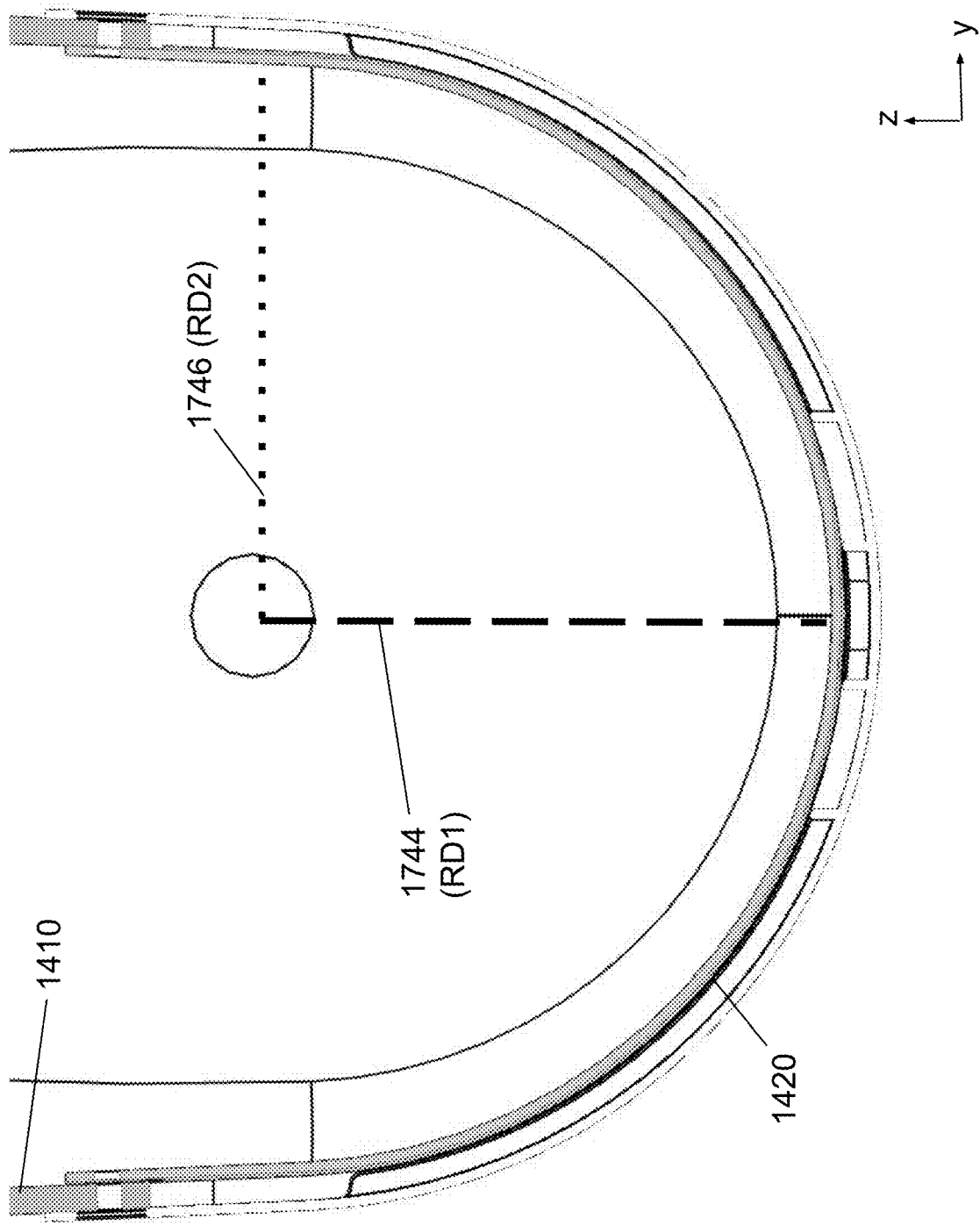
FIG. 17D shows an illustrative cross-sectional view of a portion of a housing and a metal plate according to embodiment.

Metal plate 1420 may have a curved shape that resembles a semi-circle, but is not necessarily a perfect semi-circle. FIG. 17D shows an illustrative cross-sectional view of a portion of housing 1410 and metal plate 1420 (with blade array 1430 removed). FIG. 17D shows dashed line 1744 showing a radial distance (RD1) between the center of through-hole 1640 and metal plate 1420 in a Z axis direction. FIG. 17D also shows dotted line 1746 showing a radial distance (RD2) between the center of through-hole 1640 and metal plate 1420 in a Y axis direction. The radial distance of RD1 is greater than the radial distance of RD2. This difference in radial distances is purposely constructed to accommodate the thickness of the bottom curved portion of blade array 1430.

Figure 17E:
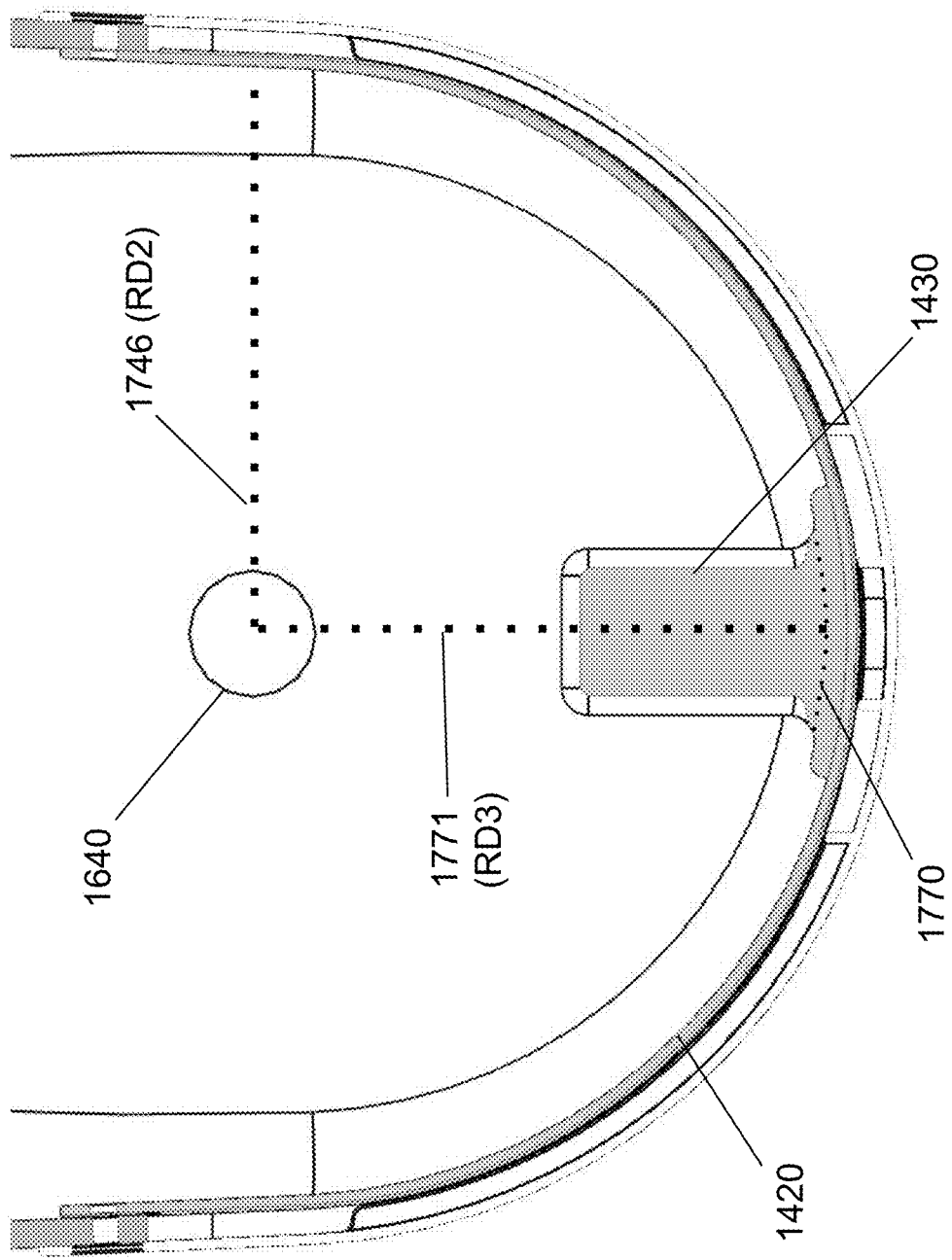
FIG. 17E shows an illustrative cross-sectional view of a portion of a housing, a metal plate, and a blade array according to embodiment.

Referring now to FIG. 17E, which shows an illustrative cross-sectional view of a portion of housing 1410 and metal plate 1420 (with blade array 1430 present). Blade array 1430 has a bottom curved portion 1770 that is mounted to metal plate 1420. Bottom curved portion 1770 has a surface with a curve having a radius defined by dashed line 1771, which originates from the center of through-hole 1640 and ends at a point on portion 1770 along the Z axis. The radial distance (RD3) of dashed line 1771 can be the same as radial distance of RD2, both of which are less than the radial distance of RD1. The radial distance RD3 is less than the radial distance of RD1 to account for z-height thickness of bottom curved portion 1770. This way, when the paddles and cutter prongs of the cut and paddle assembly rotate about an axis concentric with respect to the center of through-hole 1640, the distal ends of the paddles and cutter prongs maintain substantially uniform clearance distance with respect to metal plate 1420 and bottom curved portion 1770 throughout 180 degrees of the full 360 degree rotation. Additional discussion of metal plate 1420, blade array 1430, and cut and paddle assembly is provided below.

Figure 18:
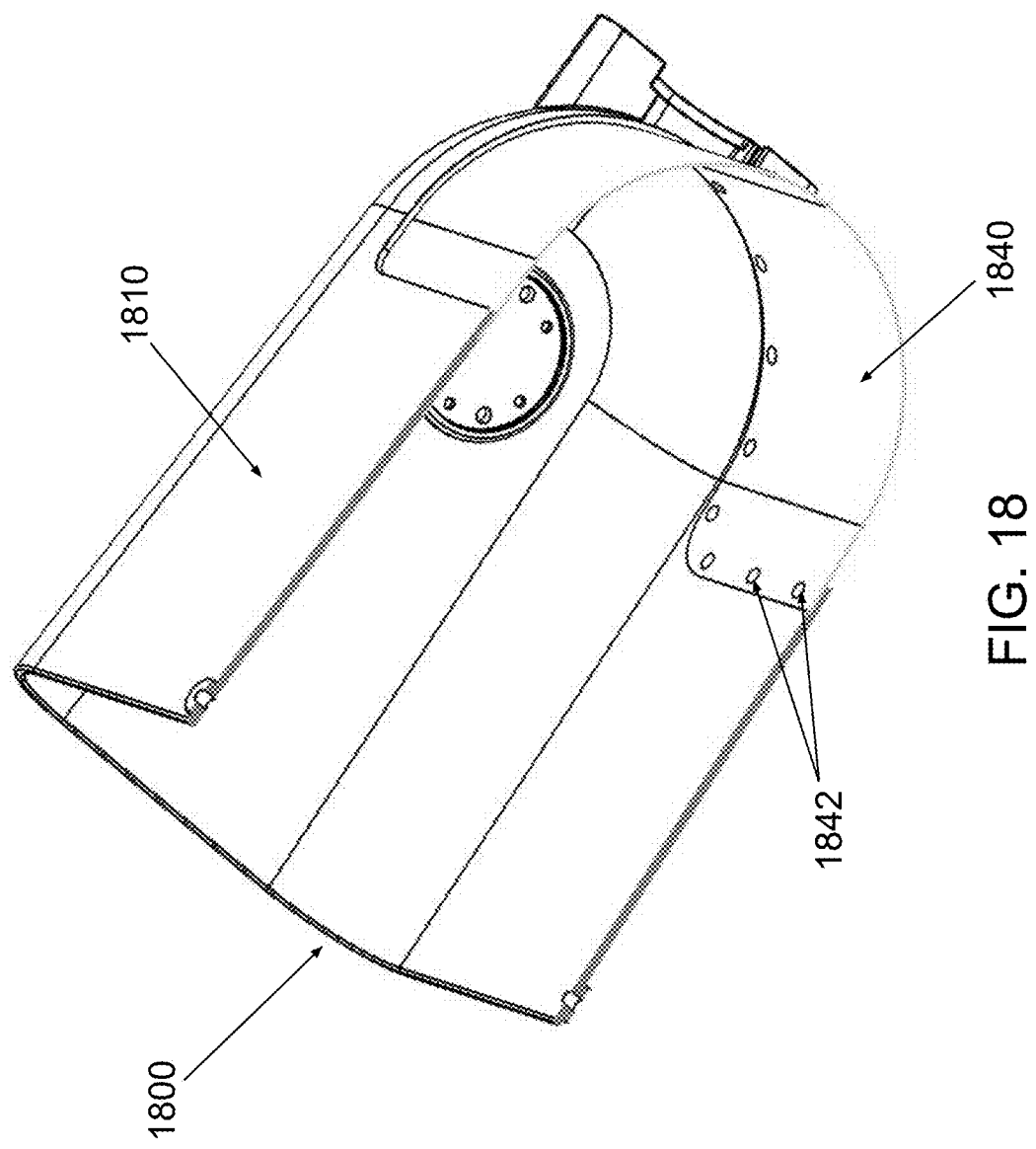
FIG. 18 which shows an illustrative cross-sectional view of integrated metal plate and housing according to embodiment.

In some embodiments, metal plate 1420 may be directly molded into housing 1410, thereby eliminating the need for gasket 1710. An example of a metal plate that is directly molded into housing 1410 is shown in FIG. 18, which shows an illustrative cross-sectional view of integrated metal plate and housing 1800. As shown, metal plate 1840 is directly integrated into housing 1810. During the molding process, material of housing 1810 can flow into holes 1842 and thereby secure metal plate 1842 to housing 1810. This process can create a substantially seamless transition from the inner walls of housing 1810 and metal plate 1840. The transition between housing 1810 and metal plate 1840 can be seamless in that there may be no gaps or negligible step transitions from housing 1810 and metal plate 1840. The substantially seamless transition can aid in preventing organic matter from getting stuck. If desired, one or more rivets can be used to provide additional reinforcement. It should be understood that the bucket assembly according to embodiments discussed herein can use integrated metal plate and housing 1800 of FIG. 18 or the housing, metal plate, gasket, and rivet combination discussed in FIGS. 17A-17C. It should be further understood that other assembly techniques may be used to produce equivalent a bucket with a plastic housing and a metal plate attached or integrated thereto. For example, a high temperature, high strength adhesive may be used in lieu of or in addition to rivets or other fastener to couple the metal plate to the housing.

Figure 17F:
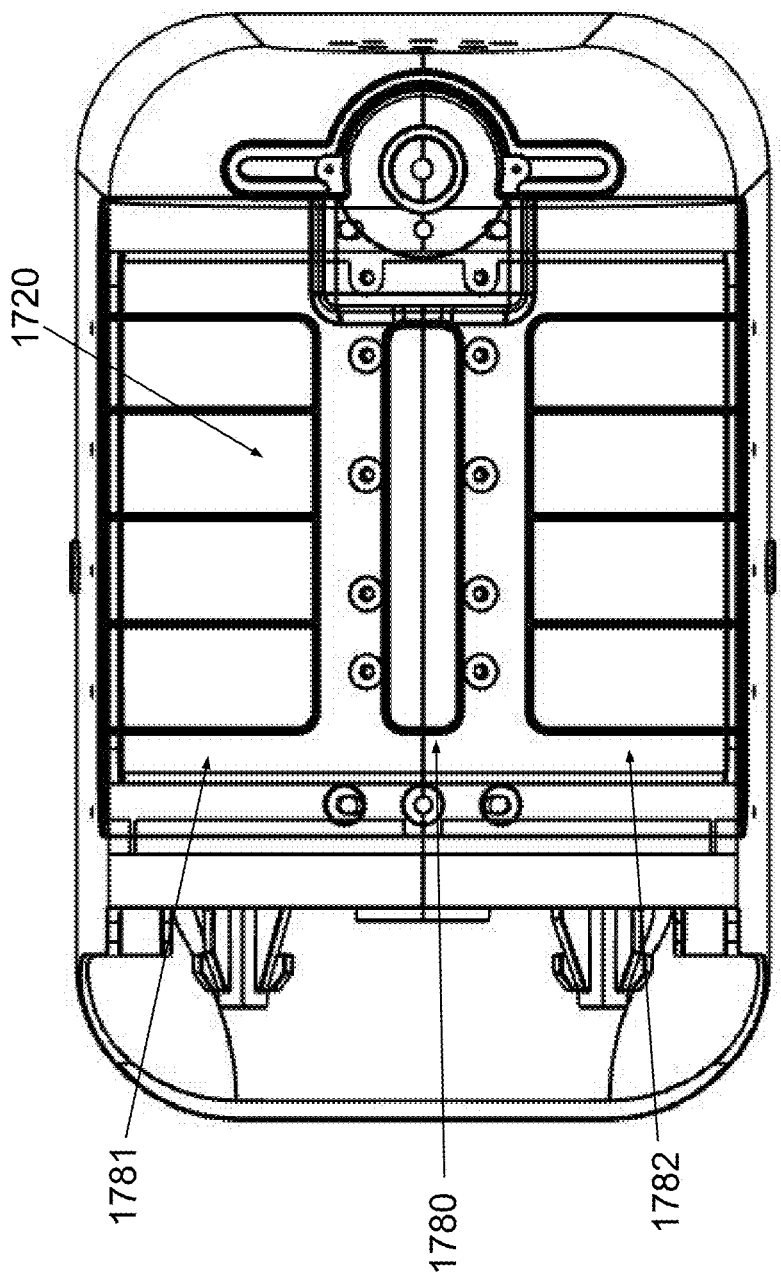
FIGS. 17F and 17G show different views of a flexible heating array according to embodiment.
Figure 17G:
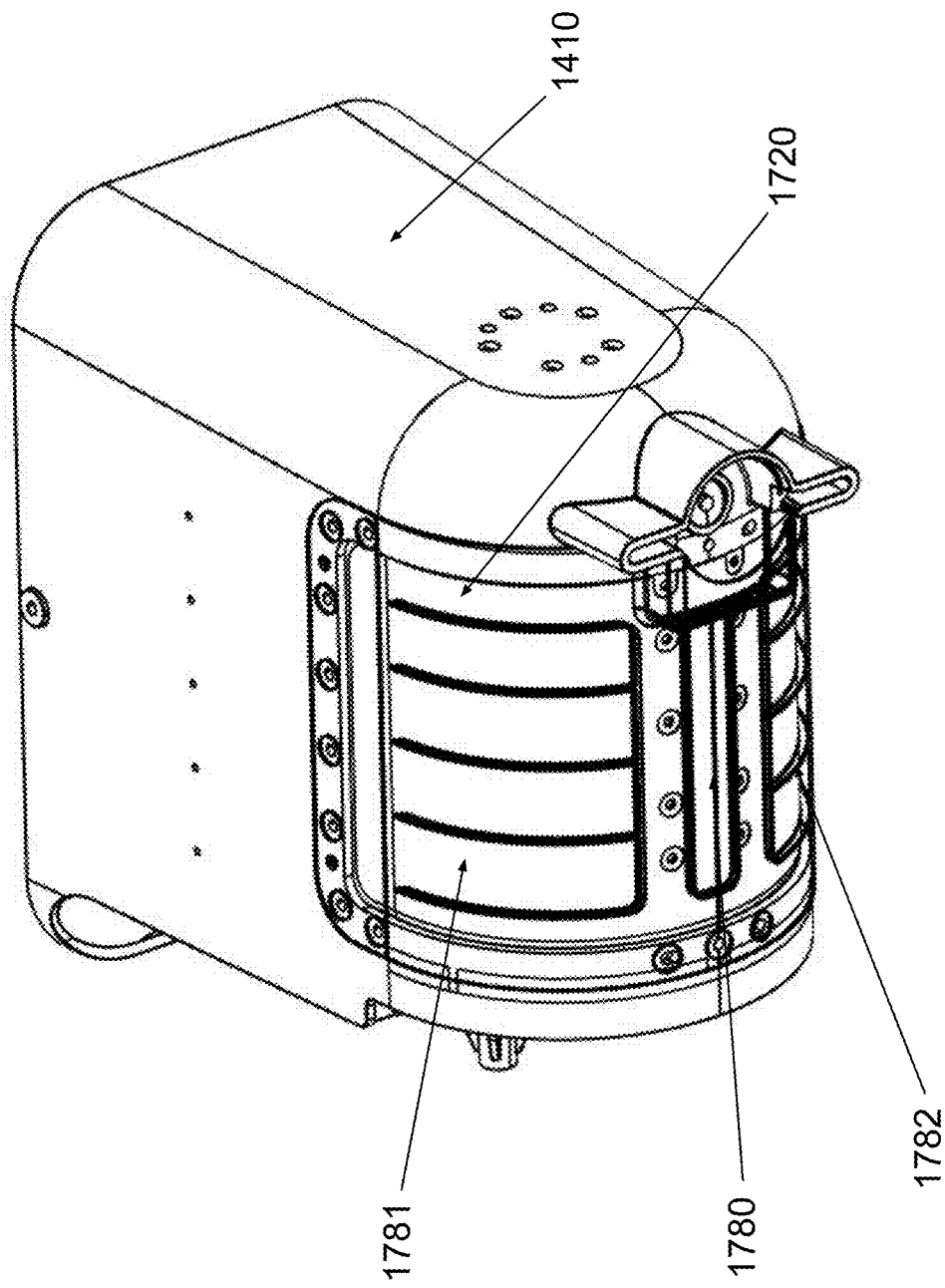

Referring now to FIGS. 17F and 17G, flexible heating array 1720 is discussed. FIG. 17F shows an illustrative bottom view and FIG. 17G shows an illustrative isometric view. Flexible heating array 1720 is part of a heating system that resides within the bucket assembly and that is attached directly to metal plate 1420. In particular, flexible heating array 1720 is attached to the outside surface (which is opposite of the inside surface that forms part of the internal cavity of the bucket assembly) of metal plate 1420. Flexible heating array 1720 can cover a substantial portion of metal plate 1420. For example, flexible heating array 1720 may occupy the entirety of metal plate 1420 that is not overlapped or interfacing with housing 1410. Flexible heating array 1720 can be a flexible substrate with one or more heater circuits arranged throughout. In one embodiment, the heater circuit can be one continuous circuit that spans the entirety of array 1720. If desired, the continuous circuit can be electrically arranged in multiple zones that can be independently controlled to achieve desired temperatures. For example, three zones may exist: a primary zone and two secondary zones. The primary zone may be positioned on a bottom portion 1780 of metal plate 1420 (e.g., under blade array 1430). A first secondary zone can be placed adjacent to side portion 1781 of metal plate 1420 and a second secondary zone can be placed adjacent to side portion 1782 of metal plate 1420. Each zone may be equipped with its own temperature sensor (e.g., thermistor). In another embodiment, multiple independently controlled heater circuits can be included as part of array 1720. For example, three heater circuits can be included and can each be independently controlled to provide different heating zones. The heater circuits can be resistive elements that have a uniform size or selective sizing to achieve a desired heating profile or zone arrangement.

Figure 17H:
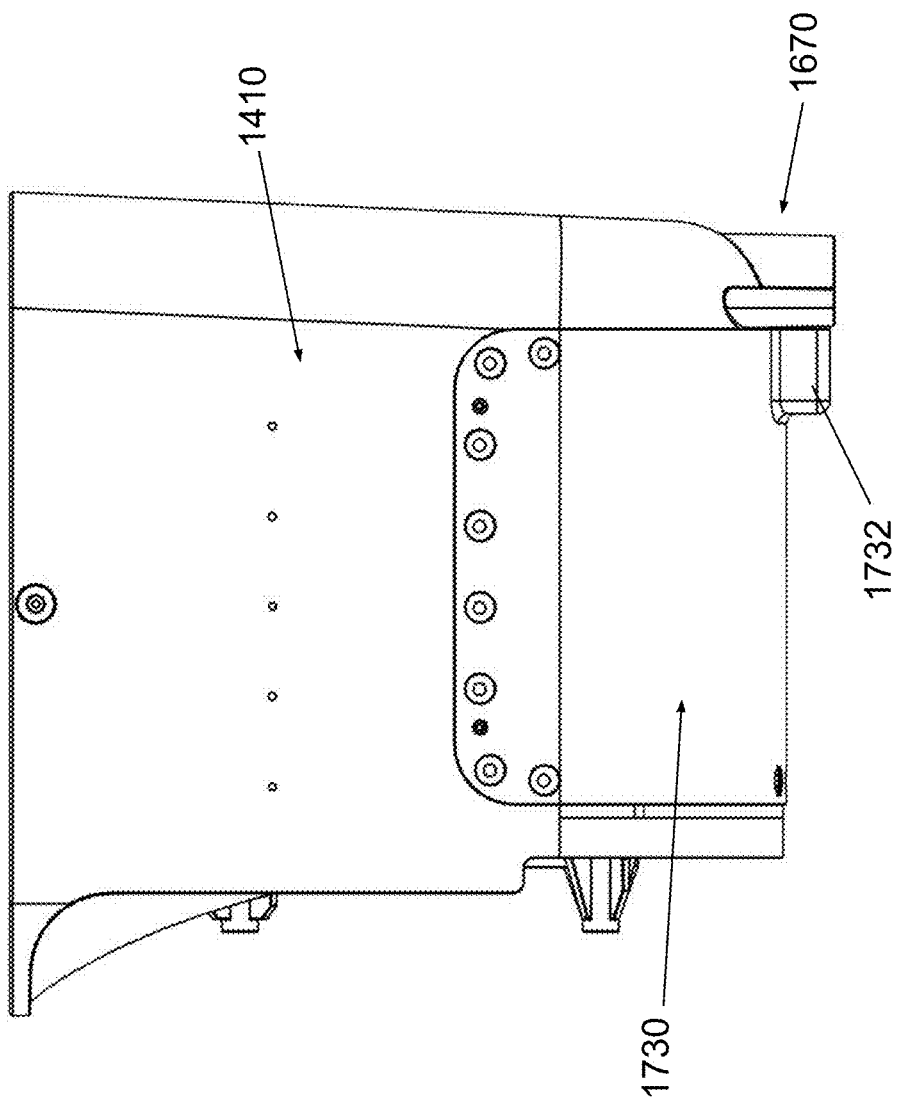
FIGS. 17H and 17I show different views of a cover according to embodiment.
Figure 17I:
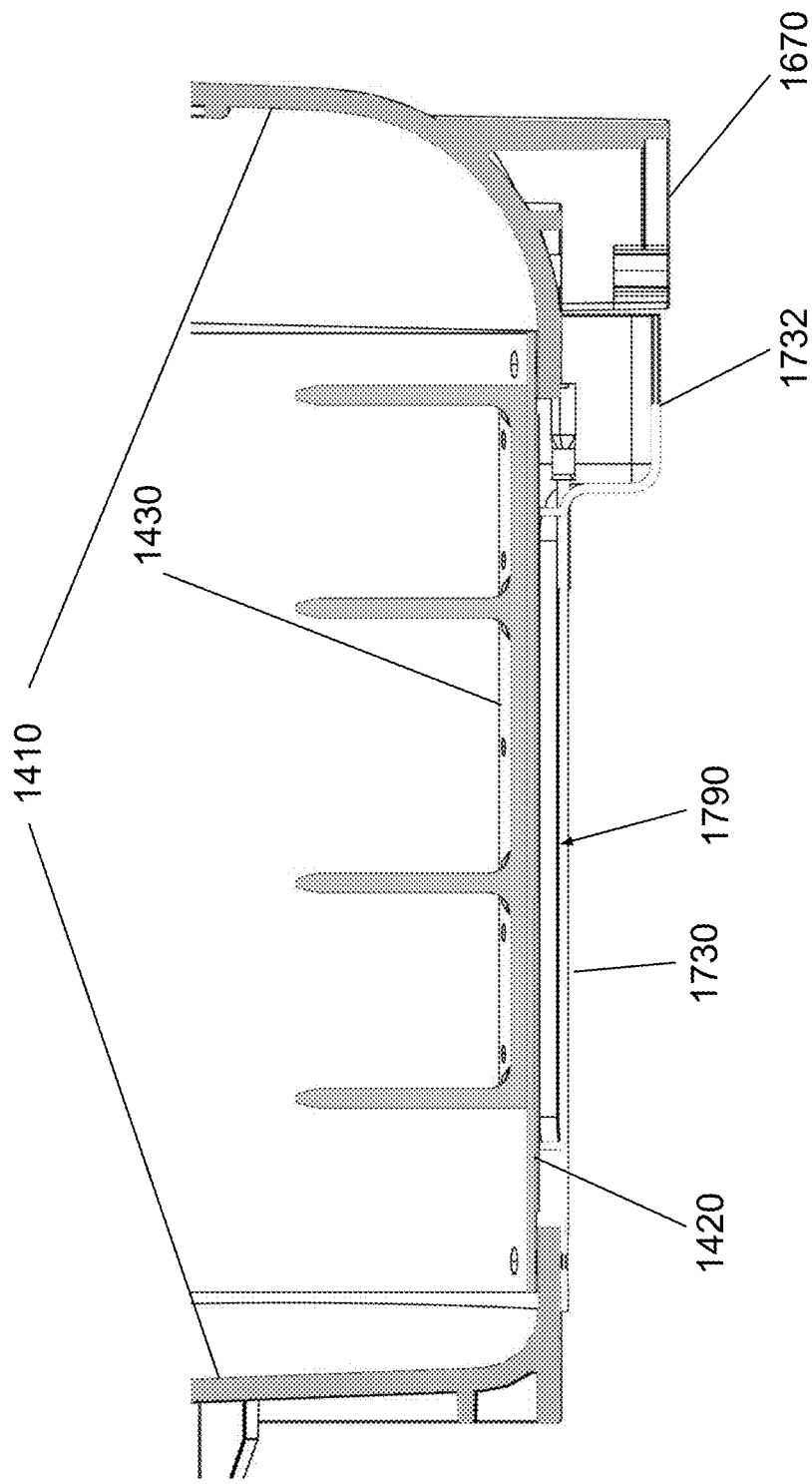

Referring now to FIGS. 17H and 17I, cover 1730 is discussed. FIG. 17H shows an illustrative side view and FIG. 17Ii shows an illustrative partial cross-sectional view. Cover 1730 is designed to cover flexible heating array 1720 and metal plate 1420 and is secured to housing 1410. Cover 1730 may be constructed from a plastic material and can serve as a heat shield that re-radiates heat emanating from heating array 1720 back into metal plate 1420 and provides a protective touch surface for any user manipulating the bucket assembly. Air gap 1790 can exist between flexible heating array 1720 and metal plate 1420 and the inside surface of cover 1730. Air gap 1790 can serve as an insulation layer. In some embodiments, the presence of air gap 1790 can result in a 50-60° C. temperature differential between metal plate 1420 and the outside surface of cover 1790 when the bucket assembly is operating at an elevated temperature. Cover 1730 may have electrical interface portion 1732 that is constructed to align with electrical registration footprint 1670. Electrical interface portion 1732 may include a cavity that provides room for connectors, wires, or other components to connect heating array 1720 to a connector contained in registration footprint 1670.

Figure 19A:
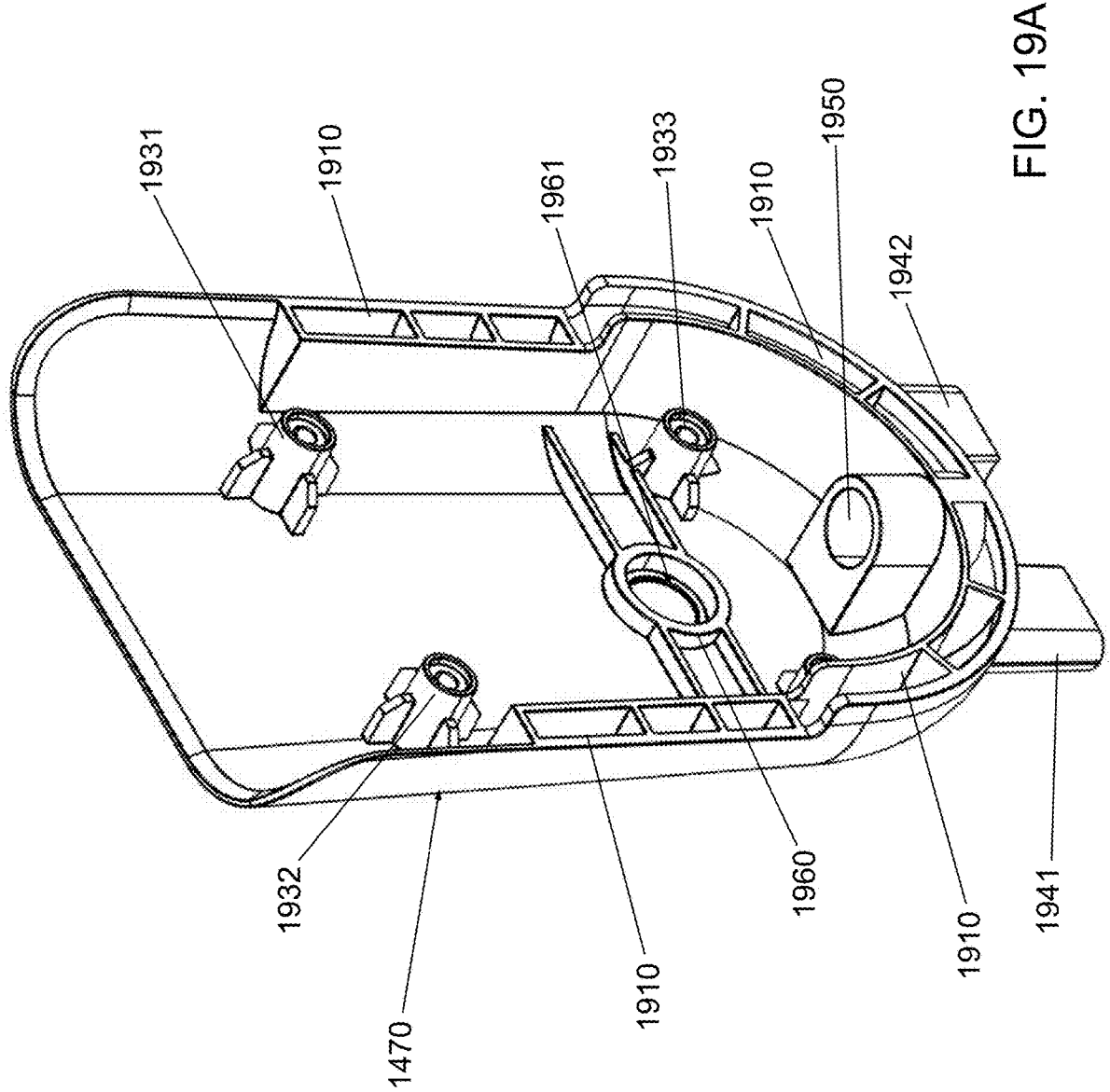
FIGS. 19A-19E show different views of transmission housing according to embodiment.
Figure 19C:
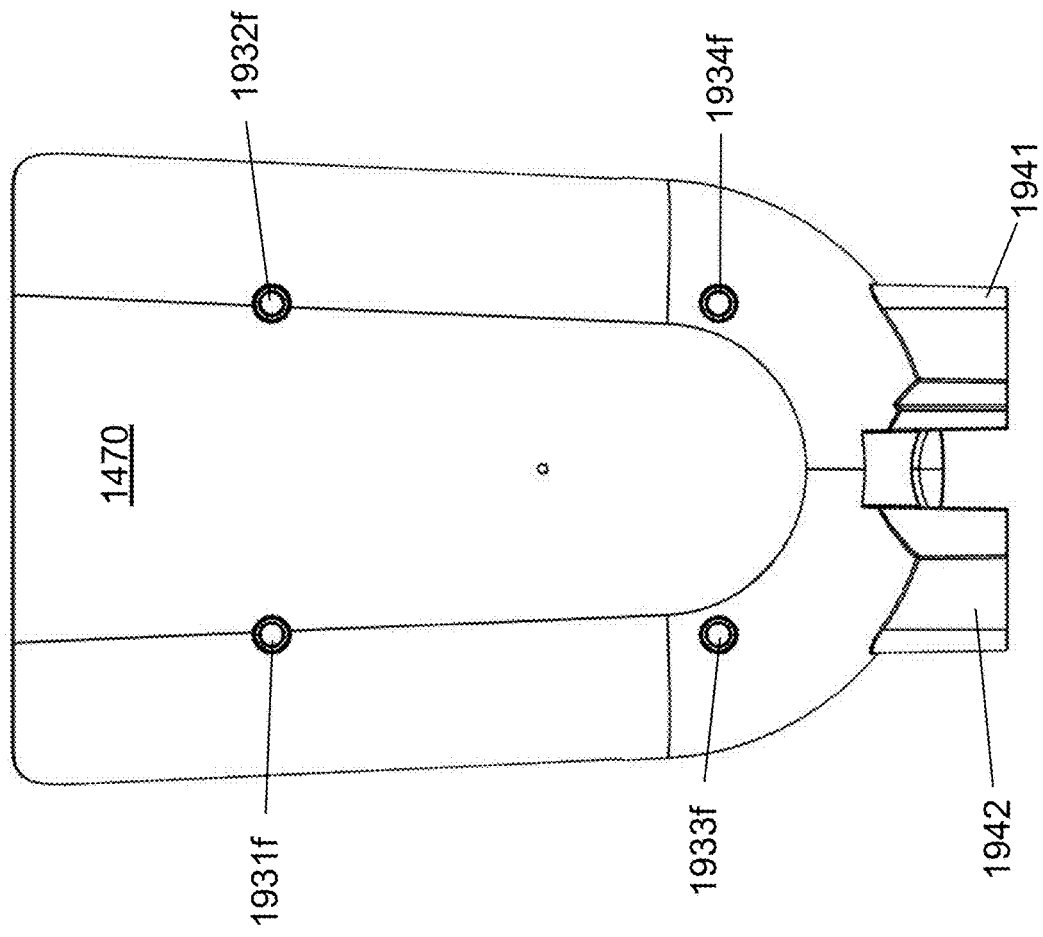
Figure 19B:
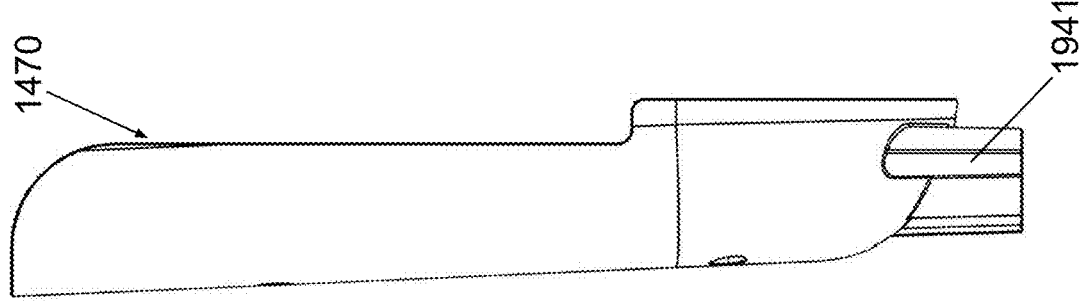
Figure 19D:
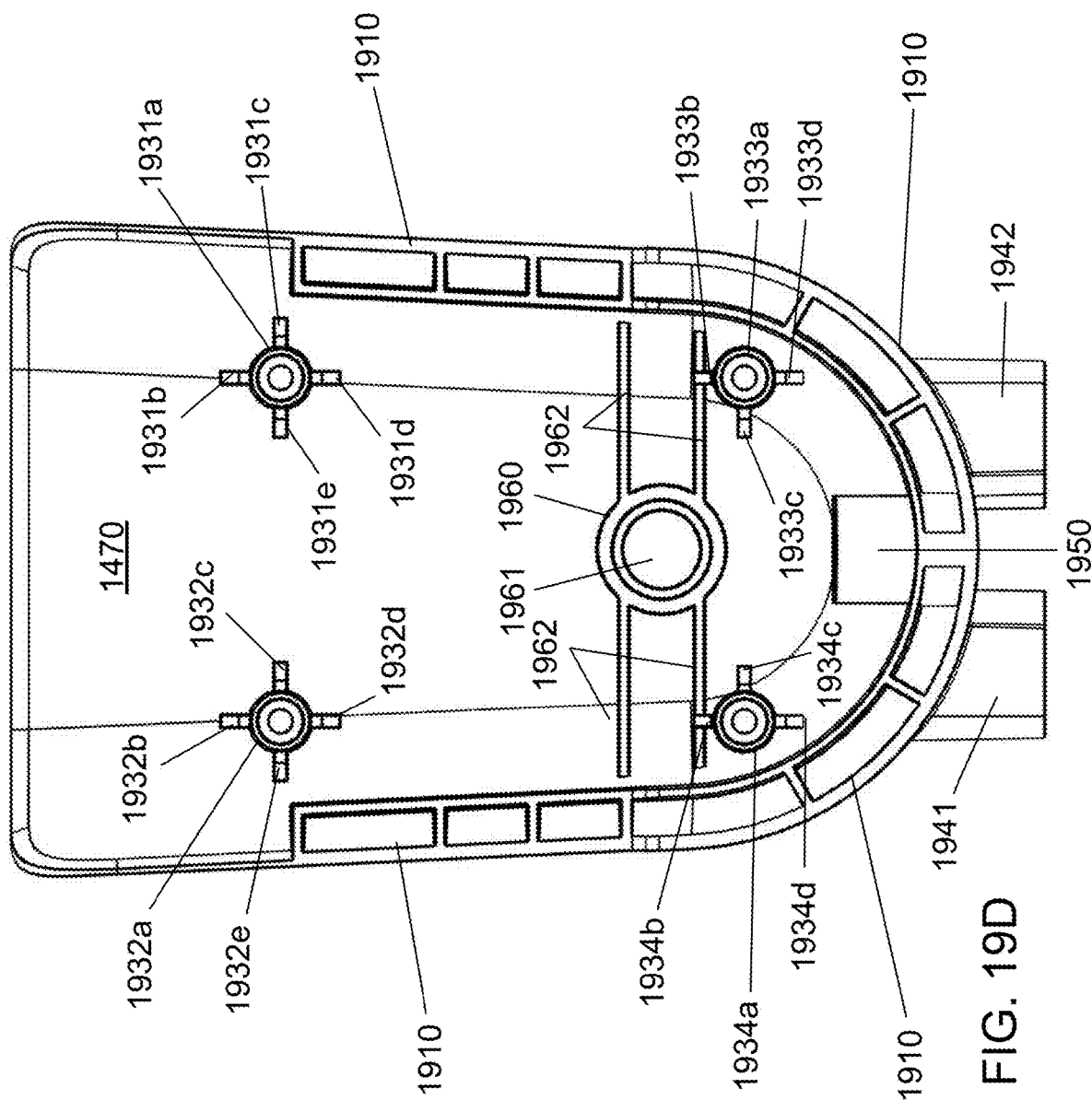
Figure 19E:
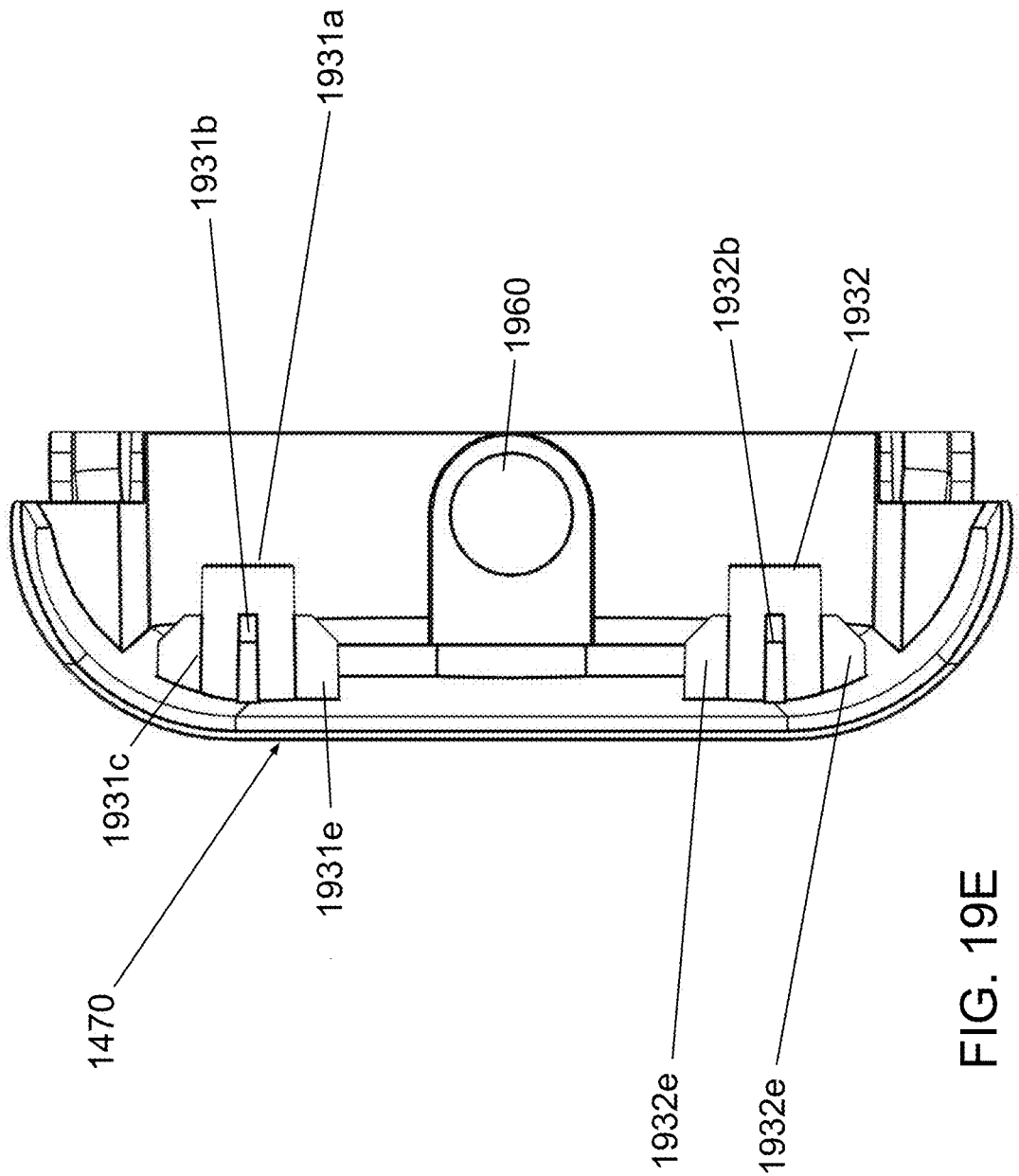

FIGS. 19A-19E show different views of transmission housing 1470. FIG. 19A shows an illustrative perspective view, FIG. 19B shows an illustrative side view, FIG. 19C shows an illustrative front view, FIG. 19D shows an illustrative back view, and FIG. 19E shows an illustrative top view. Transmission housing 1470 configured to be coupled to housing 1410 (not shown), in particular, to the external portion of side wall 1603 (see FIG. 16H) of housing 1410. Transmission housing 1470 may be constructed from a plastic material or a combination of plastic materials to minimize weight of the housing assembly. Transmission housing 1470 can include double walled members 1910 to add structural rigidity. As shown, double walled members 1910 span from an upper portion of housing 1470 down to a lower portion of housing 1470 (as shown in FIGS. 19A and 19D).

Transmission housing 1470 can include fastening support members 1931-1934 that are designed to interface with respective fastening support members 1631-1634 of housing 1410. Each of fastening support members 1931-1934 can include respective tubular members 1931a-1934a. The distal ends of tubular members 1931a-1934a may be co-planer with each other. In addition, tubular members 1931a-1934a may serve as the female interfaces to their respective male counterpart interfaces of tubular members 1631a-1634a. Fastening support members 1631 and 1632 are positioned near the top portion of housing 1470 and can include rib members 1631b-e and 1632b-e to provide added structure support to respective tubular members 1631a and 1632a. Fastening support members 1633 and 1634 are positioned near the bottom portion of housing 1470 and can include rib members 1633b-d and 1634b-d to provide added structure support to respective tubular members 1633a and 1634a. Through-holes 1931f-1934f can exist in support members 1631-1634. A screw or fastener can be inserted from an outside surface of housing 1470 through each of through-holes 1931f-1934f to interface with respective fastening support members 1631-1634 of housing 1410.

Transmission housing 1470 can include foot members 1941 and 1942 that are designed to fit into registration footprint 1324 (see FIG. 13G). Foot members 1941 and 1942, together with footprint 1670 (see FIG. 16B), enable housing assembly 1400 to stand upright when removed from housing 1320.

Transmission housing 1470 can include transmission support members 1950 and 1960. Support member 1950 may include through-hole 1951 through which a rotating rod member (not shown) can be inserted. The rotating rod member can be coupled to a transmission gear (not shown) and a motor interface coupling (not shown). Support member 1960 can include cavity 1961 and support ribs 1962. Cavity 1961 may serve as a seat for a bearing (or bushing) that supports rotation of cut and paddle assembly 1440 (not shown). Support ribs 1962 may provide added structural support to cavity 1961.

Figure 20A:
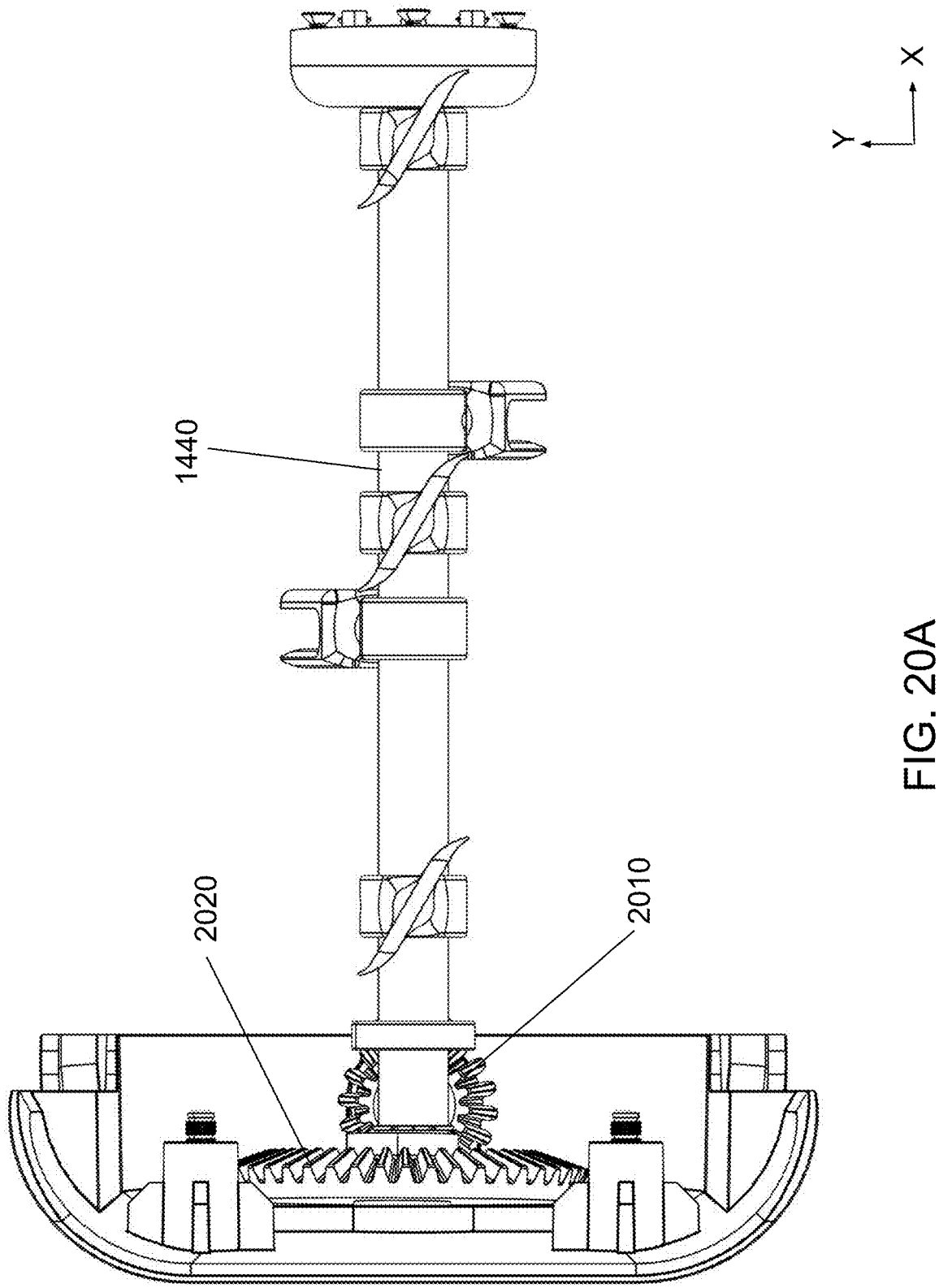
Figure 20B:
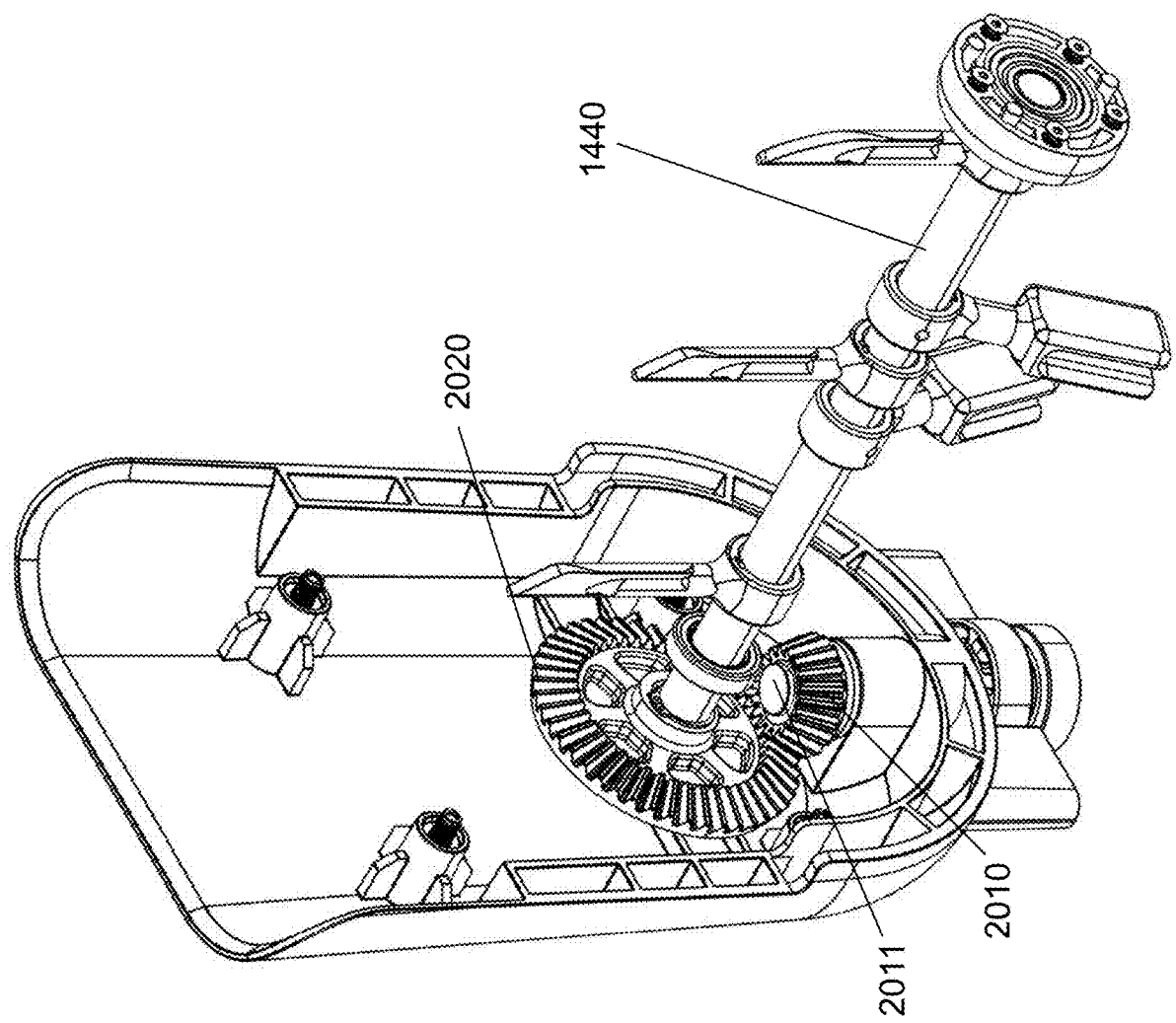

FIGS. 20A, 20B, and 20C show illustrative top, perspective, and side views, respectively, of transmission housing 1470 with transmission gears 2010 and 2020. Transmission gear 2010 may be connected to rod member 2011 that passes through through-hole 1951. Transmission gear 2020 may be connected to rod member 1441 of cut and paddle assembly 1440. Thus, when transmission gear 2020 rotates, this causes rod member 1441 to rotate, thereby causing cutter forks 1442 and 1443 and paddles 1444-1446 rotate. Rod member 1441 may be secured to transmission support member 1960 (see FIG. 19D) via a bearing or bushing contained therein and to bearing housing 1450, which is secured to bearing support structure 1650 located on the inner surface of side wall 1604 (see FIG. 16F). Transmission gears 2010 and 2020 are coupled together such that when a motor (not shown) causes transmission gear 2010 to rotate around a first axis, this causes transmission gear 2020 to rotate around a second axis, where the first axis is orthogonal to the second axis. Rotation of transmission gear 2020 causes cut and paddle assembly 1440 to rotate. The first axis may be in the Z-axis direction, and thus transmission gear 2010 rotates within the X-Y plane. The second axis may be in the X-axis direction, thus causing transmission gear 2020 to rotate within the Y-Z plane.

The configuration of transmission gears 2010 and 2020 provides a compact and robust motor to shaft gear reduction that provides slow and quiet operation. For example, the gear reduction achieved with the OMPA transmission can be around 1200:1 or in the range of 1000-1500 to 1. Such a gear reduction can provide substantial torque necessary to cut, grind, and paddle organic matter. In addition, this gear reduction enables a brushless DC motor to be used in lieu of AC motors. Brushless DC motors are more advantageous compared to AC motors because they are smaller, lighter, and more efficient. For example, the brushless DC motor having part number BLA-42F, and made available by Merkle-Korff Industries may be used in the OMPA. This motor can have an output power of 3-10 watts. According to some advantages of an OMPA bucket and drive assembly according to the preferred embodiments, very good results in terms of the described churning and grinding are achieved, while also providing robust shear cutting and shear ripping force for harder items such as corn cobs or chicken bones, all while at the same time facilitating the use of a relatively modest average motor power consumption of 3-5 watts.

Figure 20E:
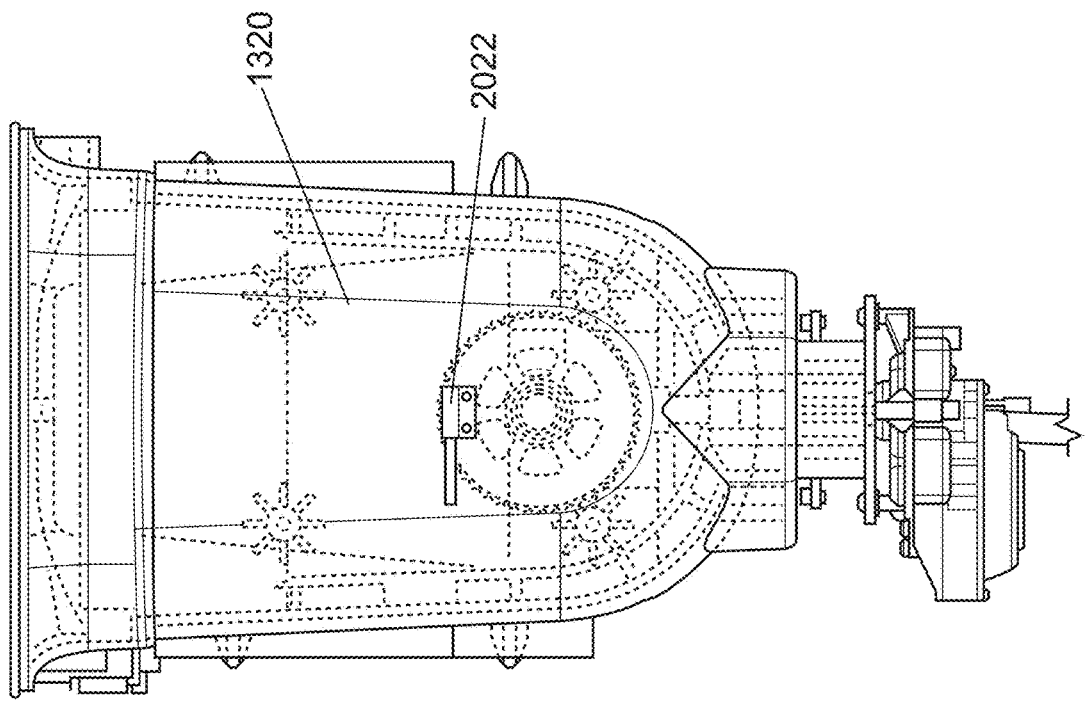
FIG. 20E shows a sensor mounted to a housing to detect a magnet located on a gear according to an embodiment.
Figure 20D:
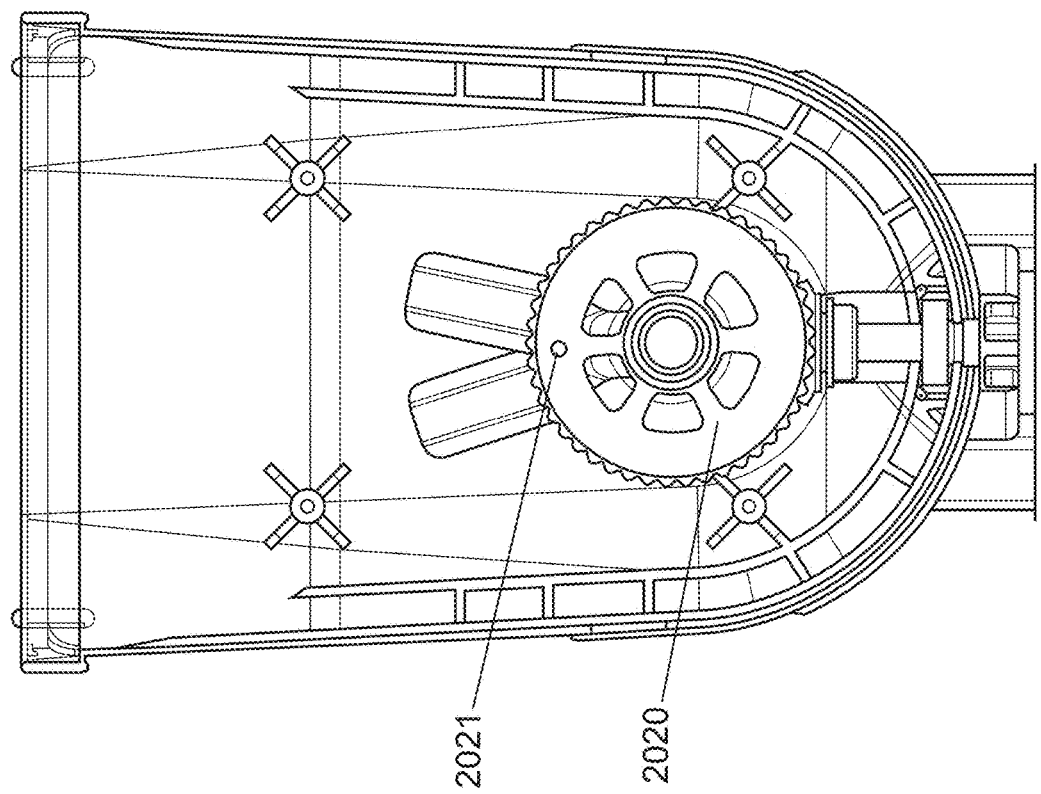
FIG. 20D shows a gear with an integrated magnet according to an embodiment.

FIG. 20D shows a different view of a transmission housing with transmission gear 2020 and a magnet 2021 integrated into gear 2020. The presence of magnet 2021 in gear 2020 can be monitored by a sensor (not shown) located on housing 1320 (also not shown) to determine the position of gear 2020 so that the motor (not shown) can be controlled to precisely position cutter prongs and paddles in a particular position. The sensor may be a Hall Effect sensor or a Reed switch sensor. FIG. 20E shows an illustrative view of sensor 2022 positioned on housing 1320. For example, in a bucket retrieval event, it may be desirable for the cutter prongs and paddles to be oriented as vertically as possible to promote egress of OMPA output out of the bucket. As gear 2020 rotates, magnet 2021 passes by the sensor, thereby triggering a sensor response indicating that magnet 2021 is adjacent to the sensor. This information can be used to register the position of gear 2020 and by inference, the position of paddles and prongs.

Figure 21A:
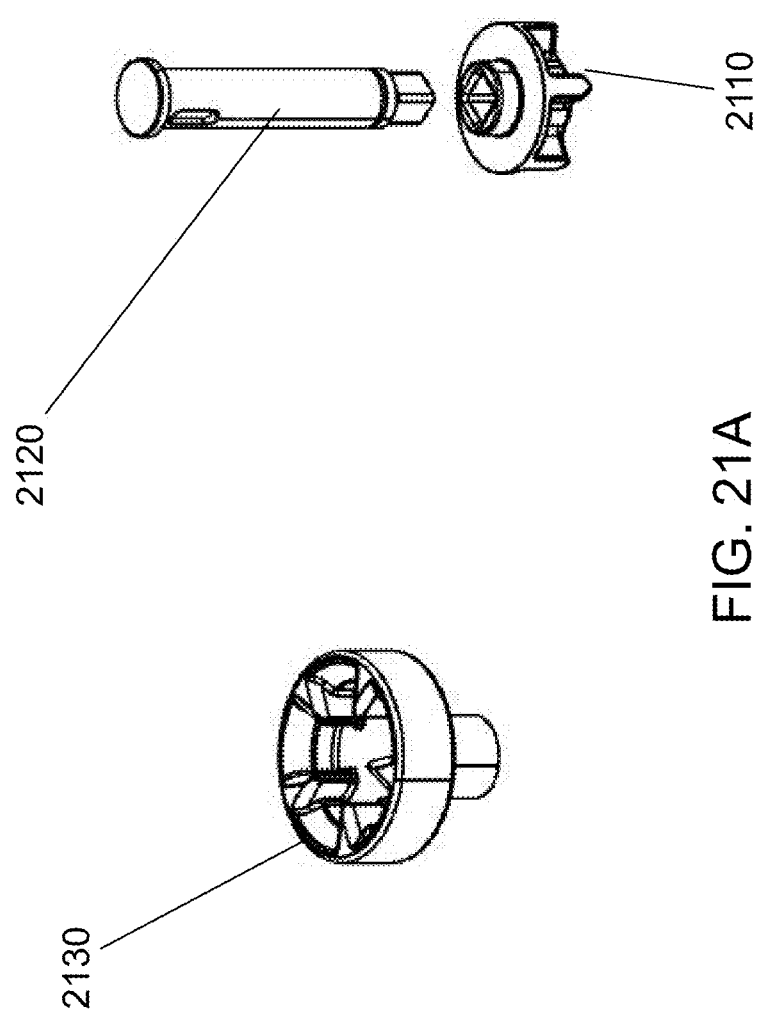
FIGS. 21A-21C show different views of the motor interface couplings with a motor rod according to embodiment.
Figure 21B:
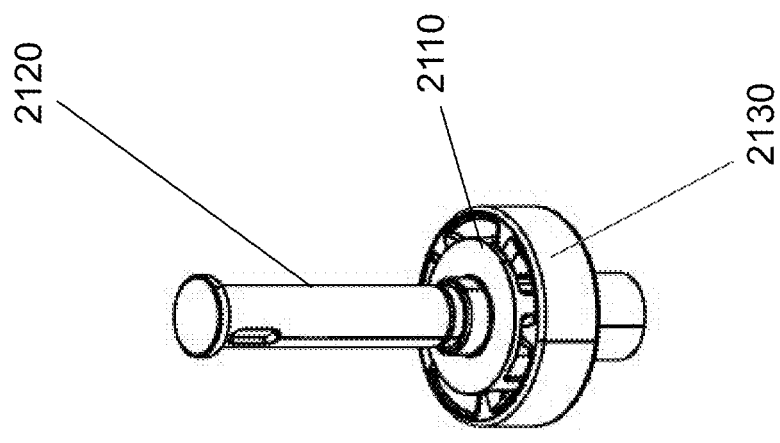
Figure 21C:
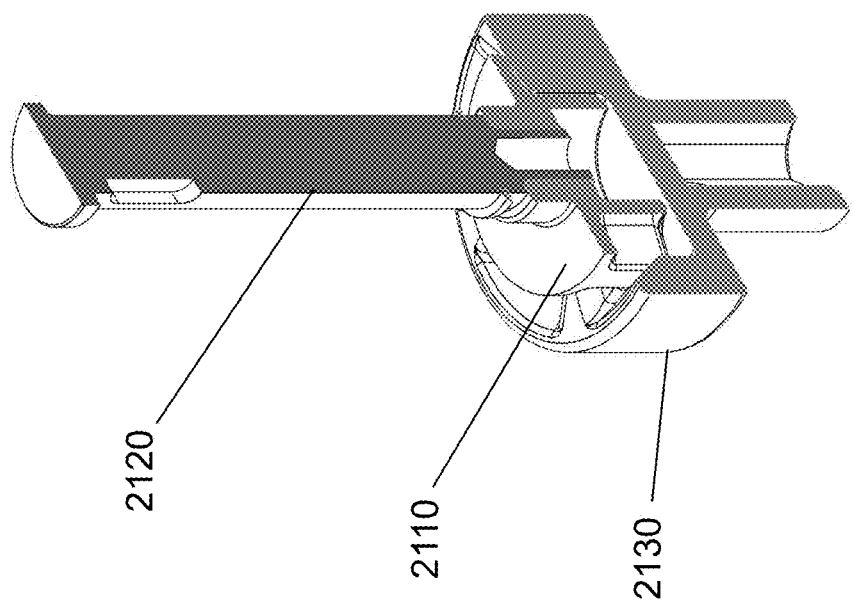
Figure 21E:
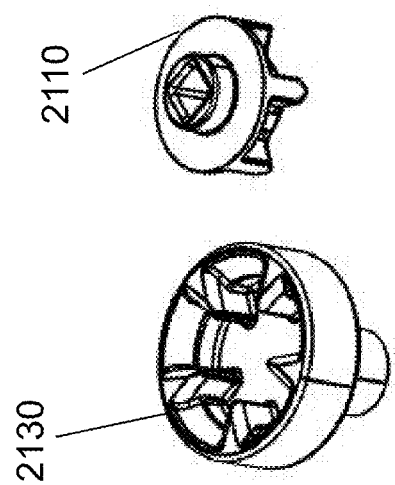
FIGS. 21D-21E show different views of a male connector and a female connector according to embodiment.
Figure 21D:
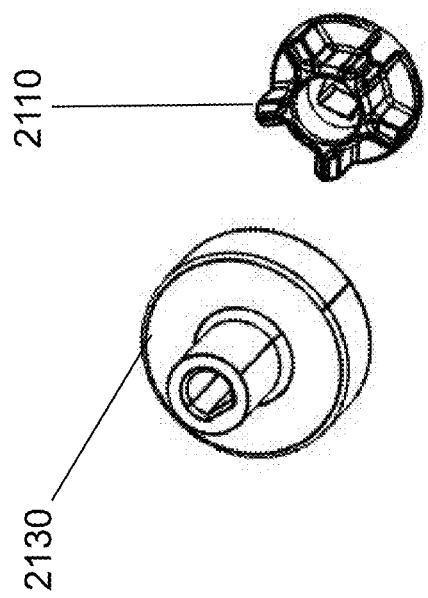

FIGS. 21A-21C show different views of the motor interface couplings with a motor rod. In particular, FIGS. 21A-21C shows male connector 2110, motor rod 2120, and female connector 2130. Male connector 2110 and motor rod 2120 may be coupled together such that when connector 2110 and rod 2120 are rotated by female connectors 2130, the transmission gears are turned responsive there to. Male connector 2110 fits into female connector 2130. FIGS. 21D-21E show different views of male connector 2110 and female connector 2130.

Figure 22A:
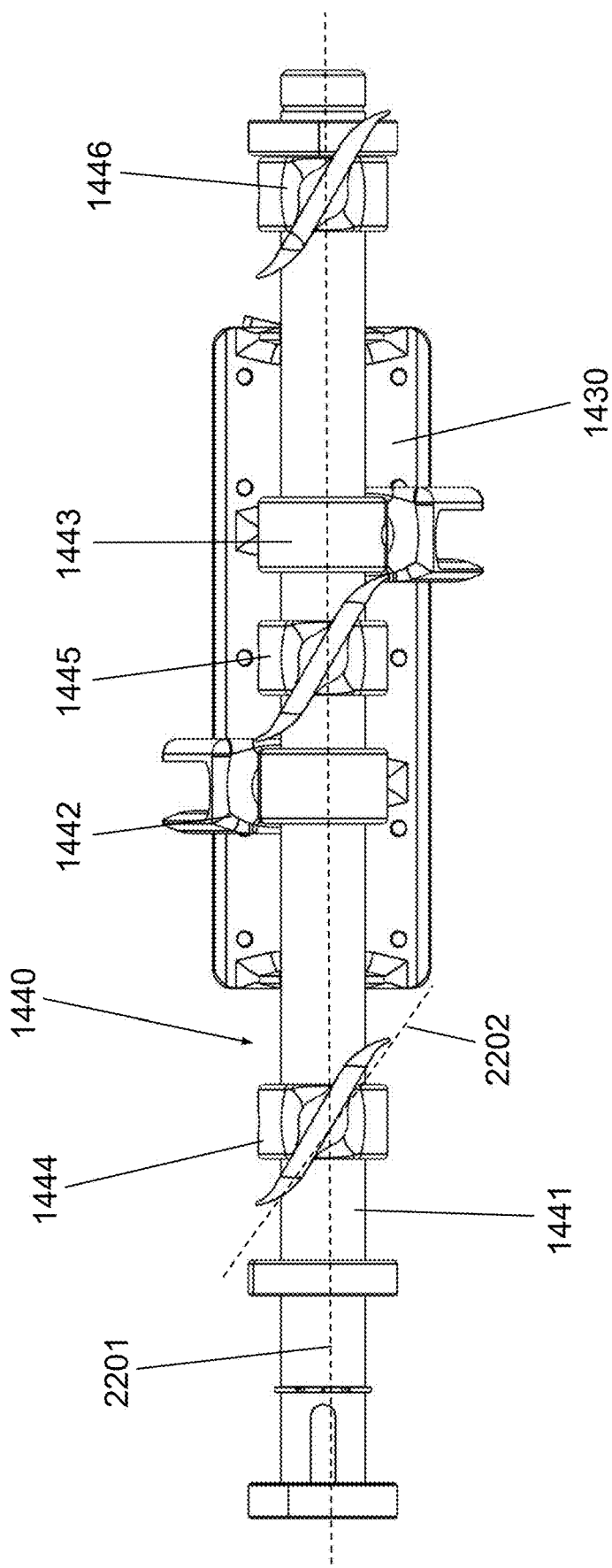
FIGS. 22A-22C show different views of a cut and paddle assembly and a blade array according to embodiment.
Figure 22B:
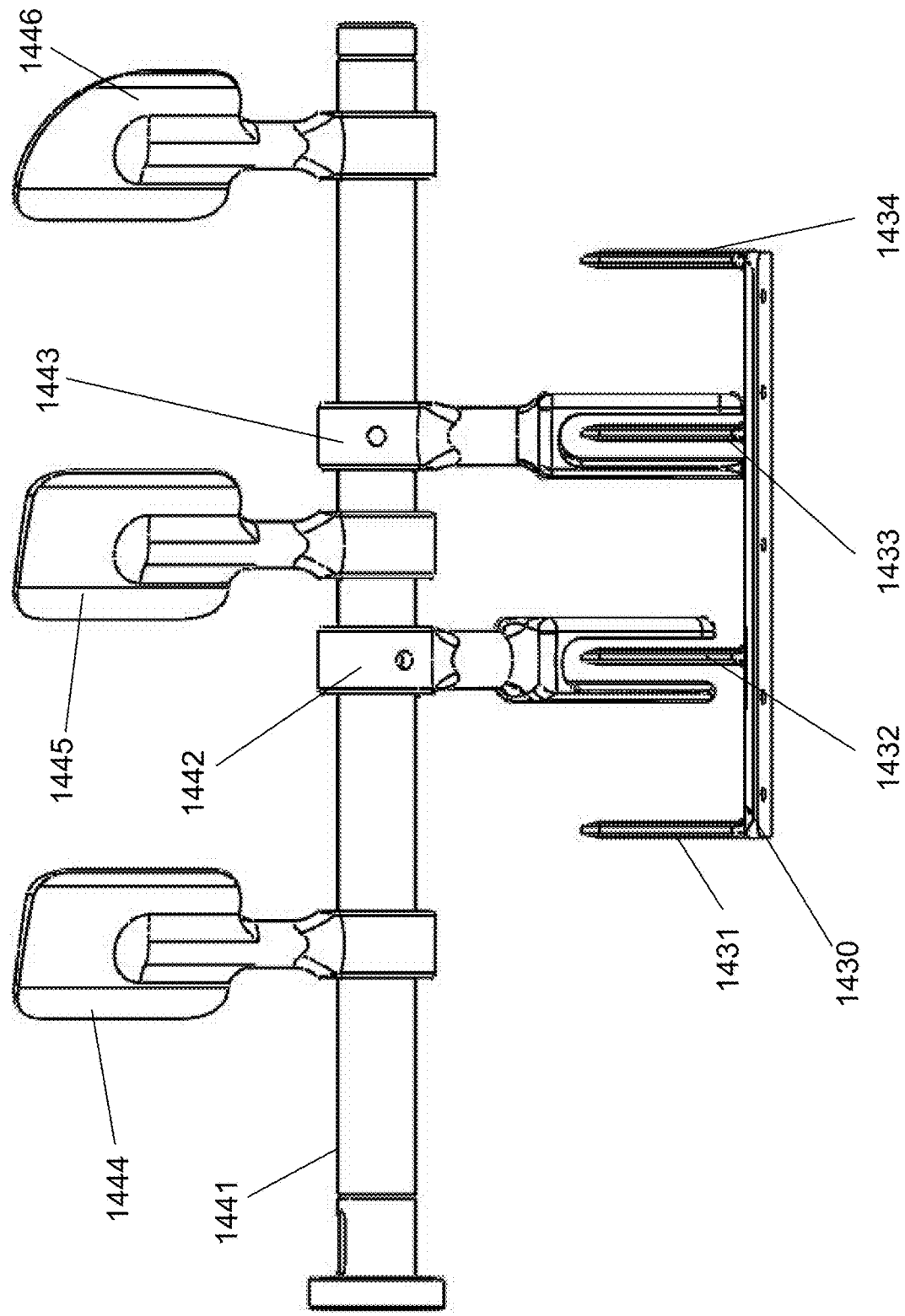
Figure 22C:
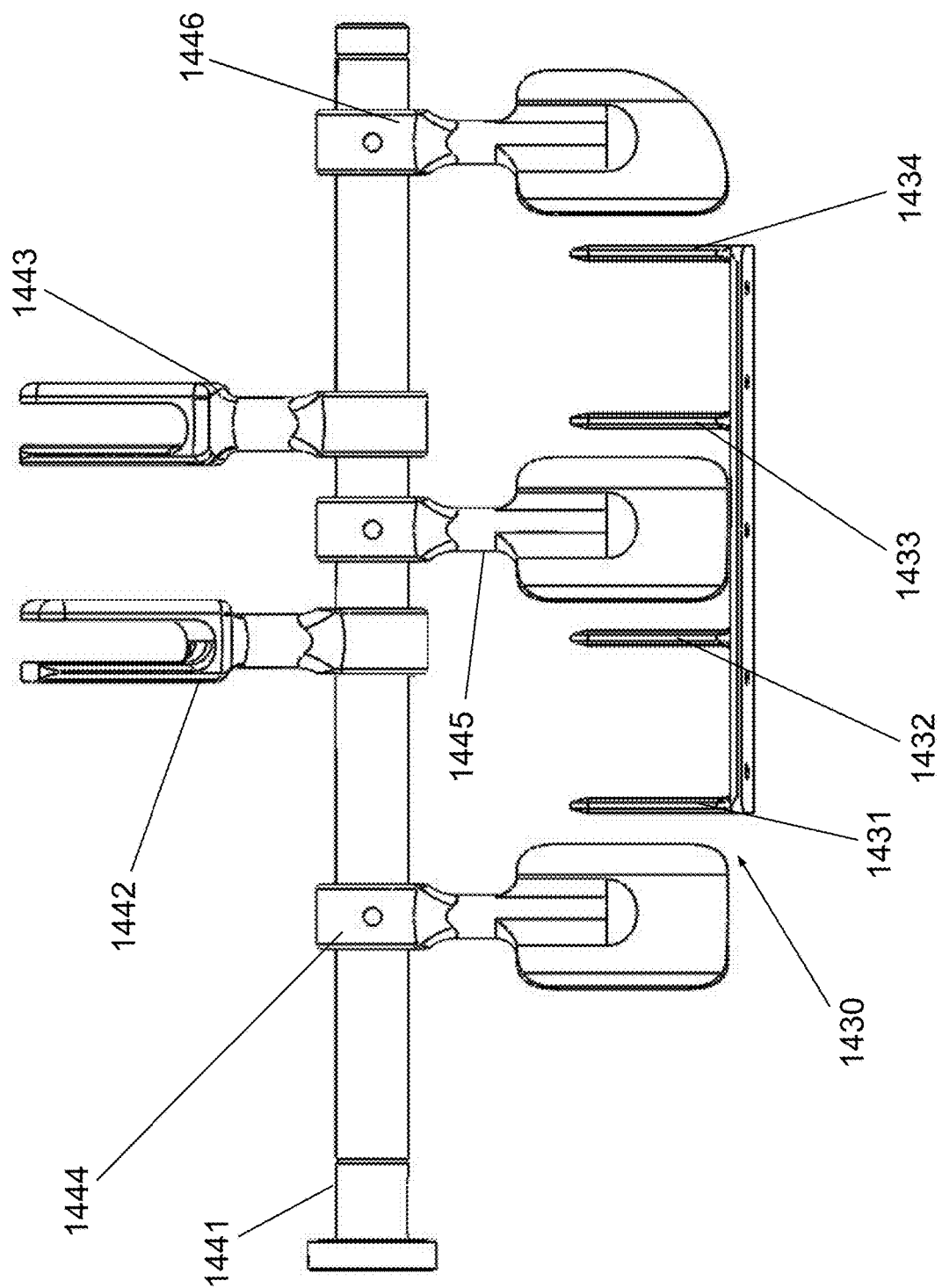

Cut and paddle assembly 1440 and its operation in conjunction with blade array 1430 and metal plate 1420 is now discussed in detail. Reference is now made to FIGS. 22A-C. As previously discussed, assembly 1440 includes rod member 1441, cutter forks 1442 and 1443, paddles 1444-1446. Cutter forks 1442 and 1443 and paddles 1444-1446 are secured to rod member 1441. In one embodiment, T-slots located in the stem of cutter forks 1442 and 1443 and paddles 1444-1446 may engage a respective protrusion member extending from rod member 1441. When the protrusion member engages its respective T-slot, that cutter fork or paddle is locked in place.

Cutter forks 1442 and 1443 and paddles 1444-1446 are positioned in specific locations along rod member 1441. These positions are chosen to ensure that fixed interface clearances are achieved between blade array 1430 and cutter forks 1442 and 1443 and paddles 1444-1446. As shown from left to right, paddle 1444 is positioned on the left side of assembly 1440, followed by cutter fork 1442, paddle 1445, cutter fork 1443, and paddle 1446. During rotation of assembly 1440, paddle 1444 passes by blade 1431 (on the left side of blade 1431), paddle 1445 passes between blades 1432 and 1433, and paddle 1446 passes by blade 1344 (on the right side of blade 1344). Also, during rotation of assembly 1440, cutter fork 1442 passes over blade 1432 and cutter fork 1443 passes over blade 1433. The fixed interface clearance between each paddle and its respective blade(s) is a first distance (e.g., about 6 mm) and the fixed interface clearance between each cutter fork and its respective blade is a second distance (e.g., about 3 mm), where the second distance is less than the first distance. It has been found that maintaining these fixed interface clearance distances minimizes or eliminates a warbling noise that can be generated when the OMPA is actively processing organic matter.

The shape and design of the cutter forks 1442 and 1443, paddles 1444-1446, blade array 1430, and interior dimensions of housing 1410 are selected to maximize cutting, fracturing, and mixing of organic matter. For example, cutter forks 1442 and 1443 are designed to fracture cut organic matter against blade array 1430. Paddles 1444-1446 are designed to cut organic matter against blade array 1430, lift organic matter up and away from blade array 1430, and move organic matter from one side of the housing to the other side and vice versa (e.g., move the organic matter from left to right or right to left depending on rotation direction). Additional design details of cutter forks and paddles are discussed below, but FIG. 22A shows how each paddle blade is rotated a fixed number of degrees (e.g., 30 degrees) relative (shown as dashed line 2202) to the X-axis direction of rod member 1441 (shown as dashed line 2201). This paddle blade rotation may further promote X, Y, and Z-axis churning of organic matter within the housing. Moreover, the position of cutter forks 1442 and 1443 and paddles 1444-1446 relative to each other also further promote cutting, fracturing, and mixing of organic matter. For example, paddles 1444-1446 can be aligned with respect to each other such that they all have the same angular position during rotation (i.e., each of paddles 1444-1446 pass by blade array 1430 at the same time). Cutter prongs 1442 and 1443 can be aligned offset with respect to each other such that only one cutter fork engages in cutting action at a time per rotation. Furthermore, cutter prongs 1442 and 1443 may be positioned substantially opposite of paddles 1444-1446. For example, when paddles 1444-1446 are at a zero-degree angle position, cutter forks 1442-1443 may be at angle positions between 165-195 degrees.

Figure 23A:
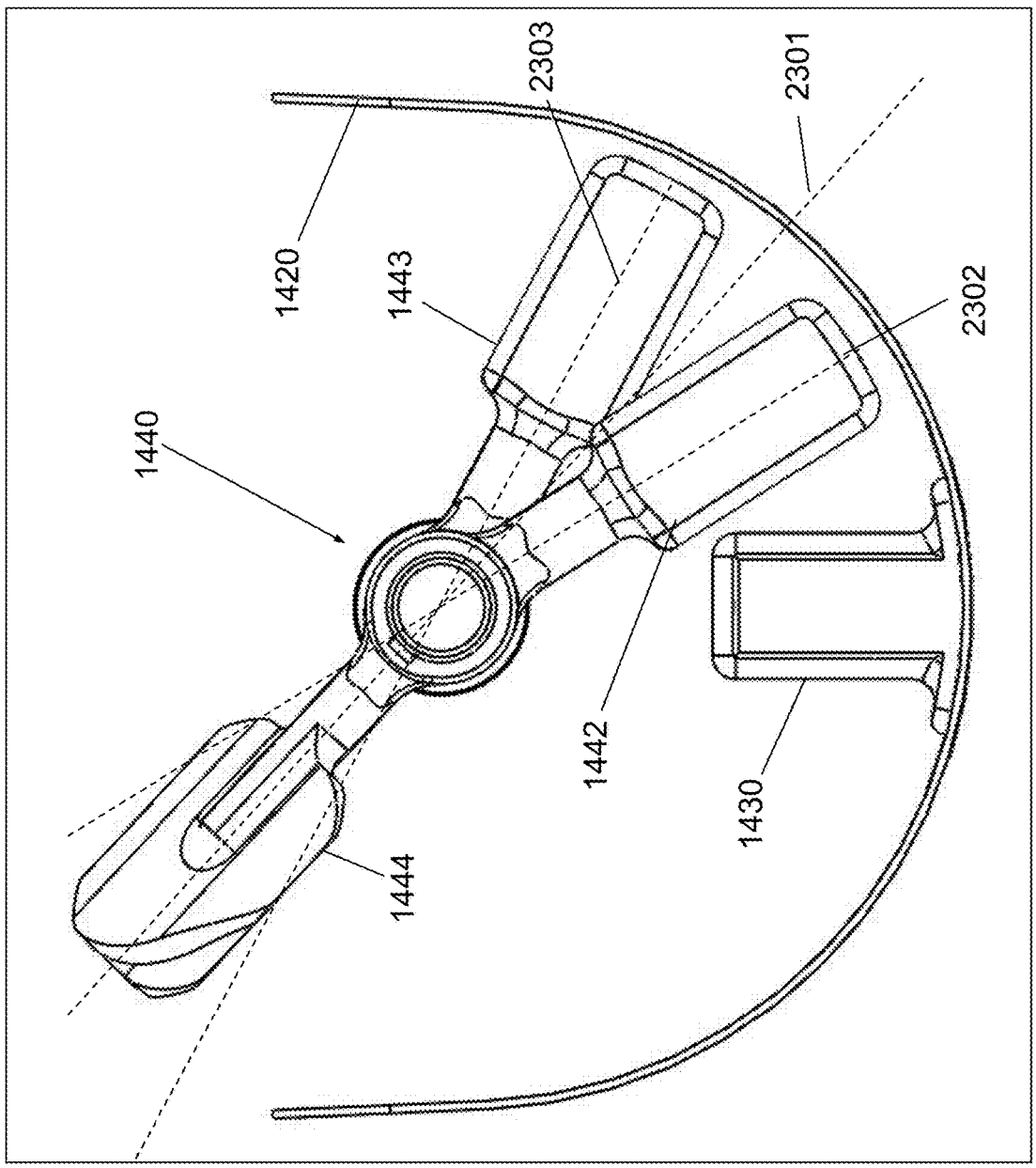
FIGS. 23A-23I show an illustrative clockwise rotation sequence of a cut and paddle assembly shown with respect to a blade array and a metal plate according to embodiment.
Figure 23B:
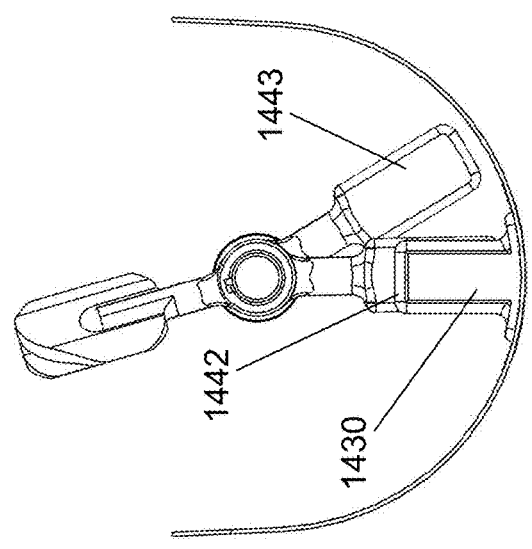
Figure 23C:
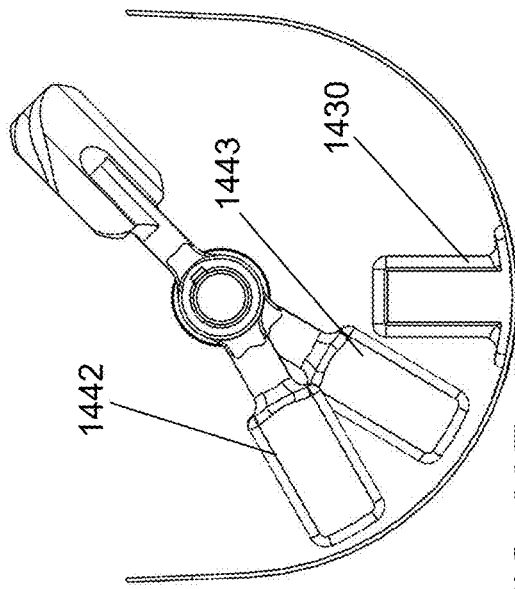
Figure 23D:
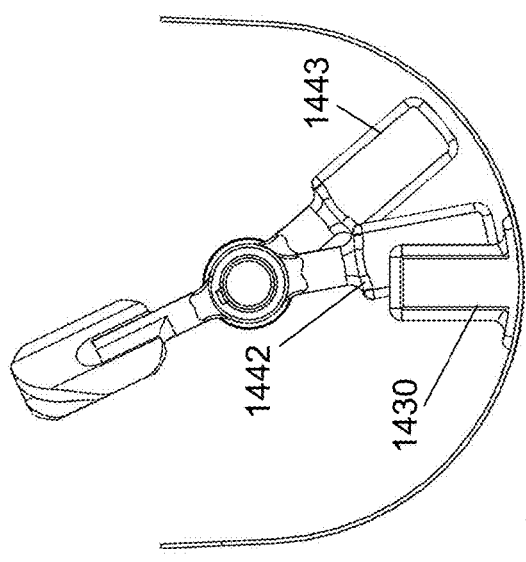
Figure 23E:
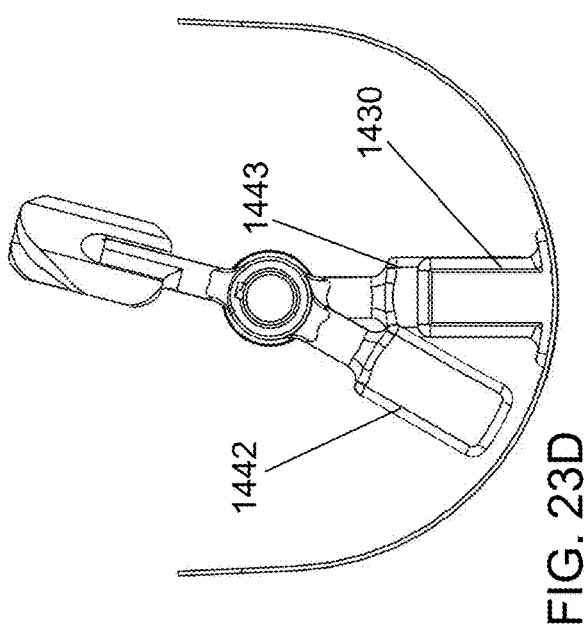
Figure 23F:
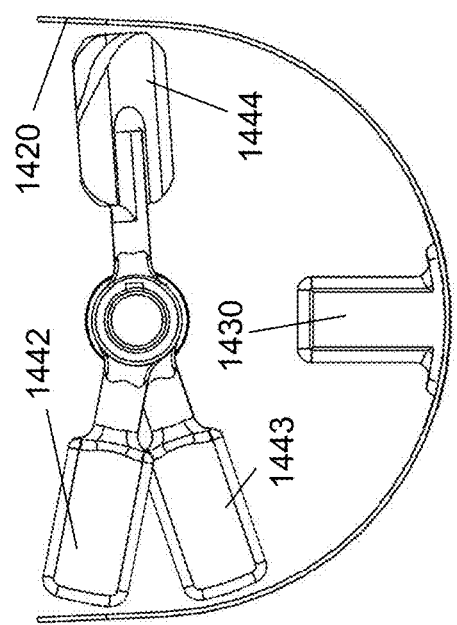
Figure 23G:
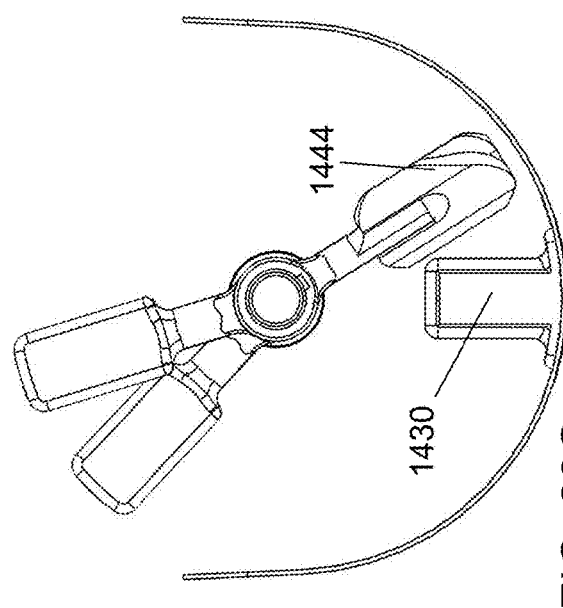
Figure 23H:
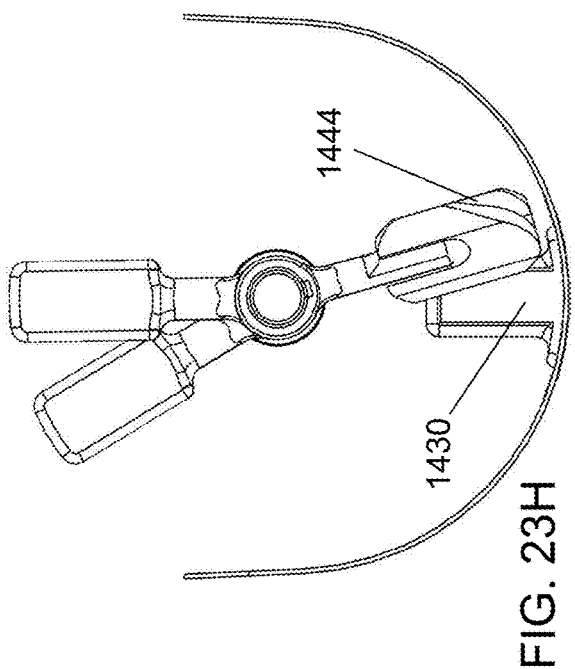
Figure 23I:
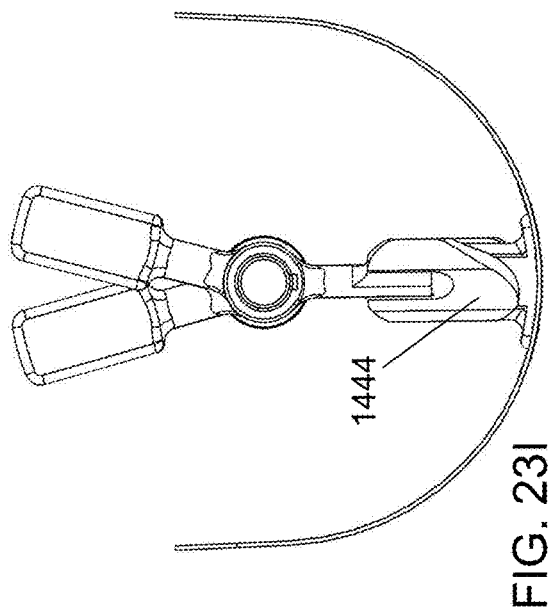
Figure 24B:
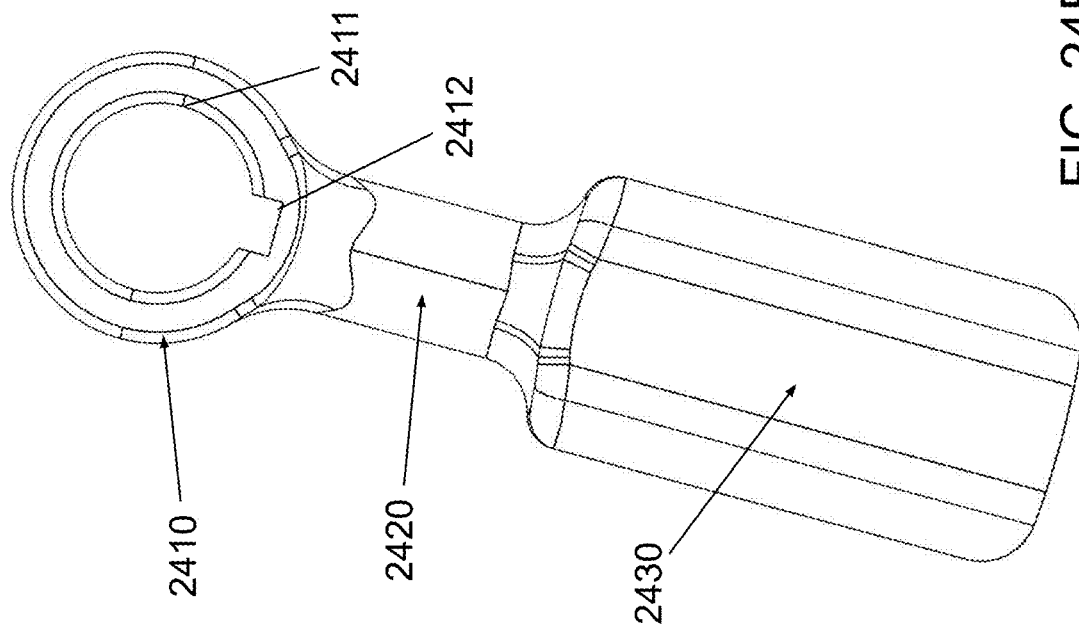
Figure 24A:
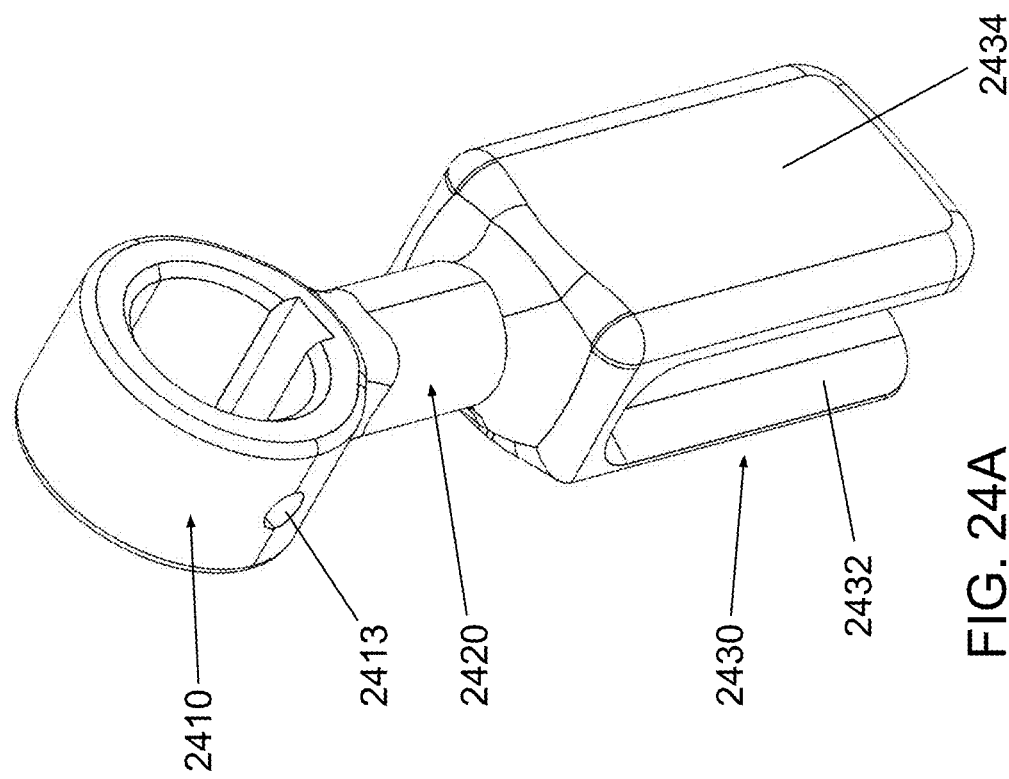
Figure 24E:
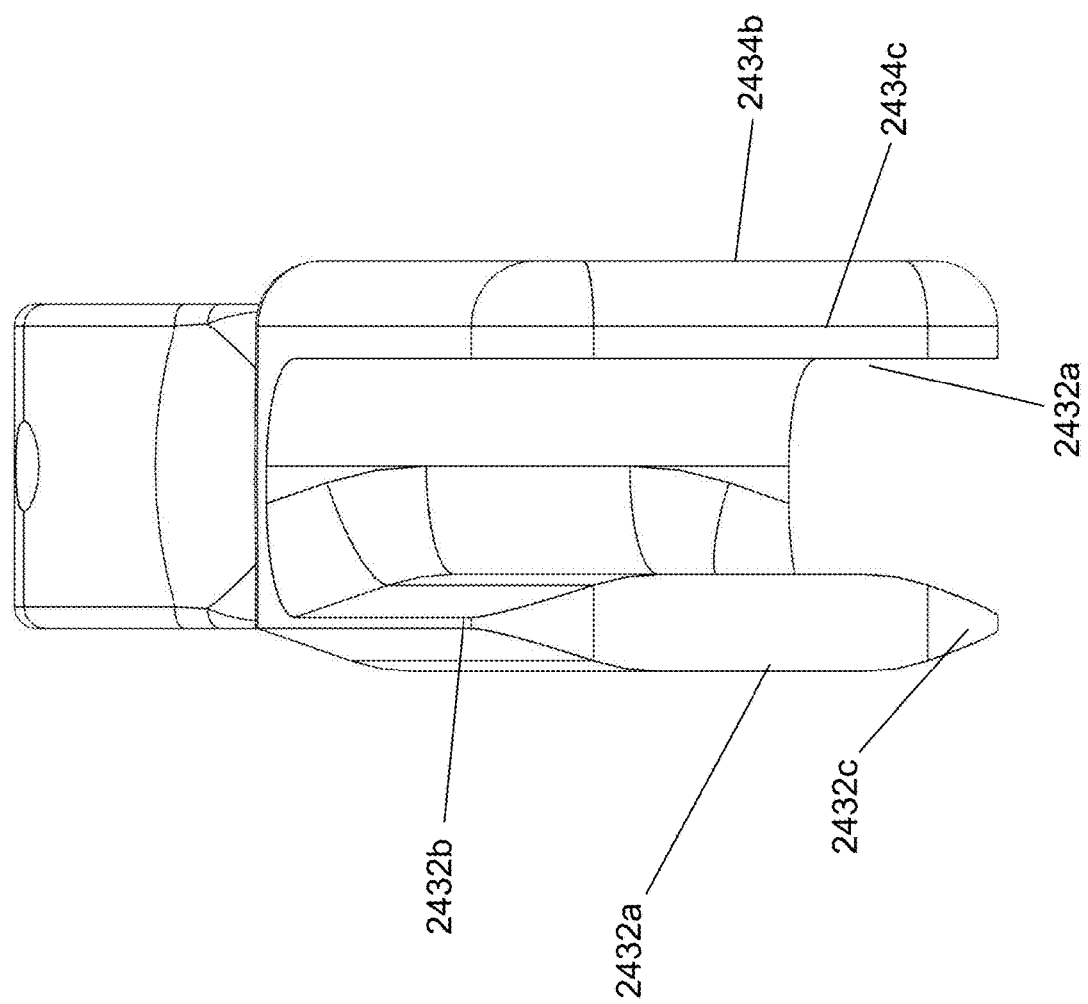
Figure 25B:
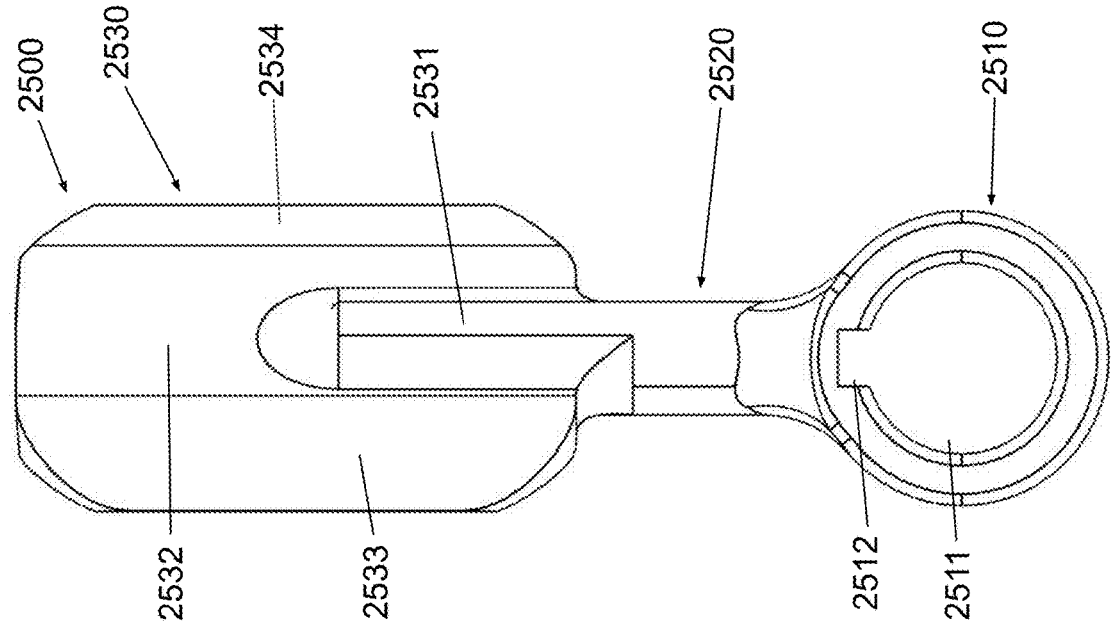
Figure 25A:
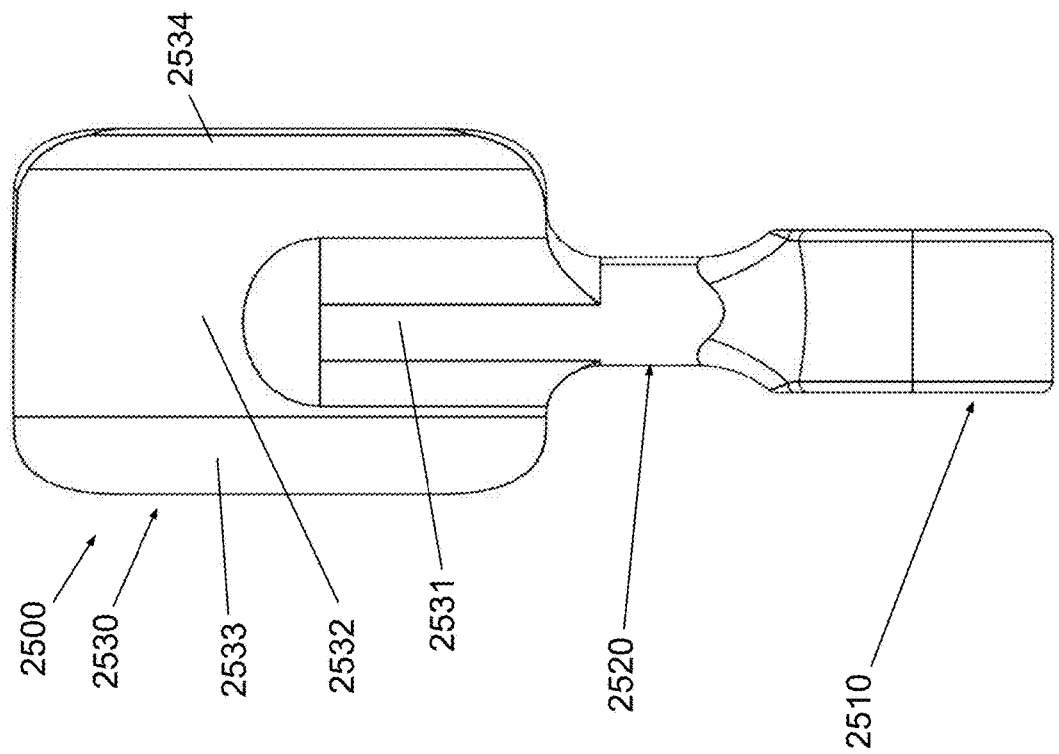
Figure 25C:
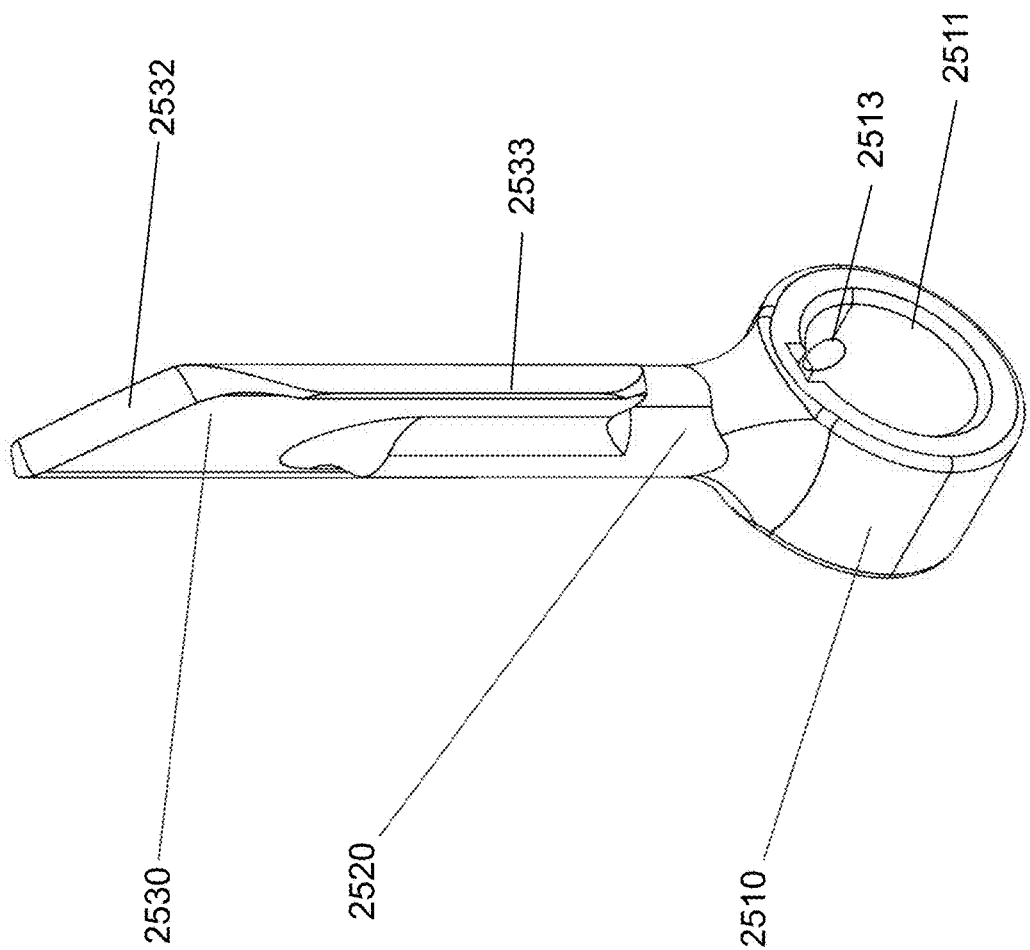

Referring now to FIGS. 23A-23I, an illustrative clockwise rotation sequence of cut and paddle assembly 1440 is shown with respect to blade array 1430 and metal plate 1420, where each figure shows array 1440 in a different position. FIG. 23A shows paddle axis 2301 (associated with paddles 1444-1446), cutter axis 2302 (associated with cutter fork 1442), and cutter axis 2303 (associated with cutter fork 1443). Axes 2301-2303 pass through a center point of rod member 1441 and represent the radial axes of the paddles and cutter forks. The angle between axes 2302 and 2303 may be approximately 15 degrees or any other suitable range of degrees to ensure that only one cutter fork is actively engage in a cutting action with blade array 1430 at time. It may be desirable to limit interfacing between the cutter forks and blade array to just one at a time to reduce strain on the transmission and motor. As also shown in FIG. 23A, cutter fork 1442 is about the interface with blade array 1430. FIG. 23B shows cutter fork 1442 partially overlapping its respective blade of blade array 1430 and FIG. 23C shows cutter fork 1442 fully overlapping its respective blade of blade array 1430. Note that in FIG. 23C, cutter fork 1443 is about to interface with blade array 1430. At this point in the rotation, any cutting action between cutter fork 1442 and blade array 1430 is complete and cutter fork 1443 can begin its cutting action. FIG. 23D shows that cutter fork 1443 has completed its cutting action with respect to blade array 1430. FIG. 23E shows that both cutter forks 1442-1443 have rotated away from blade array 1430 and could potentially be pushing organic matter up and away from the bottom of metal plate 1420. Further note that the distal ends of cutter forks 1442 and 1443 are in substantially close proximity of metal plate 1420 as they rotate up. This proximity relationship is further shown in FIG. 23F, which also shows paddle 1444 in the same proximity to metal plate 1420. FIG. 23G shows paddle 1444 about to interface with blade array 1430. FIGS. 23H and 23I show paddle 1444 passing by blade array 1430 at different points in rotation.

FIGS. 24A-24E show different views of a cutter fork 2400 according to embodiment discussed herein. Cutter fork 2400 may be used as cutter fork 1442 or 1443. Cutter fork 2400 may be constructed from a metal (e.g., stainless steel). Cutter fork 2400 can be segmented into a ring portion 2410, stem portion 2420, and fork portion 2430. Ring portion 2410 includes through-hole 2411 with T-slot 2412. T-slot 2412 provides a channel that is cut out of through-hole 2411. T-slot 2412 can register with a protrusion member extending radially out from the rod member of the cut and paddle assembly. Ring portion 2410 can include set-screw hole 2413 for receiving a set screw (not shown) that further secures cutter fork 2400 to the rod member. Stem portion 2420 may be cylindrical in shape and connects ring portion 2410 to fork portion 2430. Fork portion 2430 can include prong 2432 and prong 2434 that are separated by a u-shaped channel (best shown in FIG. 24C).

Prongs 2432 and 2434 are shown to have different shapes but have the same overall thickness. Prong 2432 can be constructed to have a relatively narrow edge compared to the relatively blunt edge of prong 2434. Prong 2432 can have a center portion 2432a that is abutted by first taper portion 2432b and second taper portion 2432c. Center portion 2432a can exhibit the thickest part of prong 2432. First and second taper portions 2432b and 2432c both exhibit a taper to yield the relatively narrow edge. Prong 2434 has a first side 2434a, a second side 2434b, and a transition region 2434c that exists between first side 2434a and second side 2434b. First side 2434a may face prong 2432 and includes a substantially flat planar surface. Second side 2434b faces away from prong 2432 and includes a substantially flat planar surface. Transition region 2434c may exhibit a chamfered edge with a rounded characteristic to yield the relatively blunt edge of prong 2434. The thickness of portion 2432a and the thickness between first and second side 2434a and 2434b can be the same.

It should be understood that prongs 2432 and 2434 can exhibit different shapes than those disclosed herein. For example, both prongs 2432 and 2434 may be the same (e.g., both resemble prong 2432 or prong 2434).

FIGS. 25A-25E show different views of paddle 2500 according to an embodiment. Paddle 2500 may correspond to paddle 1444 or 1445. Paddle 2500 can be segmented into a ring portion 2510, stem portion 2520, and paddle portion 2530. Ring portion 2510 includes through-hole 2511 with T-slot 2512. T-slot 2512 provides a channel that is cut out of through-hole 2511. T-slot 2512 can register with a protrusion member extending radially out from the rod member of the cut and paddle assembly. Ring portion 2510 can include set-screw hole 2513 for receiving a set screw (not shown) that further secures paddle 2500 to the rod member. Stem portion 2520 may be cylindrical in shape and connects ring portion 2510 to paddle portion 2530.

Paddle portion 2530 can include tongue member 2531, center region 2532, first edge region 2533, and second edge region 2534. Tongue member 2531 is connected to stem portion 2520 and to center region 2532. Center region 2532 is bookended by first edge region 2533 and second edge region 2534. Center region 2532, first edge region 2533, and second edge region 2534 can exhibit a "square" shape when viewed from the front or side view (FIGS. 25A and 25B) First edge region 2533 includes a curved portion that reduces down to a relatively narrow edge that points in a first general direction (e.g., +Y axis direction). Second edge region 2534 also includes a curved portion that reduces down to a relatively narrow edge that points in a second general direction (e.g., −Y axis direction). The first general direction can point in a direction that is opposite of the second general direction. First and second edge regions 2533 and 2534 have the same shape, but are oriented in different directions.

Paddle portion 2530 may be rotated a fixed number of degrees with respect to axis 2535. Axis 2535 may correspond to an X-axis or an axis that is concentric with a center axis of through-hole 2511. Paddle portion 2530 may be aligned with axis 2536, which is shown in FIG. 25D. The angle between axis 2535 and axis 2536 may range between 10-40 degrees, between 15-35 degrees, between 20-35 degrees, between 25-30 degrees, or be about 30 degrees. Aligning paddle portion 2530 offset with respect to axis 2535 may ensure that only one edge of paddle portion 2530 passes by the blade array during each rotation. This can reduce loading on the motor.

Figure 26C:
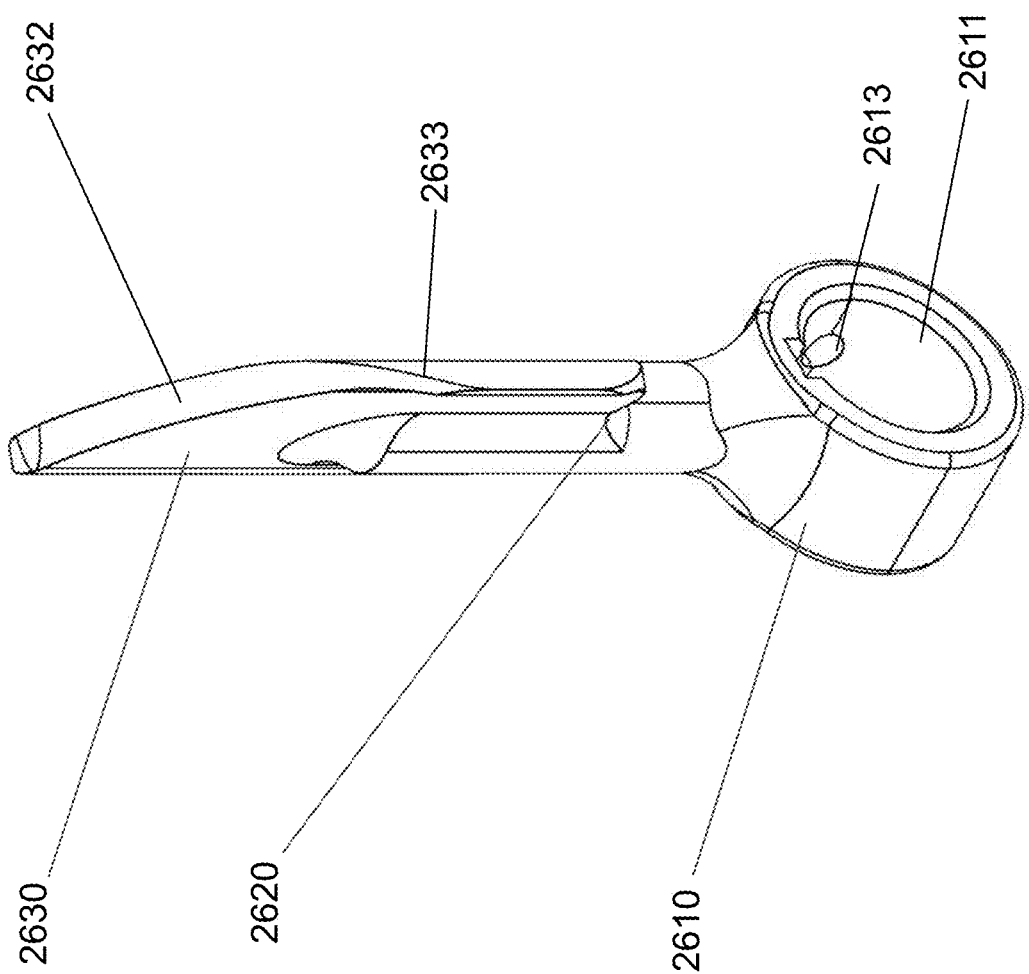

FIGS. 26A-26E show different views of paddle 2600 according to an embodiment. Paddle 2600 may correspond to paddle 1446. Paddle 2600 is essentially the same as paddle 2500, but has a rounded shape (as opposed to a "square" shape) to accommodate the shape of the bearing hub (e.g., bearing hub 1450) as paddle 2600 rotates withing the housing. Paddle 2600 can be segmented into a ring portion 2610, stem portion 2620, and paddle portion 2630. Paddle portion 2630 can include tongue member 2631, center region 2632, first edge region 2633, and second edge region 2634. Tongue member 2631 is connected to stem portion 2620 and to center region 2632. Center region 2632 is bookended by first edge region 2633 and second edge region 2634. Center region 2632, first edge region 2633, and second edge region 2634 can exhibit a "rounded" shape when viewed from the front or side view (FIGS. 26A and 26B). First edge region 2633 includes a curved portion that reduces down to a relatively narrow edge that points in a first general direction (e.g., +Y axis direction). Second edge region 2634 also includes a curved portion that reduces down to a relatively narrow edge that points in a second general direction (e.g., −Y axis direction). The first general direction can point in a direction that is opposite of the second general direction. First and second edge regions 2633 and 2634 have the same shape, but are oriented in different directions. Paddle portion 2630 may be rotated a fixed number of degrees with respect to axis 2635. Axis 2635 may correspond to an X-axis or an axis that is concentric with a center axis of through-hole 2611.

Figure 27C:
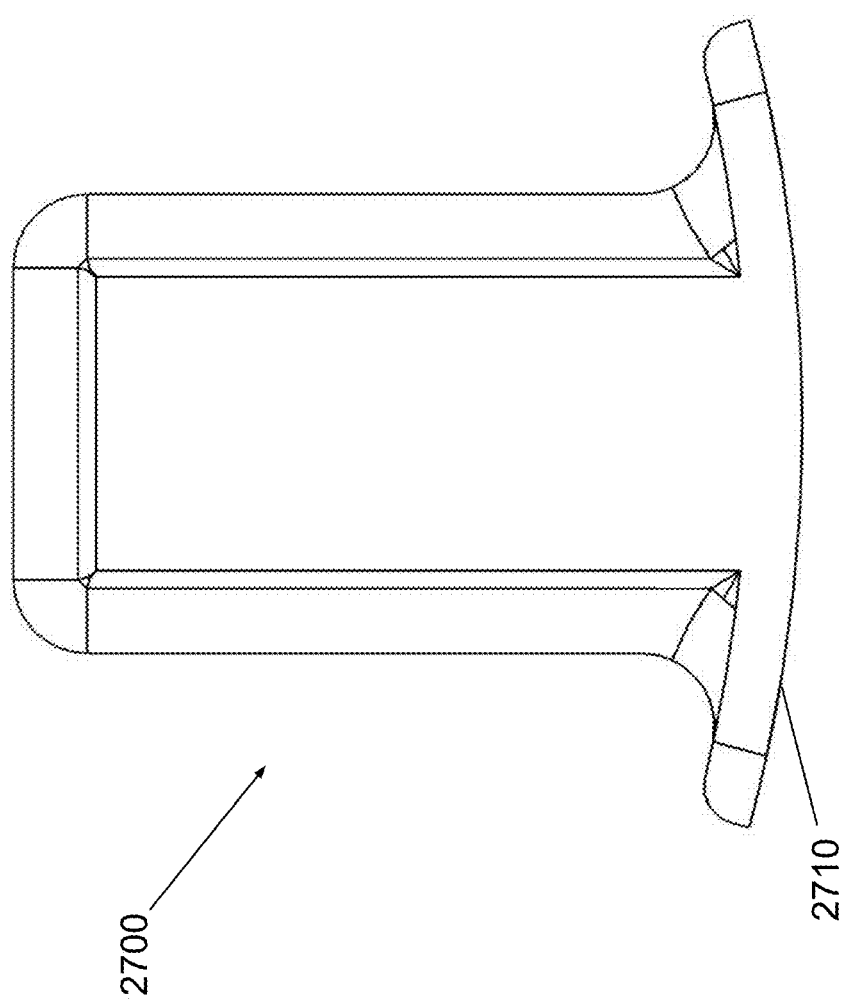

FIGS. 27A-27C show different views of blade array 2700 according to an embodiment. Blade array 2700 may be the same as blade array 1430. Blade array 2700 can include a support plate 2710 that supports blades 2720, 2730, 2740, and 2750. Support plate 2710 may have a curvature that matches the curvature of the bottom of the metal plate (e.g., metal plate 1420). Blades 2720 and 2750 are positioned on different ends of support plate 2710 and blades 2730 and 2740 can be positioned in the middle of support plate 2710. The distance between blades 2720 and 2730 may be the same as the distance between blades 2740 and 2750. The distance between blades 2730 and 2740 may be greater than the distance between blades 2720 and 2730 or blades 2740 and 2750. Each blade 2720, 2730, 2740, and 2750 is symmetrical in shape and has a first edge, a middle portion, and a second edge, where the first and second edges abut the middle portion. The first and second edges each have a taper that reduces to a width that is less than the width of the middle portion. The first and second edges may not have knife edge or razor edge sharpness because such sharp edges would eventually dull during use. Moreover, a tapered edge or relatively blunt edge has been found to be effective in fracture cutting organic matter.

Figure 28:
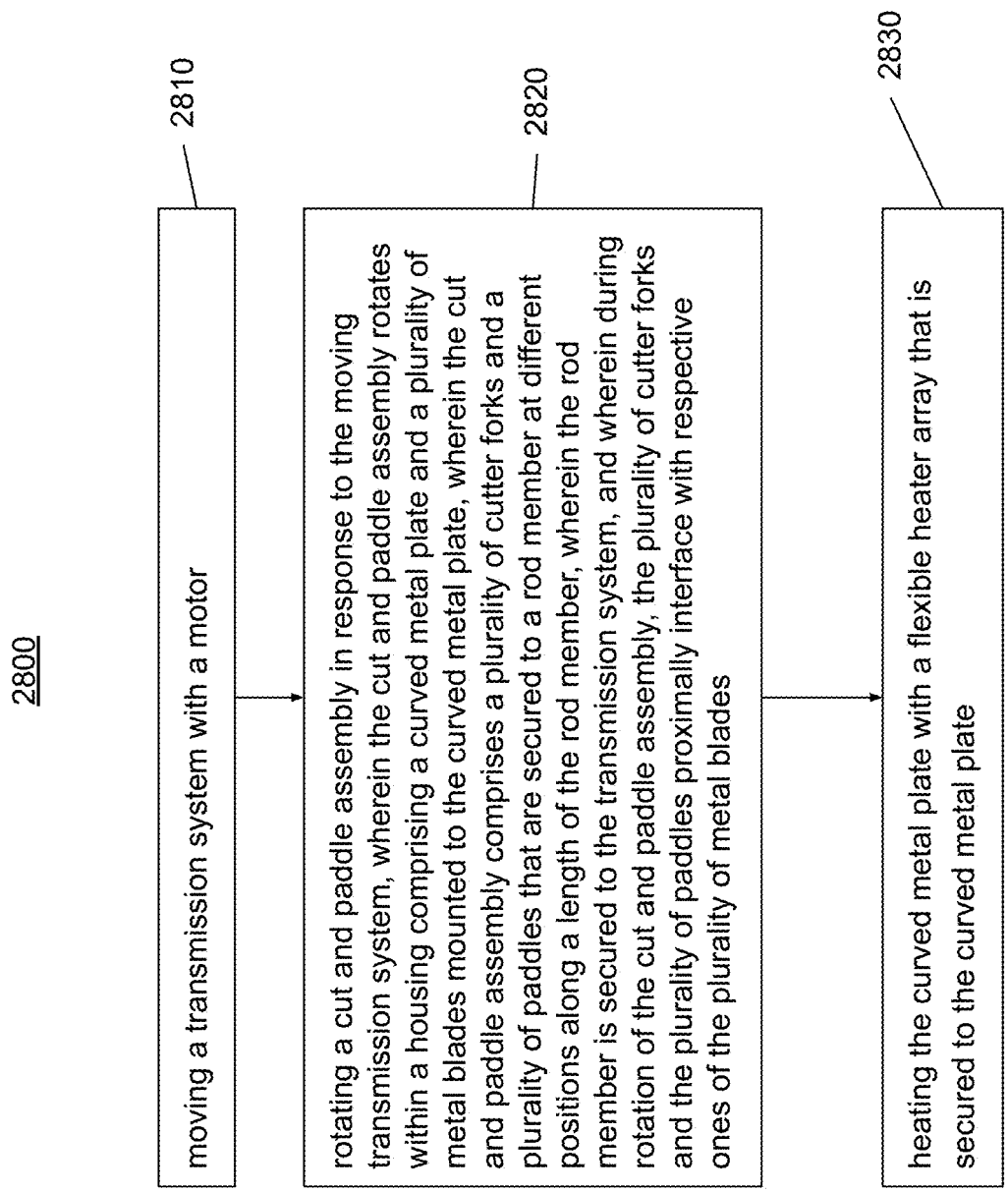
FIGS. 28 and 29 show different illustrative processes for processing organic matter with a bucket assembly, according to various embodiments.

FIG. 28 shows an illustrative process 2800 for processing organic matter with a bucket assembly, according to an embodiment. The bucket assembly can be bucket assembly 1400, for example. Starting at step 2810, a transmission system (e.g., including gears 2010 and 2020) can be moved with a motor (e.g., motor 1345). At step 2820, a cut and paddle assembly (e.g., 1440) can be rotated in response to the moving transmission system, wherein the cut and paddle assembly rotates within a housing (e.g., housing 1410) comprising a curved metal plate (1420) and a plurality of metal blades (e.g., blade array 1430) mounted to the curved metal plate, wherein the cut and paddle assembly comprises a plurality of cutter forks (e.g., cutter forks 1442 and 1443) and a plurality of paddles (e.g., paddles 1444-1446) that are secured to a rod member (e.g., rod 1441) at different positions along a length of the rod member, wherein the rod member is secured to the transmission system, and wherein during rotation of the cut and paddle assembly, the plurality of cutter forks and the plurality of paddles proximally interface with respective ones of the plurality of metal blades (e.g., see FIGS. 22A-22C and FIGS. 23A-23I). At step 2830, the curved metal plate can be heated with a flexible heater array (e.g., heater array 1720) that is secured to the curved metal plate.

It should be understood that the steps shown in FIG. 28 are illustrative and the order of the steps may be changed, additional steps may be added, or steps may be omitted. For example, an angular position of the cut and paddle assembly can be monitored and in response to receiving a bucket extraction notice, the cut and paddle assembly can be rotated such that the monitored angular position is held in place at a matter extraction position. The matter extraction position may position the paddles and cutter forks in substantially vertical position such as that shown in FIG. 22B to minimize interference with treated organic matter that is being deposited from the bucket assembly.

As another example, the motor can be controlled to rotate in a first direction for a first period of time and to rotate in a second direction for a second period of time. The motor can alternate between the first direction and the second direction after the first period of time has elapsed or after the second period of time has elapsed. The motor may alternate rotation direction to ensure that the organic matter is sufficiently mixed and ground. As explained above, the orientation of the paddles can cause the organic matter to shift from left-to-right when rotated in a first direction and from right-to-left when rotated in a second direction.

As yet another example, the flexible heater array can include multiple heater zones, and one or more of the heater zones can be selectively activated to apply heat to the curved metal plate. Thus, for scenarios where elevated heat is required, each of the multiple heater zones can be activated, and for scenarios where a base line level of heat is required, only one heater zone may be activated.

As yet another example, a load on the motor is monitored for an overload condition. In one approach, a torque sensor can be used to sense the load on the motor. In another approach, a current sensor can be used to sense the current consumption by the motor. If the current consumption exceeds a threshold, this can trigger an overload condition. In yet another approach, a speed sensor can be used to monitor the motor speed. If the speed drops below a certain rate for a fixed period of time, this can trigger the overload condition. Any combination of these approaches may be used to detect overload conditions. If the overload condition is monitored, an overload protection scheme can be engaged to protect the bucket assembly. The overload protection scheme can include stopping the motor to cease rotation in a current direction, reversing rotation of the motor to enable one of the cutter forks or one of the paddles responsible for causing the overload condition to backout a fixed number of angular degrees of rotation, and reversing rotation of the motor to resume rotation in the current direction. In another approach, the overload protection scheme can include stopping the motor to cease rotation and reversing rotation of the motor to cause the plurality of cutter forks and the plurality of paddles to rotate in the opposition direction. In yet another approach, the overload protection scheme can include determining that engagement of the overload protection scheme is not able to rectify the overload condition and notifying a user of the bucket assembly of the overload condition. If desired, any combination of these different overload protection schemes may be implemented.

As another example, the plurality of cutter members and the plurality of paddles can rotate at a speed ranging between 1 RPM and 2 RPMS. Despite being rotated at a constant speed, warbling noise is substantially eliminated because a fixed gap distance existing between the curved metal surface and a distal end of each of the plurality of cutter forks and the plurality of paddles is maintained throughout 180 degrees of the 360 degrees of rotation.

Figure 29:
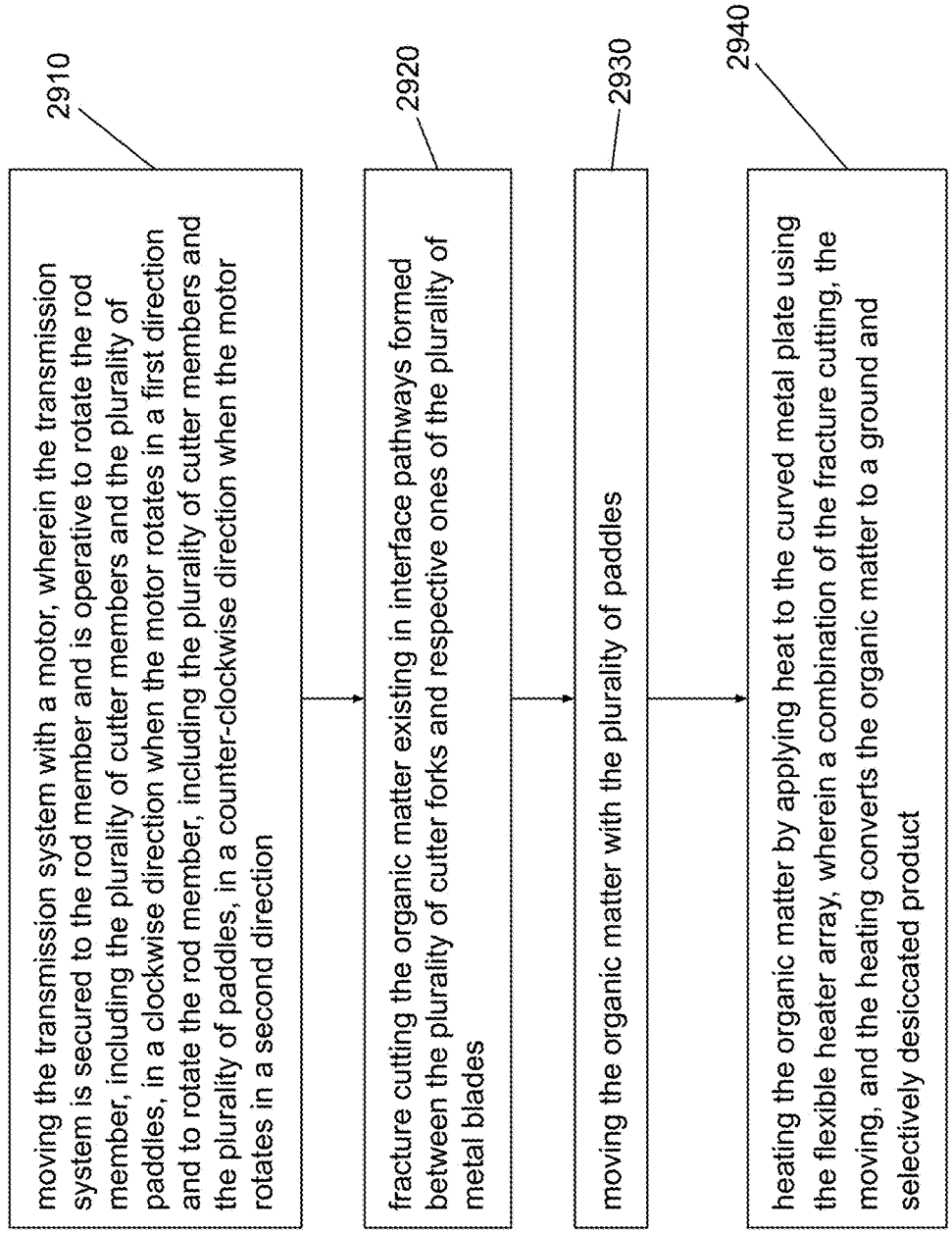

FIG. 29 shows illustrative process 2900 for processing organic matter with a bucket assembly according to an embodiment. The bucket assembly can include a transmission system, a housing, a curved metal plate, a plurality of metal blades secured to the curved metal plate, a flexible heater array attached to the curved metal plate, a rod member, a plurality of cutter members secured to the rod member, and a plurality of paddles secured to the rod member. Starting at step 2900, the transmission system can be moved with a motor, wherein the transmission system is secured to the rod member and is operative to rotate the rod member, including the plurality of cutter members and the plurality of paddles, in a clockwise direction when the motor rotates in a first direction and to rotate the rod member, including the plurality of cutter members and the plurality of paddles, in a counter-clockwise direction when the motor rotates in a second direction. Movement of the transmission system can include fracture cutting the organic matter existing in interface pathways formed between the plurality of cutter forks and respective ones of the plurality of metal blades (at step 2920) and moving the organic matter with the plurality of paddles (at step 2930). The organic matter can be heated (at step 2940) by applying heat to the curved metal plate using the flexible heater array, wherein a combination of the fracture cutting, the moving, and the heating converts the organic matter to a ground and selectively desiccated product.

It should be understood that the steps shown in FIG. 29 are illustrative and the order of the steps may be changed, additional steps may be added, or steps may be omitted.

Figure 30:
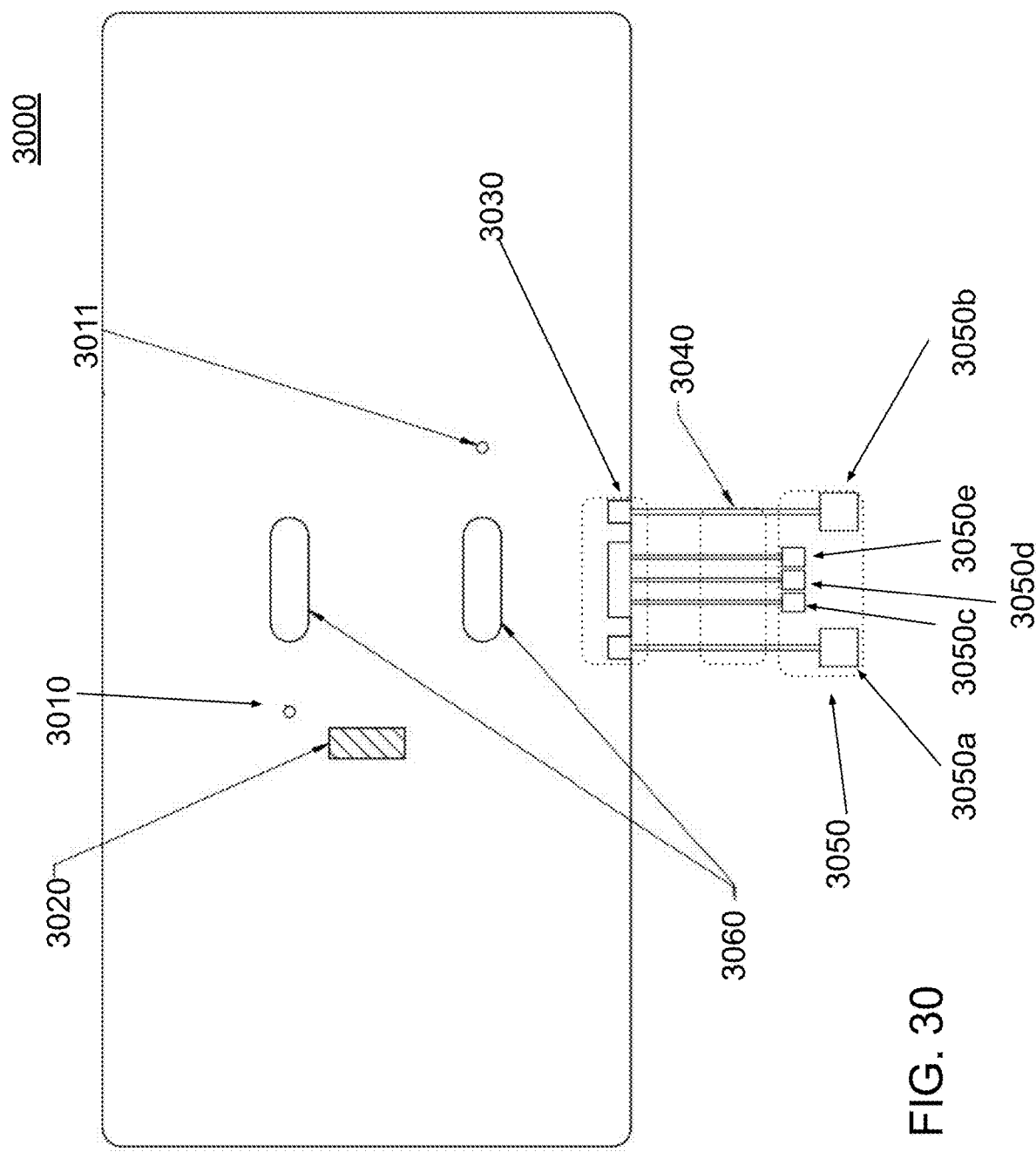
FIGS. 30 and 31 show different silicone molded flexible heaters according to various embodiments.

FIG. 30 shows a single zone silicone molded flexible heater 3000 according to an embodiment. Heater 3000 may be completely sealed to prevent any moisture intrusion. Heater 3000 can have an operating temperature of about 90-110 degrees Celsius and have a wattage density of approximately 3.5 watts per square inch. In one embodiment, a heater having a footprint of 300 mm by 140 mm can consume around 200 watts of total power. Heater 3000 can include silicone layer 3001, a metal heating mat (not shown) that has its traces arranged as a single zone, thermistors 3010 and 3011, cutoff switch 3020, connector junctions 3030, cables 3040, connectors 3050, and access ports 3060. A second silicon layer (not shown), in combination with silicone layer 3001 sandwiches the metal heating mat (not shown), thermistors 3010 and 3011, cutoff switch 3020, and connector junctions 3030 to provide a waterproof seal for heater 3000. Connector junctions 3030 can be connected to traces (not shown) that route to the heater mat and thermistors 3010 and 3011. These traces are sandwiched between the silicon layers. Cables 3040 are connected to respective connector junctions 3030. The connection between cables 3040 and connector junctions 3030 may be covered with an electrical potting compound to prevent moisture intrusion within heater 3000 via connector junctions 3030. Cables 3040 may be encapsulated in a moisture impenetrable material. In addition, an electrical potting compound may cover the connection between cables 3040 and connectors 3050.

Two thermistors 3010 and 3011 are provided in heater 3000. Thermistor 3010 may serve as the primary thermistor for heater 3000 and thermistor 3011 may serve as the backup thermistor for heater 3000. Heater 3000 has only one cutoff switch 3020, which is integrated into the heating traces of the heater mat. Cutoff switch 3020 can be a bi-metallic cutoff switch that uses a bimetal to operate as a temperature switch. When the temperature of heater 3000 is operating in normal conditions, the bimetal is in a free state and the contacts are closed, thereby allowing the heater to operate. If the temperature of heater 3000 exceeds a bimetal temperature threshold, the bimetal opens to sever the contacts and cut off power to heater 3000. When the operating temperature drops down below the bimetal temperature threshold, the contacts close and heater 3000 can continue to operate.

In some embodiments, heater 3000 can be attached to the curved metal plate (e.g., metal plate 1420) using glue or a pressure sensitive adhesive. After heater 3000 is attached, additional fasteners may be used to further secure heater 3000 to the metal place. Such fasteners can pass through access ports 3060.

Connectors 3050 can include five connectors shown as connectors 3050*a*-*e*. Connector 3050*a* can be AC common ground and connector 3050*b* can be AC power. Connectors 3050*a* and 3050*b* are used to power the heater mat. Connector 3050*c* may be a sense wire for thermistor 3011. Connector 3050*d* may be a sense wire for thermistor 3010. Connector 3050*e* may be a common ground the thermistors.

The cables 3040 connected to connectors 3050*a* and 3050*b* may be longer than the cables connected to connectors 3050*c*-3050*e*. This variation in cable lengths may be needed to achieve first mate, last mate interface connection timing.

Figure 31:
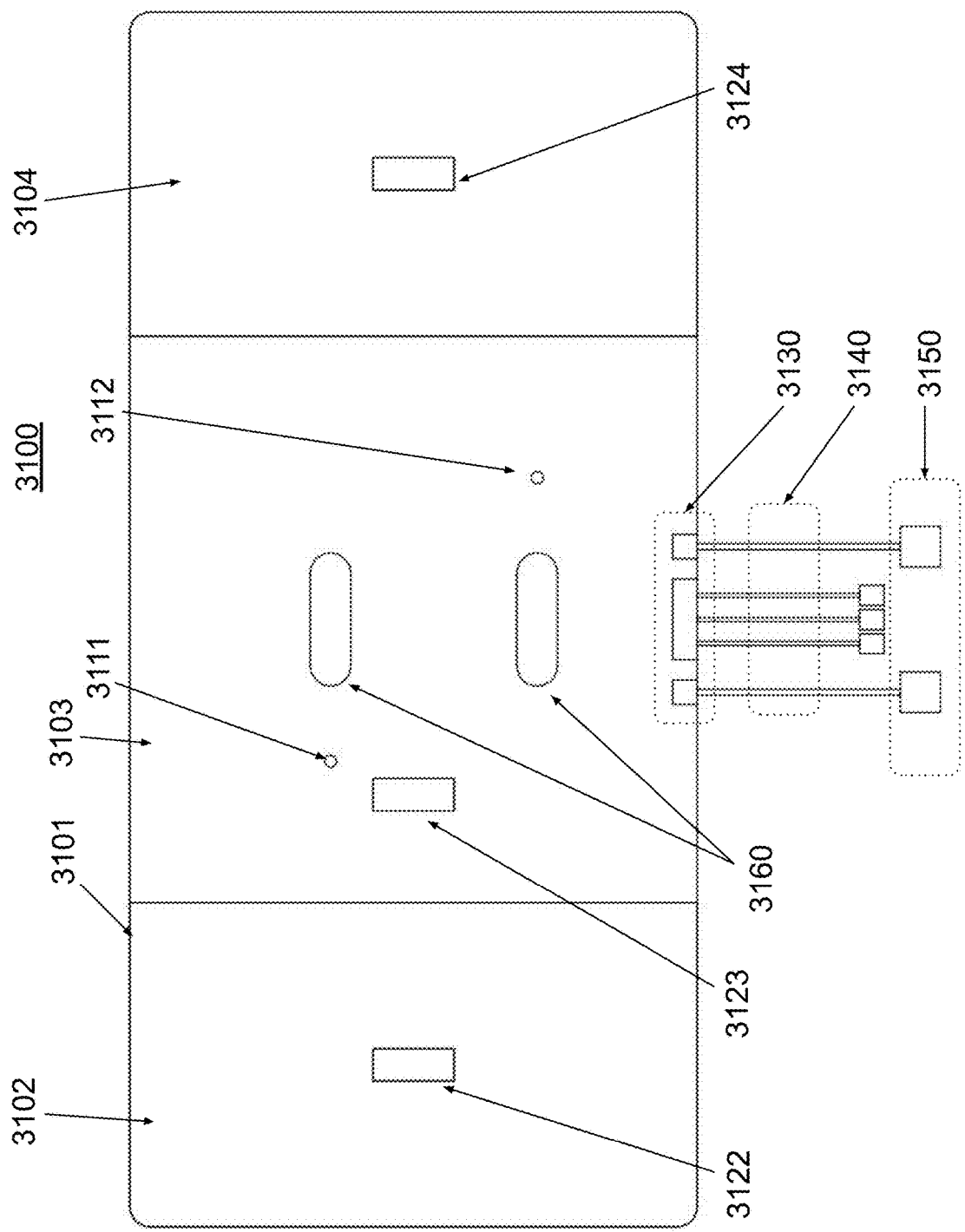

FIG. 31 shows a multi-zone silicone molded flexible heater 3100 according to an embodiment. Heater 3100 shares the same attributes as heater 3100, but the heater mat has its traces arranged into three different zones, shown as zones 3102-3104. In addition, each zone has its own integrated cutoff switch. As shown, cutoff switches 3122-3124 are associated with zones 3102-3104, respectively. Heater 3100 can include silicone layer 3101, a metal heating mat (not shown) that has its traces arranged as multiple zones 3102-3104, thermistors 3110 and 3111, cutoff switches 3122-3124, connector junctions 3130, cables 3140, connectors 3150, and access ports 3160. A second silicon layer (not shown), in combination with silicone layer 3101 sandwiches the metal heating mat (not shown), thermistors 3110 and 3111, cutoff switches 3122-3124, and connector junctions 3130 to provide a waterproof seal for heater 3100.

Figure 32B:
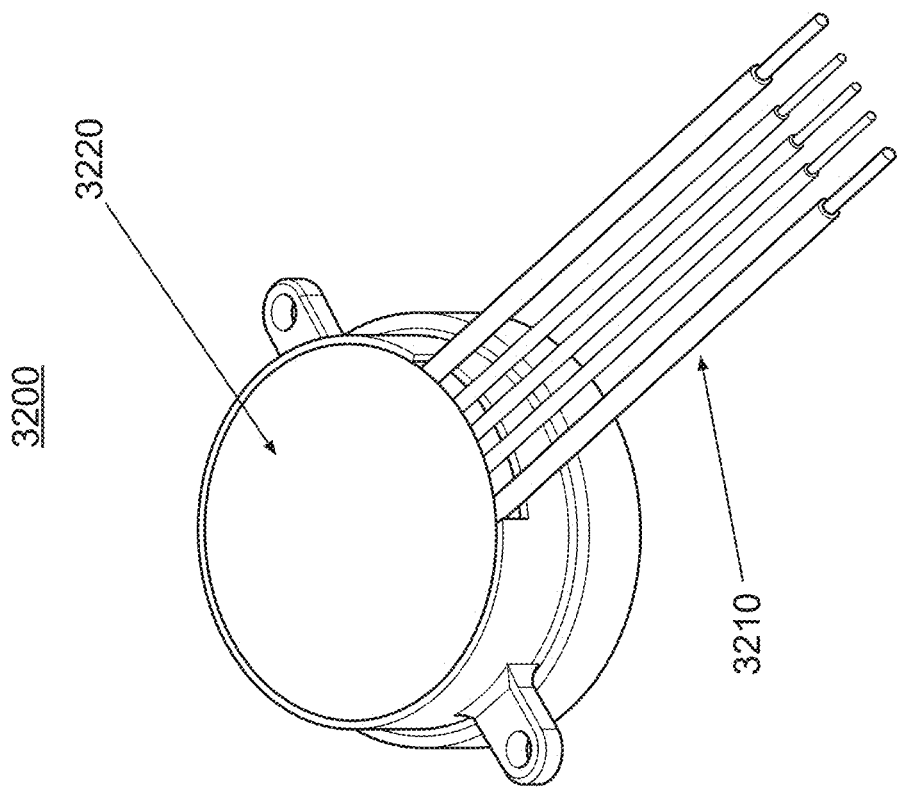
FIGS. 32A and 32B show top and bottom views, respectively, of a male electrical connector according to an embodiment.
Figure 32A:
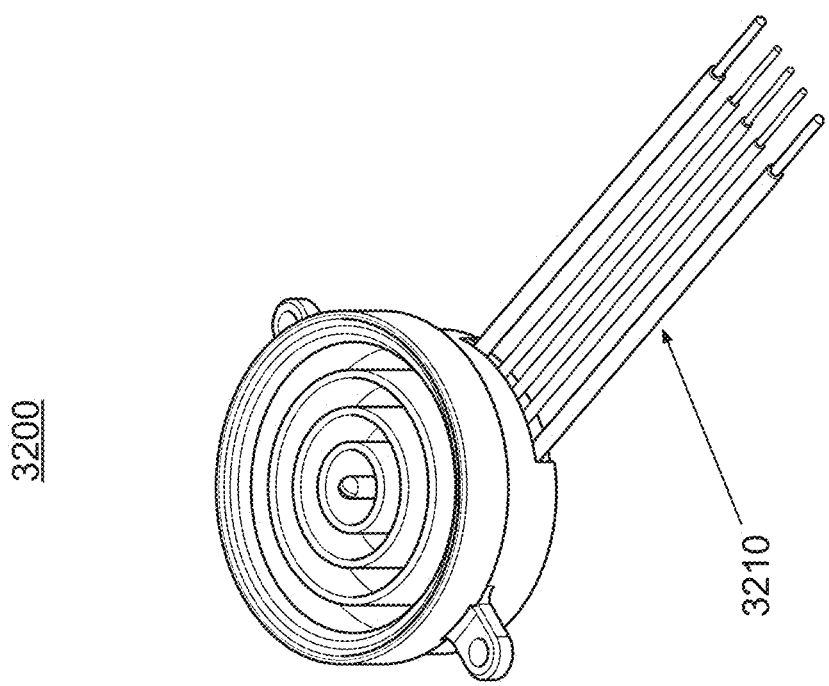

FIGS. 32A and 32B show top and bottom views, respectively, of male electrical connector 3200 according to an embodiment. Male connector 3200 may be equivalent to electrical connector 1414 (discussed above) that part of bucket assembly 1400. Wires 3210 are shown extending from connector 3200. Wires 3210 may correspond to five different connectors (not shown in FIGS. 32A and 32B, but shown in FIG. 31 as connectors 3050*a*-3050*e*) contained within housing 3202 of connector 3202. When wires 3210 are connected to their respective connectors, the connection may be sealed with an electrical potting compound (3220) to prevent moisture intrusion to connector 3200. The distal end of wires 3210 can be connected to a heat array (e.g., silicone heater 3000 or heater 3100) and sealed with an electrical potting compound.

Figure 33B:
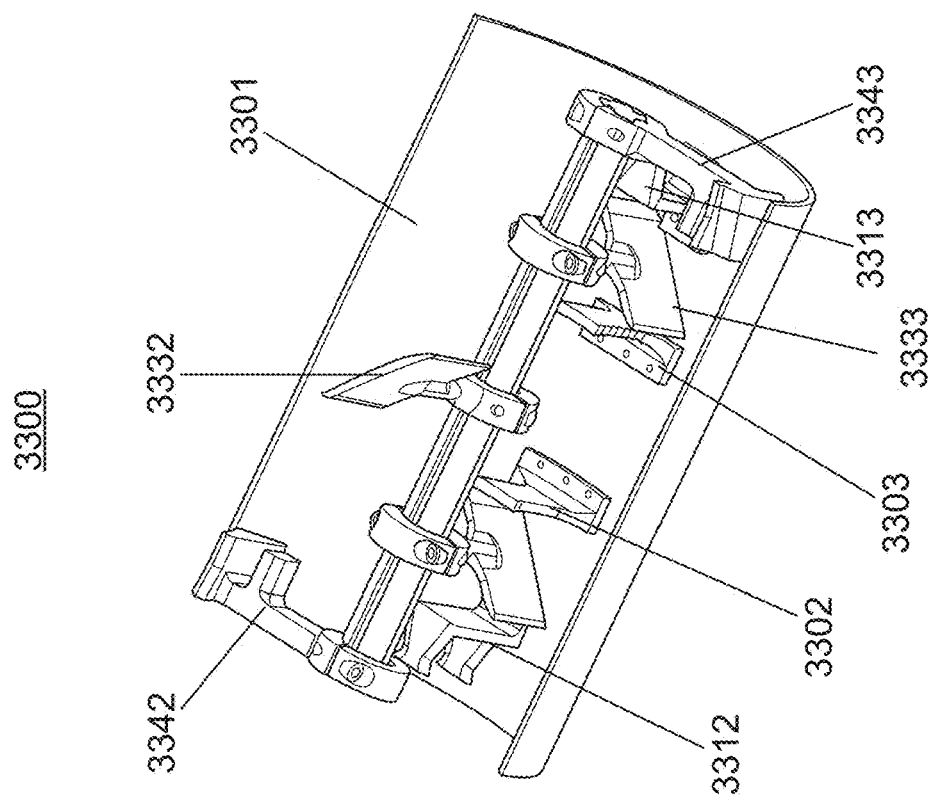
Figure 33A:
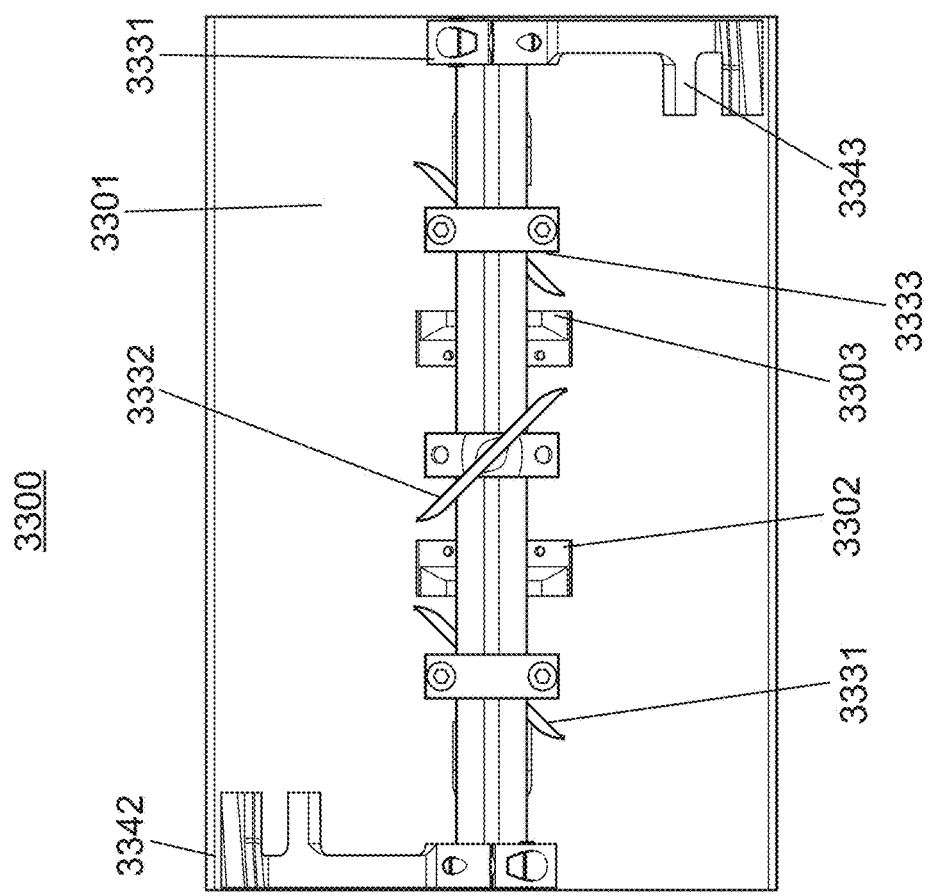

The discussion in connection with FIGS. 33A-38B describe different grinding mechanism embodiments that are alternatives to the embodiment shown in FIGS. 22A-27C. Each of the embodiments shown in FIGS. 33A-38B may rotate about a rotation axis as described above. The rotation axis may be parallel to a ground surface that the OMPA rests upon. Staring with FIGS. 33A and 33B, illustrative top and perspective views of grinder mechanism 3300 are shown. As shown, vertically oriented blades 3302 and 3303 are positioned in the middle of curved metal plate 3301. Also shown are dual plane horizontal blades 3312 and 3313 positioned on the edges of curved metal plate 3301. Grinder mechanism 3300 includes rod 3331 with paddles 3332-3334 hammer heads 3342 and 3343 secured thereto. Paddle 3332 passes by blade 3302, paddle 3333 passes between blades 3302 and 3303, and paddle pass by blade 3303 during each rotation. Paddle 3333 may be offset 180 degrees relative to paddles 3332 and 3334. In addition, each paddle may be oriented at 45 degrees relative to the length of rod 3331. Hammer head 3342 passes by horizontal blades 3312 and hammer head 3343 passes by horizontal blades 3313 during each rotation. Hammer heads 3342 and 3343 may be offset with respect to other (e.g., shown here to be offset by 180 degrees). Hammer heads 3342 and 3343 are discussed in more detail in connection with FIGS. 38A and 38B. Vertical blades 3302 and 3303 are discussed in more detail in connection with FIGS. 37A and 37B.

Figure 34B:
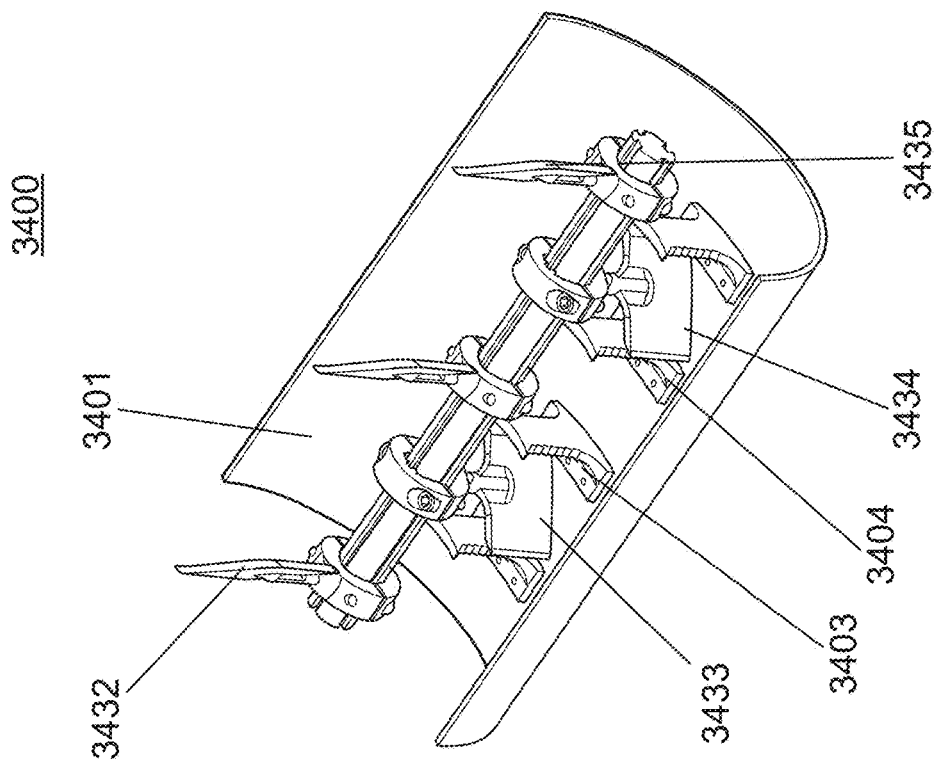
Figure 34A:
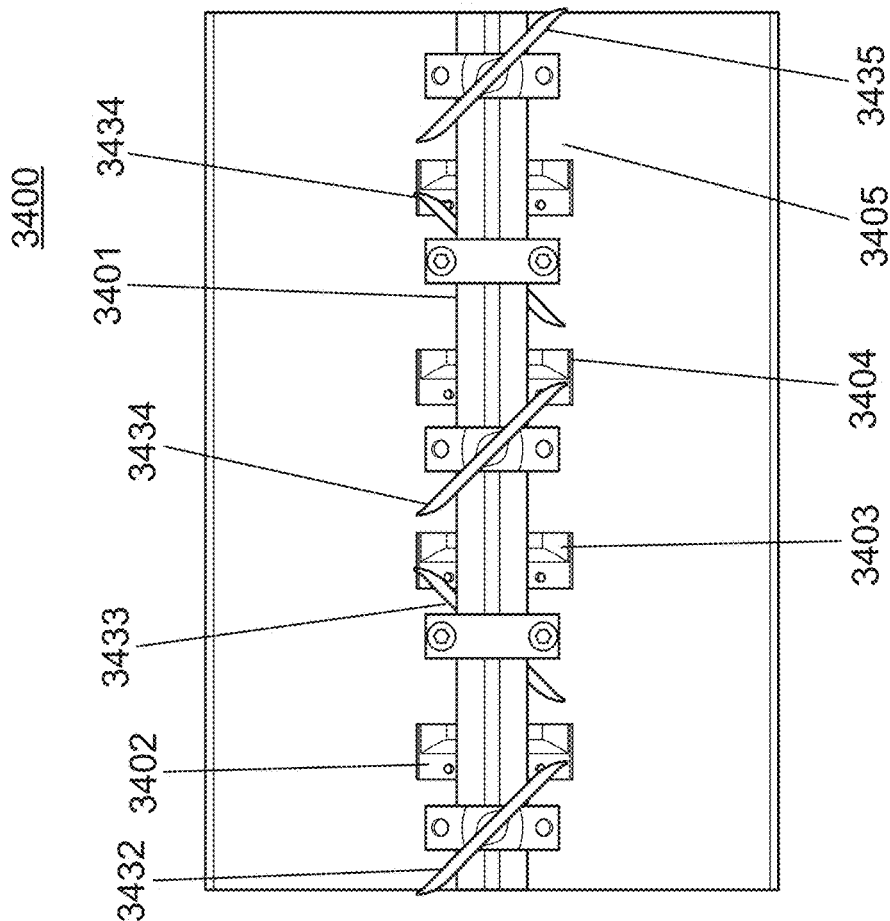

FIGS. 34A and 34B show grinder mechanism 3400 according to an embodiment. Grinder mechanism 3400 shows curved metal plate 3401, vertical blades 3402-3405, and paddles 3432-3436. Vertical blades 3402-3405 are secured to plate 3401 and paddles 3432-3436 are secured to rod 3431 as shown.

Figure 35B:
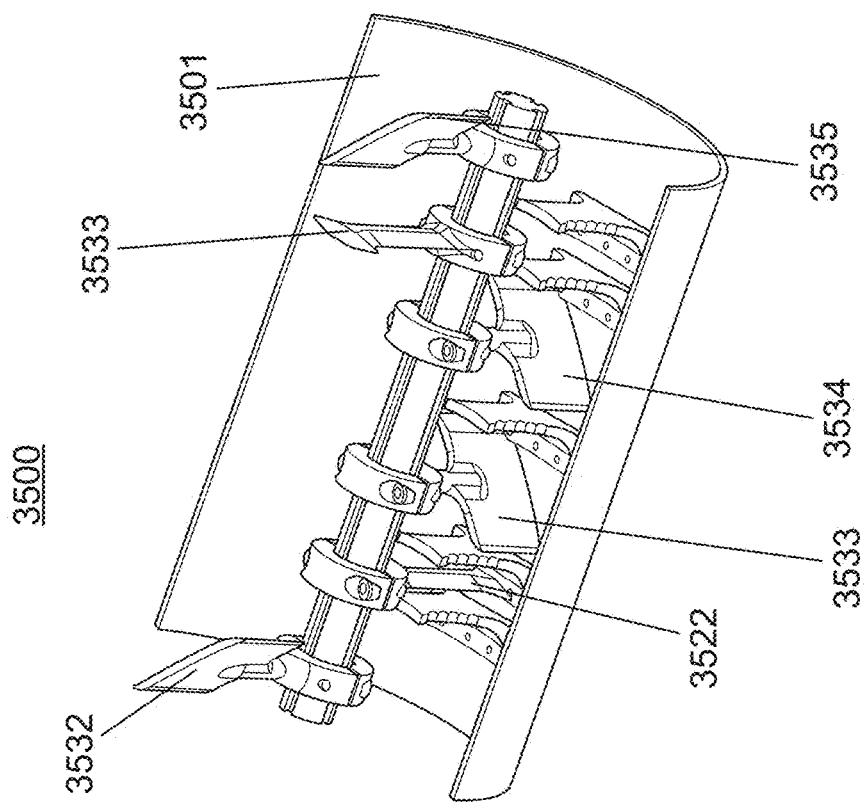
Figure 35A:
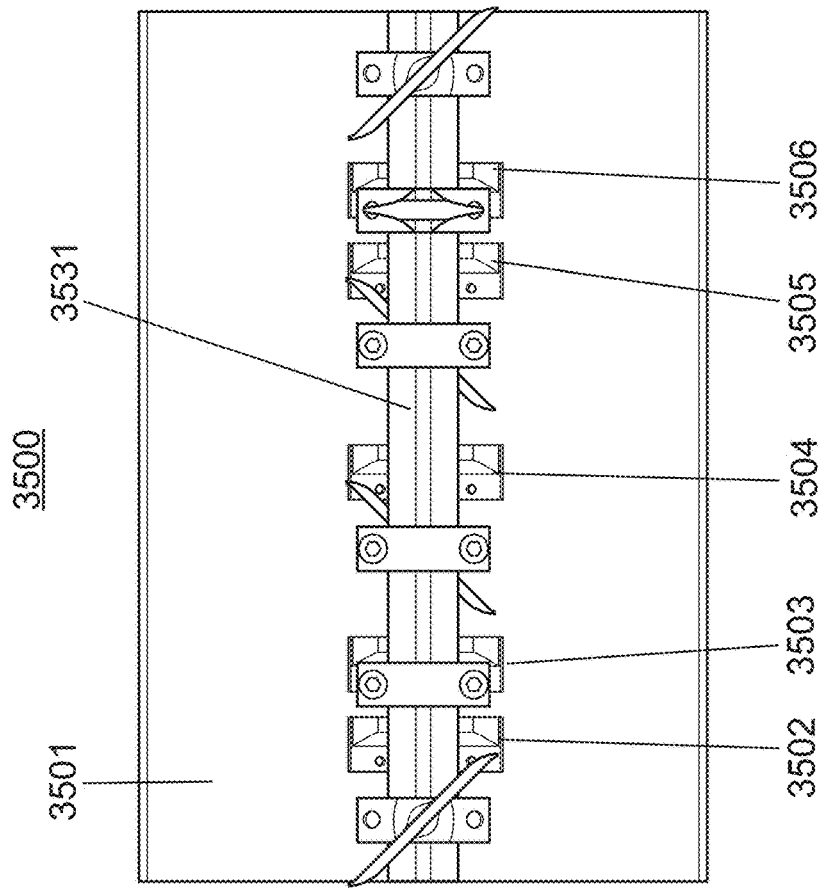
Figure 33B:
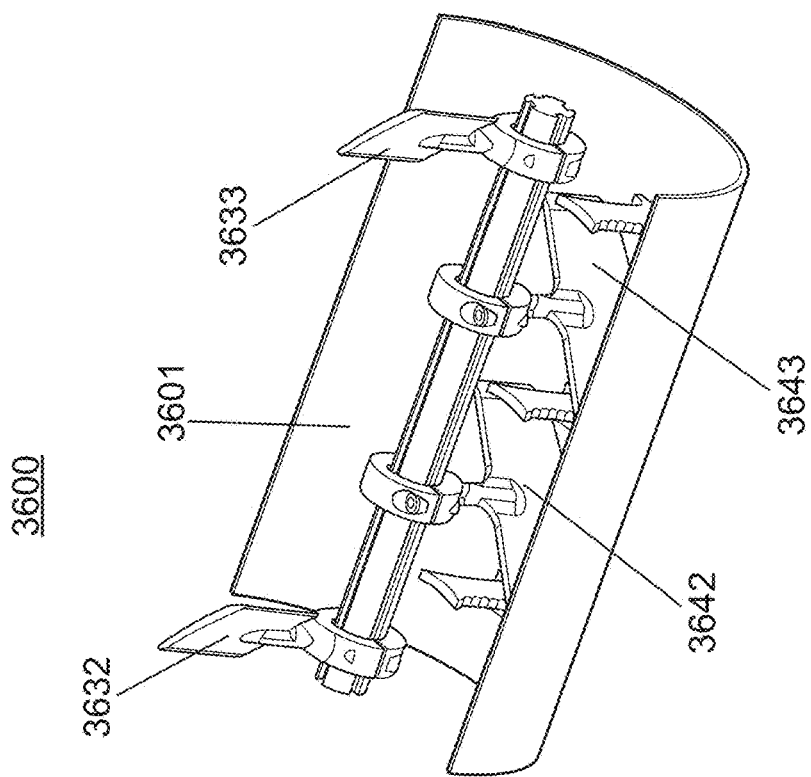
Figure 33A:
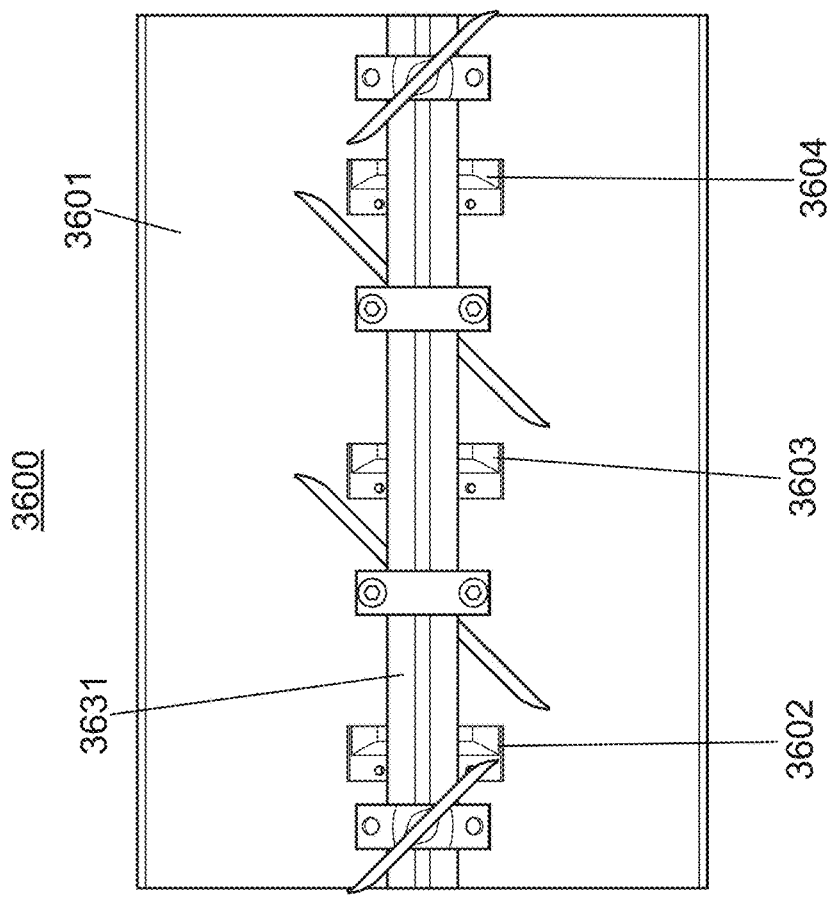

FIGS. 35A and 35B show grinder mechanism 3500 according to an embodiment. Grinder mechanism 3500 shows curved metal plate 3501, vertical blades 3502-3406, fracture blades 3522 and 3523, and paddles 3532-3535. Vertical blades 3402-3406 are secured to plate 3401 and blades 3522 and 3522 and paddles 3532-3536 are secured to rod 3531 as shown. Fracture blades 3522 and 3523 are configured to pass between two vertical blades are that placed relatively close to each other (e.g., 15-20 mm apart). For example, blades 3502 and 3503 are positioned relatively close together such that fracture blade 3532 can pass through them.

FIGS. 36A and 36B show grinder mechanism 3600 according to an embodiment. Grinder mechanism 3600 shows curved metal plate 3601, vertical blades 3602-3604, first sized paddles 3632 and 3633 and second sized paddles 3642 and 3643. Vertical blades 3602-3606 are secured to plate 3601. First sized paddles 3632 and 3633 and second sized paddles 3642 and 3643 are secured to rod 3631. First sized paddles 3632 and 3633 may a smaller width than that of second sized paddles 3642 and 3643. For example, first sized paddles may have a sweep width of 45 mm and the second sized paddles may have a sweep width of 80 mm. First and second sized paddles may have the same tilt angle (e.g., 45 degrees). In another embodiment, second size paddles may have a tilt angle of 30 degrees and a sweep width of 80 mm. Use of such a paddle may reduce the number of paddles needed from 5 to 3 or 4.

FIGS. 37A and 37B show an illustrative paddle 3702 and vertical blade 3712 according to an embodiment. Paddle 3702 may be the same paddles used in grinder mechanisms 3300, 3400, and 3500. Vertical blade 3712 may be same paddles used in grinder mechanisms 3300, 3400, 3500, and 3600. Paddle 3702 may have a 45 degree tile angle, a 45 mm coverage width, and a 45 mm sweep height. Vertical blade 3712 may a serrated edge to promote shearing and fracturing. A gap of 5-10 mm may exist between paddle 3702 and vertical blade 3712.

Figure 38B:
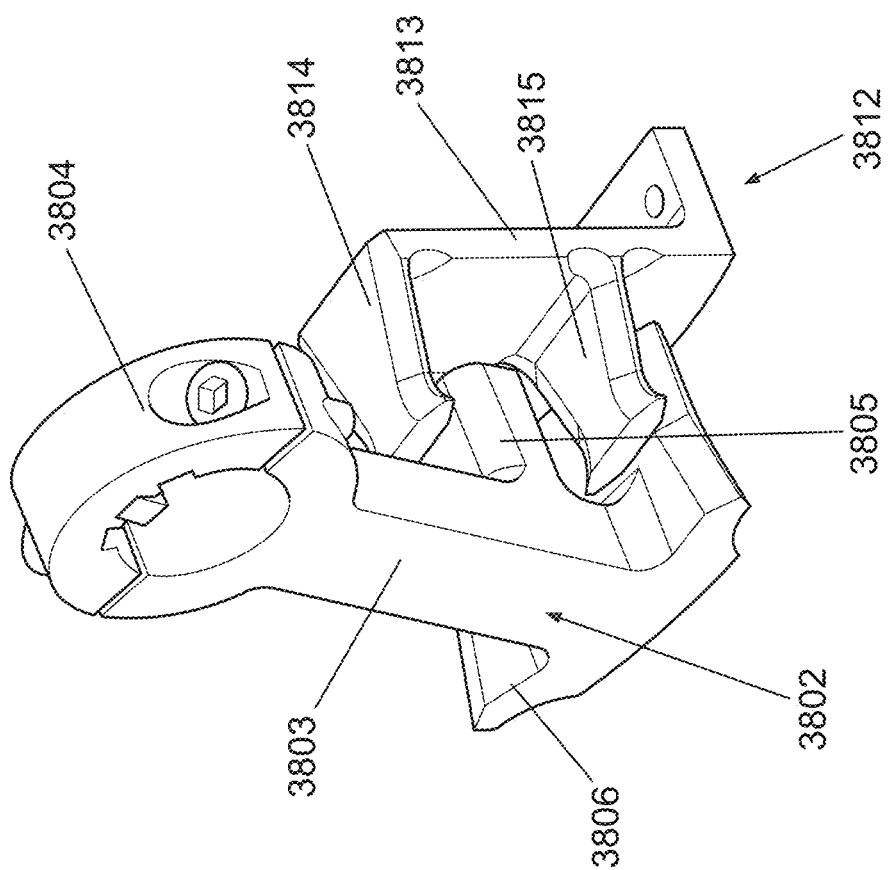
Figure 38A:
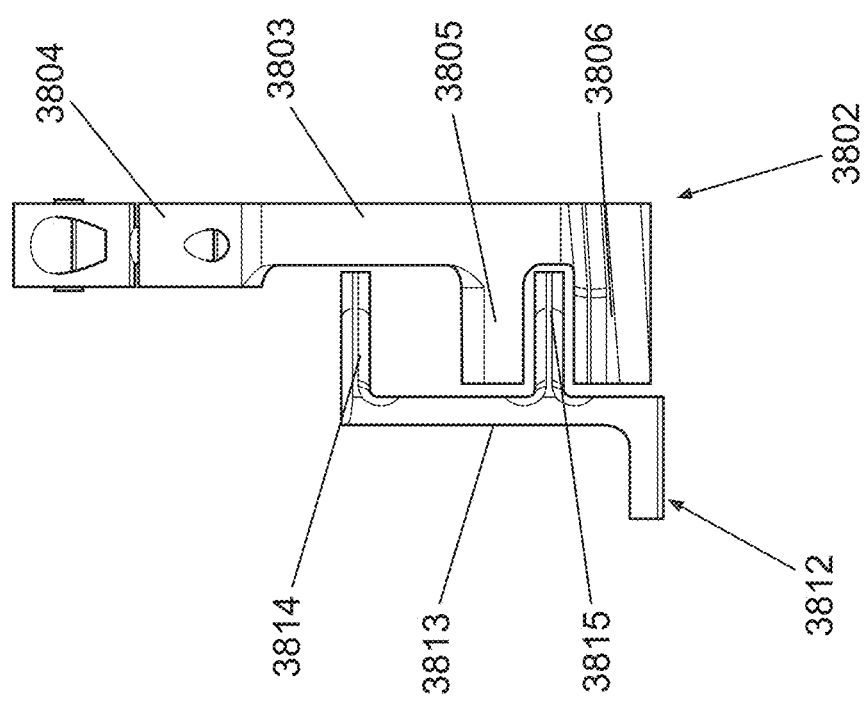

FIGS. 38A and 38B show an illustrative hammer head 3802 and horizontal blade pair 3812 according to an embodiment. Hammer head 3802 and horizontal blade pair 3812 may be used in grinder mechanism 3400. Hammer head 3802 can have extension member 3803 extending from rod securing portion 3804. First horizontal prong 3805 and second horizontal prong 3806 extend from extension member 3803 and are parallel to each other. Prong 3805 may have a different geometry or profile than prong 3806. For example, prong 3805 may have a more blunt face compared to a sharper edge of prong 3806. Horizontal blade pair 3812 may have vertical member 3813 with first horizontal blade 3814 and second horizontal blade 3815 protruding therefrom. First horizontal blade 3814 can be parallel to second horizontal blade 3815. First horizontal blade 3814 and second horizontal blade 3815 may have the same edge geometry or different edge geometries. Prong 3805 of hammer head 3802 may pass between blades 3814 and 3815 and prong 3806 may pass under blade 3815 during each rotation. A fixed gap (e.g., 2 mm) may exist between blade 3814 and prong 3806 and between prong 3806 and blade 3815.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The following provides a listing of various claim sets focusing on OMPAs and the use thereof. The claims, including the incorporated disclosures, cover various embodiments or configurations, methods, algorithms, and structures related to the embodiments defined herein. Features may be mixed between the various claim sets. Thus, various concepts covered in these claims can be integrated into different embodiments. The statement sets below are organized into different concepts. Each statement can be combined with any other statement. References to "any previous statement"

expressly extend beyond just the particular subset of statements but refers to any of the statements below.

Statement 1. A bucket assembly for processing organic matter, the bucket assembly having X, Y, and Z axes, the bucket assembly comprising:
  a plastic housing comprising an opening through which organic matter can be deposited and removed and a cavity that is at least partially defined by a plurality of interior surfaces;
  a curved metal plate coupled to the plastic housing, wherein the cavity is defined by the curved metal plate and the plurality of interior surfaces;
  a blade array coupled to a cavity facing side of the curved metal plate;
  a flexible heater array coupled to a first side of curved metal plate, wherein the first side is opposite of the cavity facing side, and wherein the flexible heater array operative to apply heat to the cavity via the curved metal plate; and
  a cut and paddle assembly comprising:
    a rod member having a center axis aligned parallel to the X axis;
    at least one cutter fork secured to the rod member and that extends radially away from the center axis;
    at least one paddle secured to the rod member and that extends radially away from the center axis; and
    wherein the cut and paddle assembly is operative to rotate around the center axis within the cavity such that the at least one cutter fork and the least one paddle pass by the blade array during rotation.

Statement 2. The bucket assembly of any previous statement, further comprising:
  a transmission housing coupled to the plastic housing, the transmission housing comprising:
    a first gear coupled to the rod member;
    a second gear that interfaces with the first gear;
    a motor rod coupled to the second gear; and
    a first motor interface connector coupled to the motor rod, the motor interface connector configured to interface with a second motor interface connector that is coupled to a motor, wherein when the first interface connector rotates, the first and second gears rotate in response thereto, thereby causing the cut and paddle assembly to rotate.

Statement 3. The bucket assembly of any previous statement, wherein the first gear rotates in a Y-Z plane, and wherein the second gear rotates in a X-Y plane.

Statement 4. The bucket assembly of any previous statement, wherein the first and second gears collectively yield a gear reduction of 1200 to 1 or a gear reduction existing within a range of 1000-1500 to 1.

Statement 5. The bucket assembly of any previous statement, wherein the transmission housing is constructed from a plastic material, wherein the transmission housing further comprises:
  a plurality of fastening support members that are configured to interface with and be coupled to reciprocal fastening members existing on the plastic housing;
  a plurality of double walled members disposed around a portion of a periphery of the transmission housing; and
  a support member for supporting the cut and paddle assembly, the support member comprising a cavity and a plurality of support structures extending from a circular wall defining the cavity.

Statement 6. The bucket assembly of any previous statement, wherein the plastic housing comprises an integrated pour spout that defines a shape of one of the interior surfaces, the plastic housing characterized as having a length, a width, and a depth, wherein the depth has a larger dimension than the length, and wherein the length has a larger dimension than the width.

Statement 7. The bucket assembly of any previous statement, wherein the blade array comprises:
  a support plate that matches a curvature of the metal plate to which the support plate is coupled; and
  a plurality of blades that are positioned at specific locations along the support plate in line with the X-axis and that extend up towards the opening along the Z-axis.

Statement 8. The bucket assembly of any previous statement, wherein a first interface clearance distance between a first cutter fork of the at least one cutter fork and a first one of the plurality of blades is maintained when the first cutter fork passes by the first blade, and wherein a second interface clearance distance between a first paddle of the at least one paddle and a second one of the plurality of blades is maintained when the first paddle passes by the second blade, wherein the second interface clearance distance is greater than the first interface clearance distance.

Statement 9. The bucket assembly of any previous statement, wherein each of the plurality of blades comprises a middle portion, a first edge, and a second edge, where the first and second edges abut the middle portion, and wherein the first and second edges each have a taper that reduces to a width that is less than a width of the middle portion.

Statement 10. The bucket assembly of any previous statement, wherein the plurality of blades comprises first, second, third, and fourth metal blades, wherein the first and fourth metal blades are positioned on opposite ends of the support plate and wherein the second and third blades are positioned between the first and fourth metal blades, and wherein a distance between the first and second metal blades is the same as a distance between the third and fourth metal blades, and wherein a distance between the second and third metal blades is greater than the distance between the first and second metal blades.

Statement 11. The bucket assembly of any previous statement, wherein a first radial distance exists between the center axis and the metal plate along the Y axis, wherein a second radial distance exists between the center axis and a top surface of the support plate along the Z axis, wherein a third radial distance exists between the center axis and the metal plate along the Z axis, wherein the first radial distance is the same as the second radial distance, and wherein the third radial distance is greater than the first radial distance and the second radial distance.

Statement 12. The bucket assembly of any previous statement, wherein the at least one cutter fork comprises:
  a ring portion that is secured to the rod member;
  a stem portion that connects the ring portion to a fork portion; and
  the fork portion comprising first and second prongs separated by a u-shaped channel.

Statement 13. The bucket assembly of any previous statement, wherein the first prong comprises a first edge design and wherein the second prong comprises a second edge design, wherein the first edge design is characterized as having a narrower edge than the second edge design.

Statement 14. The bucket assembly of any previous statement, wherein the at least paddle comprises:
  a ring portion that is secured to the rod member;
  a stem portion connected to the ring portion; and
  the paddle portion comprising a tongue member connected to the stem portion, a center region connected to the tongue member, a first edge region that abuts a first side of the center region, and a second edge region that abuts a second side of the center region.

Statement 15. The bucket assembly of any previous statement, wherein the first edge region comprises a curved portion that is oriented in a first direction, and wherein the second edge region comprises a curved portion that is oriented in a second direction that is opposite of the first direction.

Statement 16. The bucket assembly of any previous statement, wherein the at least one cutter fork comprises first and second cutter forks and wherein the at least one paddle comprises first, second, and third paddles.

Statement 17. The bucket assembly of any previous statement, wherein the first, second, and third paddles each has a first angular position, wherein the first cutter fork has a second angular position, and wherein the second cutter fork has a third angular position, wherein the second and third angular positions are selected such that only one cutter fork engages in cutting action at a time per rotation.

Statement 18. The bucket assembly of any previous statement, wherein when the first angular position is a zero degree position, the second and third angular positions can exist between 91 and 179 degrees, between 120 and 240 degrees, or between 165 and 195 degrees.

Statement 19. The bucket assembly of any previous statement, further comprising:
  a movable handle coupled to the plastic housing that assists a user in removing the bucket assembly from a subassembly;
  a mechanical registration footprint configured to interface only with a reciprocal mechanical registration footprint associated with the subassembly; and
  an electrical registration footprint configured to interface only with a reciprocal electrical registration footprint associated with the subassembly, wherein the mechanical registration footprint and the electrical registration footprint support self-standing of the bucket assembly when removed from the subassembly.

Statement 20. The bucket assembly of any previous statement, wherein the plastic housing is injected molded directly to the metal plate.

Statement 21. The bucket assembly of any previous statement 21, further comprising:
  a gasket existing between the metal plate and the plastic housing; and
  a plurality of rivets that couple the metal plate to the plastic housing.

Statement 22. An apparatus comprising:
  a subassembly comprising a first housing, a first electrical interface, a first mechanical interface, and a motor coupled to the first mechanical interface; and
  a bucket assembly constructed to be inserted into and removed from the first housing and interface with the first electrical interface via a second electrical interface and the first mechanical interface via a second mechanical interface, the bucket assembly comprising:
    a transmission system comprising the second mechanical interface and a transmission gear set;
    a second housing coupled to the transmission system, the second housing comprising:
      a cavity;
      the second electrical interface;
      a curved metal plate;
      a blade array mounted to a first side of the curved metal plate; and
      a flexible heater array mounted to a second side of the curved metal plate, wherein the second electrical interface receives power to enable the flexible heater array to heat the curved metal plate; and
    a cut and paddle assembly coupled to the transmission gear set and operative to rotate within the cavity when the motor drives the transmission system, the cut and paddle assembly comprising:
      at least one cutter fork that passes by the blade array during rotation of the cut and paddle assembly; and
      at least one paddle that passes by the blade array during rotation of the cut and paddle assembly.

Statement 23. The apparatus of any previous statement, wherein the cut and paddle assembly has a center axis that spans a length of the second housing, wherein the at least one cutter fork and the at least one paddle each rotate in a respective plane that is orthogonal to the center axis.

Statement 24. The apparatus of any previous statement, wherein the at least one cutter fork is operative to fracture cut organic matter against the blade array.

Statement 25. The apparatus of any previous statement, wherein the at least one paddle is operative to move organic matter within the cavity, including moving the organic matter above the center axis.

Statement 26. The apparatus of any previous statement, wherein the cut and paddle assembly is operative to rotate in a clockwise direction when the motor is rotating in a first direction and to rotate in a counter-clockwise direction when the motor is rotating in a second direction.

Statement 27. The apparatus of any previous statement, wherein the subassembly further comprises a movable bezel that is secured to the first housing.

Statement 28. The apparatus of any previous statement, wherein the flexible heater array comprises multiple zones that are each independently turned ON and OFF to vary a quantity of heat being applied to the curved metal plate.

Statement 29. The apparatus of any previous statement, wherein flexible heater array comprises at least one heat sensor.

Statement 30. The apparatus of any previous statement, wherein the transmission system comprises a position sensor operative to detect an angular position of the cut and paddle assembly.

Statement 31. The apparatus of any previous statement, wherein the transmission gear set has a gear reduction of 1200 to 1 or a gear reduction existing within a range of 1000-1500 to 1.

Statement 32. The apparatus of any previous statement, wherein during operation of the bucket assembly, heat is applied to the curved metal plate via the flexible heater array and the cut and paddle assembly alternates between periods of clockwise rotation and counter-clockwise rotation.

Statement 33. A bucket assembly comprising:
  a transmission housing comprising a transmission system;
  a plastic housing coupled to the transmission housing, the plastic housing comprising:
    a cavity;
    a curved metal plate;
    a plurality of blades mounted to a first side of the curved metal plate; and
    a flexible heater array mounted to a second side of the curved metal plate and that is operative to apply heat to the curved metal plate;
  a cut and paddle assembly comprising:
    a rod member secured to the transmission system and a side wall of the housing such that the rod member spans the cavity along a first axis;

a plurality of cutter forks secured to the rod member at different positions along the first axis and that are operative to rotate about the first axis within the cavity and pass over one of the plurality of blades; and a plurality of paddles secured the rod member at different positions along the first axis and that are operative to rotate about the first axis within the cavity and pass by at least one of the plurality of blades.

Statement 34. The bucket assembly of any previous statement, further comprising:

a plastic cover secured to the plastic housing such that it covers the flexible heater array and the second side of curved metal plate, wherein an airgap exists between the plastic cover and the flexible heater array.

Statement 35. The bucket assembly of any previous statement, wherein the plastic housing further comprises:

an integrated pour spout that defines a shape of an interior surface of the cavity; and a movable handle.

Statement 36. The bucket assembly of any previous statement, wherein the transmission housing comprises a mechanical registration footprint, wherein the plastic housing comprises an electrical registration footprint, and wherein the mechanical registration footprint and the electrical registration footprint enables the bucket assembly to self-stand.

Statement 37. The bucket assembly of any previous statement, wherein the plastic housing characterized as having a length, a width, and a depth, wherein the depth has a larger dimension than the length, wherein the length has a larger dimension than the width, and wherein the length is parallel to the first axis.

Statement 38. The bucket assembly of any previous statement, wherein each of the plurality of cutter forks comprises:

a ring portion that is secured to the rod member;

a stem portion that connects the ring portion to a fork portion; and the fork portion comprising first and second prongs separated by a channel.

Statement 39. The bucket assembly of any previous statement, where each of the plurality of cutter forks are aligned at a different angular position with respect to each other cutter fork.

Statement 40. The bucket assembly of any previous statement, wherein each of the plurality of paddles comprises:

a ring portion that is secured to the rod member;

a stem portion connected to the ring portion; and the paddle portion comprising a tongue member connected to the stem portion, a center region connected to the tongue member, a first edge region that abuts a first side of the center region, and a second edge region that abuts a second side of the center region.

Statement 41. The bucket assembly of any previous statement, wherein the center region has a center region axis that offset by a predetermined angle with respect to the first axis.

Statement 42. The bucket assembly of any previous statement, wherein each of the paddles are aligned according to a commonly shared angular position.

Statement 43. The bucket assembly of any previous statement, wherein the plurality of cutter forks and the plurality of paddles are arranged in an interlacing format such that one of the cutter forks is positioned directly adjacent to one of the paddles.

Statement 44. A method for processing organic matter with a bucket assembly comprising a transmission system, a housing, a curved metal plate, a plurality of metal blades secured to the curved metal plate, a flexible heater array attached to the curved metal plate, a rod member, a plurality of cutter members secured to the rod member, and a plurality of paddles secured to the rod member, the method comprising:

moving the transmission system with a motor, wherein the transmission system is secured to the rod member and is operative to rotate the rod member, including the plurality of cutter members and the plurality of paddles, in a clockwise direction when the motor rotates in a first direction and to rotate the rod member, including the plurality of cutter members and the plurality of paddles, in a counter-clockwise direction when the motor rotates in a second direction, wherein moving the transmission system comprises:

fracture cutting the organic matter existing in interface pathways formed between the plurality of cutter forks and respective ones of the plurality of metal blades; and moving the organic matter with the plurality of paddles; and heating the organic matter by applying heat to the curved metal plate using the flexible heater array, wherein a combination of the fracture cutting, the moving, and the heating converts the organic matter to a ground and selectively desiccated product.

Statement 45. The bucket assembly of any previous statement, further comprising:

alternating rotation direction such that the plurality of cutter members and the plurality of paddles rotate in the clockwise direction for a first period of time and rotate in the counter-clockwise direction for a second period of time.

Statement 46. The bucket assembly of any previous statement, wherein said moving the organic matter with the plurality of paddles comprises:

pushing the organic matter from left-to-right within the housing when the motor rotates in the first direction; and pushing the organic matter from right-to-left within the housing when the motor rotates in the second direction.

Statement 47. The bucket assembly of any previous statement, wherein said moving the organic matter with the plurality of paddles comprises:

lifting the organic matter away from a bottom portion of the curved metal plate and the plurality of metal blades.

Statement 48. The bucket assembly of any previous statement, further comprising fracture cutting organic matter existing in interface paths established between the plurality of paddles and respective ones of the plurality of metal blades.

Statement 49. The bucket assembly of any previous statement, wherein the flexible heater array comprises a plurality of heater zones, and wherein applying heat to the curved metal plate comprises:

selectively activating one or more of the heater zones to apply heat to the curved metal plate.

Statement 50. The bucket assembly of any previous statement, wherein the plurality of cutter members and the plurality of paddles rotate at a speed ranging between 1 RPM and 2 RPMS.

Statement 51. The bucket assembly of any previous statement, further comprising:
monitoring a load on the motor for an overload condition; and
engaging an overload protection scheme when the overload condition is monitored.

Statement 52. The bucket assembly of any previous statement, wherein the overload protection scheme comprises:
stopping the motor to cease rotation in a current direction;
reversing rotation of the motor to enable one of the cutter forks or one of the paddles responsible for causing the overload condition to backout a fixed number of angular degrees of rotation; and
reversing rotation of the motor to resume rotation in the current direction.

Statement 53. The bucket assembly of any previous statement, wherein the overload protection scheme comprises:
stopping the motor to cease rotation; and
reversing rotation of the motor to cause the plurality of cutter forks and the plurality of paddles to rotate in the opposition direction.

Statement 54. The bucket assembly of any previous statement, wherein the overload protection scheme comprises:
determining that engagement of the overload protection scheme is not able to rectify the overload condition; and
notifying a user of the bucket assembly of the overload condition.

Statement 55. A method for processing organic matter with a bucket assembly, comprising:
moving a transmission system with a motor;
rotating a cut and paddle assembly in response to the moving transmission system, wherein the cut and paddle assembly rotates within a housing comprising a curved metal plate and a plurality of metal blades mounted to the curved metal plate, wherein the cut and paddle assembly comprises a plurality of cutter forks and a plurality of paddles that are secured to a rod member at different positions along a length of the rod member, wherein the rod member is secured to the transmission system, and wherein during rotation of the cut and paddle assembly, the plurality of cutter forks and the plurality of paddles proximally interface with respective ones of the plurality of metal blades; and
heating the curved metal plate with a flexible heater array that is secured to the curved metal plate.

Statement 56. The method of any previous statement, further comprising:
monitoring an angular position of the cut and paddle assembly; and
in response to receiving a bucket extraction notice, rotating the cut and paddle assembly such that the monitored angular position is held in place at a matter extraction position.

Statement 57. The method of any previous statement, further comprising:
controlling the motor to rotate in a first direction for a first period of time;
controlling the motor to rotate in a second direction for a second period of time; and
alternating between the first direction and the second direction after the first period of time has elapsed or after the second period of time has elapsed.

Statement 58. The method of any previous statement, wherein the flexible heater array comprises a plurality of heater zones, and wherein applying heat to the curved metal plate comprises:
selectively activating one or more of the heater zones to apply heat to the curved metal plate.

Statement 59. The method of any previous statement, further comprising:
monitoring a load on the motor for an overload condition; and
engaging an overload protection scheme when the overload condition is monitored.

Statement 60. The method of any previous statement, wherein the overload protection scheme comprises:
stopping the motor to cease rotation in a current direction;
reversing rotation of the motor to enable one of the cutter forks or one of the paddles responsible for causing the overload condition to backout a fixed number of angular degrees of rotation; and
reversing rotation of the motor to resume rotation in the current direction.

Statement 61. The method of any previous statement, wherein the overload protection scheme comprises:
stopping the motor to cease rotation; and
reversing rotation of the motor to cause the plurality of cutter forks and the plurality of paddles to rotate in the opposition direction.

Statement 62. The method of any previous statement, wherein the overload protection scheme comprises:
determining that engagement of the overload protection scheme is not able to rectify the overload condition; and
notifying a user of the bucket assembly of the overload condition.

Statement 63. The method of any previous statement, wherein the plurality of cutter members and the plurality of paddles rotate at a speed ranging between 1 RPM and 2 RPMS.

Statement 64. The method of any previous statement, further comprising substantially eliminating a warbling noise by maintaining a fixed gap distance existing between the curved metal surface and a distal end of each of the plurality of cutter forks and the plurality of paddles throughout 180 degrees of the 360 degrees of rotation.

What is claimed is:

1. A bucket assembly for processing organic matter, the bucket assembly having X, Y, and Z axes, the bucket assembly comprising:
a plastic housing comprising an opening through which organic matter can be deposited and removed and a cavity that is at least partially defined by a plurality of interior surfaces;
a curved metal plate coupled to the plastic housing, wherein the cavity is defined by the curved metal plate and the plurality of interior surfaces;
a blade array coupled to a cavity facing side of the curved metal plate;
a flexible heater array coupled to a first side of curved metal plate, wherein the first side is opposite of the cavity facing side, and wherein the flexible heater array operative to apply heat to the cavity via the curved metal plate; and
a cut and paddle assembly comprising:
a rod member having a center axis aligned parallel to the X axis;
at least one cutter fork secured to the rod member and that extends radially away from the center axis;

at least one paddle secured to the rod member and that extends radially away from the center axis; and wherein the cut and paddle assembly is operative to rotate around the center axis within the cavity such that the at least one cutter fork and the least one paddle pass by the blade array during rotation.

2. The bucket assembly of claim 1, further comprising:
a transmission housing coupled to the plastic housing, the transmission housing comprising:
  a first gear coupled to the rod member;
  a second gear that interfaces with the first gear;
  a motor rod coupled to the second gear; and
  a first motor interface connector coupled to the motor rod, the motor interface connector configured to interface with a second motor interface connector that is coupled to a motor, wherein when the first interface connector rotates, the first and second gears rotate in response thereto, thereby causing the cut and paddle assembly to rotate.

3. The bucket assembly of claim 2, wherein the first gear rotates in a Y-Z plane, and wherein the second gear rotates in a X-Y plane.

4. The bucket assembly of claim 2, wherein the first and second gears collectively yield a gear reduction of 1200 to 1 or a gear reduction existing within a range of 1000-1500 to 1.

5. The bucket assembly of claim 2, wherein the transmission housing is constructed from a plastic material, wherein the transmission housing further comprises:
  a plurality of fastening support members that are configured to interface with and be coupled to reciprocal fastening members existing on the plastic housing;
  a plurality of double walled members disposed around a portion of a periphery of the transmission housing; and
  a support member for supporting the cut and paddle assembly, the support member comprising a cavity and a plurality of support structures extending from a circular wall defining the cavity.

6. The bucket assembly of claim 1, wherein the plastic housing comprises an integrated pour spout that defines a shape of one of the interior surfaces, the plastic housing characterized as having a length, a width, and a depth, wherein the depth has a larger dimension than the length, and wherein the length has a larger dimension than the width.

7. The bucket assembly of claim 1, wherein the blade array comprises:
  a support plate that matches a curvature of the metal plate to which the support plate is coupled; and
  a plurality of blades that are positioned at specific locations along the support plate in line with the X-axis and that extend up towards the opening along the Z-axis.

8. The bucket assembly of claim 7, wherein a first interface clearance distance between a first cutter fork of the at least one cutter fork and a first one of the plurality of blades is maintained when the first cutter fork passes by the first blade, and wherein a second interface clearance distance between a first paddle of the at least one paddle and a second one of the plurality of blades is maintained when the first paddle passes by the second blade, wherein the second interface clearance distance is greater than the first interface clearance distance.

9. The bucket assembly of claim 7, wherein each of the plurality of blades comprises a middle portion, a first edge, and a second edge, where the first and second edges abut the middle portion, and wherein the first and second edges each have a taper that reduces to a width that is less than a width of the middle portion.

10. The bucket assembly of claim 7, wherein the plurality of blades comprises first, second, third, and fourth metal blades, wherein the first and fourth metal blades are positioned on opposite ends of the support plate and wherein the second and third blades are positioned between the first and fourth metal blades, and wherein a distance between the first and second metal blades is the same as a distance between the third and fourth metal blades, and wherein a distance between the second and third metal blades is greater than the distance between the first and second metal blades.

11. The bucket assembly of claim 7, wherein a first radial distance exists between the center axis and the metal plate along the Y axis, wherein a second radial distance exists between the center axis and a top surface of the support plate along the Z axis, wherein a third radial distance exists between the center axis and the metal plate along the Z axis, wherein the first radial distance is the same as the second radial distance, and wherein the third radial distance is greater than the first radial distance and the second radial distance.

12. The bucket assembly of claim 1, wherein the at least one cutter fork comprises:
  a ring portion that is secured to the rod member;
  a stem portion that connects the ring portion to a fork portion; and
  the fork portion comprising first and second prongs separated by a u-shaped channel.

13. The bucket assembly of claim 12, wherein the first prong comprises a first edge design and wherein the second prong comprises a second edge design, wherein the first edge design is characterized as having a narrower edge than the second edge design.

14. The bucket assembly of claim 1, wherein the at least paddle comprises:
  a ring portion that is secured to the rod member;
  a stem portion connected to the ring portion; and
  the paddle portion comprising a tongue member connected to the stem portion, a center region connected to the tongue member, a first edge region that abuts a first side of the center region, and a second edge region that abuts a second side of the center region.

15. The bucket assembly of claim 14, wherein the first edge region comprises a curved portion that is oriented in a first direction, and wherein the second edge region comprises a curved portion that is oriented in a second direction that is opposite of the first direction.

16. The bucket assembly of claim 1, wherein the at least one cutter fork comprises first and second cutter forks and wherein the at least one paddle comprises first, second, and third paddles.

17. The bucket assembly of claim 16, wherein the first, second, and third paddles each has a first angular position, wherein the first cutter fork has a second angular position, and wherein the second cutter fork has a third angular position, wherein the second and third angular positions are selected such that only one cutter fork engages in cutting action at a time per rotation.

18. The bucket assembly of claim 17, wherein when the first angular position is a zero degree position, the second and third angular positions can exist between 91 and 179 degrees, between 120 and 240 degrees, or between 165 and 195 degrees.

19. The bucket assembly of claim 1, further comprising:
- a movable handle coupled to the plastic housing that assists a user in removing the bucket assembly from a subassembly;
- a mechanical registration footprint configured to interface only with a reciprocal mechanical registration footprint associated with the subassembly; and
- an electrical registration footprint configured to interface only with a reciprocal electrical registration footprint associated with the subassembly, wherein the mechanical registration footprint and the electrical registration footprint support self-standing of the bucket assembly when removed from the subassembly.

20. The bucket assembly of claim 1, wherein the plastic housing is injected molded directly to the metal plate.

21. The bucket assembly of claim 1, further comprising:
- a gasket existing between the metal plate and the plastic housing; and
- a plurality of rivets that couple the metal plate to the plastic housing.

* * * * *